United States Patent
Sato et al.

(10) Patent No.: US 6,470,907 B1
(45) Date of Patent: Oct. 29, 2002

(54) EXISTING PIPE CUT-OFF METHOD, EXISTING PIPE SLITTING METHOD, PIPING STRUCTURE, AND VALVE INSERTION METHOD FOR INSERTING A VALVE IN A LINE WITHOUT STOPPING PASSAGE OF WATER OR FLUID

(75) Inventors: Toshiyuki Sato; Hideshige Homma; Tamotsu Yamashita, all of Takatsuki; Gumpei Yokoyama, Osaka, all of (JP)

(73) Assignee: SuIken Co., Ltd., Shiga (JP)

( * ) Notice: Subject to any disclaimer, the term of this patent is extended or adjusted under 35 U.S.C. 154(b) by 0 days.

(21) Appl. No.: 09/195,601

(22) Filed: Nov. 19, 1998

(30) Foreign Application Priority Data

| Feb. 6, 1998 | (JP) | ............................................. 10-041087 |
| Mar. 13, 1998 | (JP) | ............................................. 10-082488 |
| Apr. 16, 1998 | (JP) | ............................................. 10-124032 |
| Apr. 16, 1998 | (JP) | ............................................. 10-124033 |
| Jun. 17, 1998 | (JP) | ............................................. 10-186865 |
| Jul. 16, 1998 | (JP) | ............................................. 10-219655 |

(51) Int. Cl.⁷ .................... F16K 43/00; B23D 21/06; B26D 3/16
(52) U.S. Cl. .................... 137/318; 30/94; 137/15.14; 137/315.41; 251/327; 251/328; 251/329
(58) Field of Search .................... 30/94; 137/315.41, 137/318, 15.14; 251/326, 327, 328, 329; 83/745, 829, 54; 82/78, 113

(56) References Cited

U.S. PATENT DOCUMENTS

| 1,989,768 A | * | 2/1935 | Nieman ........................ 137/318 |
| 2,396,964 A | * | 3/1946 | O'Brian ........................ 137/318 |
| 3,108,499 A | * | 10/1963 | Duncan ........................ 137/318 |
| 3,227,011 A | * | 1/1966 | Larry ........................... 137/318 |
| 3,385,314 A | * | 5/1968 | Thompson .................... 137/318 |
| 3,603,387 A | * | 9/1971 | Schoeffler .................... 137/318 |
| 3,633,873 A | * | 1/1972 | Leopold, Jr. et al. ........ 251/326 |
| 3,650,547 A | | 3/1972 | Tickett ........................ 137/318 |
| 3,699,996 A | | 10/1972 | Nichols ....................... 137/318 |
| 3,703,906 A | | 11/1972 | Tickett ........................ 137/318 |

(List continued on next page.)

FOREIGN PATENT DOCUMENTS

| DE | 8810661 | 2/1989 |
| GB | 258047 | 9/1926 |
| JP | 49-59368 | 8/1974 |
| JP | 52150892 | 12/1977 |
| JP | 55-44167 | 3/1980 |
| JP | 56-83690 | 7/1981 |
| JP | 56-120886 | 9/1981 |
| JP | 57-47089 | 3/1982 |
| JP | 09103908 | 4/1997 |
| WO | WO 97/31207 | 8/1997 |

OTHER PUBLICATIONS

"Introducing the Valve Insertion System," American Waterworks Association Annual Conference and Exposition, pp. 1–10, Jun. 21, 1998.

*Primary Examiner*—George L. Walton
(74) *Attorney, Agent, or Firm*—Sughrue Mion, PLLC

(57) ABSTRACT

The invention relates to an existing pipe cut-off method and slitting method, by which an existing pipe made of cast iron and steel can be cut off. With a cut-off method according to the invention, first, a part of an existing pipe 1 is enclosed and sealed up by a seal-up housing 2 in an airtight state, a cutting tool 30 having a plurality of blades 30c is accommodated in the corresponding seal-up housing in a state the cutting tool is attached to the abovementioned seal-up housing 2. Next, the cutting tool 30 is fed toward the center of the abovementioned existing pipe 1 while slitting the existing pipe 1 by rotating the cutting tool 30 by power of a prime mover, and the abovementioned existing pipe 1 is cut off by the cutting tool 30 by turning the abovementioned seal-up housing 2 in the circumferential direction R of the existing pipe 1.

34 Claims, 85 Drawing Sheets

U.S. PATENT DOCUMENTS

| | | | |
|---|---|---|---|
| 3,735,775 A | | 5/1973 | Tickett ........................ 137/318 |
| 3,799,182 A | * | 3/1974 | Long .......................... 137/318 |
| 3,948,282 A | | 4/1976 | Yano .......................... 137/318 |
| 4,370,995 A | * | 2/1983 | Smith .......................... 137/318 |
| 4,483,514 A | * | 11/1984 | Kennedy ..................... 251/327 |
| 4,516,598 A | * | 5/1985 | Stupak ........................ 137/318 |
| 4,527,586 A | * | 7/1985 | Yano et al. .................. 137/318 |
| 5,063,957 A | * | 11/1991 | Yano et al. .................. 137/318 |
| 5,074,526 A | * | 12/1991 | Ragsdale et al. ............ 137/318 |
| 5,509,440 A | * | 4/1996 | Cantaloube et al. ......... 137/318 |
| 5,611,365 A | | 3/1997 | Maichel ....................... 137/318 |
| 5,732,728 A | | 3/1998 | Maichel ....................... 137/318 |

\* cited by examiner

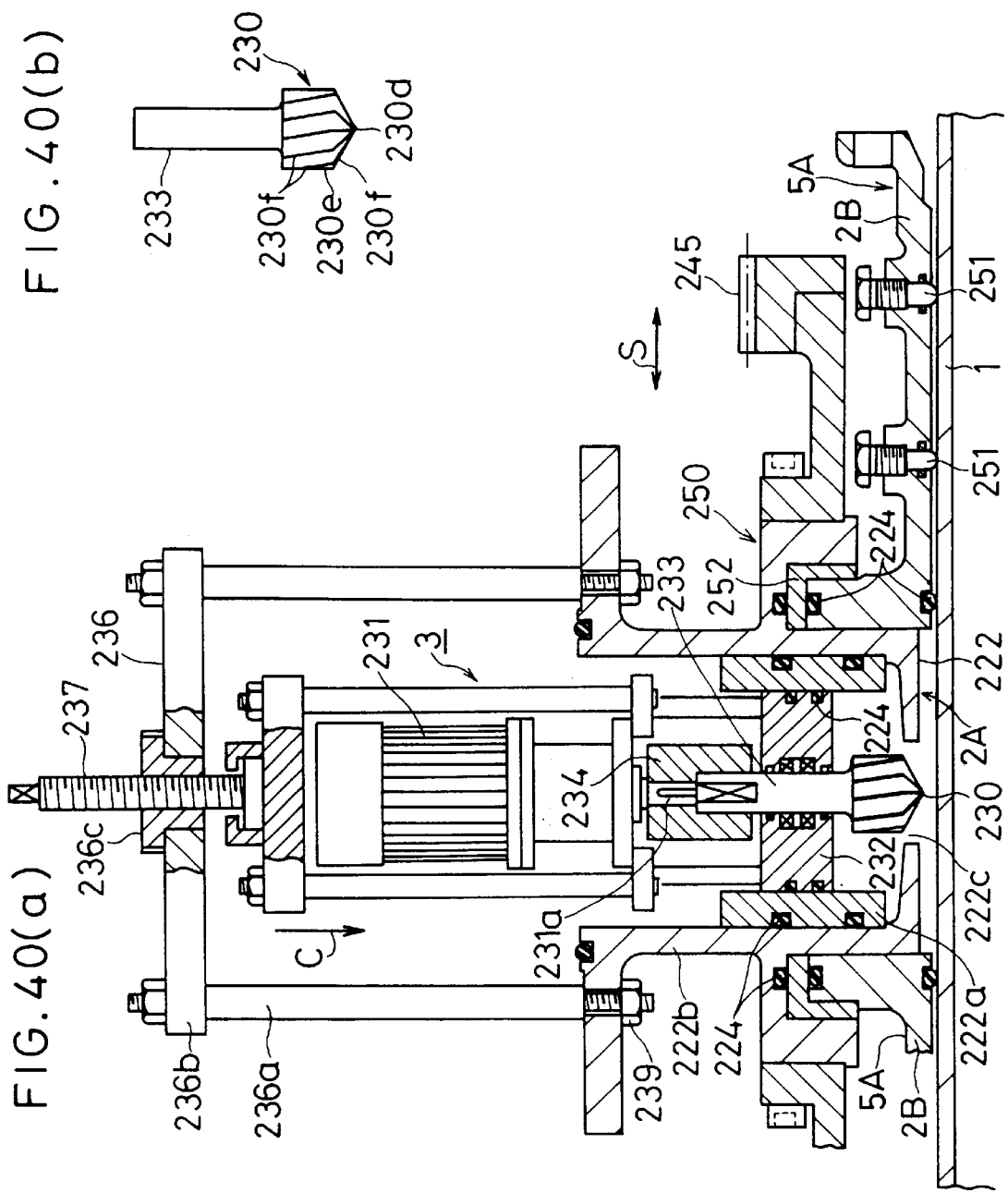

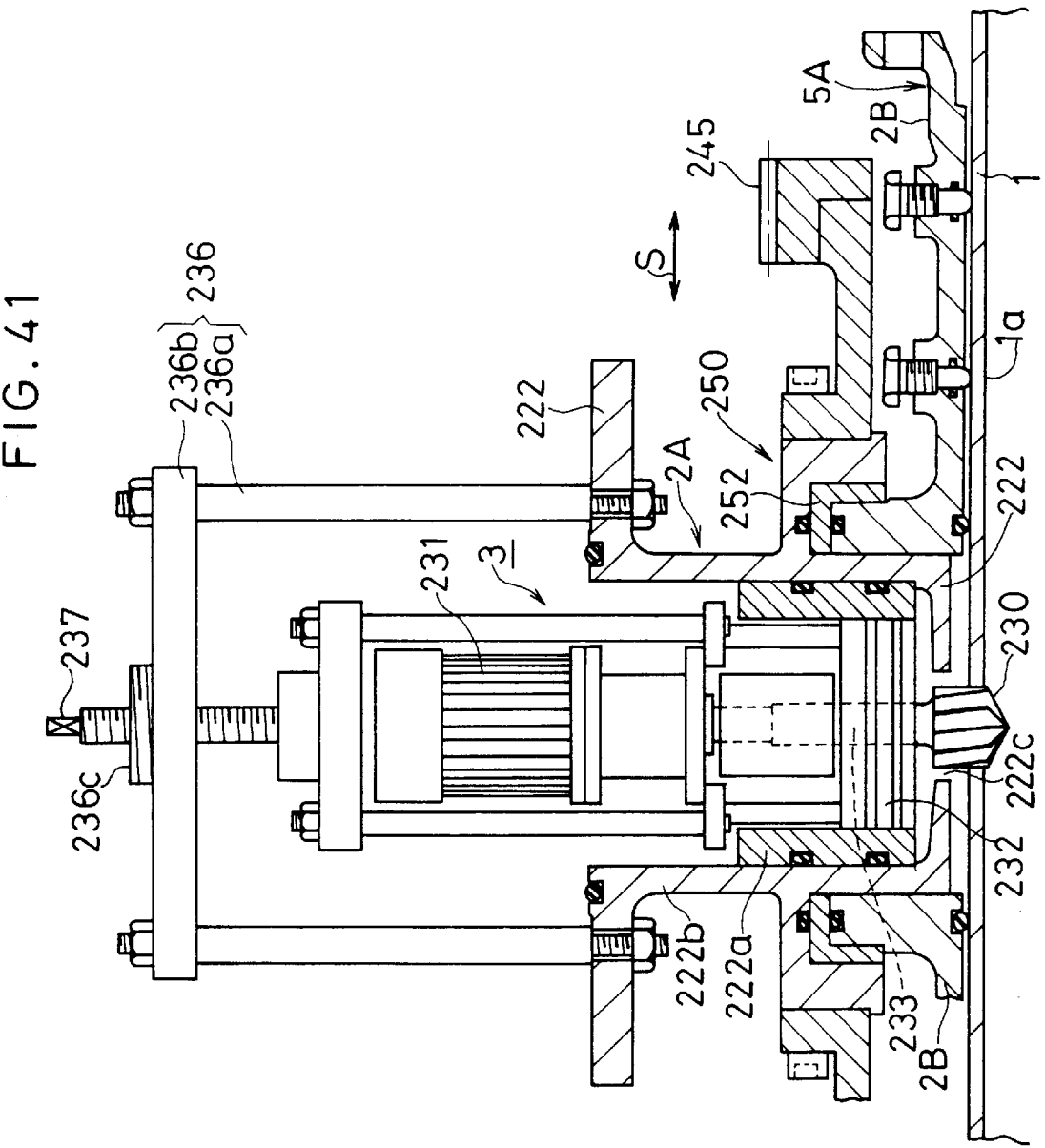

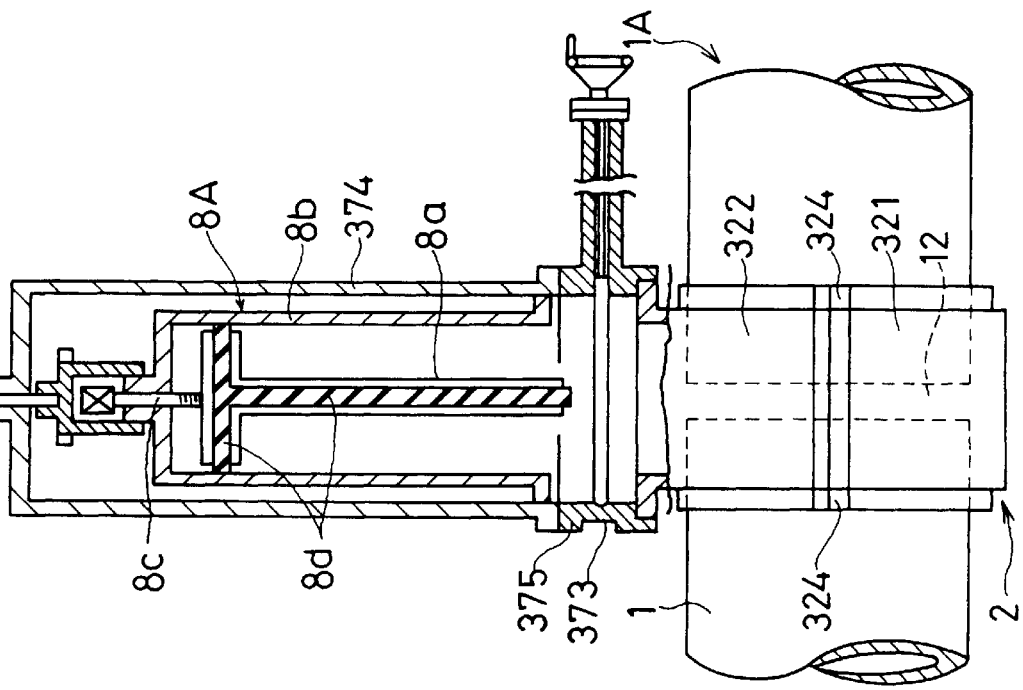
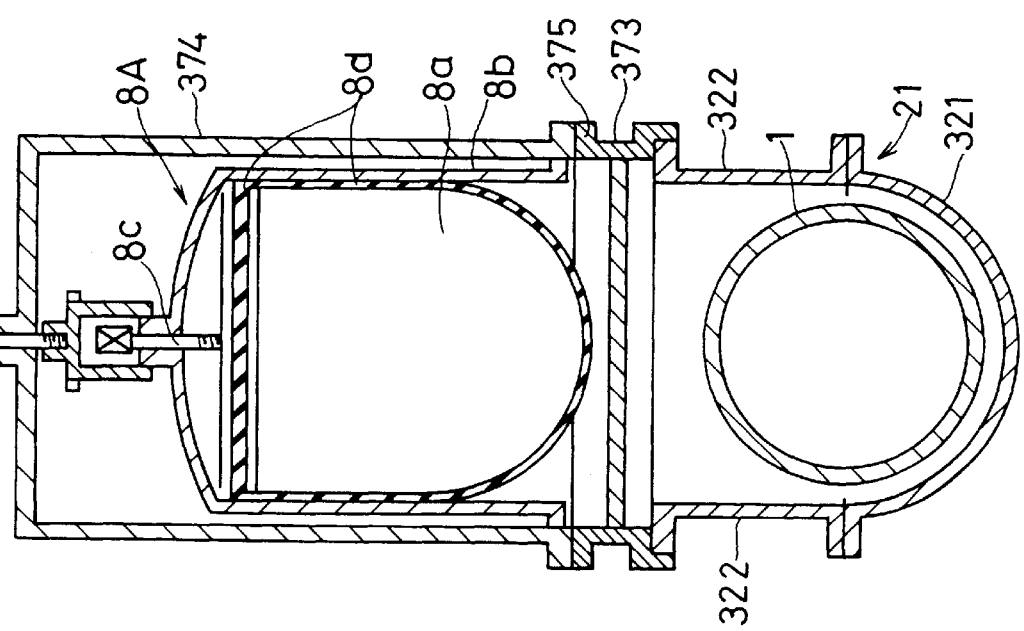

US 6,470,907 B1

EXISTING PIPE CUT-OFF METHOD, EXISTING PIPE SLITTING METHOD, PIPING STRUCTURE, AND VALVE INSERTION METHOD FOR INSERTING A VALVE IN A LINE WITHOUT STOPPING PASSAGE OF WATER OR FLUID

BACKGROUND OF THE INVENTION

1. Field of the Invention

The present invention relates to an existing pipe cut-off method, and a valve insertion method for inserting a valve in a line without stopping passage of water or fluid, etc.

2. Description of Prior Arts

Conventionally, a valve insertion method for inserting a valve in a line without stopping passage of water, by which an existing pipe is cut off without stopping passage of water and a valve is inserted into the cut-off portion of the existing pipe in a line including the existing pipe, has been already publicly known.

FIG. 72 shows a sketch of a conventional method disclosed in Japanese Laid-Open Patent Publication Nos. 44167 of 1980, 83690 of 1981, 120886 of 1981, and 47089 of 1982.

The method illustrated in the drawing is such that cutting equipment 500 is fixed at an existing pipe 1, the cutting equipment 500 and existing pipe 1 are enclosed and sealed up by a seal-up housing 501, and the left and right blades 502 are rotated along the cutting equipment 500 in order to cut off the existing pipe 1. Thereafter, a valve is inserted into a line 1A instead of a cut-off section 10 of the existing pipe 1 by opening and closing an operation sluice valve 503. In the prior art, since the cutting equipment 500 is accommodated in the seal-up housing 501, the seal-up housing 501 is made large-scaled to resultantly expand the digging area, etc.

FIG. 73 shows a sketch of a prior method disclosed in U.S. Pat. No. 5,611,365 and International Laid-Open WO 97/31207.

With the method illustrated in the drawing, an existing pipe 1 is enclosed and sealed up by a seal-up housing 600, a cutting tool 602 is fixed at and attached to the tip end of a gate valve 601 installed at the seal-up housing 600, and the gate valve 601 is turned together with the seal-up housing 600, wherein an existing pipe 1 is cut off by the cutting tool 602. According to the prior arts, since the cutting tool 602 is turned by rotations of the seal-up housing 600, it is not necessary that the seal-up mechanism for turning the cutting tool 602 is provided in a seal-up housing 600. Therefore, the seal-up housing 600 can be small-sized.

However, with such conventional cut-off methods, a chiplike cutter 602 bites an existing pipe 1. Therefore, in a housing of cutting into an existing pipe 1 made of cast iron or steel, the seal-up housing 600 must be turned many times, wherein it takes much time to cut off. Furthermore, there is a fear that rubber packing to seal between the seal-up housing 600 and existing pipe 1 is damaged.

FIG. 74 shows a sketch of a conventional cut-off method disclosed in U.S. Pat. Nos. 3,650,547, 3,703,906, and 3,735,775.

With the prior art shown in the drawing, an existing pipe 1 is enclosed and sealed up by a seal-up housing 700, and after a cutting wheel 701 attached to the seal-up housing 700 is caused to bite the existing pipe 1 by a lead screw 702, the cutting wheel 701 is turned together with the seal-up housing 700, whereby the existing tube 1 is cut off.

With the cutting method, since the cutting wheel 701 has a smooth outer circumferential part, it is impossible to cut off an existing pipe 1 made of cast iron and steel.

FIG. 75(a) and FIG. 75(b) show views of a conventional method for inserting a valve in a line without stopping passage of water, which is disclosed in U.S. Pat. No. 3,948,282.

With the conventional method shown in these drawings, an existing pipe 1 shown in FIG. 75(a) is enclosed and sealed up by a seal-up housing 800. Subsequently, an operation sluice valve 801 is attached to the seal-up housing 800. Thereafter, a circular hole 803 is drilled by using a hole saw 802 in compliance with an already known method. After the drilling is completed, as shown in FIG. 75(b), a valve body 804 which is fitted into the drilled circular hole 803 is inserted therein.

With the conventional valve inserting method, since the hole 803 which has roughly the same diameter as the inner diameter of the existing pipe 1 is provided, the seal-up housing 800 shown in FIG. 75(a) is made longer in the axial direction S and is made large-sized.

Furthermore, with the conventional inserting method, since hydraulic pressure is given to the valve body 804 shown in FIG. 75(b) with respect to a large area equivalent to the circular hole, the diameter of the valve rod 806 is unavoidably made large.

Still furthermore, with the conventional inserting method, the circumferential edge 805 of the hole 803 at the existing pipe 1 is made thin, and pressure resulting from the valve body 804 is applied to the circumferential edge 805, wherein the existing pipe 1 is liable to be broken.

FIG. 76(a) and FIG. 76(b) show the outline of a conventional valve insertion method for inserting a valve in a line without stopping passage of water, which was disclosed in U.S. Pat. No. 4,516,598.

In the prior art shown in these drawings, the existing pipe 1 in FIG. 76(a) is enclosed and sealed up by an seal-up housing 800. At this time, a hole saw 802 and a valve body 804 are accommodated in advance in the seal-up housing 800. Thereafter, a circular hole is drilled at the existing pipe 1 by the hole saw 802. After the drilling is completed, the seal-up housing 800 is turned as shown by the arrow 850 in FIG. 76(a). After that, a valve body 804 is inserted into the circular hole 803 in FIG. 76(b).

FIG. 77 shows the outline of a conventional valve insertion method for inserting a valve in a line without stopping passage of water, which was disclosed in U.S. Pat. No. 1,989,768.

In the prior art shown in this drawing, the existing pipe 1 in FIG. 77 is enclosed and sealed up by a seal-up housing 501. At this time, cutting equipment 500 and a sluice valve 510 are accommodated in advance in the seal-up housing 501. After the cutting equipment 500 having a blade 502 cuts off and removes the existing pipe 1, the sluice valve is inserted instead of the cutting equipment 500.

The prior arts shown in FIG. 76(a), 76(b), and FIG. 77 are able to quickly insert a valve after the cutting is completed. But with the prior arts shown in FIG. 76(a), 76(b), and FIG. 77, since it is necessary to accommodate a hole saw 802 or cutting equipment 500, the size of which is equivalent to that of the valves 804 and 510 to be inserted, in the seal-up housing 800 or 501, the seal-up housings 800 and 501 are obliged to be large-scaled.

SUMMARY OF THE INVENTION

The present invention has been developed to solve the problems inherent to the prior arts, and it is therefore a major object of the invention to provide an existing pipe cut-off method by which the existing pipe made of cast iron or steel can be cut off without causing its seal-up housing to turn many times.

It is another object of the invention to provide a method for inserting a valve in a line without stopping passage of water, in which the abovementioned method is employed.

It is still another object of the invention to provide a piping structure in which an existing pipe is scarcely damaged, an existing pipe slitting method by which the existing pipe can be slit to such a shape as the existing pipe is scarcely damaged, and a method for inserting a valve in a line without stopping passage of fluid.

In order to achieve the abovementioned main object, in a cut-off method according to the invention, a cutting tool, which is fixed at a rotatably supported cutter shaft and is provided with a plurality of blades, is accommodated in a seal-up housing in a state where the cutting tool is attached to the abovementioned seal-up housing while enclosing, in an airtight state, a part of an existing pipe by the abovementioned seal-up housing which is divided into plural sections in the circumferential direction of the existing pipe.

Subsequently, the abovementioned cutting tool is fed roughly in the cross direction of the abovementioned existing pipe in a state of performing a slitting motion to slit the abovementioned existing pipe by rotations of the abovementioned cutting tool by causing the abovementioned cutting tool to rotate on the abovementioned cutter shaft by power of a prime mover, wherein the abovementioned cutting tool is caused to perform a feed motion with the abovementioned cutting tool turned in the abovementioned circumferential direction by causing at least a part of the abovementioned seal-up housing to turn in the abovementioned circumferential direction of the abovementioned existing pipe, and the abovementioned existing pipe is cut off by the abovementioned cutting tool.

According to the invention, since the existing pipe is slit by rotating the cutting tool on its cutter shaft, any existing pipe made of cast iron or steel is able to be easily cut off by turning the seal-up housing one to three times. Therefore, the cut-off time can be shortened, and there is no fear that rubber packing secured at the rotating and sliding portion is damaged.

In the invention, "existing pipe" means a pipe through which fluid such as water flows and is generally buried under the ground.

"Seal-up" does not mean "completely sealed" but means such a state where work can be carried out without stopping passage of water or fluid. Therefore, "seal-up housing" means a housing which has such a pressure resisting capacity, by which it can withstand the pressure of fluid flowing through the existing pipe, and has a sealing capacity to some degree.

Furthermore, "enclosed and sealed up in an airtight state" means such a sealed up state where work such as inserting a valve in a line after cut-off or slitting is not hindered, for example, wherein a water discharge port is provided at the seal-up housing and is made open during slitting of an existing pipe, and cutting chips may be discharged through the discharge port together with water.

Since a "cutting tool" used in the present cut-off method has a plurality of blades, the corresponding cutting tool does not include a cutting chip and a cutter wheel having a single continuous blade. As the "cutting tool" used in the cut-off method, a columnar cutting tool having a plurality of blades on its tip end and its outer circumferential surface may be used in addition to a diamond wheel and a metal slitting saw, etc.

Here in the specification, "pillar shape" means a conical trapezoidal shape in addition to a columnar shape, and includes such a shape, in which a conical shape is added to a column, and a conical shape. Furthermore, it may be of a short-pillar shape in comparison with the outer diameter of a cutting tool.

Furthermore, in a housing of slitting an existing pipe having mortar lining on its inner circumferential surface, it is preferable that a cutting tool having a plurality of blades made of an ultra-hard alloy, or a cutting tool, the blades of which are made of diamond grains, is used.

Furthermore, in the invention, "slitting" means slitting a part of a pipe wall by rotating a plurality of blades. On the other hand, "cut-off" means cutting off a pipe into two or more sections. Furthermore, "slitting motion" means causing a plurality of blades to rotate on the cutter shaft. On the other hand, "feeding motion" means causing the abovementioned cutting tool to move to the position where a new part of the pipe wall can be progressively cut off or slit by the cutting tool.

In the invention, "feeding the cutting tool roughly in the cross direction of the existing pipe and causing the seal-up housing to turn in the circumferential direction of the existing pipe" means both housings, one of which is turning the seal-up housing after the cutting tool is fed roughly in the cross or diametrical direction of an existing pipe, and the other of which is turning the seal-up housing while feeding the cutting tool roughly in the cross or diametrical direction of an existing pipe.

It is possible to insert a valve into the cut-off position of the existing pipe in a line after the existing pipe is cut off by the cut-off method of the invention.

Furthermore, in the invention, "inserting a valve (in a line)" does not mean physically inserting a valve or valve body in a cut-open section of an existing pipe but means installing a valve, which can stop water or regulate the flow quantity in an existing line, in the corresponding line.

Herein, "valve" means the entire valve, that is, valve assembly, including a valve body, valve housing, valve rod, etc.

Furthermore, "valve body" means a member which clogs a flow passage, in the case of a sluice valve, it is generally called a gate, and in the case of a butterfly valve, it is a member which turns around the valve rod, Still furthermore, "valve housing" means a member which accommodates the valve body, regardless of its opened or closed state of the valve body.

In order to achieve the abovementioned other object of the invention, a piping structure according to the invention is provided with an existing pipe, a seal-up housing, a sluice valve body and a valve rod.

The abovementioned existing pipe has a slit groove obtained by notching the corresponding existing pipe in a range of approximately 180 degrees in the circumferential direction thereof.

The abovementioned seal-up housing is divided into plural sections in the circumferential direction of the abovementioned existing pipe and encloses and seals up the existing pipe in an airtight state.

The sluice valve body has rubber packing which is brought into contact with the inner circumferential surface of the existing pipe and a cut-off surface forming the abovementioned slit groove in the corresponding existing pipe in the open state (closed state). The sluice valve body moves in the diametrical direction of the abovementioned existing pipe in the seal-up housing and invades the existing pipe through the slit groove, wherein the abovementioned rubber packing stops a stream of fluid in the existing pipe.

The abovementioned valve rod causes the valve body to move roughly in the cross direction.

In a preferred embodiment of the invention, the slit groove is formed by slitting an existing pipe by the cutting tool.

Furthermore, in another preferred embodiment of the invention, the slit surface forming the abovementioned slit groove is formed so that the angle with respect to the surface of the existing pipe at the corresponding part is set in a range from 45 degrees through 90 degrees.

Furthermore, in still another preferred embodiment of the invention, both end portions of the abovementioned slit groove in the circumferential direction are made roughly U-shaped.

A piping structure according to the invention is completed by inserting a valve in a line, by a method for inserting a valve in a line without stopping passage of fluid according to the invention, after slitting an existing pipe by, for example, an existing pipe slitting method of the invention. Furthermore, "without stopping passage of fluid (water)" means that work is carried out without stopping a stream of fluid (for example, water) flowing in a line.

That is, in an existing pipe slitting method according to the invention, a cutting tool, which is rotatably supported on the axial line established roughly in the cross direction of an existing pipe and is provided with a plurality of blades on the tip end face and outer circumferential surface of the columnar portion thereof, is accommodated in a seal-up housing in a state where the cutting tool is attached to the abovementioned seal-up housing while enclosing, in an airtight state, a part of the abovementioned existing pipe by the abovementioned seal-up housing which is divided into plural sections in the circumferential direction of the existing pipe. Subsequently, the abovementioned cutting tool is fed roughly in the cross direction of the abovementioned existing pipe in a state of performing a slitting motion to slit the abovementioned existing pipe by rotations of the abovementioned cutting tool by causing the abovementioned cutting tool to rotate on the abovementioned axial line by power of a prime mover, wherein the abovementioned existing pipe is slit by the abovementioned cutting tool in a range of approximately 180 degrees in the circumferential direction thereof by causing the abovementioned cutting tool to perform a feed motion with the abovementioned cutting tool turned in the abovementioned circumferential direction by causing at least a part of the abovementioned seal-up housing to turn in the abovementioned circumferential direction of the abovementioned existing pipe.

After the existing pipe is slit in a range of approximately 180 degrees by the abovementioned cutting tool in conjunction with a slitting method according to the invention, a valve is inserted in a line. The valve body of the valve invades the existing pipe through the slit groove, clogs the slit groove itself, and is pressure-fitted to the inner circumference of the existing pipe, thereby closing the abovementioned existing pipe.

According to the invention, a cutting tool, the axial line of which is set in the diametrical direction of an existing pipe, is fed in the circumferential direction of the existing pipe to slit the existing pipe like a deep groove. Therefore, since the peripheral edge portion of the slit groove at the existing pipe is not made thin, there is no fear that the existing pipe is damaged when a valve body is fitted in the abovementioned slit groove.

Furthermore, in the slitting method, "slitting in a range of approximately 180 degrees in the circumferential direction" means slitting through an existing pipe to such a degree that the valve body having a size approximate to the inner diameter of the existing pipe can be inserted thereinto through the slit groove.

BRIEF DESCRIPTION OF THE DRAWINGS

FIG. 41 is a longitudinally sectional view showing the cutting equipment after the cutting is finished, FIG. 42($a$), FIG. 42($b$), and FIG. 42($c$) are, respectively, process views showing the sequence of slitting.

DESCRIPTION OF THE PREFERRED EMBODIMENTS

The invention will be more apparently understood on the basis of the following description of preferred embodiments with reference to the accompanying drawings. However, the preferred embodiments and drawings are merely for illustration and description. They are not utilized so as to define or limit the scope of the invention. The scope of the invention is defined on the basis of only the scope of claims attached hereto. In the accompanying drawings, the same reference numbers in a plurality of drawings indicate the same or equivalent parts.

First Preferred Embodiment

FIG. 1 through FIG. 14 show a first preferred embodiment. Hereinafter, a description is given, in the order of processes, of an existing pipe cut-off method and a method for inserting a valve in a line without stopping passage of water, which are according to the first preferred embodiment of the invention. The first embodiment is a method suitable for medium- and large-sized pipes ranging from 20 inches through 60 inches in diameter.

Cutting Equipment

Figure 1A:
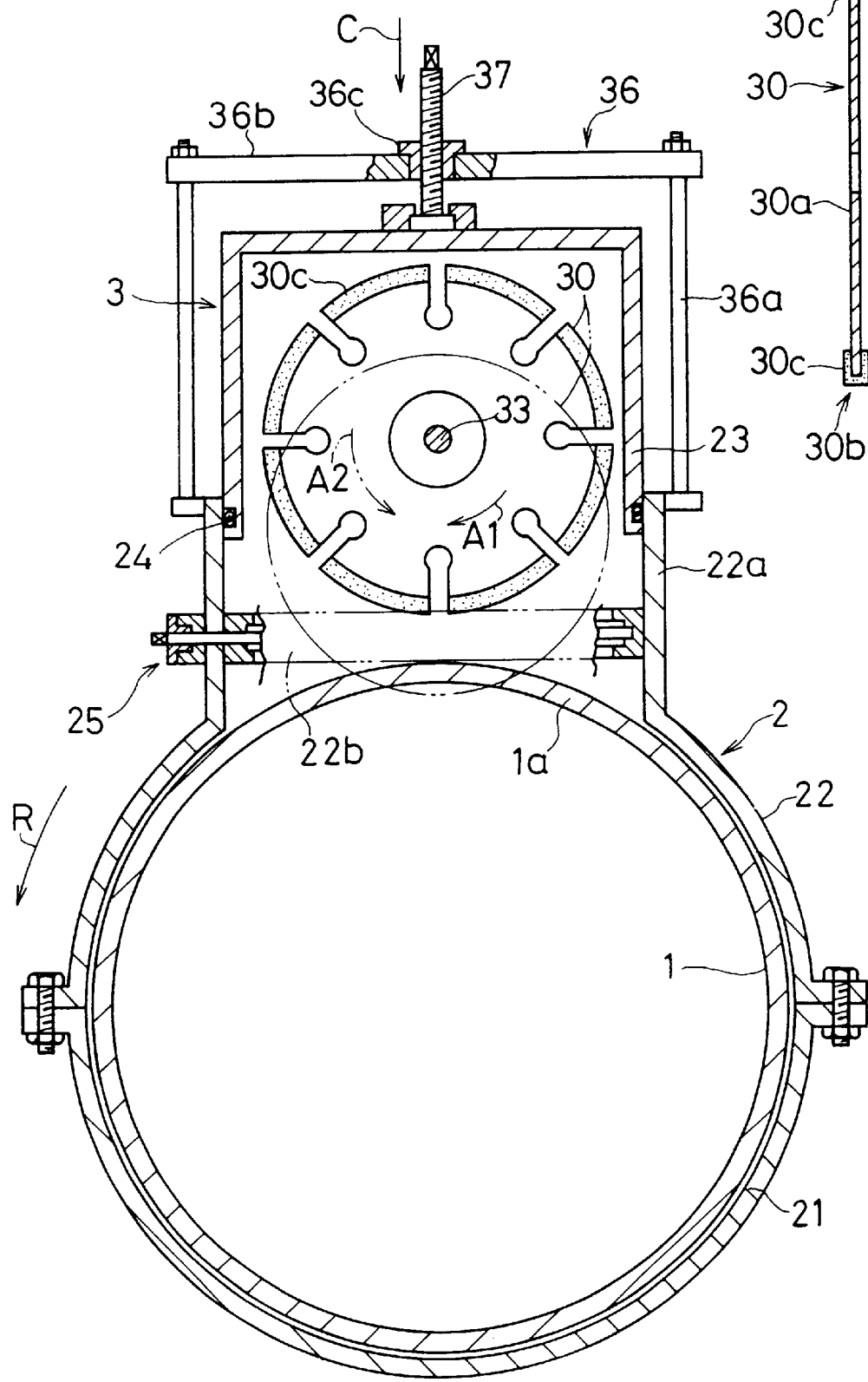
FIG. 1a is a cross-sectional view of a seal-up housing showing the first preferred embodiment of an existing pipe cut-off method according to the invention.
Figure 2:
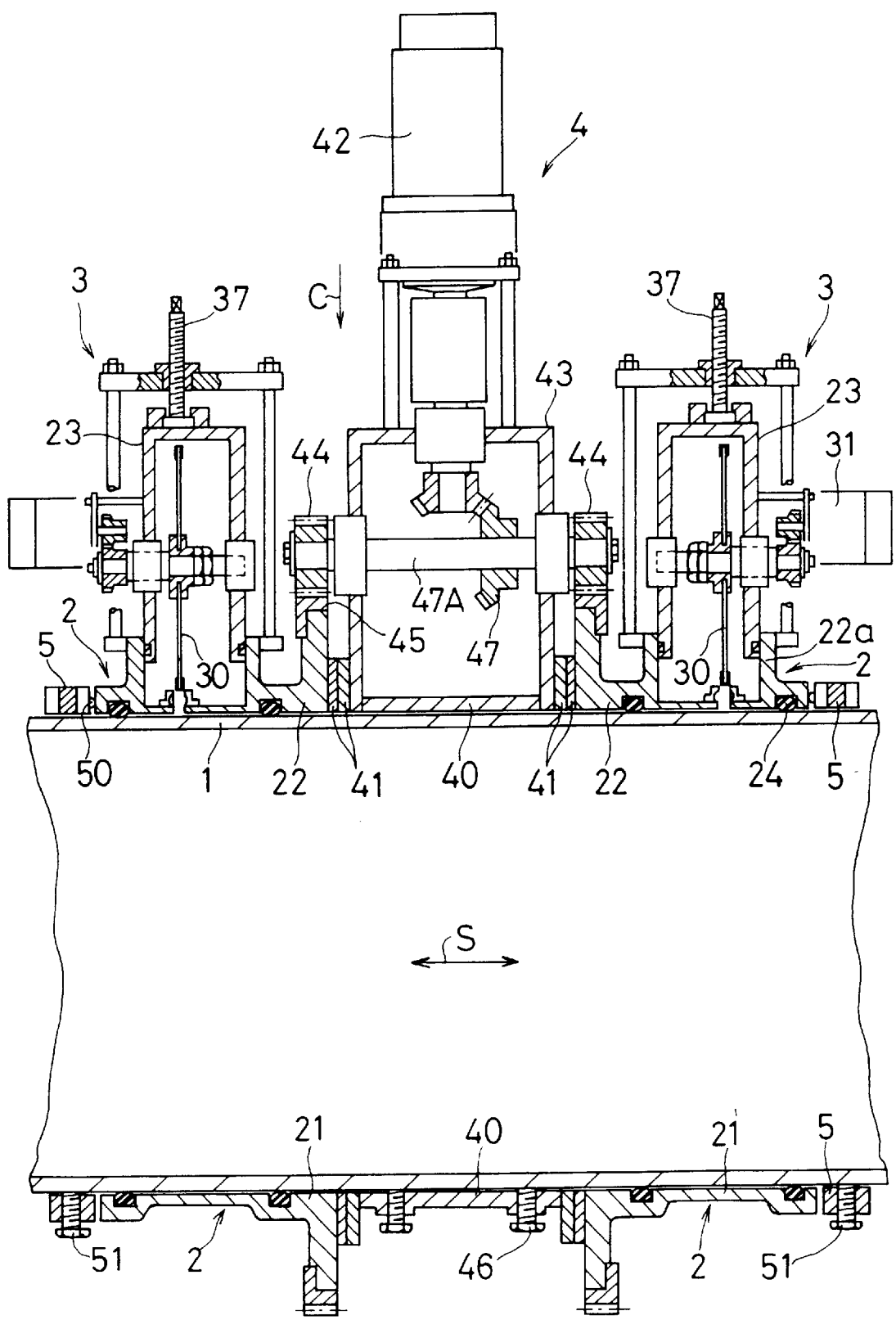
FIG. 2 is a longitudinally sectional view showing the entirety of a seal-up housing, cutting equipment, etc.
Figure 3:
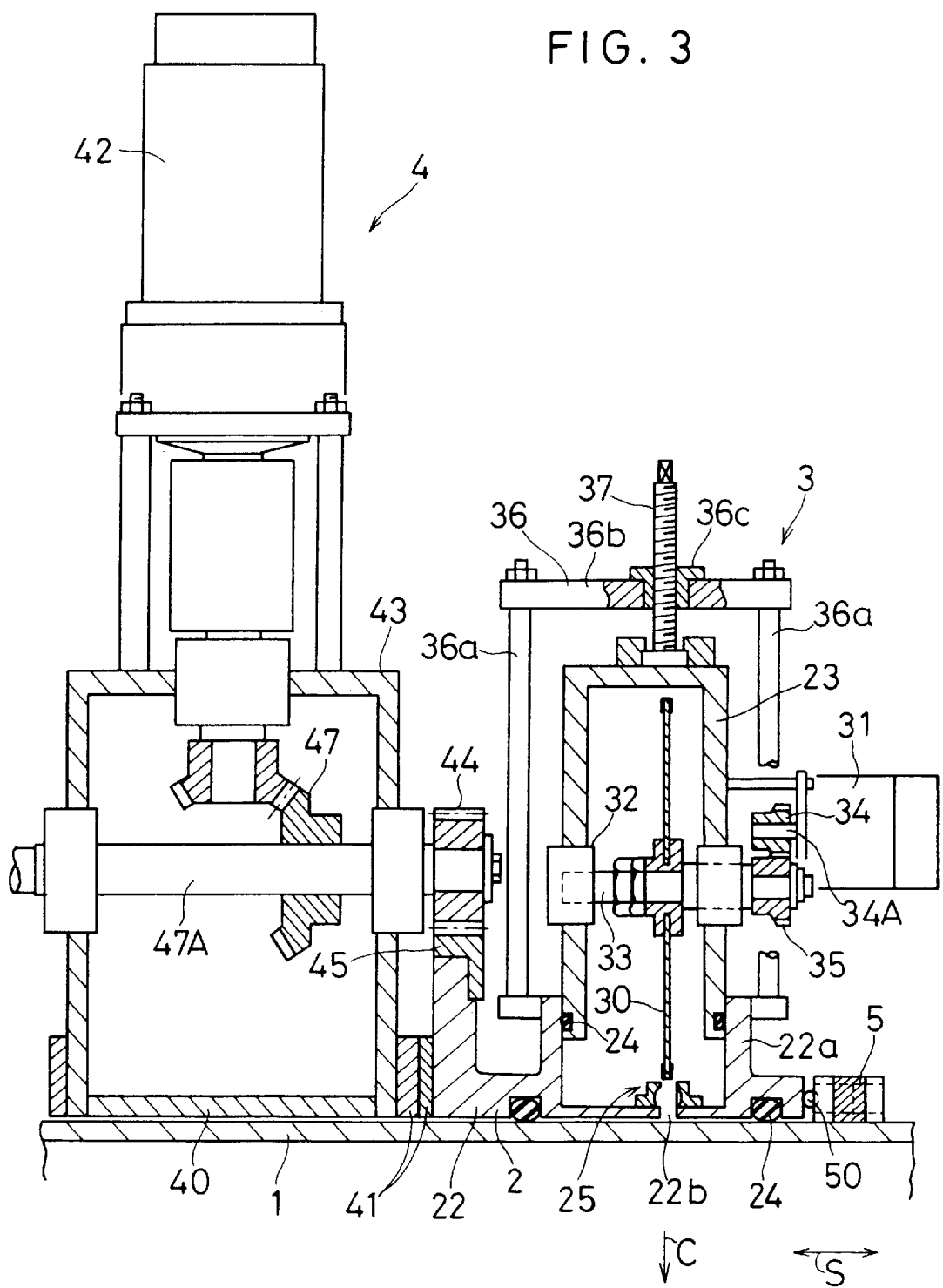
FIG. 3 is a longitudinally sectional view mainly showing the cutting equipment before cutting is started.

As shown in FIG. 1, a seal-up housing 2 consists of the first half housing 21 and second half housing 22, which are of a semi-split type, and a cutter attaching housing (tool attaching housing) 23. As shown in FIG. 2, a pair of left and tight seal-up housings 2 and 2 are attached to an existing pipe 1, and they enclose and seal up, in an airtight state, two portions spaced from each other in the axial direction S of pipe on the existing pipe 1. Rubber rings 24, etc. as shown in FIG. 3 are used to seal between the respective housings 21 and 22 and between both the slit housings 21 through 23 and the existing pipe 1. Furthermore, With respect to a sealing structure between the existing pipe 1 and the respective housings 21 and 22 and between the respective housings 21 and 22, an already known structure disclosed in, for example, FIG. 4 of U.S. Pat. No. 3,650,547 described above may be employed.

The abovementioned second split housing 22 has a branch-like guiding portion (bifurcated portion) 22a which protrudes from the existing pipe 1 in its diametrical direction C. The abovementioned cutter attaching housing 23 is attached to the corresponding guiding portion 22a so that it is slidable in its diametrical direction C. A slit-like opening 22b into which a disk-shaped cutting tool 30 is inserted is formed at the guiding portion 22a in the second slit housing 22.

Cutting equipment 3 is attached to each of the cutter attaching housings 23 of a pair of seal-up housings 2. That is, a first motor (one example of the prime movers) 31 for rotating a cutting tool is fixed outside the abovementioned cutter attaching housing 23 while the abovementioned cutting tool 30 is housed in the abovementioned cutter attaching housing 23. A bearing housing 32 is fixed at the cutter attaching housing 23, and a cutter shaft 33 is rotatably supported in the bearing housing 32 so that the cutter shaft 33 can be driven and rotated. The cutting tool 30 is fixed at the cutter shaft 33. The cutter shaft 33 is provided in parallel to the axial direction S of an existing pipe 1. The abovementioned first motor 31 causes the cutting tool 30 to rotate via a drive gear 34 fixed at the output shaft 34A of the first motor 31, a driven gear 35 fixed at the cutter shaft 33, and the abovementioned cutter shaft 33. Furthermore, a hydraulic motor, a pneumatic motor, an oil hydraulic motor or an electric motor may be used as the abovementioned first motor 31.

The abovementioned cutting tool 30 is, for example, a diamond wheel.

Figure 1B:
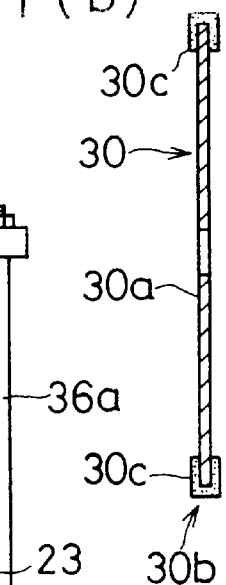
FIG. 1(b) is a longitudinally sectional view of a cutting tool used for the method.

The corresponding diamond wheel 30 is such that a number of diamond grains 30c (one example of a number of blades 30c) are welded, by a YAG laser, to the outer circumferential portion 30b of a disk-shaped base 30a shown in FIG. 1(b) together with metallic powder. A number of blades 30c are provided on the outer circumferential surface and both side surfaces of the base 30a. Although the corresponding diamond wheel 30 is a cutting tool, having non-directivity, which is able to slit an existing pipe 1 even though it rotates in any one of two directions centering around the cutter shaft 33 in FIG. 1(a), it is preferable that the cutter shaft 33 is caused to rotate in the rotation direction Al opposite to the rotation direction R of the seal-up housing 2 in FIG. 1(a). This is because cutting chips are scarcely discharged into the existing pipe 1 during slitting.

The abovementioned diamond wheel 30 is suitable for cutting concrete and stone materials. As for the corresponding diamond wheel, those made by Robtex, Ltd. and/or Shibaura Mfg. CO., Ltd. may be used.

Furthermore, a mechanical seal (not illustrated) is used to seal between the bearing housing 32 and the cutter shaft 33.

Figure 4:
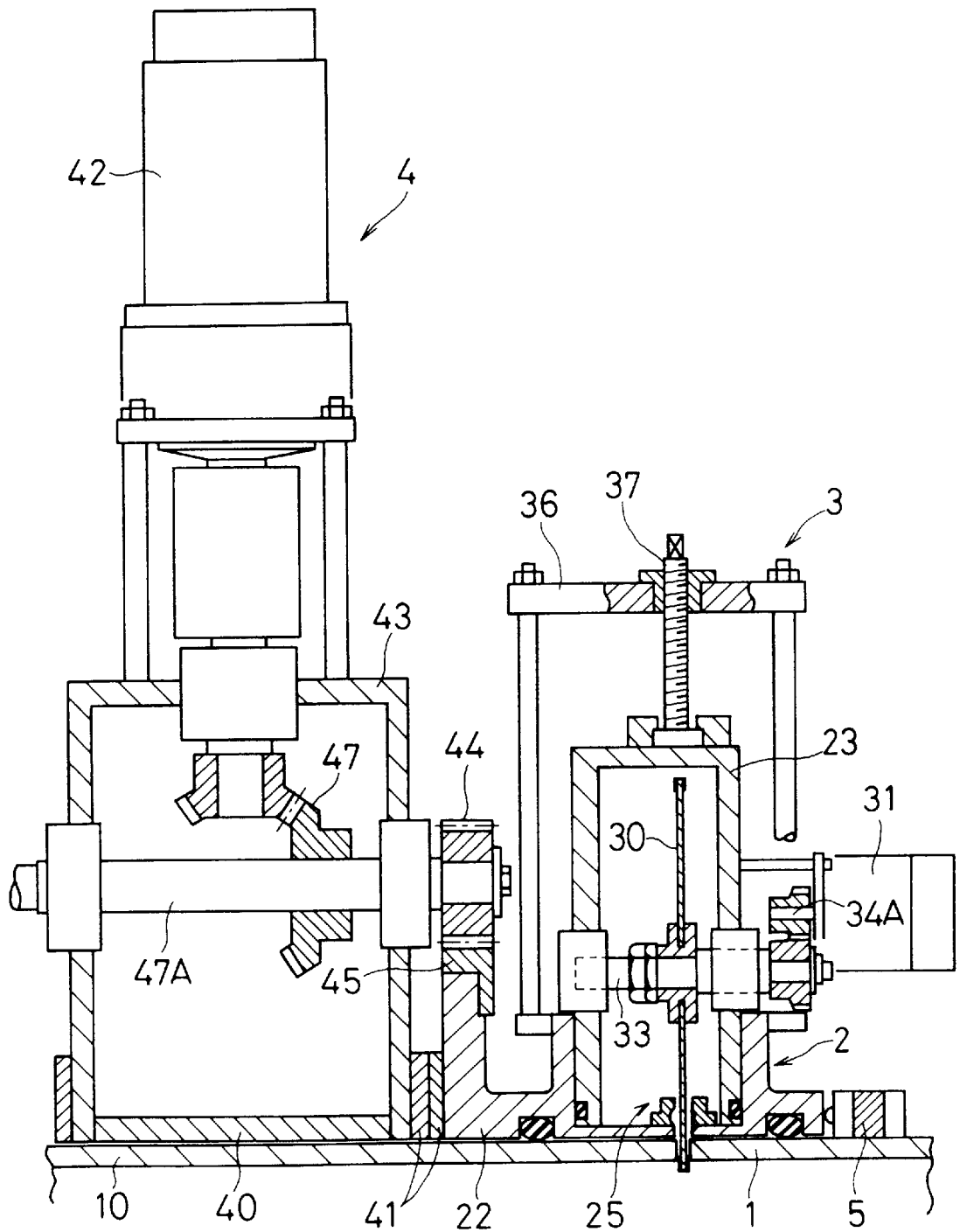
FIG. 4 is a longitudinally sectional view mainly showing the cutting equipment after cutting is finished.
Figure 5:
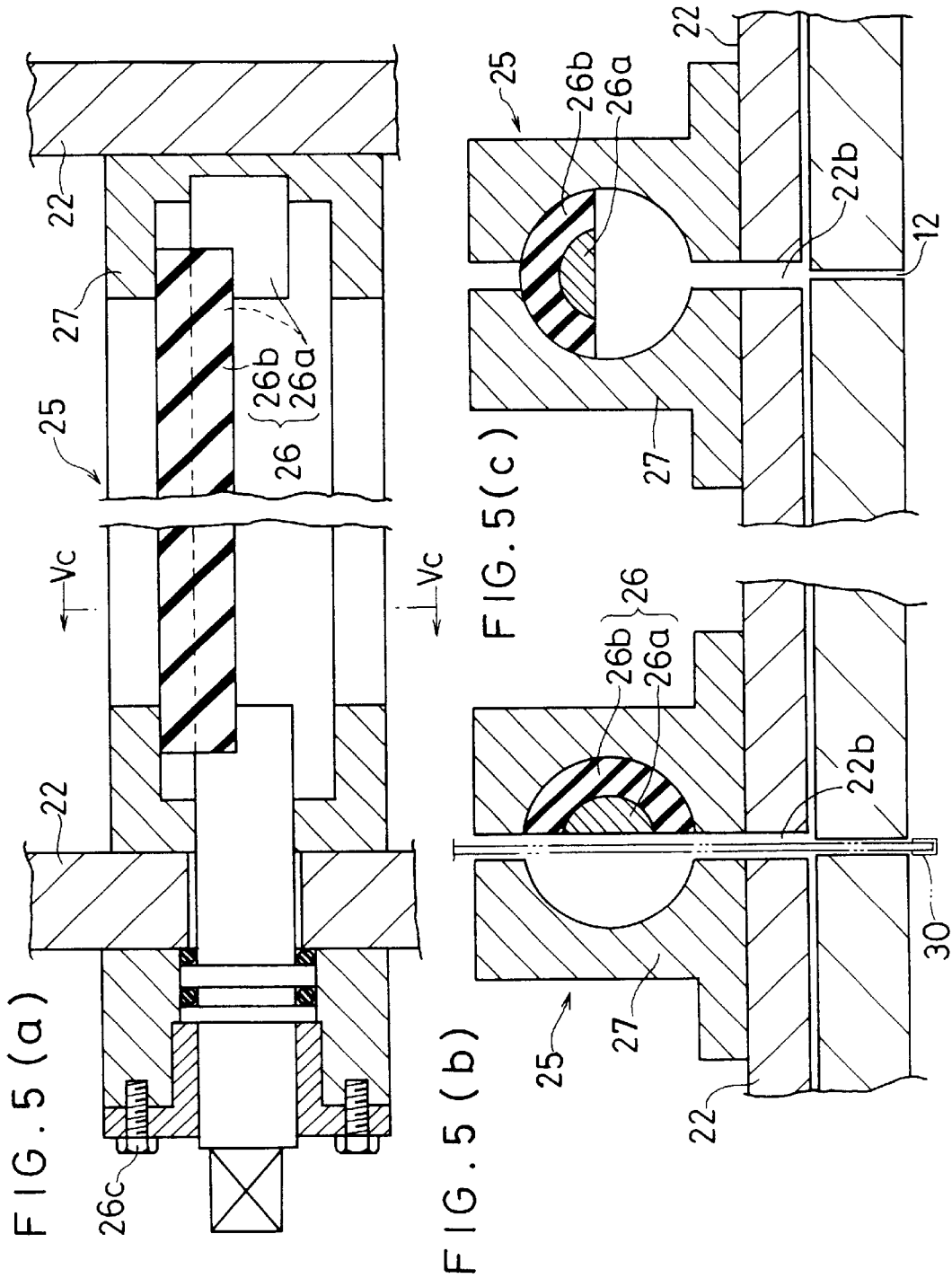
FIGS. 5 are sectional views, (a) of which is a longitudinally sectional view of a bar-like valve, (b) of which is a cross-sectional view of the bar-like valve in its open state, and (c) of which is a cross-sectional view taken along the line Vc—Vc in FIG. 5(a)

A cutting feed frame 36 is fixed at the abovementioned guiding portion 22a. The cutting feed frame 36 is provided with long bolts 36a fixed at the abovementioned guiding portion 22a and a top plate 36b fixed at the upper ends of the long bolts 36a. A male lead screw 37 for cutting feed is screwed in a bushing 36c secured at the top plate 36b of the abovementioned cutting feed frame 36. By turning the male lead screw 37 for cutting feed to be screwed in the cutting direction C (the center direction of the diametrical direction C of an existing pipe 1), the cutter attaching housing 23 advances in the cutting direction C. Therefore, the cutter attaching housing 23 is fed in the cutting direction C while rotating the abovementioned cutting tool 30, wherein if the cutting tool 30 is caused to advance in a slit-like opening 22b in FIG. 3, the cutting tool 30 is fed toward roughly the center in the diametrical direction of the existing tube 1, thereby causing the existing pipe 1 to be slit as shown in FIG. 4.

As shown in FIG. 2, a housing turning device 4 is disposed between the abovementioned pair of seal-up housings 2 and 2. The corresponding housing turning device 4 has an annular spacer 40 circumferentially divided into two sections. The corresponding spacer 40 is to determine the relative position between a pair of seal-up housings 2 and 2. The spacer 40 is fixed at the existing pipe 1 with a number of set screws 46 and a liner 41 is provided at both sides of the spacer 40.

A gear housing 43 is fixed at one of the abovementioned two-split spacers 40, and a second motor 42 for turning the seal-up housing is fixed at the corresponding gear housing 43. The corresponding second motor rotates a pair of drive gears 44 for turning the seal-up housing, via a bevel gear 47 and a driven gear 47A, etc., and the respective drive gears 44 rotates a driven gear 45 for turning the seal-up housing, which is fixed at the outer circumference of the first and second split housings 21 and 22. Therefore, the present method is able to cut off an existing pipe 1 at two points by turning the seal-up housing 2 once around the existing pipe 1 while causing the cutting tool 30 to rotate in a cutting feed state shown in FIG. 4 (that is, carrying out a slitting motion).

As shown in FIG. 2, an annular slip preventing member 5 is, respectively, secured at the existing pipe 1 outward of the abovementioned pair of seal-up housings 2 and 2. The corresponding slip preventing member 5 is divided into two sections in the circumferential direction R (FIG. 1) of the existing pipe 1, and the slip preventing member 5 is provided with a number of steel balls 50 and set screws 51 secured alternately in the circumferential direction R (FIG. 1). The slip preventing member 5 is fixed at the existing pipe 1 by set screws 51. The slip preventing member 5 presses the seal-up housing 2 to the central side by the steel balls 50 and nips the seal-up housing 2 between the steel balls 50 and the liners 41 of the abovementioned housing turning device 4, wherein the seal-up housing 2 is prevented from slipping and shaking in the axial direction S of the existing pipe 1. Therefore, the seal-up housing 2 smoothly turns when turning around the existing pipe 1. Furthermore, the abovementioned steel balls 50 are fixed at the slip preventing member 5 so that their positions are able to be adjusted in the axial direction S of pipe 1 in FIG. 3.

A bar-like valve 25 is secured at the slit-like opening 22b of the abovementioned second split housing 22 in FIG. 3. As shown in FIG. 5(a), the corresponding bar-like valve 25 is provided with a bar-like long valve body 26 and a bar-like valve housing 27. As shown in FIG. 5(b) and FIG. 5(c), the abovementioned bar-like valve body 26 is composed so that half-moon type rubber packing 26b is formed integral with a metallic core 26a, and so that the valve body 26 is rotatably attached to the bar-like valve housing 27. The bar-like valve body 26 allows the cutting tool 30 to be fed for cutting as shown in FIG. 5(b), and on the other hand, seals the slit-like opening 22b to stop water by turning the bar-like valve body 26 as shown in FIG. 5(c) after the cutting is finished.

Cutting Process

Next, a description is given of a cutting procedure.

First, workmen attach a housing turning device 4 and a spacer 40 to the existing pipe 1 in a state where fluid (water) is flowing through the existing pipe 1 in FIG. 2, and attach a seal-up housing 2 and slip preventing members 5 to both sides of the housing turning device 4, wherein two points spaced from each other in the axial direction S of the pipe on the existing pipe 1 are enclosed and sealed up in an airtight state by a pair of seal-up housings 2 and 2. Cutting equipment 3 is attached, in advance, to a cutter attaching housing 23 of the seal-up housing 2. Furthermore, the workmen fix a bar-like valve 25 by turn-stop bolts 26c in FIG. 5(a) in its open state as shown in FIG. 5(b).

Next, as the workmen drive the first motor 31 in FIG. 3, the corresponding first motor 31 rotates the abovementioned cutting tool 30 on the cutter shaft 33 at a high speed and causes the cutting tool 30 to perform a slitting motion by which the existing pipe 1 is slit by rotations of the cutting tool 30. In a state where the corresponding slitting motion is being carried out by the cutting tool 30, as the workmen progressively screw a male lead screw 37 for cutting feed in the cutting direction C, the cutting tool 30 advances, concurrently, to the position where the cutting tool 30 passes through a part of the wall 1a of the existing pipe 1 as shown with alternate long and two dashes lines in FIG. 1. Thus, cutting feed of the cutting tool 30 in the direction C is completed.

After that, as workmen drive the second motor for turning the seal-up housing in FIG. 2, a pair of seal-up housings 2 are turned around the existing pipe 1 via a bevel gear 47 and a pair of drive gears 44 and driven gear 45. Thereby, the cutting tool 30 in FIG. 1 is caused to rotate on the cutter shaft 33 while the cutting tool 30 turns in the direction of the arrow R along the outer circumference of the existing pipe 1 together with the seal-up housings 2, wherein the cutting tool 30 roughly slits annularly the existing pipe 1, and finally cuts off the pipe 1. That is, with the second motor 42 in FIG. 2, the cutting tool 30 in FIG. 4 is turned in the circumferential direction R by turning the abovementioned seal-up housing 2 in the circumferential direction R (FIG. 1) of the existing pipe 1, wherein the cutting tool 30 is caused to perform a feeding motion. Thereby, the cutting tool 30 cuts off the existing pipe1, and a cut-off section 10 to be removed (a cylindrical cut-off section 10 in FIG. 6) in FIG. 4 is formed from the existing pipe 1.

After the cutting-off, the workmen reversely turn the male lead screw 37 for cutting feed, cause the cutting tool 30 to slide together with the cutter attaching housing 23, and retreat the cutting tool 30 to a non-cutting position in FIG. 3. After the cutting tool is retreated, the workmen turn the bar-like valve body 26 in FIG. 5(b) by 90 degrees, wherein the fluid (water) is prevented from flowing out through the slit-like opening 22b in FIG. 5(c). The next eliminating process of the cut-off section is commenced after the sealing is finished.

Cut-off Section Eliminating Process

Figure 6:
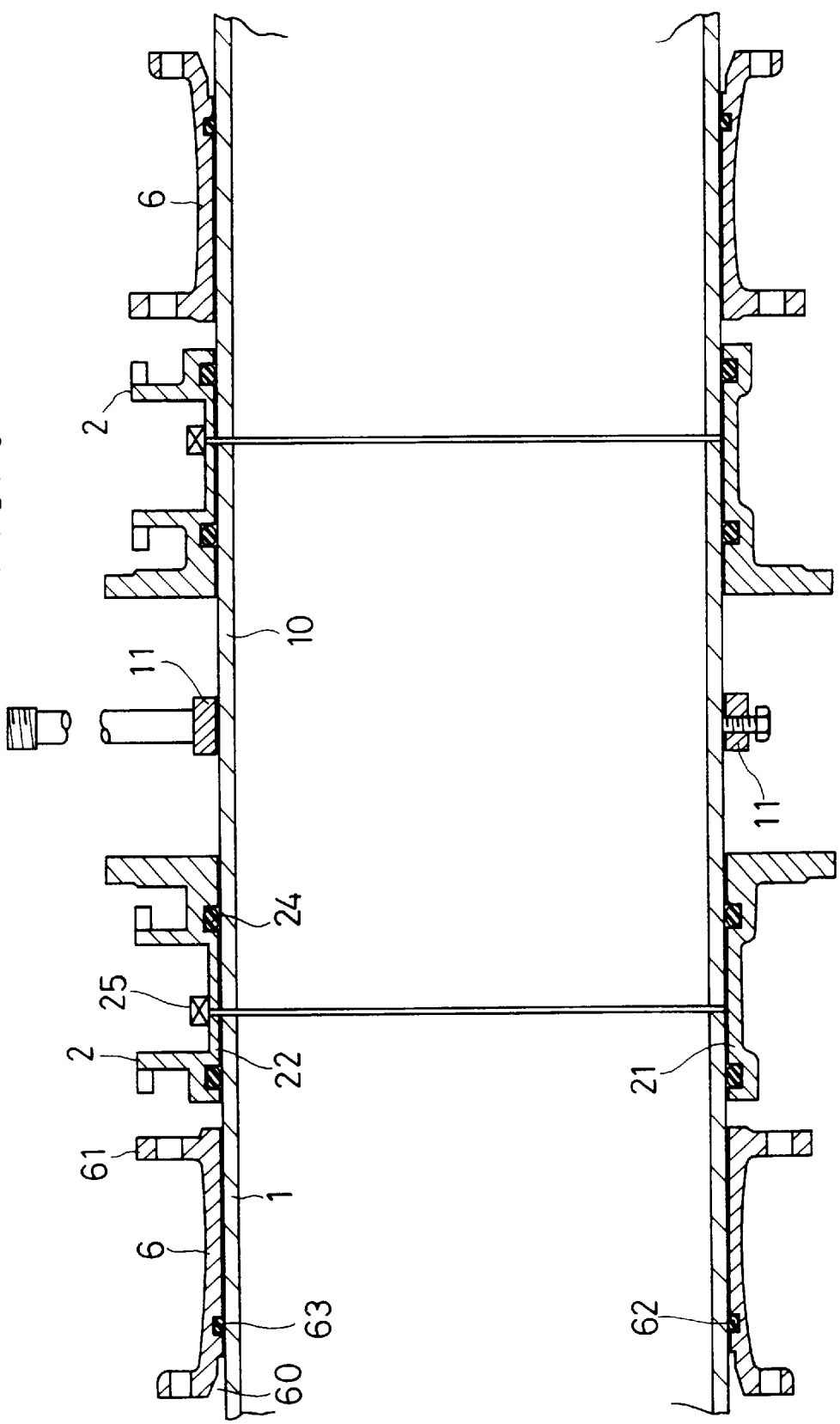
FIG. 6 is a sectional view showing the entirety of an existing pipe after the cutting is completed.

After the cutting off is completed, the workmen remove the cutting equipment 3 from the existing pipe 1 in FIG. 2 together with the cutting attaching housing 23. Furthermore, the workmen remove the slip preventing members 5, housing turning device 4, spacer 40, etc., from the existing pipe 1. Thus, as shown in FIG. 6, the situation is such that the existing pipe 1 is in a state where only a first split housing 21, second split housing 22 of the seal-up housing 2 and bar-like valve 25 remain. After that, the workmen fixes a lifting band 11 to the cut-off section 10 in order to raise the cut-off section 10 between both seal-up housings 2 and 2, and at the same time attach a split type short pipe 6 to both sides of the seal-up housings 2 and 2 at the existing pipe 1. The split type short pipe 6 is divided into two sections in the circumferential direction R (FIG. 1) of the existing pipe 1, and is provided with a packing insertion portion 60, into which rubber packing is inserted, and a plate-like flange 61, which compresses sheet packing 81 (FIG. 12), at both ends thereof. Furthermore, the corresponding split type short pipe 6 is provided with an O ring 63 to temporarily stop water in a groove 62.

Figure 7:
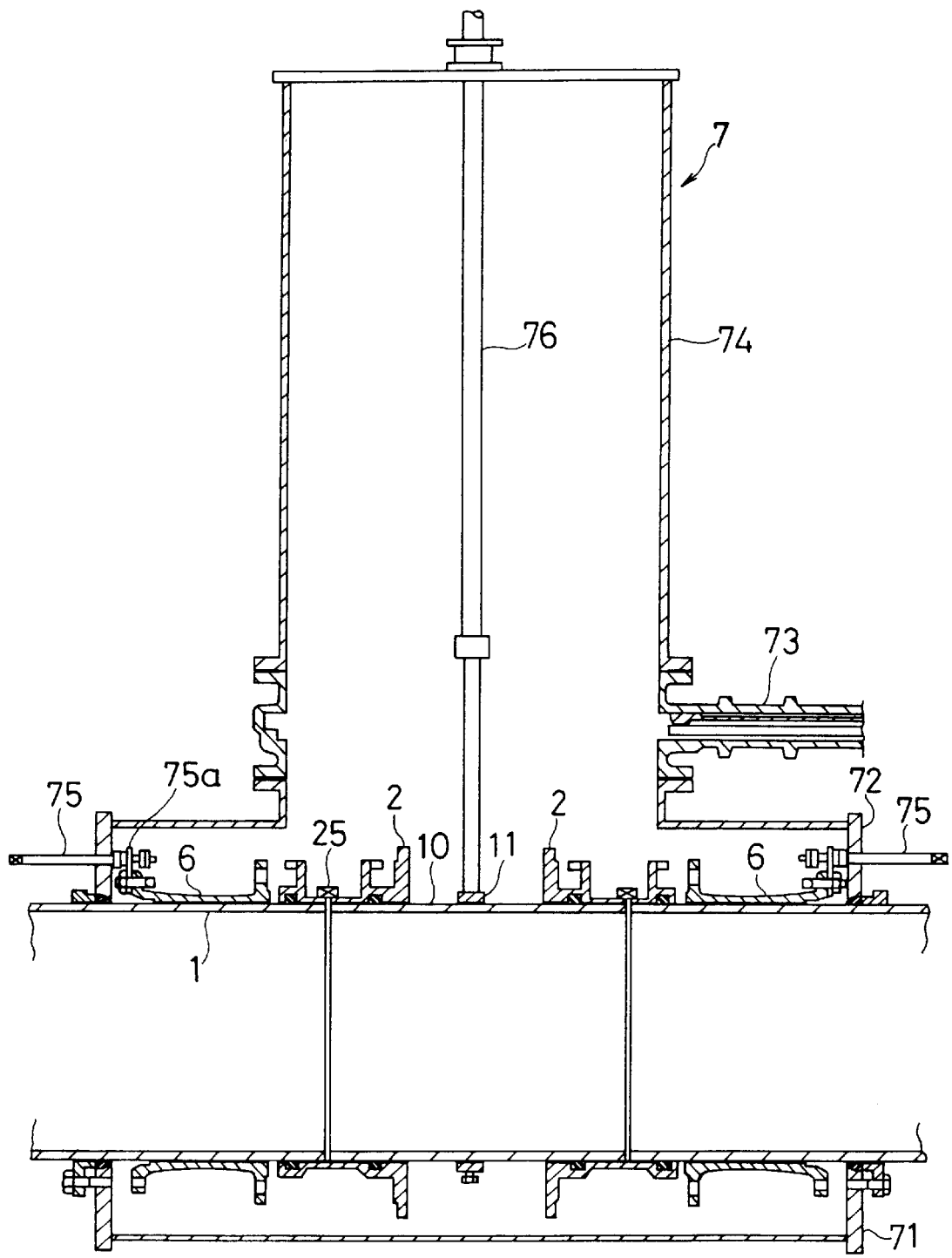
FIG. 7 is a longitudinally sectional view showing a state wherein an operation chamber is assembled.

Next, as shown in FIG. 7, the workmen enclose and seal up, in an airtight state, both seal-up housings 2 and 2 and split type short pipe 6 together with the existing pipe 1 by an operation chamber 7, and connect an elevating shaft 76 to the lifting band 11. The operation chamber 7 consists of operation lower chambers 71 and 72, which are divided in the perpendicular direction (circumferential direction), an operation sluice valve 73 and an operation upper chamber 74. On the other hand, the workmen screw a pressing rod 75, by which the split type short pipe 6 and seal-up housing 2 are caused to slide, into the operation lower chambers 71 and 72 before sealing up by the abovementioned operation chamber 7 and connect the tip end of the pressing rod 75 to the split type short pipe 6 via a connecting metal fitting 75a in FIG. 8. The corresponding pressing rod 75 consists of, for example, a male long screw. The workmen turns the pressing rod 75 clockwise to move the split type short pipe 6 to the central side. On the other hand, by turning the pressing rod 75 counterclockwise, the split type short pipe 6 is returned sideways.

Figure 8:
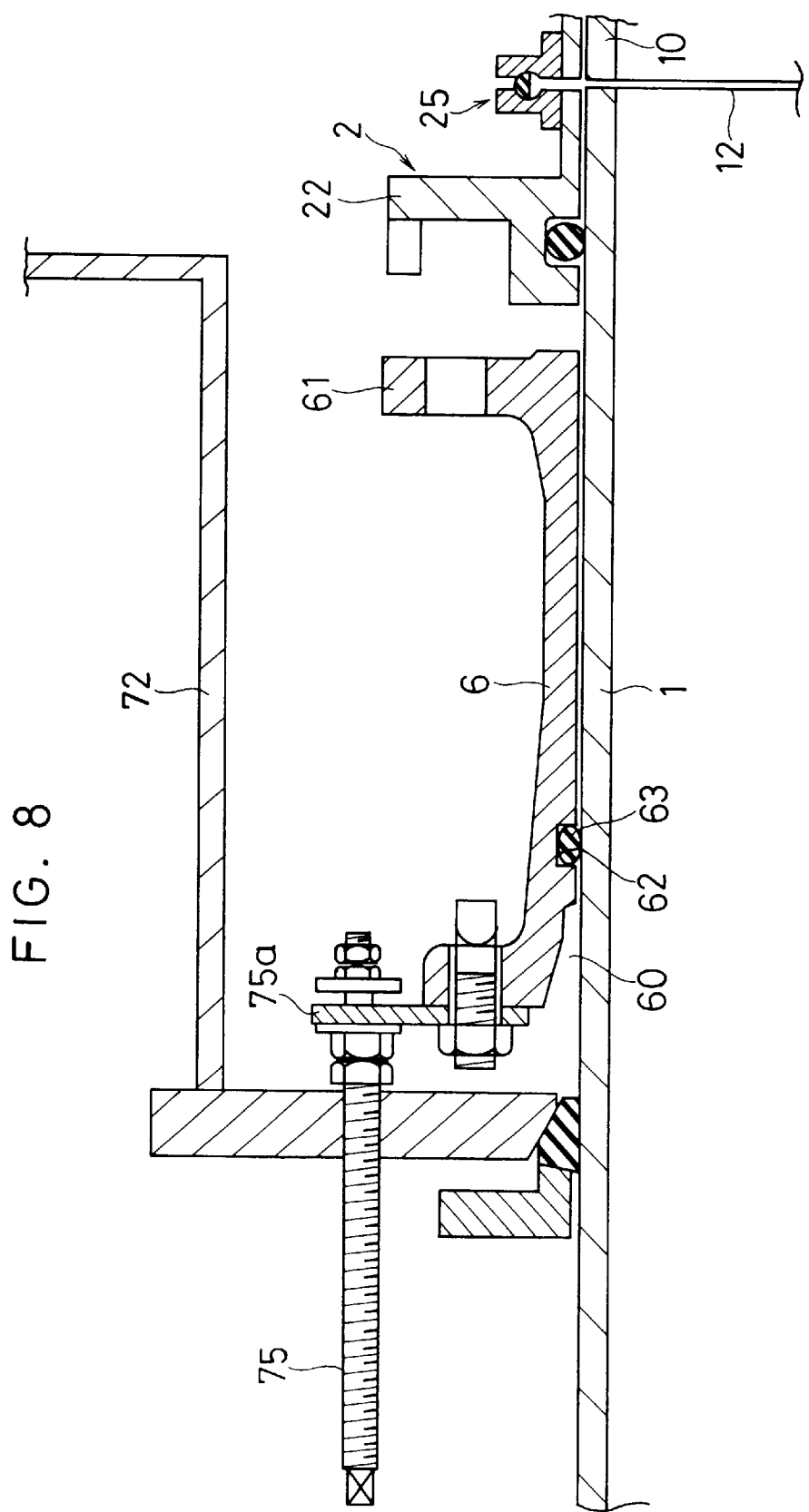
FIG. 8 is a sectional view showing the structure of a press rod, etc.
Figure 9:
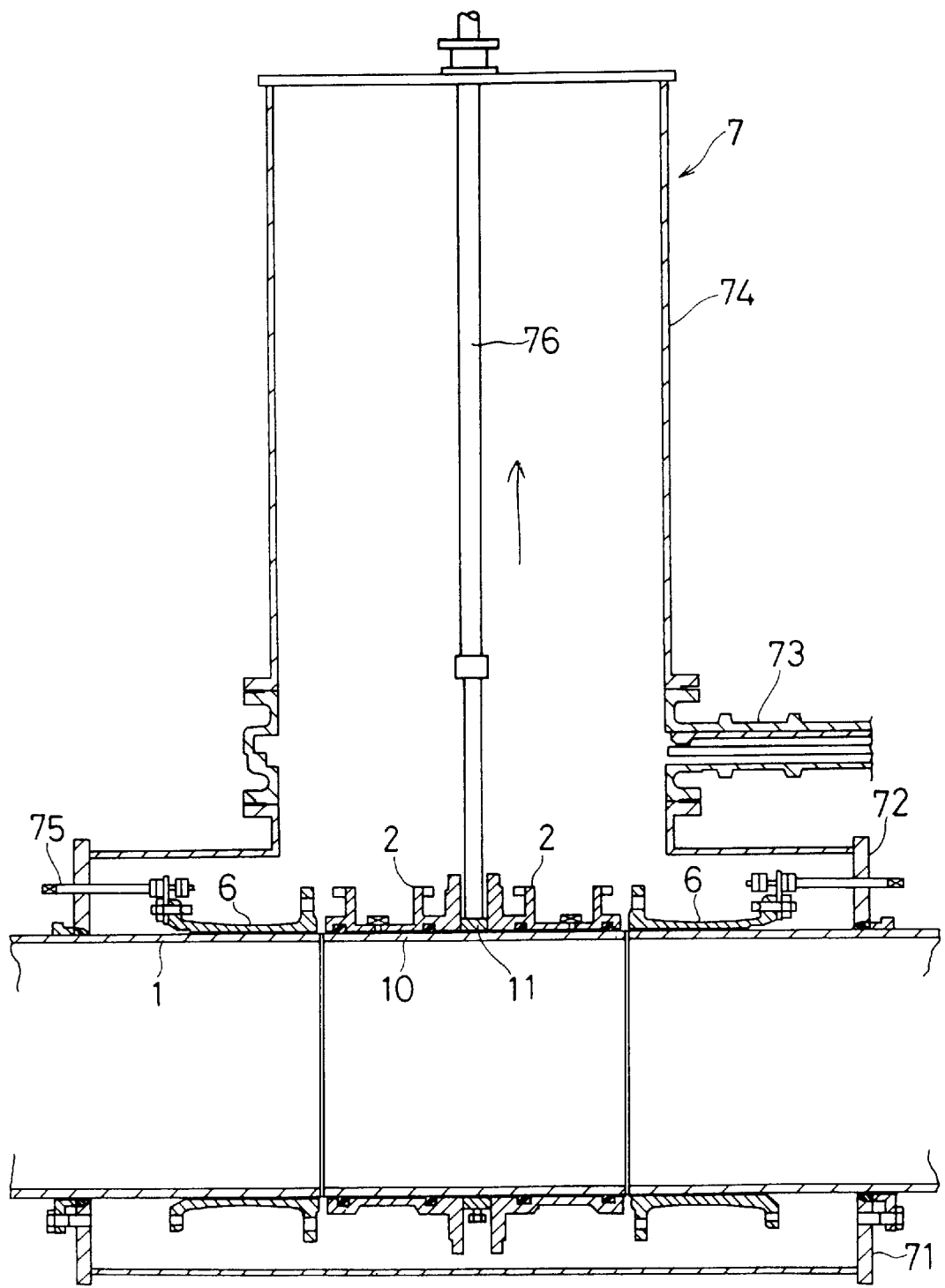
FIG. 9 is a sectional view of the entirety, showing a state where a seal-up housing is moved onto a cut-off section by using the press rod.

In a state as shown in FIG. 8, if workmen turn the pressing rod 75 clockwise, the split type short pipe 6 is pressed and is caused to slide to the central side, wherein the split type short pipe 6 presses the seal-up housing 2 to cause the split type short pipe 6 to move to the central side. After the seal-up housing 2 rides over the cut-off groove portion 12 and is placed on the cut-off section 10, the workmen reversely turn the pressing rod 75, only the split type short pipe 6 is returned sideways (right side) as shown in FIG. 9. Thereafter, the workmen lift up the elevating shaft 76 and take out the cut-off section 10 together with two seal-up housings 2 and 2 from the operation lower chambers 71 and 72 to the operation upper chamber 74 in FIG. 10, wherein an operation sluice valve 73 is closed. After the sluice valve 73 is closed, workmen remove the cut-off section 10 and seal-up housing 2 together with the operation upper chamber 74. Furthermore, the workmen may use a lifting device such as a crane in assembling the abovementioned chamber 74.

Furthermore, in FIG. 7, FIG. 9, FIG. 11, or FIG. 13, the abovementioned O-ring 63 (FIG. 12) for temporarily stopping water is omitted.

Process for Inserting a Valve

Figure 10:
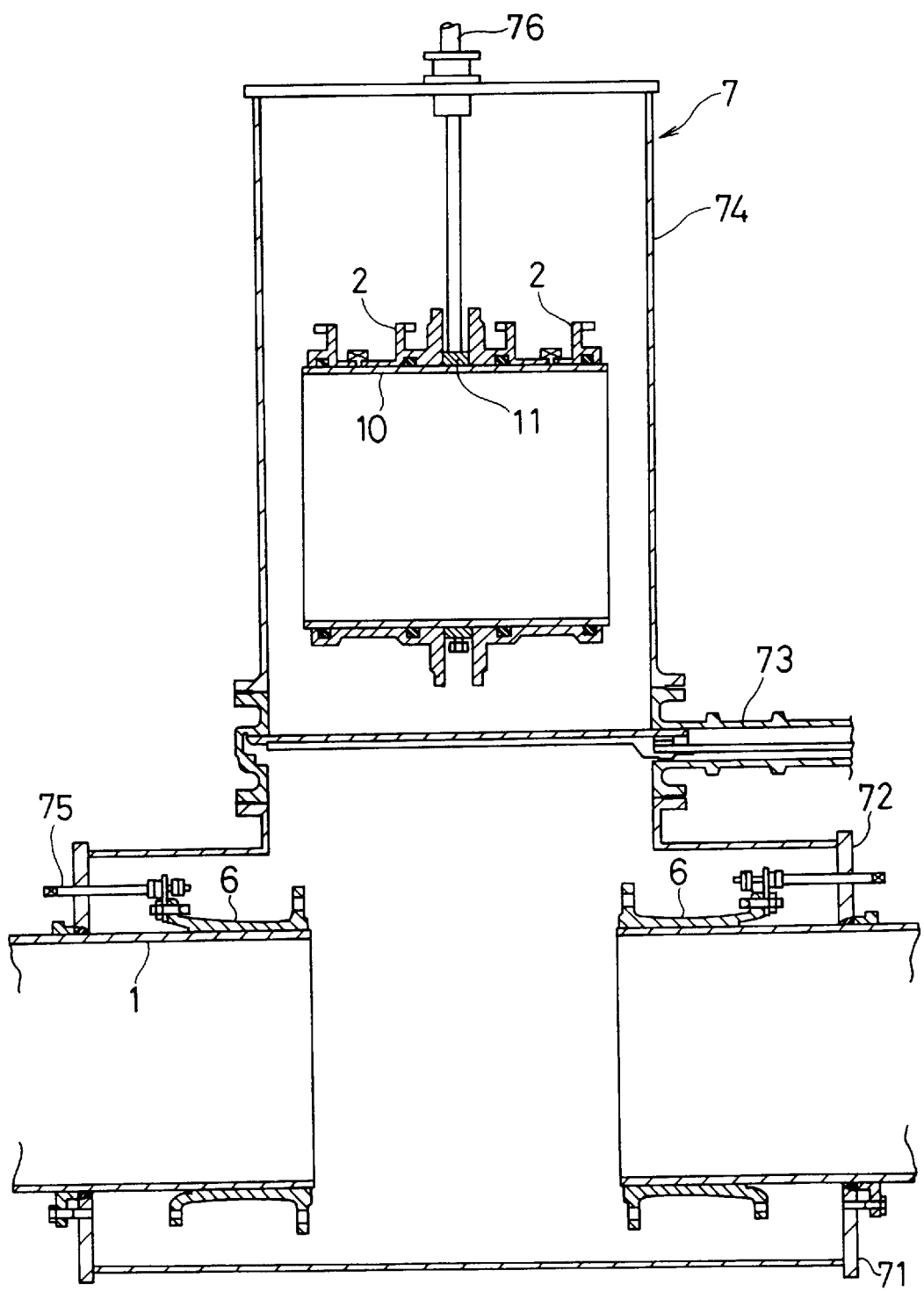
FIG. 10 is a sectional view showing a state where the cut-off section is removed.
Figure 11:
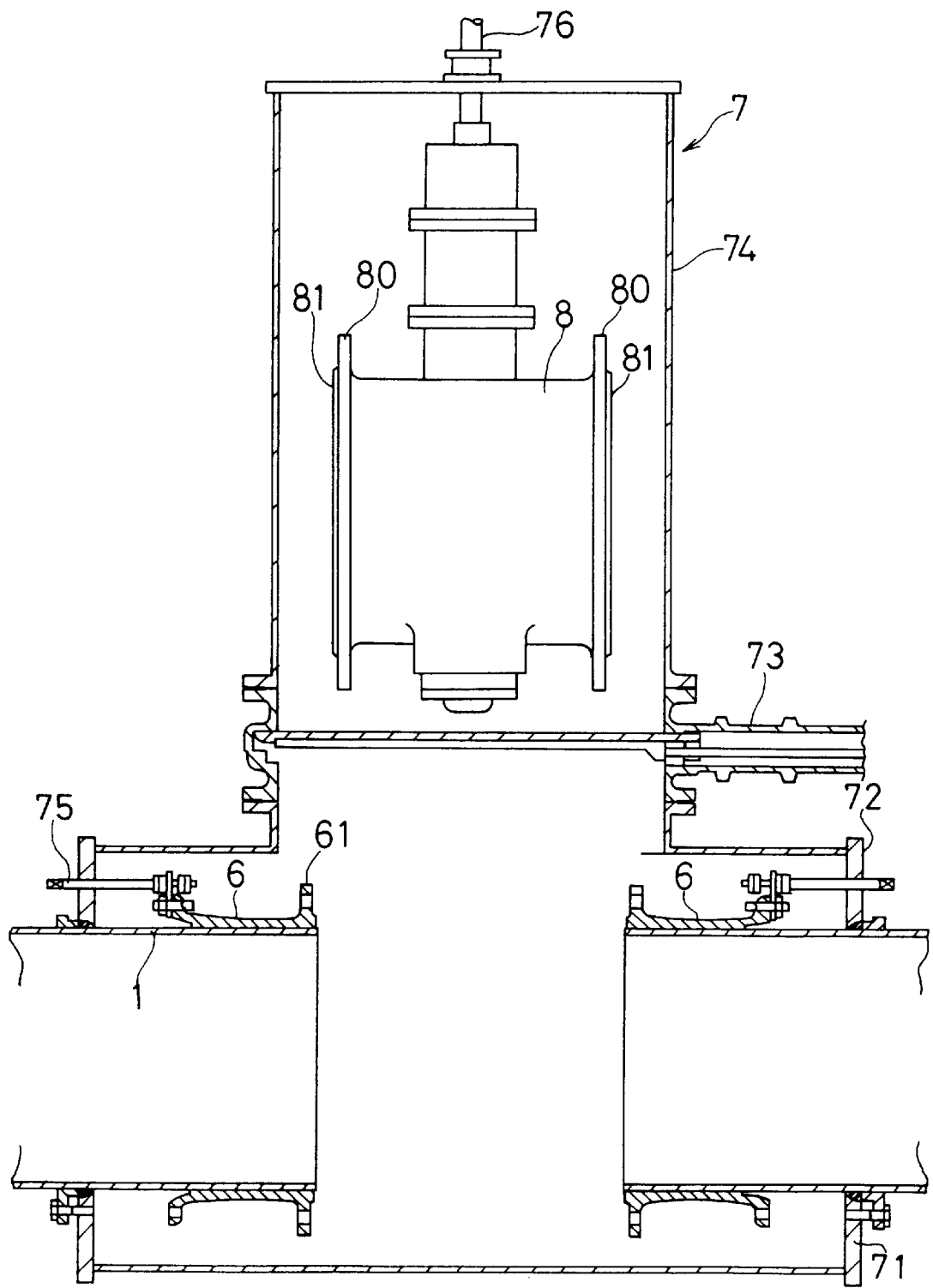
FIG. 11 is a sectional view showing a state where a valve is housed in an operation upper chamber.

After the cut-off section 10 is eliminated in FIG. 10, as shown in FIG. 11, workmen houses a valve for insertion such as a butterfly valve 8 in an operation upper chamber 74. The butterfly valve 8 has collar-like flanges 80 and 80 at both ends, and for example, annular sheet packing 81 is cemented to the respective flanges 80 and 80. Furthermore, when inserting the corresponding butterfly valve 8, the butterfly valve 8 is kept in its open state and a speed reducer 82 (FIG. 14) is removed from the butterfly valve 8.

After that, the workmen open the operation sluice valve 73. After the valve is opened, the butterfly valve 8 is shifted down into the operation lower chambers 71 and 72.

Figure 12:
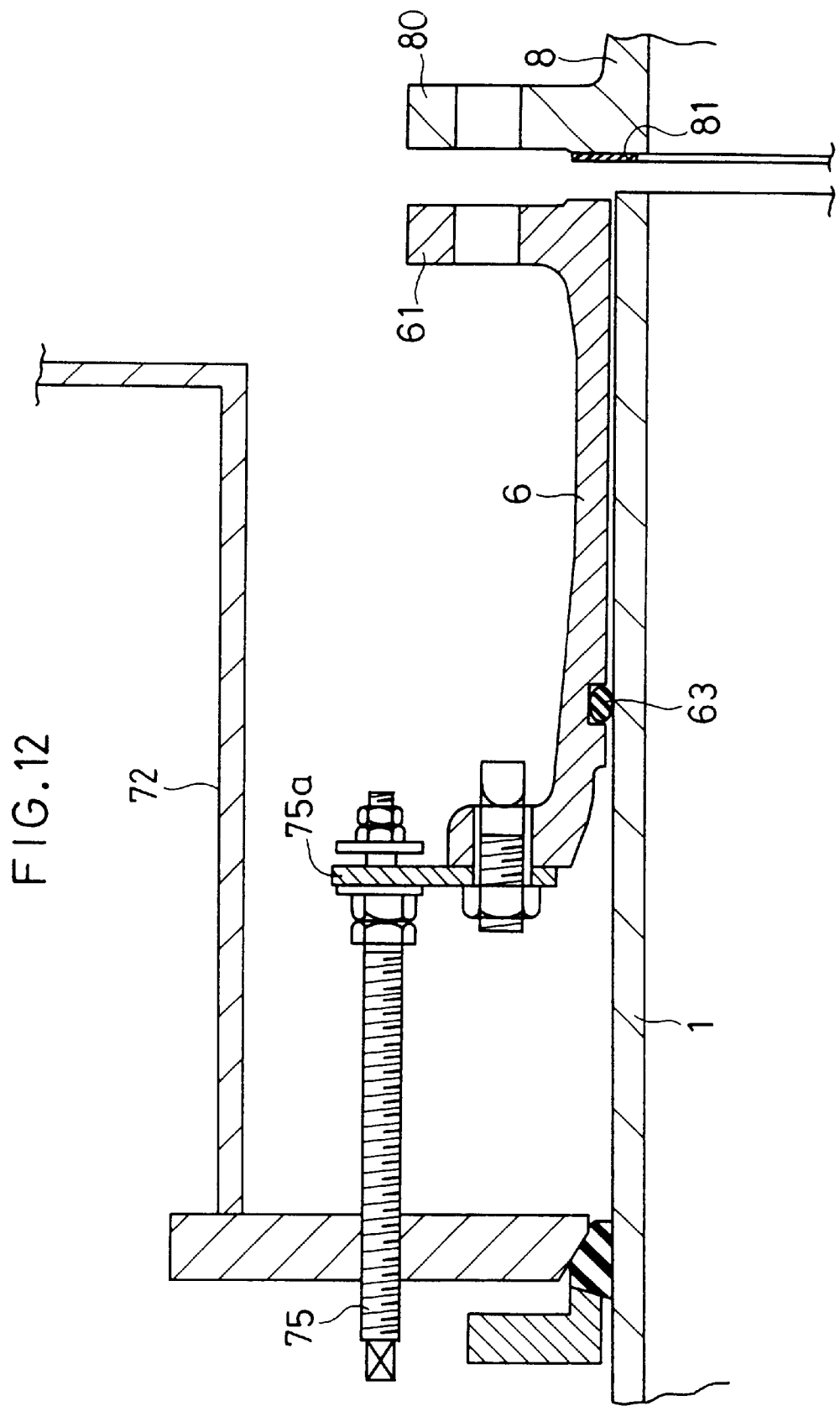
FIG. 12 is a part sectional view showing a process of temporarily stopping water.
Figure 13:
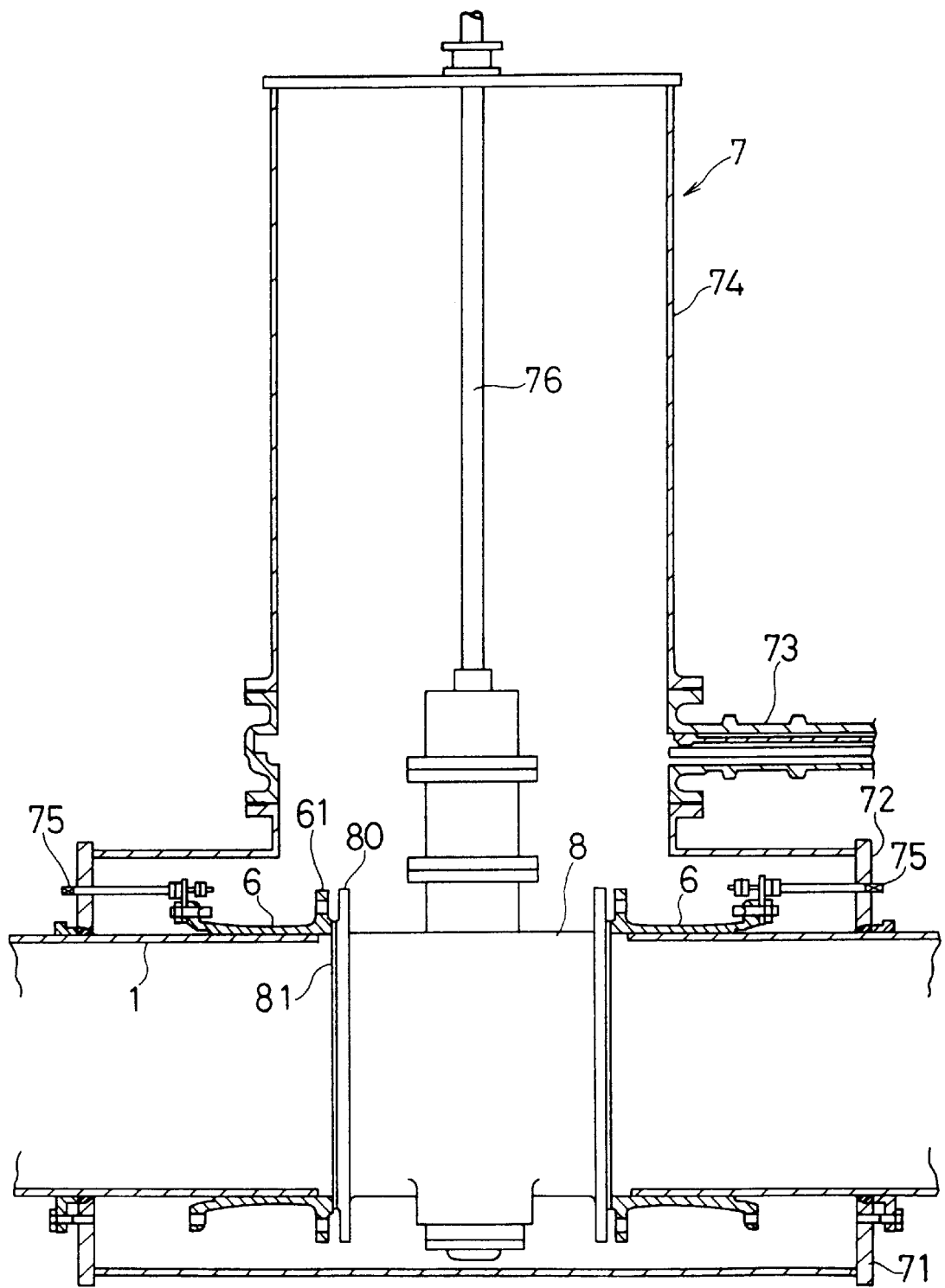
FIG. 13 is a longitudinally sectional view showing the entirety of the process.
Figure 14:
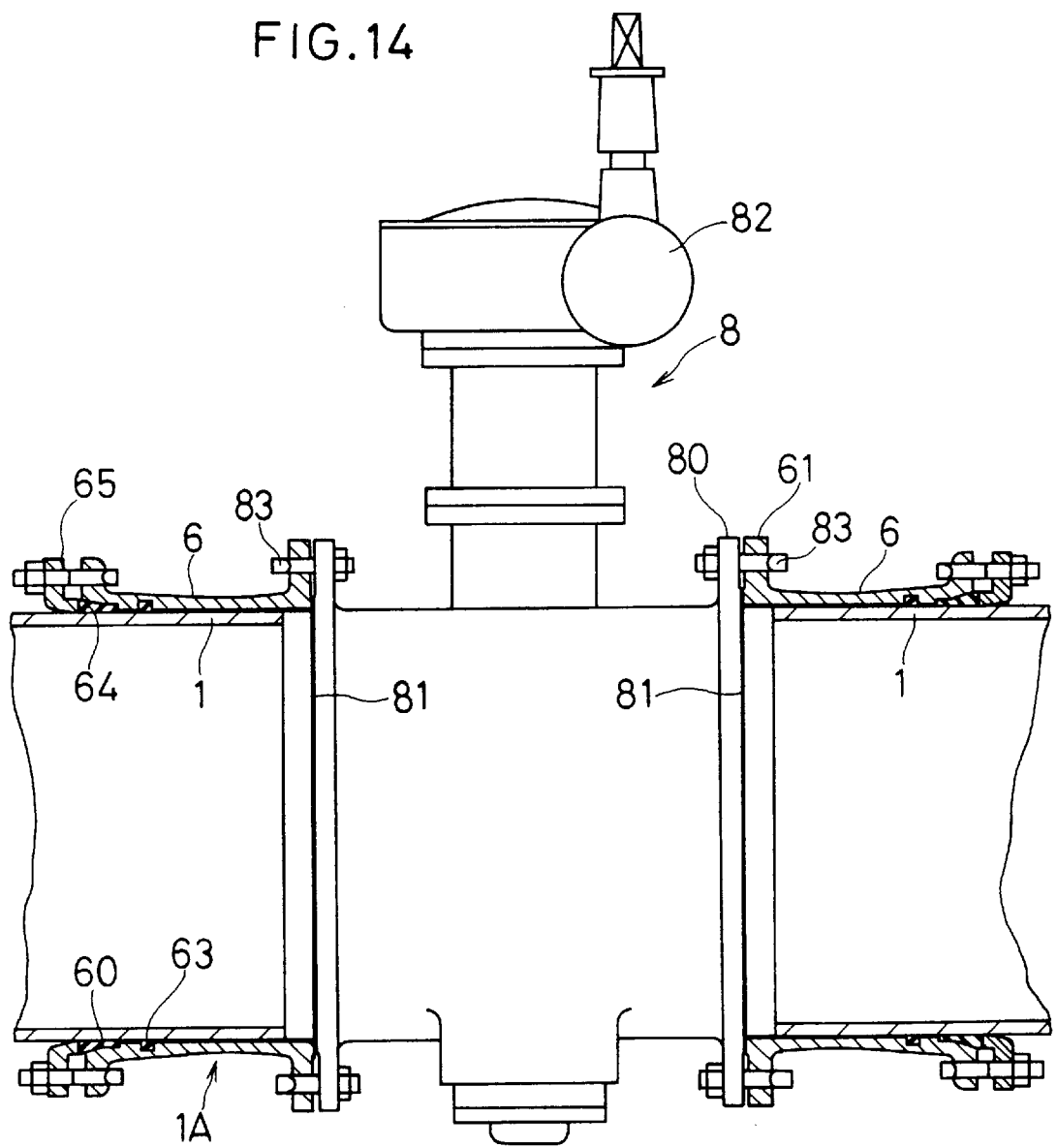
FIG. 14 is a sectional view showing a completed state.

Thereafter, as the pressing rod 75 in FIG. 12 is turned clockwise by workmen and the split type short pipe 6 is caused to slide toward the butterfly valve 8, as shown in FIG. 13, a plate-like flange 61 of the split type short pipe 6 is brought into contact with the sheet packing 81 concurrently. In this state, the sheet packing 81 is compressed between the two plate-like flanges 61 and 80 by an axial force of the pressing rod 75, wherein it is attempted that water is temporarily stopped between the split-type short pipe 6 and butterfly valve 8. On the other hand, water is also temporarily stopped between the split-type short pipe 6 and the existing pipe 1 by the abovementioned O-ring 63 mounted in advance at the split-type short pipe 6 in FIG. 14.

Thereafter, workmen discharge water in the operation chamber 7 in FIG. 13. After water is discharged, the workmen tighten a pair of plate-like flanges 61 and 80 by tightening bolts 83 in FIG. 14, wherein water is completely stopped between the split type short pipe 6 and butterfly valve 8. After that, the workmen disassemble the operation chamber 7 in FIG. 13. After the disassembling is completed, the workmen attach split-type pressing rings 65 between the existing pipe 1 and the split-type short pipes 6 and press water stopping rubber rings 64 into the abovementioned packing inserting portions 60 of the split-type short pipe 6. On the other hand, a speed reducer 82 is attached to the butterfly valve 8. Thus, the butterfly valve 8 which stops water in a line 1A is inserted into the line 1A including the existing pipe 1.

Thus, in the present cut-off method, since the abovementioned cutting tool 30 is turned in the outer circumference of the existing pipe 1 by turning the seal-up housing 2 when cutting it off in FIG. 2, it is not necessary that a mechanism for turning the cutting tool 30 around the existing pipe 1, that is, a housing turning device 4 is provided in the seal-up housing 2. Therefore, downsizing of the seal-up housing 2 is achieved. Furthermore, with a valve inserting method according to the invention, although an operation chamber 7 in FIG. 7 is required and the corresponding operation chamber 7 is remarkably large in comparison with the seal-up housing 2, the operation chamber 7 is made smaller than that in prior arts since the seal-up housing 2 from which the cutting equipment 3 is removed is accommodated by the operation chamber 7.

Figure 15A:
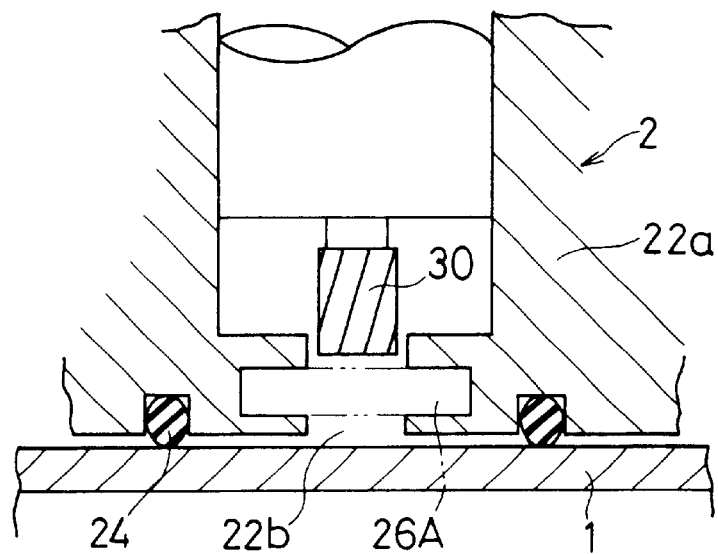
FIG. 15 shows a modified version of the first preferred embodiment, (a) of which is a sectional view showing major parts of the modified version, (b) of which is a cross-sectional view of a plate-like valve body, and (c) of which is a front elevational view showing a metal slitting saw.
Figure 15B:
Figure 15C:
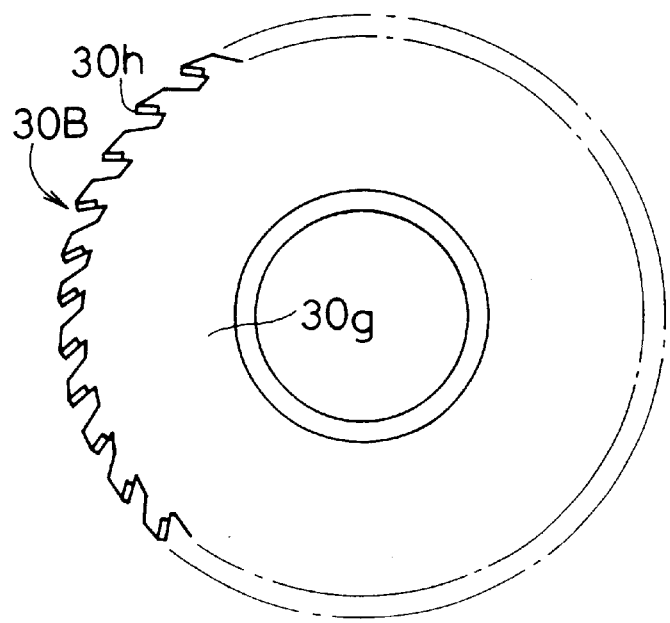

Hence, in the abovementioned preferred embodiment, although a diamond wheel 30 in FIG. 1(a) is used as the abovementioned cutting tool, an end mill 30 in FIG. 15(a) and a metal slitting saw 30B shown in FIG. 15(c) may be used in the invention instead of a disk-shaped cutting tool 30. The abovementioned metal slitting saw 30B in FIG. 15(c) is composed so that a number of cutting chips (blades) 30h are brazed to the outer circumferential portion of a disk-shaped base 30g.

Furthermore, instead of turning the bar-like valve body 26 in the preferred embodiment, a plate-like valve body 26A in FIG. 15(b) may be inserted into a slit-like opening 22b in FIG. 15(a) to cause water to be stopped by clogging the opening 22b. Furthermore, with the method for inserting a valve in a line without stopping water according to the invention, a sluice valve may be inserted instead of a butterfly valve.

Figure 16A:
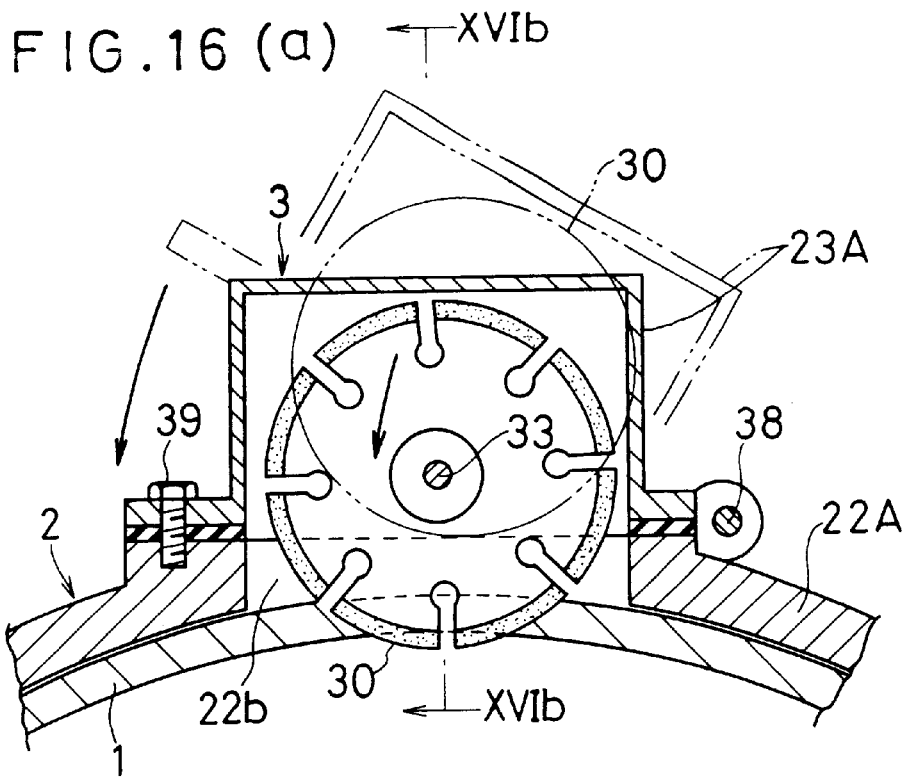
FIG. 16 shows cutting equipment of another modified version, (a) of which is a sectional view taken along the line XVIa—XVIa in FIG. 16(b), and (b) of which is a sectional view taken along the line XVIb—XVIb in FIG. 16(a)
Figure 16B:
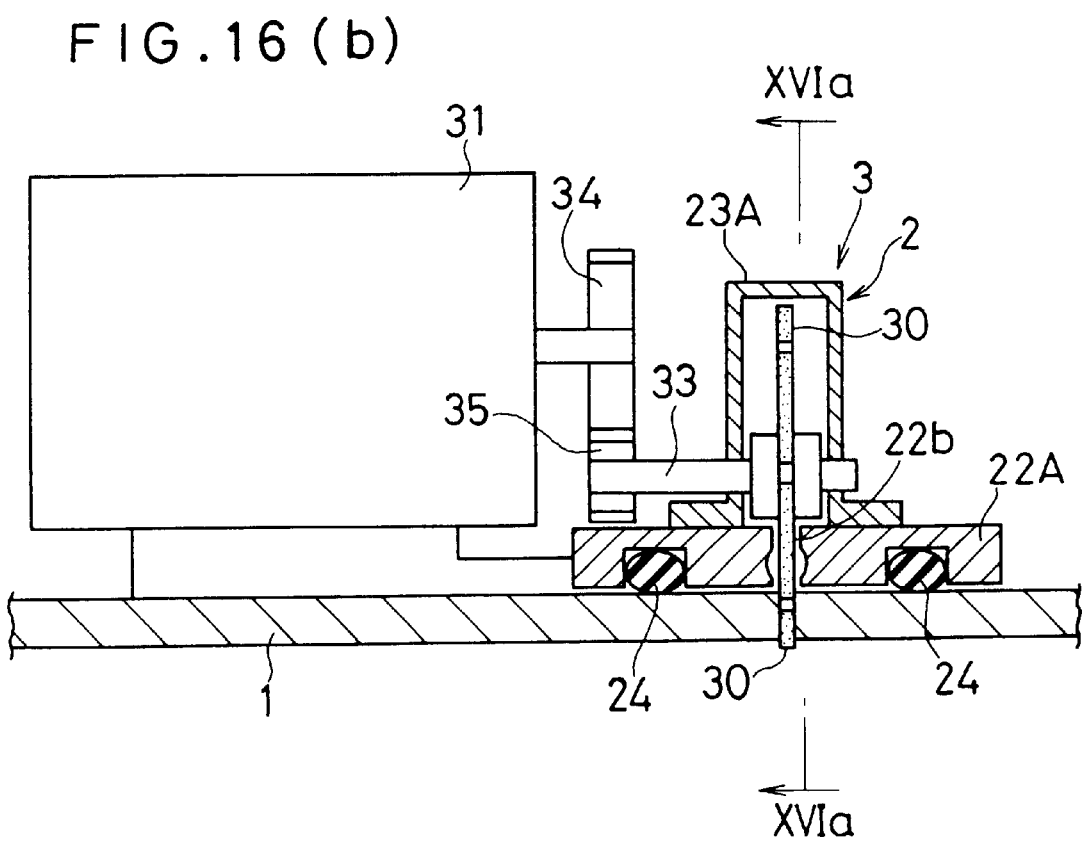

FIG. 16 shows a modified version of the first preferred embodiment.

In the modified version of the first embodiment, a cutter attaching housing 23A is rotatably attached to the second split housing 22A via a hinge 38. The corresponding cutter attaching housing 23A is fixed at the second split housing 22A by bolts 39.

In the modified version, in order to cut off the existing pipe 1, first, the workmen attach the second split housing 22A, etc., to the existing pipe 1. Subsequently, the workmen actuate the first motor 31 to rotate the cutting tool 30 in a state where the cutter attaching housing 23A is open as shown with an alternate long and two dashes line in FIG. 16(a). From this state, the workmen cause the cutter attaching housing 23A in the direction of the arrow around the hinge 38, the cutting tool 30 also moves in the direction of the arrow and begins cutting off the existing pipe 1. Concurrently, as the cutter attaching housing 23A enters a state where the the slit-like opening 22b of the second split housing 22A, the cutting tool 30 finishes a cutting feed of the existing pipe 1. Thereafter, the workmen fix the cutter attaching housing 23A at the second split housing 22A by bolts 39 in FIG. 16(a). After the cutter attaching housing 23A is fixed, the existing pipe 1 is cut off if the workmen turn the seal-up housing 2 around the existing pipe 1 while providing a slitting motion to the cutting tool 30.

Second Preferred Embodiment

FIG. 17 through FIG. 25 show a second preferred embodiment.

Hereinafter, a description is given, in the order of processes, of an existing cut-off method and a method for inserting a valve in a line without stopping passage of water according to the second preferred embodiment. The following embodiments including the second preferred embodiment are suitable for and applicable to small-and medium-sized pipes having a diameter of 4 inches through 20 inches.

Cutting Equipment

Figure 17:
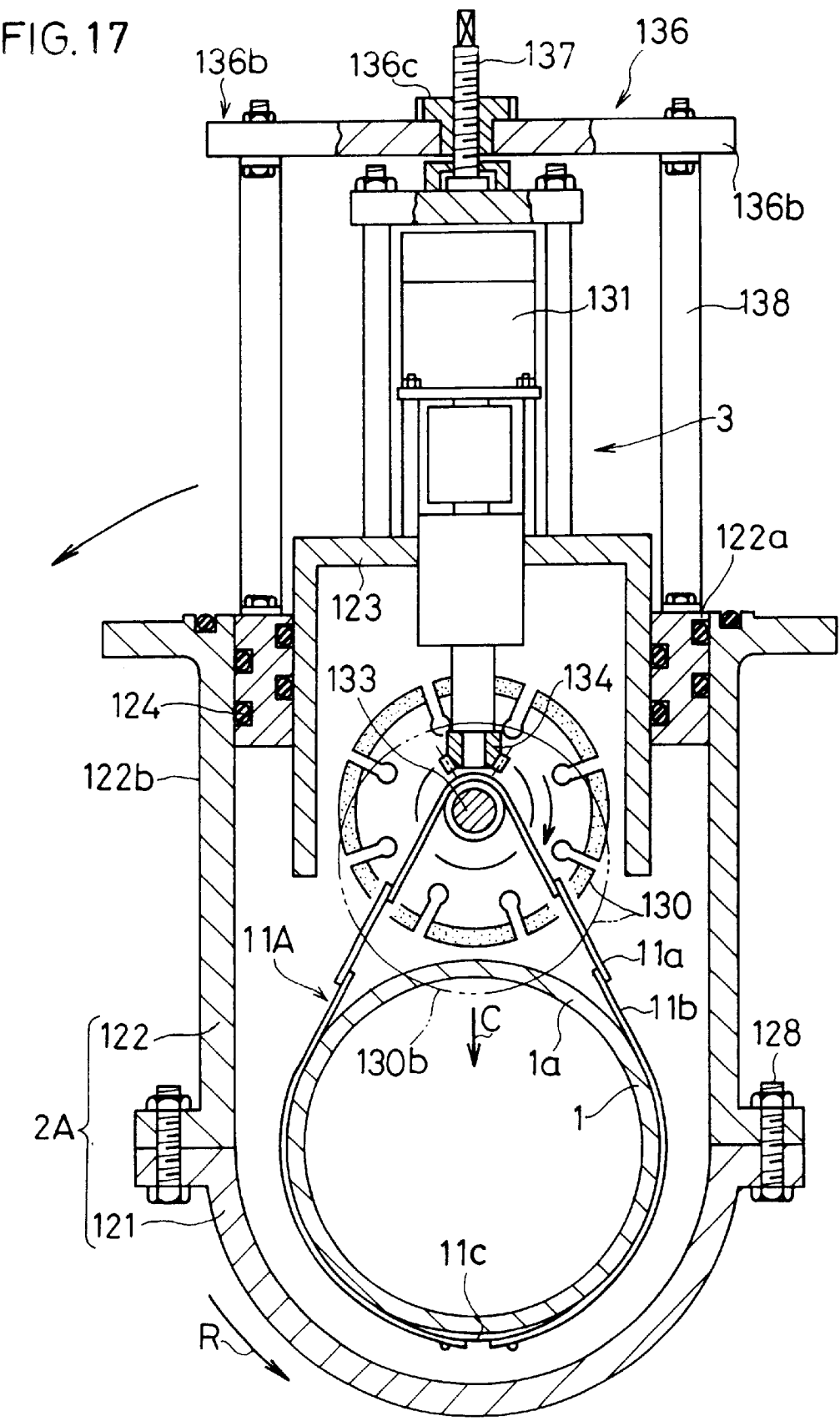
FIG. 17 is a cross-sectional view of a seal-up housing showing a second preferred embodiment of an existing pipe cut-off method according to the invention.
Figure 18:
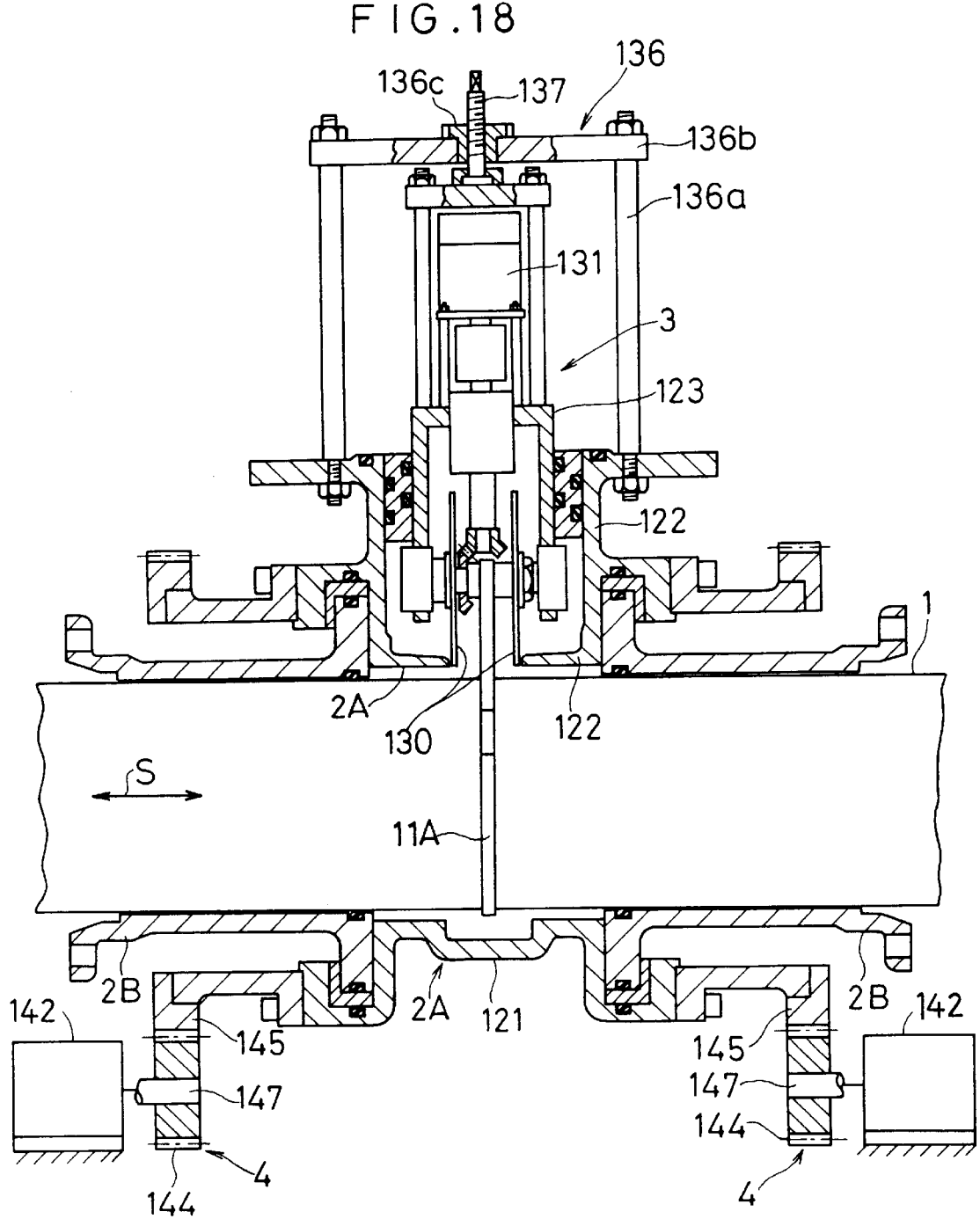
FIG. 18 is a longitudinally sectional view showing the entirety of a seal-up housing and cutting equipment, etc.

As shown in FIG. 18, in the preferred embodiment, a central first seal-up housing 2A and a pair of left and right second seal-up housings 2B are used. The abovementioned first seal-up housing 2A is provided with a first split housing 121 and a second split housings 122, divided into two sections in the circumferential direction R as shown in FIG. 17, and a two-cutting tool attaching housing 123. Furthermore, the abovementioned second seal-up housing 2B (FIG. 18) is also divided into two sections in the circumferential direction. Rubber rings 124, etc., are used to seal between these housings 121 and 122, and 2A and 2B, and between the second seal-up housing 2B and the existing pipe 1 in FIG. 19.

The abovementioned second split housing 122 has a bifurcated portion 122b protruding outward in the diametrical direction C of the existing pipe 1. The cutter attaching housing 123 is slidably attached to the bifurcated portion 122b in the diametrical direction C of the existing pipe 1 via a guide bushing 122a so that the cutter attaching housing 123 is permitted to advance and retreat. An opening 122C into which two disk-shaped cutting tools 130 are inserted is formed at the abovementioned bifurcated portion 122b at the second split housing 122.

Cutting equipment 3 is attached to the cutter attaching housing (tool attaching housing) 123 of the first seal-up housing 2A. That is, a first motor (one example of a prime mover) 131 for rotating the tools is fixed upward of the abovementioned cutter attaching housing 123. On the other hand, the abovementioned two cutting tools 130 are disposed in the abovementioned cutter attaching housing 123. It is preferable that a diamond wheel having the same structure as that of the first preferred embodiment is used as the corresponding cutting tool 130. These cutting tools 130 are disposed so as to be spaced from each other in the axial direction S of pipe 1 and are fixed at the cutter shaft 133. The cutter shaft 133 is rotatably supported at a bearing housing 132 fixed at the cutter attaching housing 123 so that it is able to be driven and rotated. The first motor 131 causes the cutting tools 130 to rotate via the output shaft of the first motor 131, a bevel gear 134 attached to the cutter shaft, and the cutter shaft 133.

A cutting feed frame 136 is fixed at the bifurcated portions 122b, and the corresponding cutting feed frame 136 is provided with long bolts 136a fixed at the bifurcated portions 122b and a top plate 136b fixed at the upper ends of the long bolts 136a. A cutting feed male lead screw 137 is screwed in a bushing 136c secured at the top plate 136b of the cutting feed frame 136.

Figure 20:
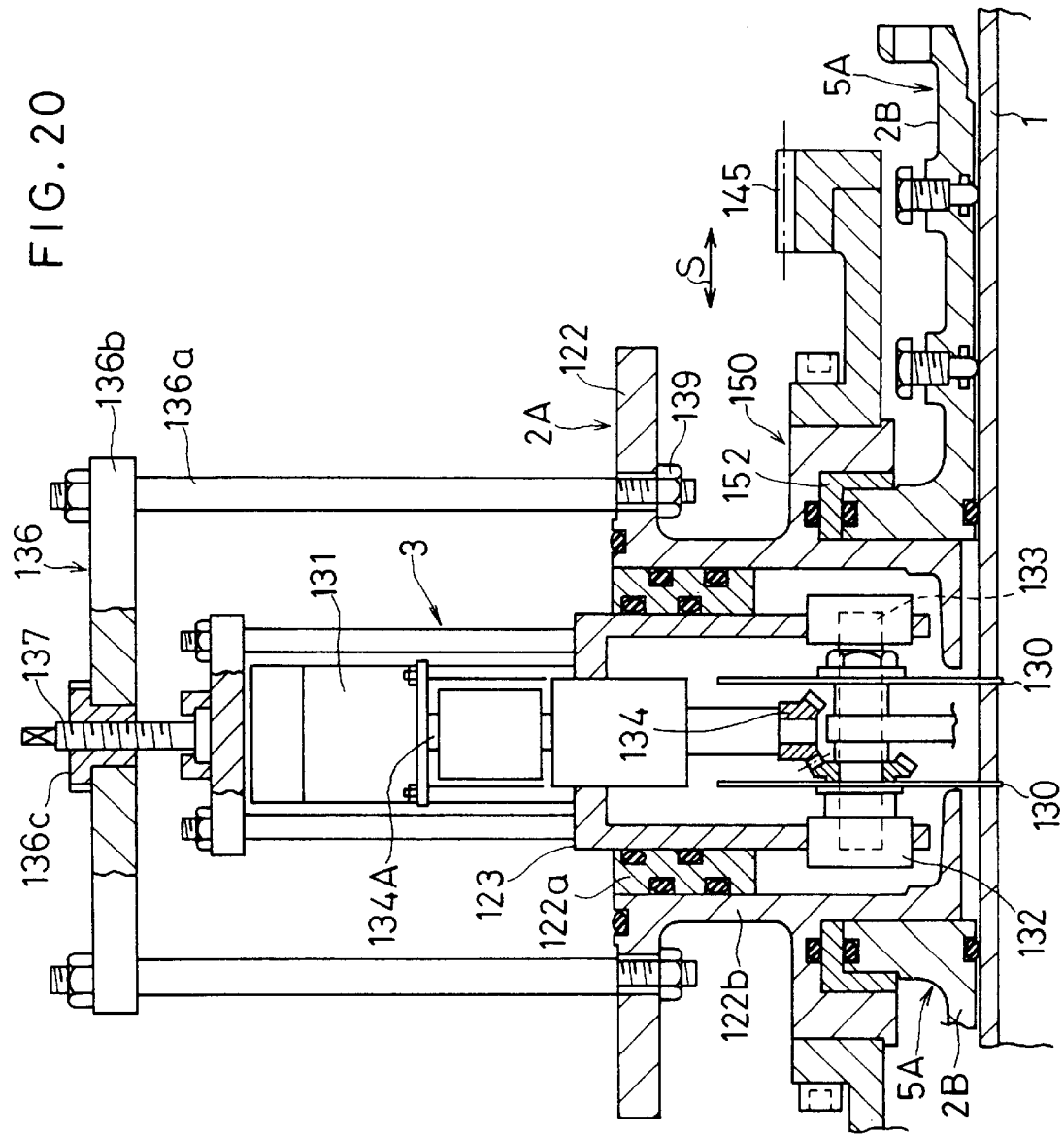
FIG. 20 is a longitudinally sectional view showing the above after the cutting is finished.

By turning and screwing the abovementioned cutting feed male lead screw 137 in the cutting feed direction C, the cutter attaching housing 123 advances in the cutting feed direction C. Therefore, the cutter attaching housing 123 is sent in the cutting feed direction C to cause the cutting tools 130 to go into the opening 122C while rotating the cutting tools 130, wherein as shown in FIG. 20, it is possible to slit the existing pipe 1 by the abovementioned cutting tools 130. Furthermore, since the guide bushing 122a is fixed at the top plate 136b via a connection metal fitting 138 in FIG. 17, it is collected together with the cutting feed frame 136 after the cutting is completed.

Figure 21:
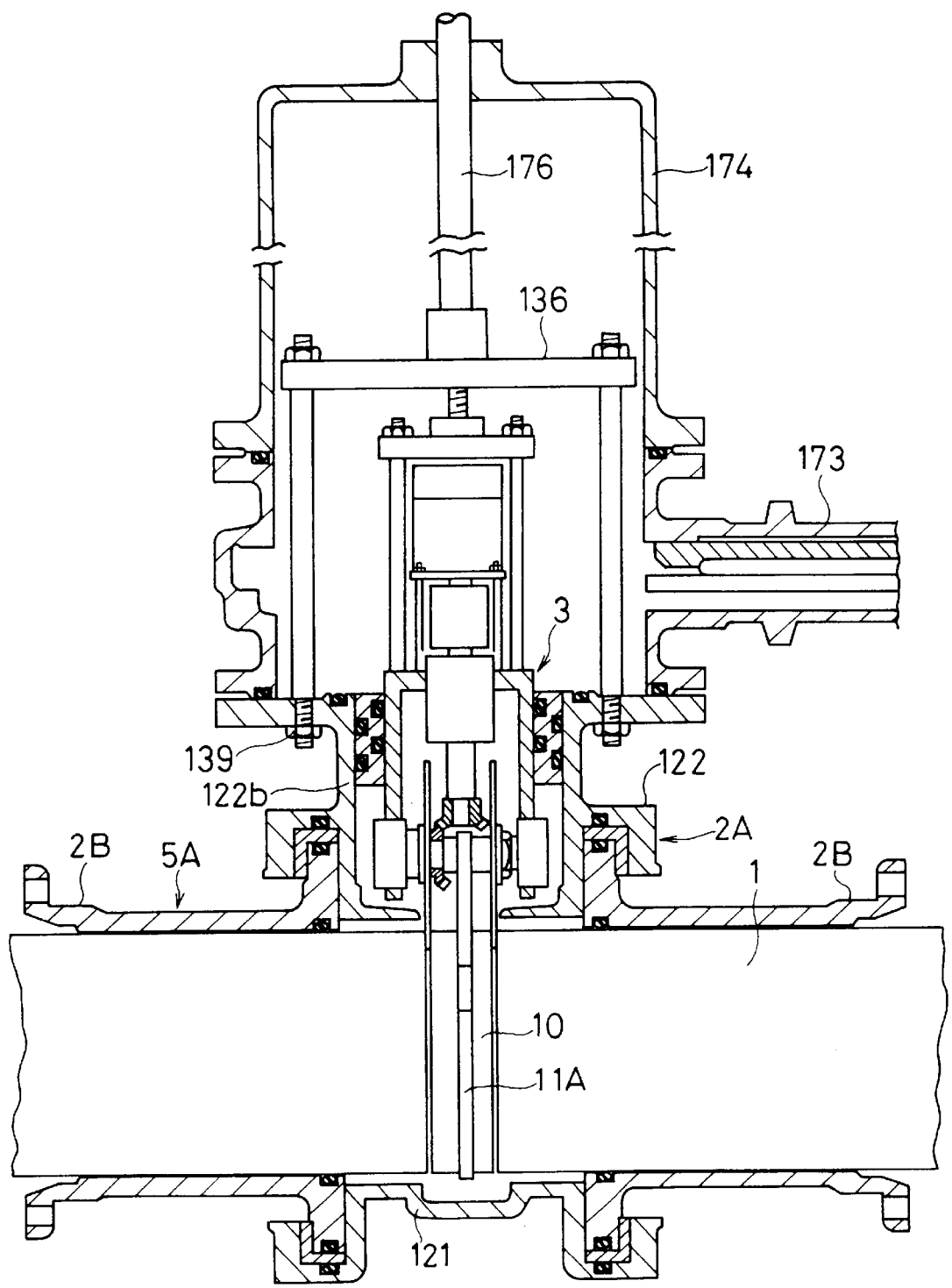
FIG. 21 is a longitudinally sectional view showing a state where an operation upper chamber is assembled after the cutting is completed.
Figure 22:
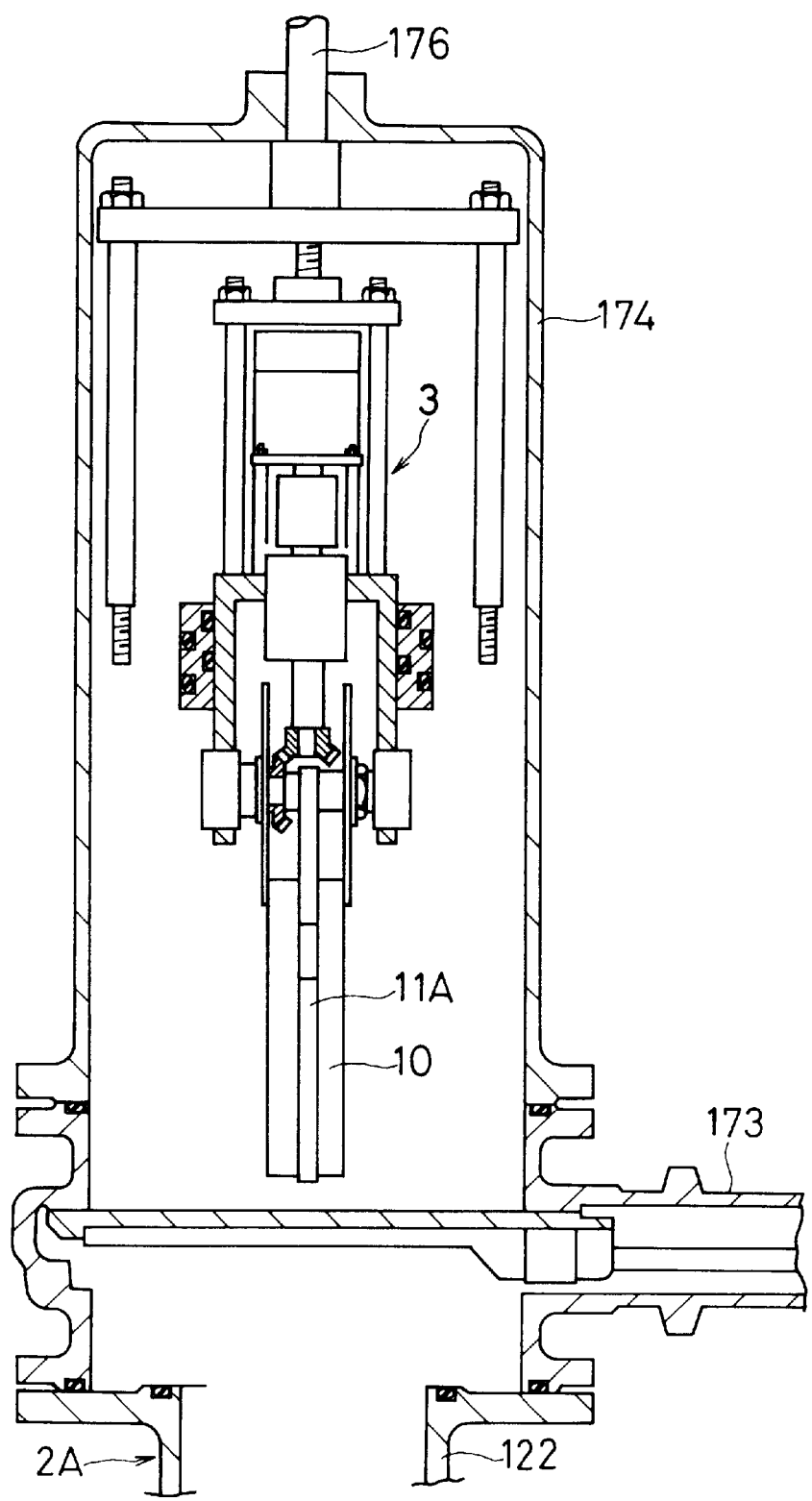
FIG. 22 is a sectional view showing a state where a cut-off section is removed.

As shown in FIG. 17, a lifting belt 11A is wound onto the existing pipe 1 and cutter shaft 133, by which a freshly cut-off section 10 in FIG. 21 is collected together with the cutting equipment 3 after cutting off the existing pipe 1. Furthermore, the lifting belt 11A is such that as in FIG. 17, a flexible rubber plate portion 11a, a thin metal belt 11b, and a connection piece 11c are united.

In the preferred embodiment, a housing turning device 4 shown in FIG. 18 is provided, which causes the first seal-up housing 2A to be turned around the existing pipe 1. The housing turning device 4 has a pair of second motors 142 for turning the seal-up housing. The corresponding second motors 142 rotates drive gears 144, which turn the seal-up housing, via the respective output shafts 147. The corresponding drive gears 144 driven gears 145, which turns the seal-up housing fixed at the first seal-up housing 2A. Therefore, by turning the first seal-up housing 2A to be turned around the existing pipe 1 once while rotating the cutting tools 130 in a cutting feed state as shown in FIG. 20, the existing pipe 1 can be cut off at two points.

Figure 19:
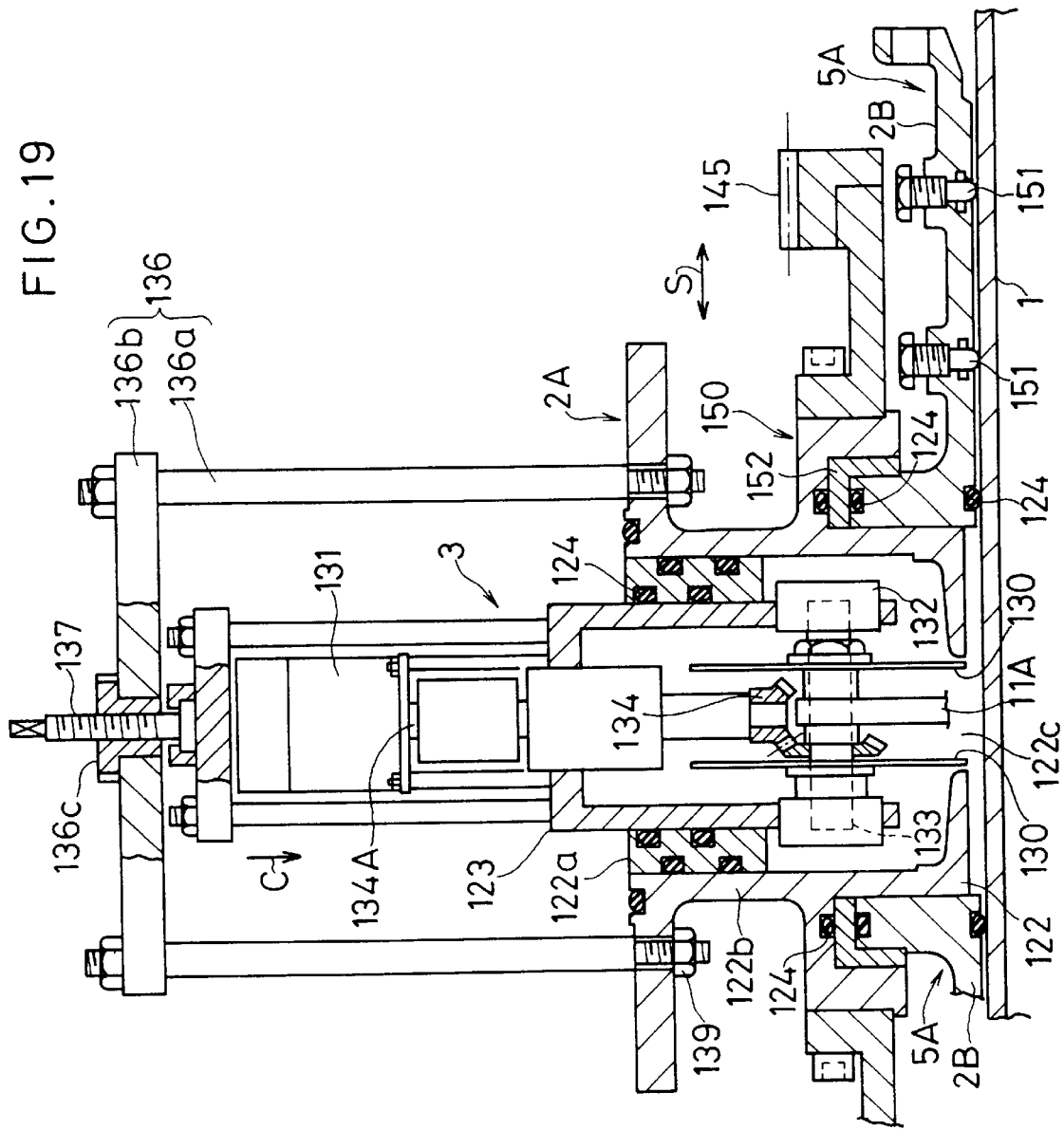
FIG. 19 is a longitudinally sectional view mainly showing the cutting equipment before the cutting is started.

As shown in FIG. 19, the second seal-up housing 2B constitutes a slip preventing member 5A. The corresponding second seal-up housing 2B is divided into two divisions in the circumferential direction R (FIG. 17). The second seal-up housing 2B has a number of set screws 151 provided in the circumferential direction R (FIG. 17) at each of the two points spaced from each other in the axial direction S of pipe 1. A rotation guiding portion 150 which slides via a liner 152 is provided at the connection portion between the first seal-up housing 2A and the second seal-up housing 2B. The second seal-up housing 2B is fixed at the existing pipe 1 by the abovementioned set screws 151. The abovementioned pair of second seal-up housings 2B guides the first seal-up housing 2A via the abovementioned rotation guiding portion 150 and prevents the first seal-up housing 2A from slipping or shaking in the axial direction S of the existing pipe 1. Therefore, the first seal-up housing 2A is able to be smoothly turned when turning around the existing pipe 1. Furthermore, a ball bearing may be used instead of the liner 152.

Cutting Process

Next, a description is given of a cutting process.

First, in a state where fluid (water) is flowing through the existing pipe 1 in FIG. 17, the workmen apply the upper half member of the first and second seal-up housings 2A and 2B (in FIG. 18) onto the existing pipe 1, and wind the lifting belt 11A onto the cutter shaft 133 and existing pipe 1. Thereafter, the workmen tighten the lower half member of the first and second seal-up housings 2A and 2B together with the upper half member by assembly bolts 128. Thus, the existing pipe 1 is enclosed and sealed up, in an airtight state, by the first and second seal-up housings 2A and 2B. Furthermore, the workmen attach, in advance, the cutting equipment 3 to the cutter attaching housing 123 of the first seal-up housing 2A.

Next, as the workmen drive the first motor 131 in FIG. 19, the corresponding first motor 131 rotates the abovementioned cutting tools 130 on the cutter shaft 133 at a high speed, wherein the abovementioned cutting tools 130 are caused to perform a slitting motion by which the existing pipe 1 is slit by rotations of the corresponding cutting tools 130. In the state where the cutting tool 130 is performing the corresponding slitting motion, if the workmen screws the male lead screw 137 for cutting feed in the direction C, concurrently, the abovementioned cutting tools 130 advance, as shown with an alternate long and two dashes line in FIG. 17, to the position where the cutting tools 130 pass through a part of the wall 1a of the existing pipe 1. Thus, cutting feed of the cutting tools 130 in the direction C is completed.

After the cutting feed, if the workmen drive the second motor 142 for turning the seal-up housing, the first seal-up housing 2A is turned around the existing pipe 1 via a pair of drive gears 144 and driven gears 145 in FIG. 20, in a state where the first seal-up housing 2A is guided by the second seal-up housing 2B. Thereby, the cutting tools 130 shown in FIG. 17 are rotated on the cutter shaft 133 while turning in the direction of the arrow R along the outer circumference of the existing pipe 1 together with the first seal-up housing 2A, wherein as shown in FIG. 21, the existing pipe 1 is slit to be roughly annular at two points to cut off the existing pipe 1. That is, the abovementioned second motor 142 shown in FIG. 18 causes the cutting tools 130 in FIG. 20 to turn in the circumferential direction R by turning the first seal-up housing 2A in the circumferential direction R (FIG. 17) of the existing pipe 1, thereby causing the cutting tools 130 to perform a feeding motion. Therefore, the cutting tools 130 cut off the abovementioned existing pipe 1.

After the corresponding cutting is completed, the workmen remove the housing turning device 4 (in FIG. 18).

Furthermore, cutting chips may be discharged through a water discharge valve by attaching the discharge valve to the cutter attaching housing 123.

Cut-off Section Removing Process

Next, the workmen remove the cutting equipment 3 and freshly cut-off section 10 by the method described below. As shown in FIG. 21, the workmen connect an operation sluice valve 173 to the bifurcated portion 122b and further connect an operation upper chamber 174 to the abovementioned operation sluice valve 173 so as to overlap thereon. At the point of the connection, the workmen connect a cutting feed frame 136 to the tip end of an lifting shaft 176 passing through the operation upper chamber. After the connection is completed, the workmen remove nuts 139. After removing the nuts, the workmen raise the lifting shaft 176 in FIG. 22 to remove the cutting equipment 3 and cut-off section 10 from the first seal-up housing 2A into the operation upper chamber 174. After that, the operation sluice valve 173 is closed. After the valve is closed, the workmen separate the operation upper chamber 174 from the operation sluice valve 173.

Valve Inserting Process

Figure 23:
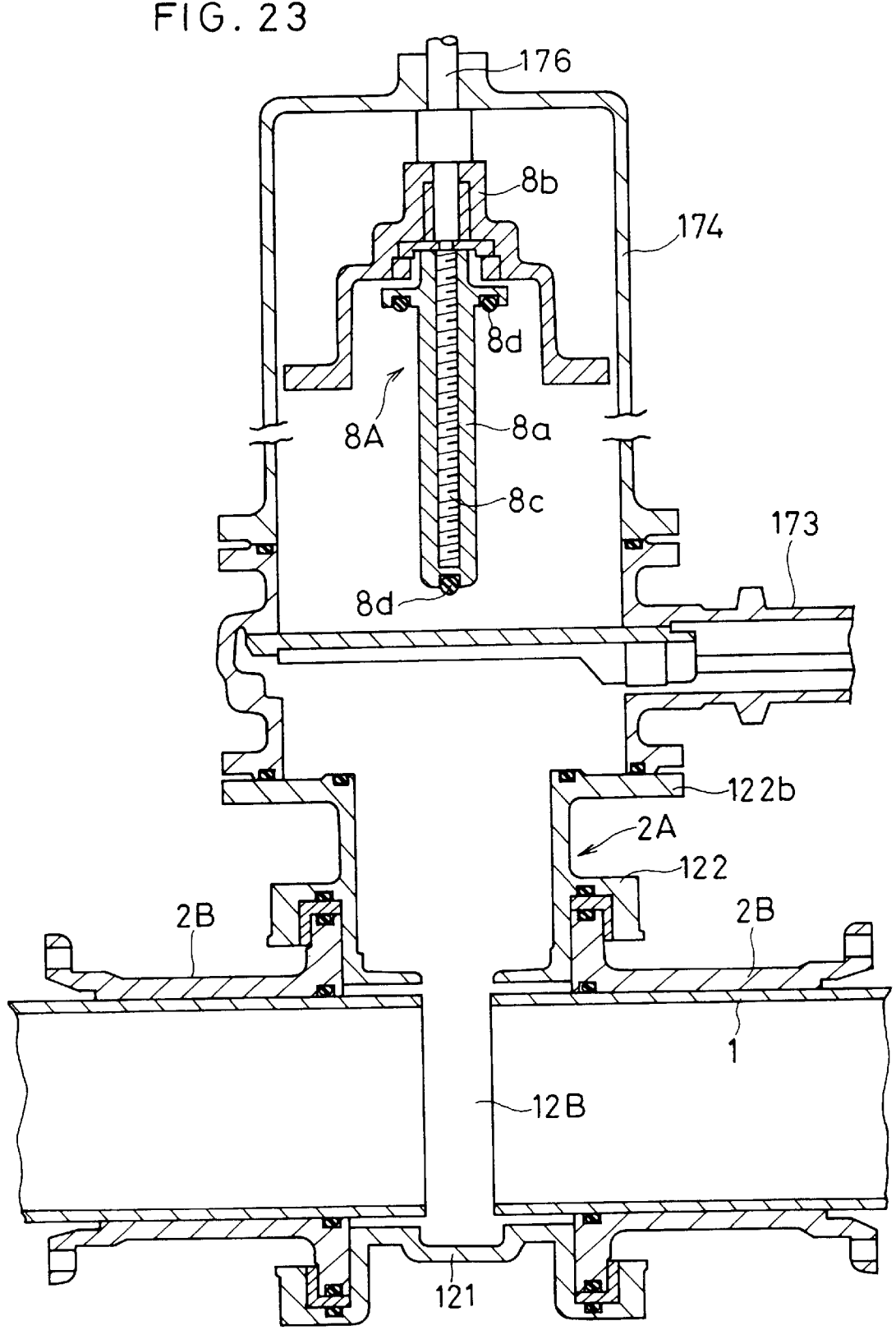
FIG. 23 is a sectional view showing a state where a valve is housed in the operation upper chamber.

Next, the workmen accommodate a valve cover 8b in FIG. 23 and sluice valve body 8a into the operation upper chamber 174 and connect the operation upper chamber 174 to the operation sluice valve 173. The sluice valve 8A is provided with a spindle 8c for opening and closing the sluice valve body 8a. The sluice valve 8A constitutes a valve so that, if the spindle 8c is turned, the sluice valve body 8a invades the cut-open portion 12B and rubber packing 8d secured at the sluice valve body 8a is pressure-fitted to the inner circumferential portions, etc., of the first seal-up housing in FIG. 25.

Figure 24:
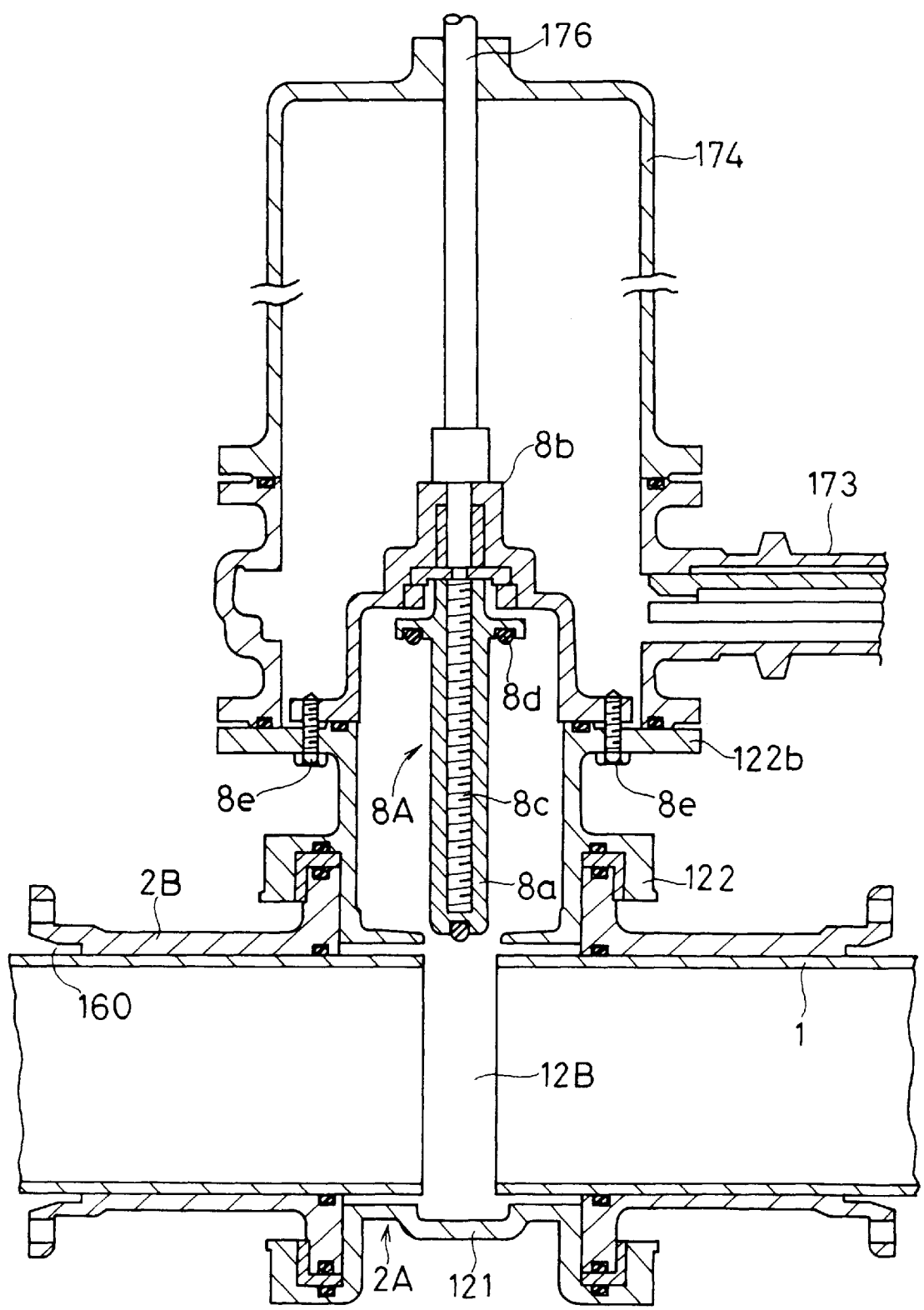
FIG. 24 is a sectional view showing a state where a valve is inserted.
Figure 25:
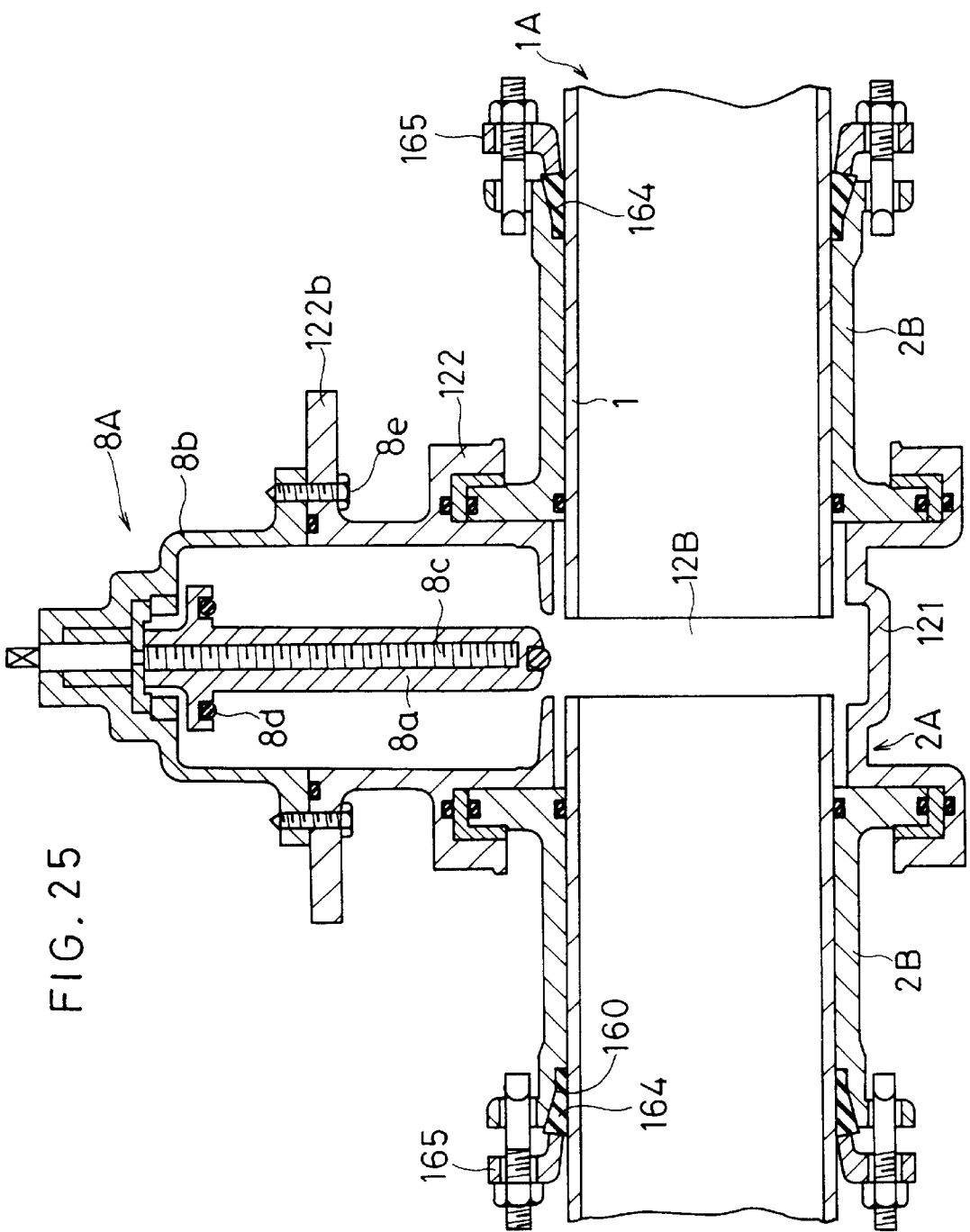
FIG. 25 is a sectional view showing a state where the valve is completely inserted.

After the operation upper chamber 174 shown in FIG. 23 is attached, the workmen open the operation sluice valve 173 as shown in FIG. 24 and lower the lifting shaft 176. Thereby, the valve cover 8b is brought into contact with the bifurcated portion 122b. After they are brought into contact with each other, the workmen connect the valve cover 8b to the bifurcated portion 122b by flange bolts 8e. After the connection is completed, the workmen withdraw the operation upper chamber 174 and operation sluice valve 173. Thereafter, the workmen press rubber rings 164 into the packing insertion portions 160 of the second seal-up housing 2B in FIG. 25 and attach the split press rings 165 to the second seal-up housing 2B. Thus, the sluice valve 8A is disposed at the position corresponding to the cut-open portion 12B and the sluice valve 8A is inserted into a line 1A.

Figure 26:
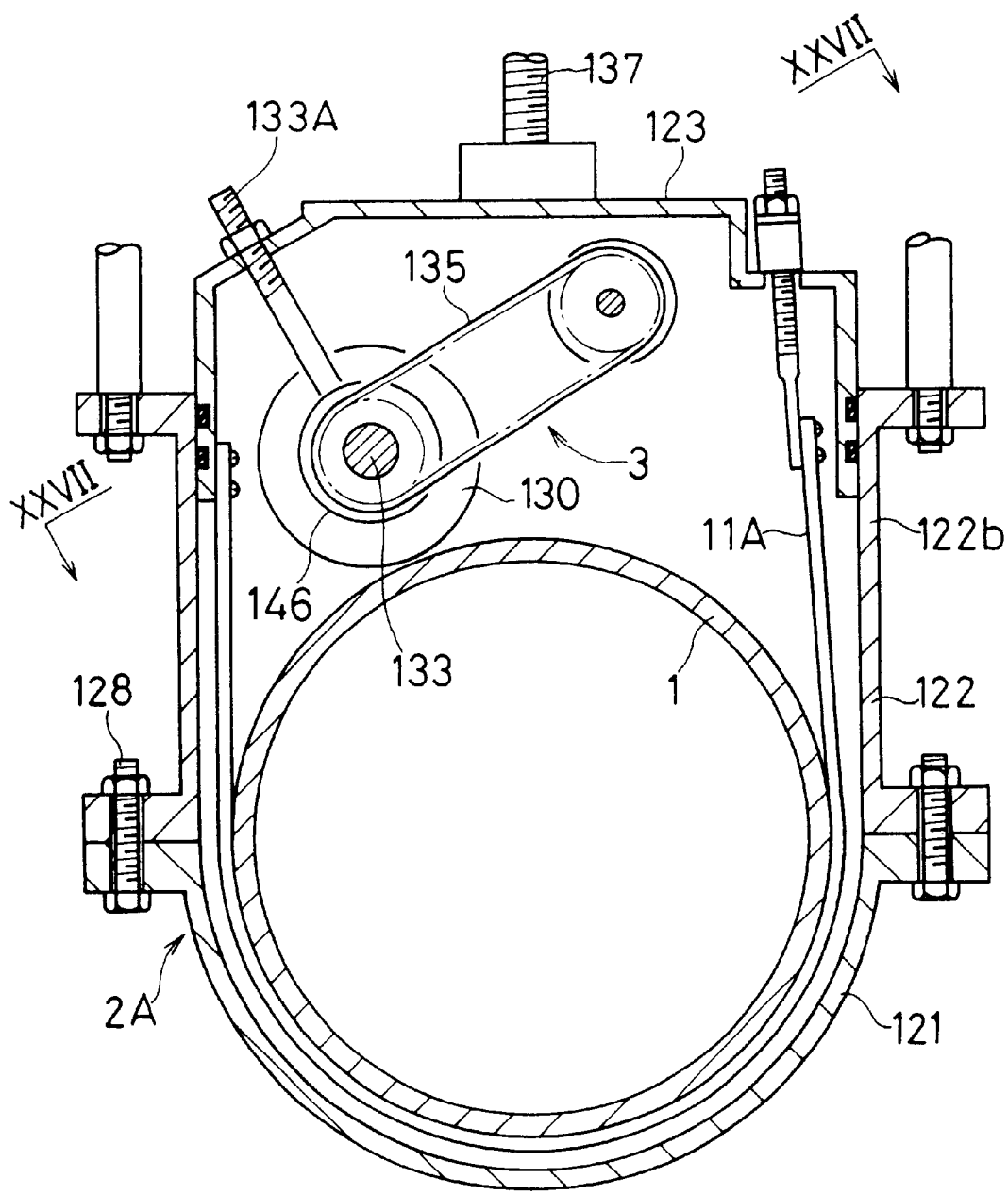
FIG. 26 is a cross-sectional view of major parts showing a modified version of the second preferred embodiment.
Figure 27:
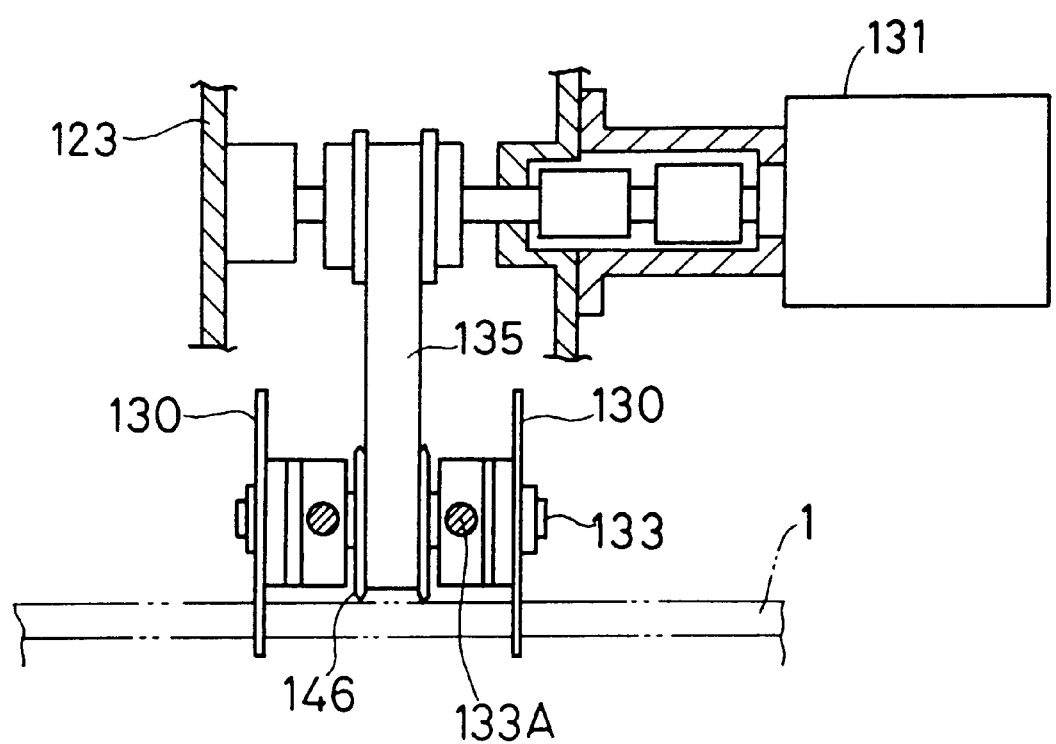
FIG. 27 is a sectional view taken along the line XXVII—XXVII in FIG. 26.
Figure 28:
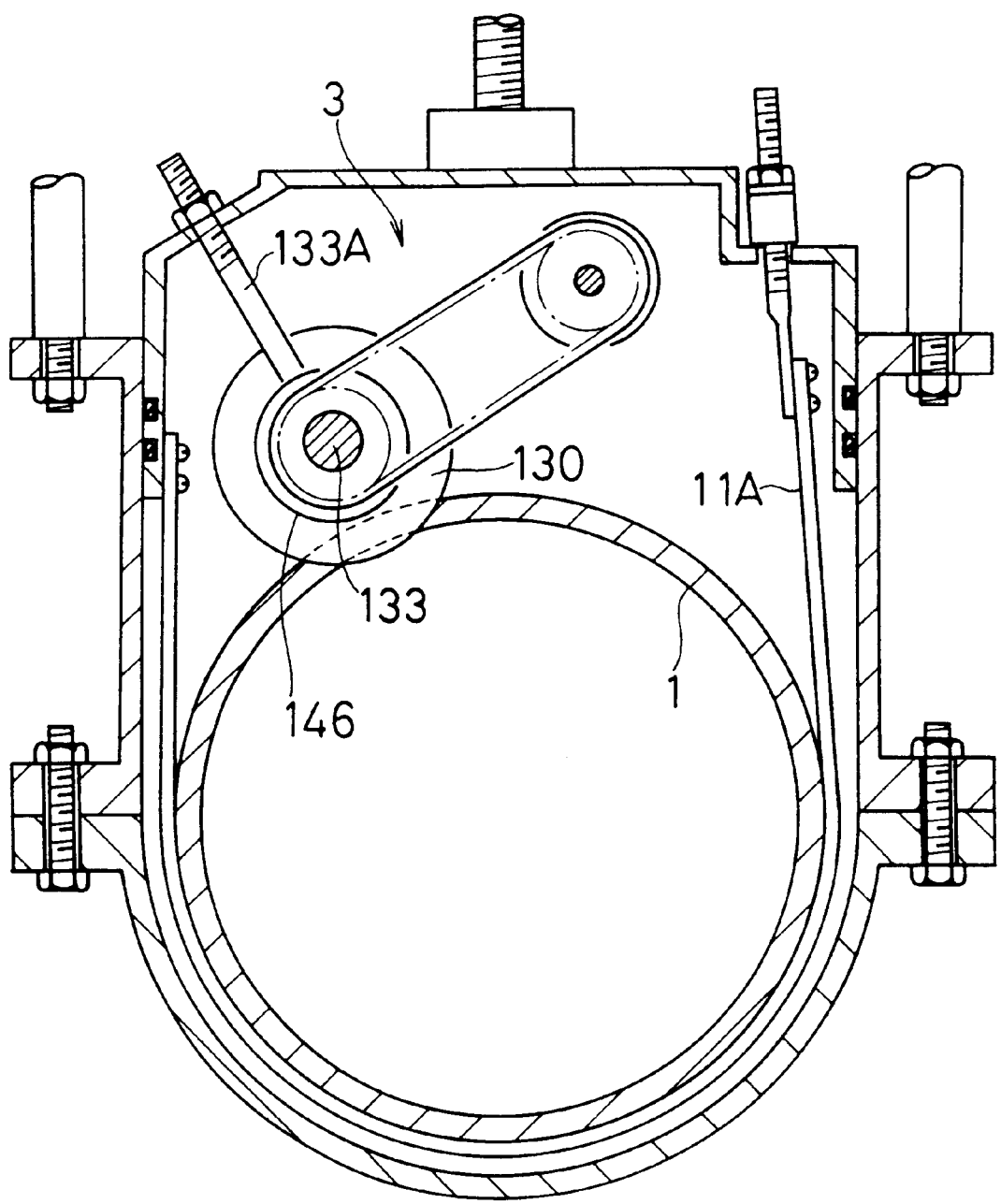
FIG. 28 is a cross-sectional view of the same modified version after the cutting is finished.

FIG. 26 through FIG. 28 show a modified version of the embodiment.

As shown in the modified version, the lifting belt 11A may be attached to the bifurcated portion 122b. Furthermore, as shown in FIG. 27, the output of the first motor 131 may be transmitted to the cutter shaft 133 via a timing belt 135. Moreover, at the point of cutting shown in FIG. 28, a guide roller 146 which bites the outer surface of the existing tube 1 and guides the cutting equipment 3 may be provided. Furthermore, the cutter shaft 133 is rotatably supported at an eye bolt 133A.

Third Preferred Embodiment

FIG. 29 through FIG. 37 show a third preferred embodiment.

Hereinafter, a description is given, in the order of processes, of an existing pipe cut-off method and a method for inserting a valve in a line without stopping passage of water according to the third preferred embodiment.

Cutting Equipment

Figure 29:
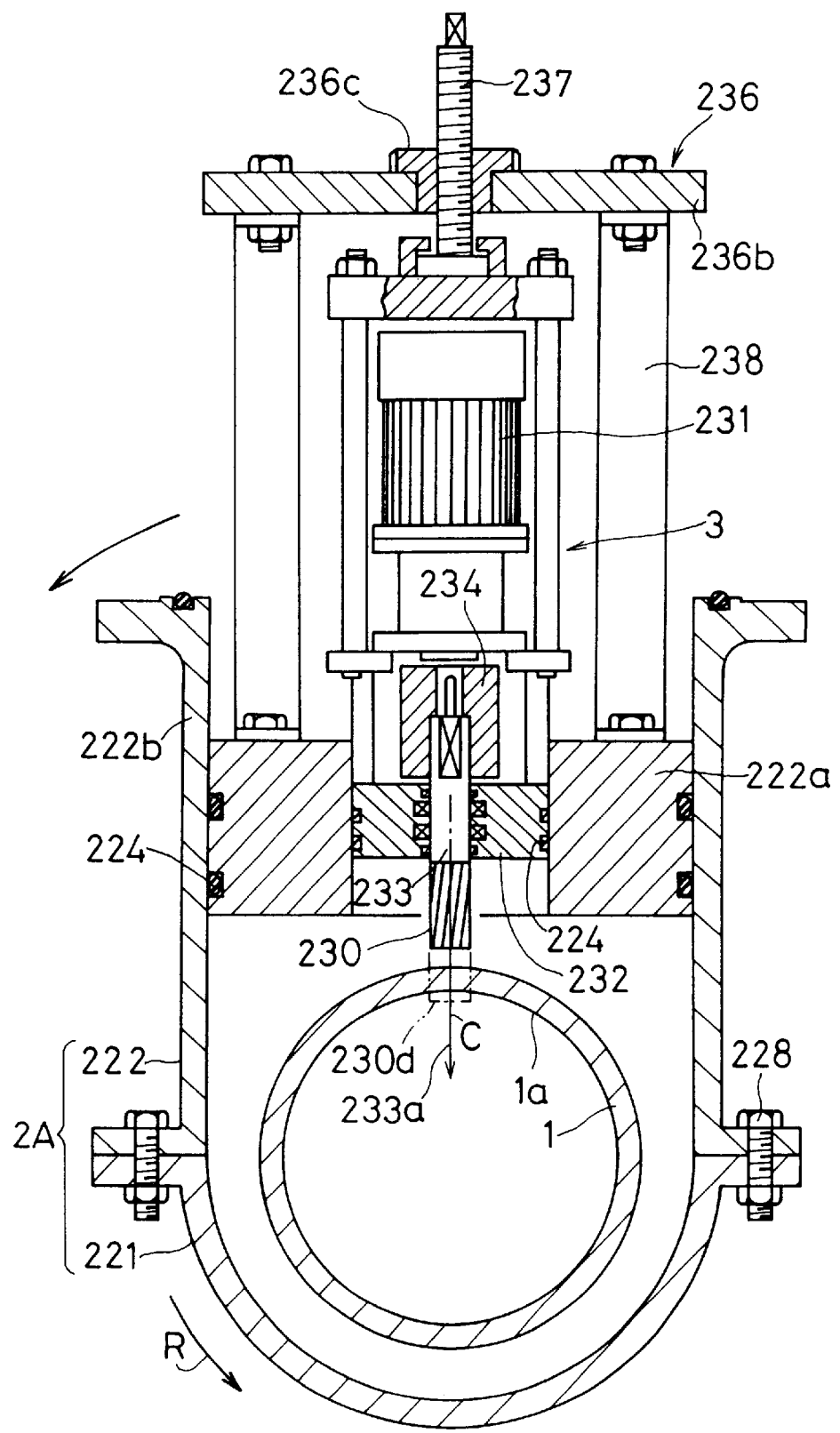
FIG. 29 is a cross-sectional view of a seal-up housing showing the third preferred embodiment of an existing pipe cut-off method according to the invention.
Figure 30:
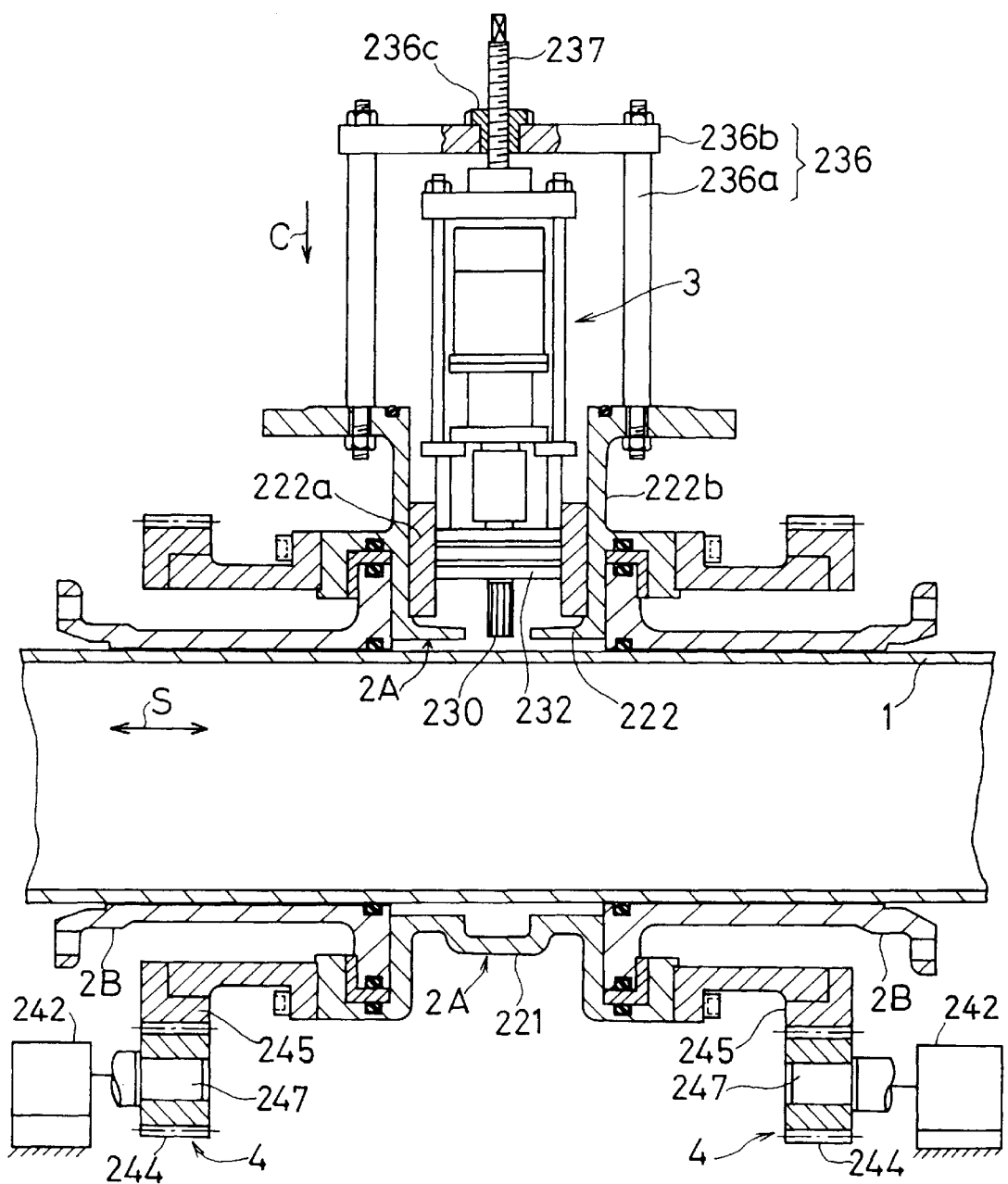
FIG. 30 is a longitudinally sectional view showing the entirety of a seal-up housing, cutting equipment, etc.

As shown in FIG. 30, in the preferred embodiment, a first central seal-up housing 2A and a pair of left and right second seal-up housings 2B are used. The first seal-up housing 2A is equipped with, as shown in FIG. 29, the first and second split housings 221 and 222, which are split into two sections in the circumferential direction, and a guide bushing 222a. Furthermore, the abovementioned second seal-up housing 2B (FIG. 30) is divided into two divisions. As shown in FIG. 31(a), rubber rings 224, etc. are used to seal up between these housings 221 and 222, and 2A and 2B, and the second seal-up housing 2B and the existing pipe 1.

The abovementioned second split housing 222 has a bifurcated portion 222b protruding from the existing pipe 1 in the diametrical direction C. A main bearing (tool attaching housing) 232 is secured at the bifurcated portions 222b via the abovementioned guide bushing 222a so that the main bearing is able to slidably be advanced and retreated in the diametrical direction C of the existing pipe 1. Rubber rings 224 are used to seal up between the abovementioned guide bushing 222a, bifurcated portions 222b and main bearing 232. An opening 222c into which an end mill (cutting tool) 230 is inserted is formed at the abovementioned bifurcated portions 222b at the second split housing 222.

Cutting equipment 3 is attached to the guide bushing 222a fixed at the abovementioned first seal-up housing 2A via the main bearing 232. That is, the first motor 231 (an example of a prime mover) for rotating a tool is fixed upward of the main bearing 232. On the other hand, the abovementioned end mill 230 is disposed inside the abovementioned main bearing 232. The end mill 230 is formed integral with the main shaft 233 (cutter shaft) rotatably supported on the main bearing 232. The first motor 231 rotates the end mill 230 via the output shaft 231a of the first motor 231 and a coupling 234 fixed at the main shaft 233.

As shown in FIG. 31(b), the abovementioned end mill 230 is provided with a plurality of blades 230f at the columnar tip end surface 230d and the outer circumferential surface 230e thereof. Furthermore, the abovementioned main shaft 233 is formed at the end mill 230 integral therewith. As shown in FIG. 29, the axial line 233a of the abovementioned end mill 230 and main shaft 233 is set in the diametrical direction C of the existing pipe 1. The abovementioned end mill 230 carries out a slitting motion by rotating around the axial line 233a established in the diametrical diameter C of the abovementioned existing pipe 1.

A cutting feed frame 236 is fixed at the abovementioned bifurcated portions 222b in FIG. 31(a). The cutting feed frame 236 is provided with long bolts 236a fixed at the abovementioned bifurcated portions 222b and a top plate 236b fixed at the upper end of the corresponding long bolts 236a. A mail lead screw 237 for cutting feed is screwed in a bushing 236c secured at the abovementioned top plate 236b of the abovementioned cutting feed frame 236.

Figure 32:
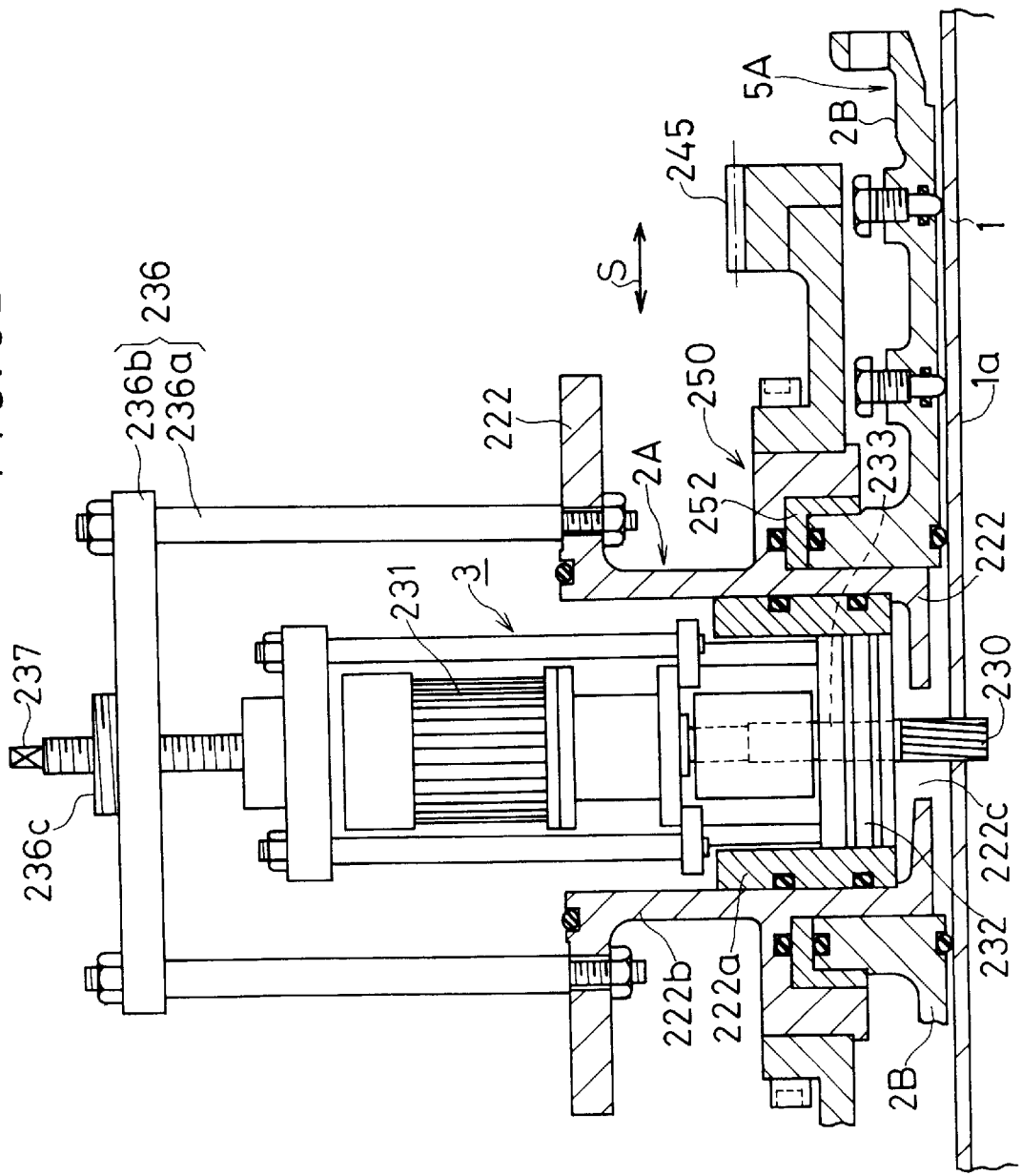
FIG. 32 is longitudinally sectional view showing the cutting equipment after the cutting is started.

By turning and screwing the corresponding male lead screw 237 for cutting feed in the cutting feed direction C, the main bearing 232 advances in the cutting feed direction C. Therefore, by feeding the end mill 230 together with the main bearing 232 in the cutting feed direction C while rotating the end mill 230 and causing the end mill 230 to advance into the opening 222c, it is possible to slit the existing pipe 1 by the end mill 230 as shown in FIG. 32. Furthermore, the guide bushing 222a is fixed at the cutting feed frame 236 via a connection metal fitting 238 in FIG. 29, and it is designed so that it can be collected together with the cutting feed frame 236 after the cutting is completed.

In the preferred embodiment, a housing turning device 4, shown in FIG. 30, which causes the first seal-up housing 2A to rotate around the existing pipe 1, is provided. The housing turning device 4 has a pair of second motors 242 for turning the seal-up housing. The corresponding second motors 242 rotate drive gears 244 for turning the seal-up housing via their output shafts 247. The corresponding drive gears 244 rotate driven gears 245 for turning the seal-up housing, which are fixed at the first seal-up housing 2A. Therefore, by causing the first seal-up housing 2A to turn once around the existing pipe 1 while rotating the end mill 230 in a cutting feed state in FIG. 32, it is possible to cut off the existing pipe 1.

Figure 31:
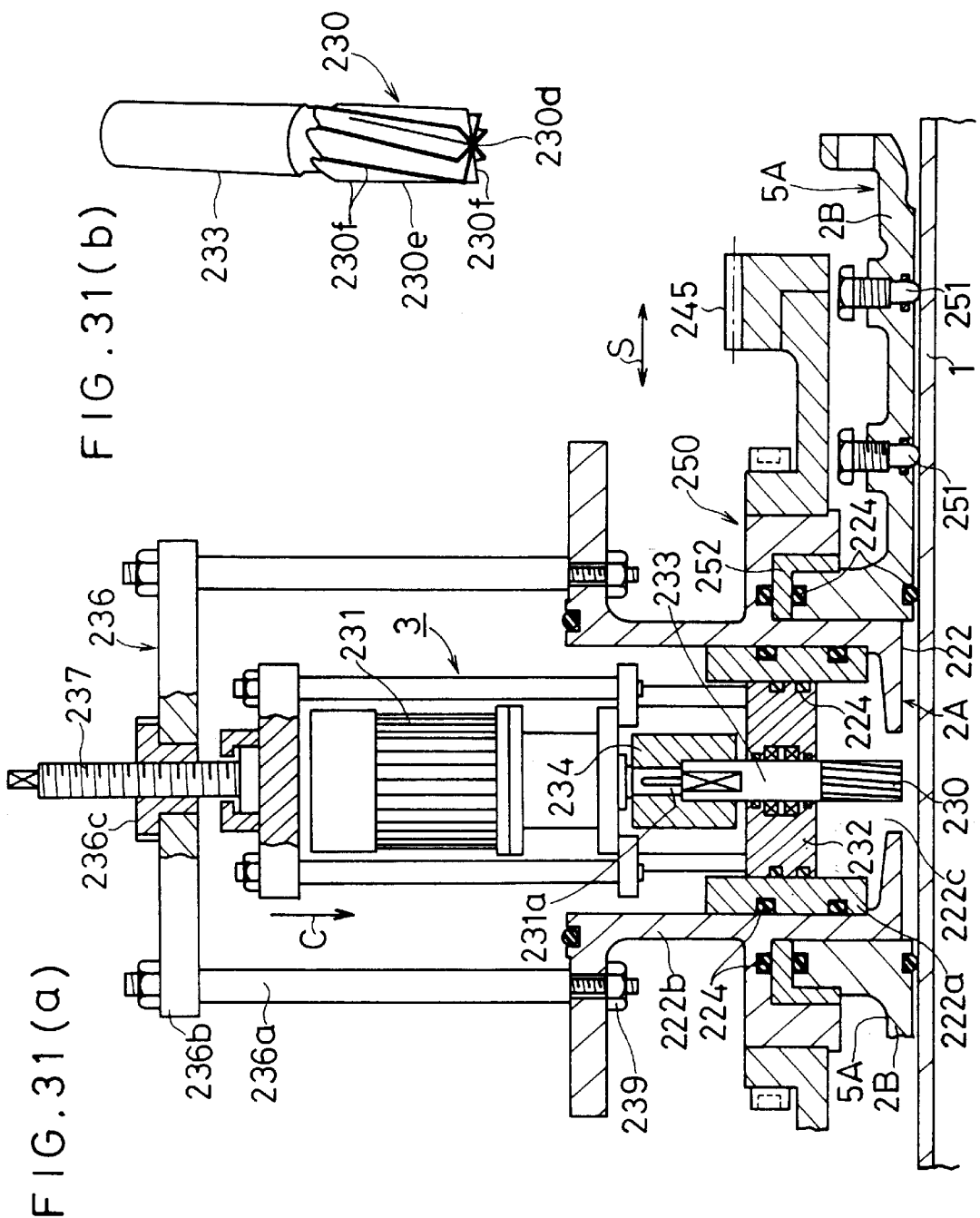
FIG. 31($a$) is a longitudinally sectional view mainly showing the cutting equipment before the cutting is started, and FIG. 31($b$) is a perspective view of an end mill.

As shown in FIG. 31, the second seal-up housing 2B constitutes a slip preventing member 5A. The corresponding second seal-up housing 2B is divided into two sections in the circumferential direction R (FIG. 29) of the existing pipe 1. A number of set screws 251 are secured at two points spaced from each other in the axial direction S of pipe 1 at the corresponding second seal-up housing 2B, in the circumferential direction R (FIG. 29). A rotation guiding portion 250 which slides via a liner 252 is provided at the connection portion between the first seal-up housing 2A and the second seal-up housing 2B. The abovementioned pair of second seal-up housings 2B are fixed at the existing pipe 1 by the set screws 251. The abovementioned second seal-up housings 2B guide the first seal-up housing 2A via the abovementioned rotation guiding portion 250 and prevent the first seal-up housing 2A from slipping or shaking in the axial direction S of the existing pipe 1. Therefore, the first seal-up housing 2A is able to be smoothly turned when turning around the existing pipe 1. Furthermore, a ball bearing may be used instead of the liner 252.

Cutting Process

Next, a description is given of a sequence of cutting.

First, the workmen attach the first and second seal-up housings 2A and 2B to the existing pipe 1 in a state where fluid (water) is flowing through the existing pipe 1 in FIG. 30, and assemble both split housings 221 and 222 by assembling bolts 228 in FIG. 29. Thus, as shown in FIG. 30, the first and second seal-up housings 2A and 2B enclose and seal up the existing pipe 1 in an airtight state. Furthermore, the cutting equipment 3 is attached, in advance, to the guide bushing 222a of the first seal-up housing 2A.

Next, as the workmen drive the first motor 231 in FIG. 29, the corresponding first motor 231 causes the end mill 230 to rotate around the axial line 233a of the main shaft 233 and causes the cutting tool 230 to perform a slitting motion by which the existing pipe 1 is slit by rotations of the end mill 230. In a state where the corresponding cutting tool 230 is performing a slitting motion, if the workmen screw the male lead screw 237 for cutting feed in the cutting feed direction C, concurrently, the tip end face 230d of the end mill 230 (FIG. 31(b)) advances to the position where it passes through a part of the wall 1a of the existing pipe 1. Thus, the cutting feed of the end mill 230 in the direction C is completed.

After that, the workmen drive the second motor 242 for turning the seal-up housing in FIG. 30, the first seal-up housing 2A is turned around the existing pipe 1 via a pair of drive gears 244 and driven gears 245 in FIG. 32 in a state where it is guided by the second seal-up housing 2B. Thereby, the end mill 230 rotates on the main shaft 233 while turning in the outer circumference of the existing pipe 1 together with the first seal-up housing 2A, wherein, by slitting the existing pipe 1 roughly annularly, the existing pipe 1 is cut off.

That is, the abovementioned second motor 242 (FIG. 29) causes the end mill 230 to be turned in the circumferential direction R (FIG. 29) by turning the abovementioned first seal-up housing 2A in the abovementioned circumferential direction R of the existing pipe 1 in order to perform a feed motion of the end mill 230, wherein the end mill 230 annularly slits the existing pipe 1 and cuts off the abovementioned existing pipe 1. After the cutting is completed, the workmen remove the housing turning device 4 in FIG. 30.

Furthermore, if a water discharge valve is attached to the main bearing 232, cutting chips may be discharged through the water discharge valve when carrying out a slitting motion.

Cutting Equipment Removing Process

Figure 33:
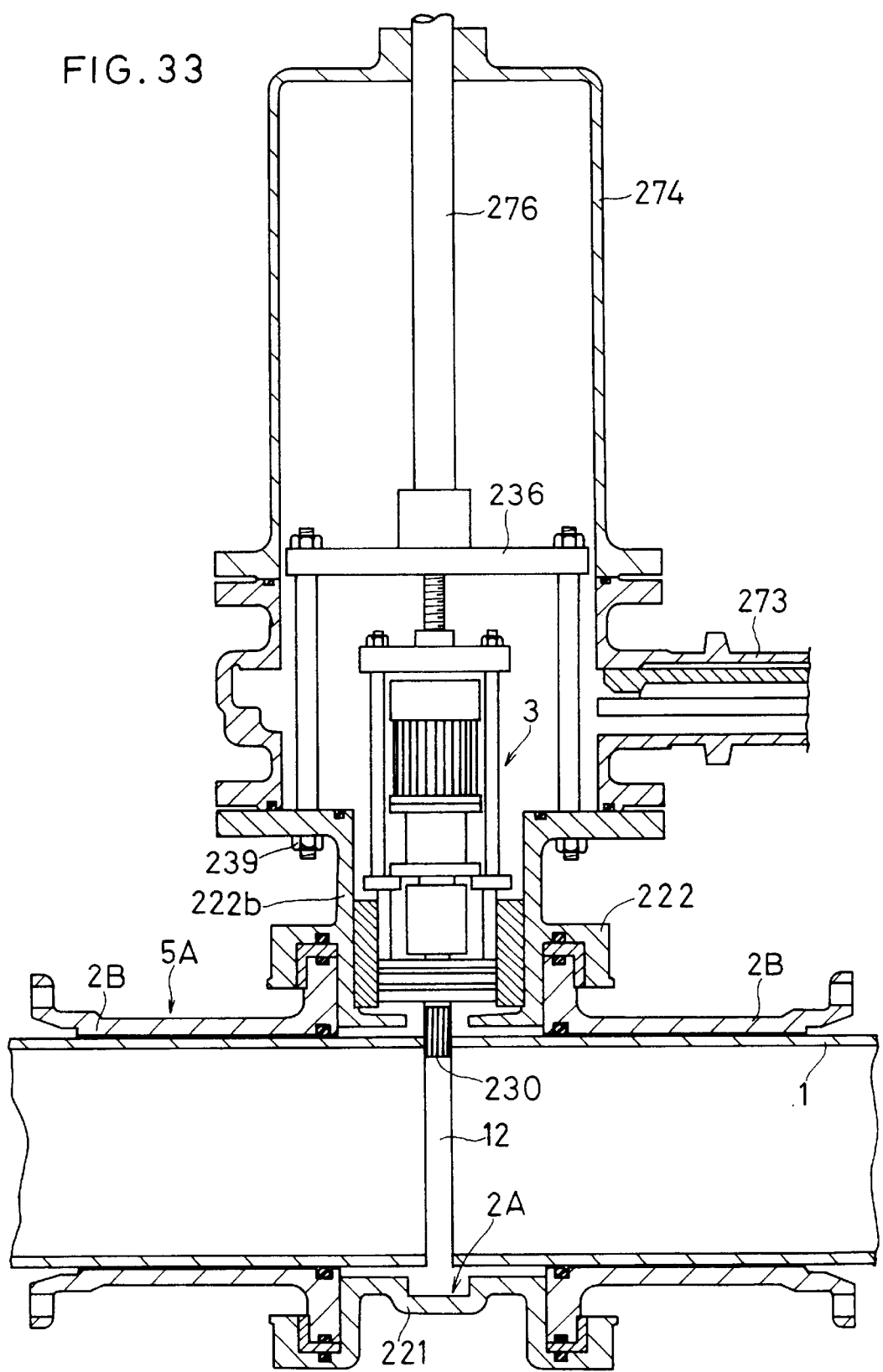
FIG. 33 is longitudinally sectional view showing a state where an operation upper chamber is assembled after the cutting is completed.
Figure 34:
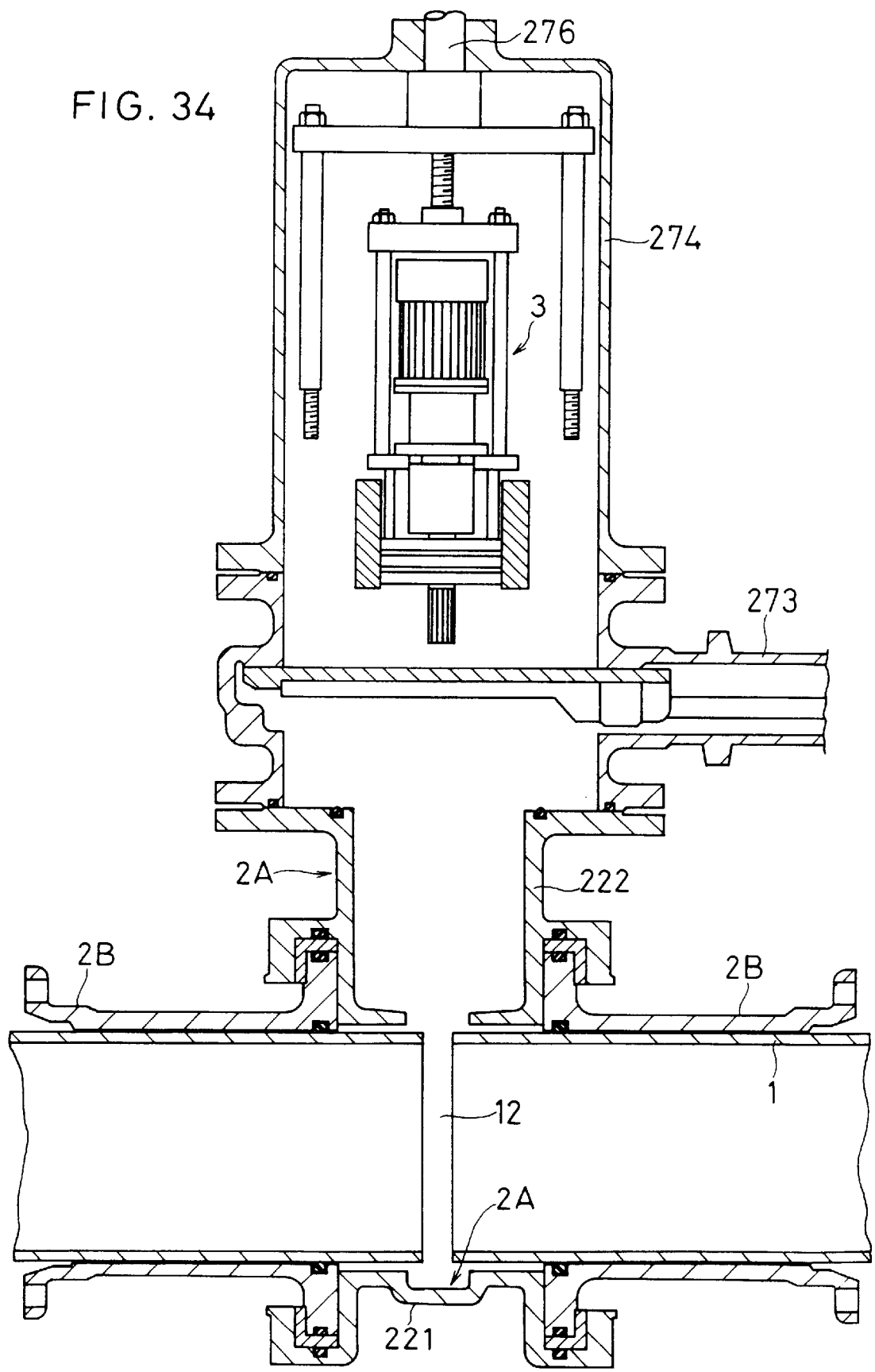
FIG. 34 is a sectional view showing a state where the cutting equipment is removed.

Next, the workmen remove the cutting equipment 3 by the method described below. That is, as shown in FIG. 33, the operation sluice valve 273 is connected to the bifurcated portion 222b, and furthermore an operation upper chamber 274 is connected to the operation sluice valve 273 so as to overlap thereon. When connecting them, the workmen connect a cutting feed frame 236 to the tip end portion of a lifting shaft 276 which passes through the the operation upper chamber 274. After the connection is finished, the workmen remove nuts 239. After the nuts are removed, the workmen raise the lifting shaft 276 in FIG. 34 and remove the cutting equipment 3 from the first seal-up housing 2A into the operation upper chamber 274. After the cutting equipment 3 is removed, the workmen close the operation sluice valve 273. After the valve is closed, the workmen separate the operation upper chamber 274 from the operation sluice valve 273.

Valve Inserting Process

Figure 35:
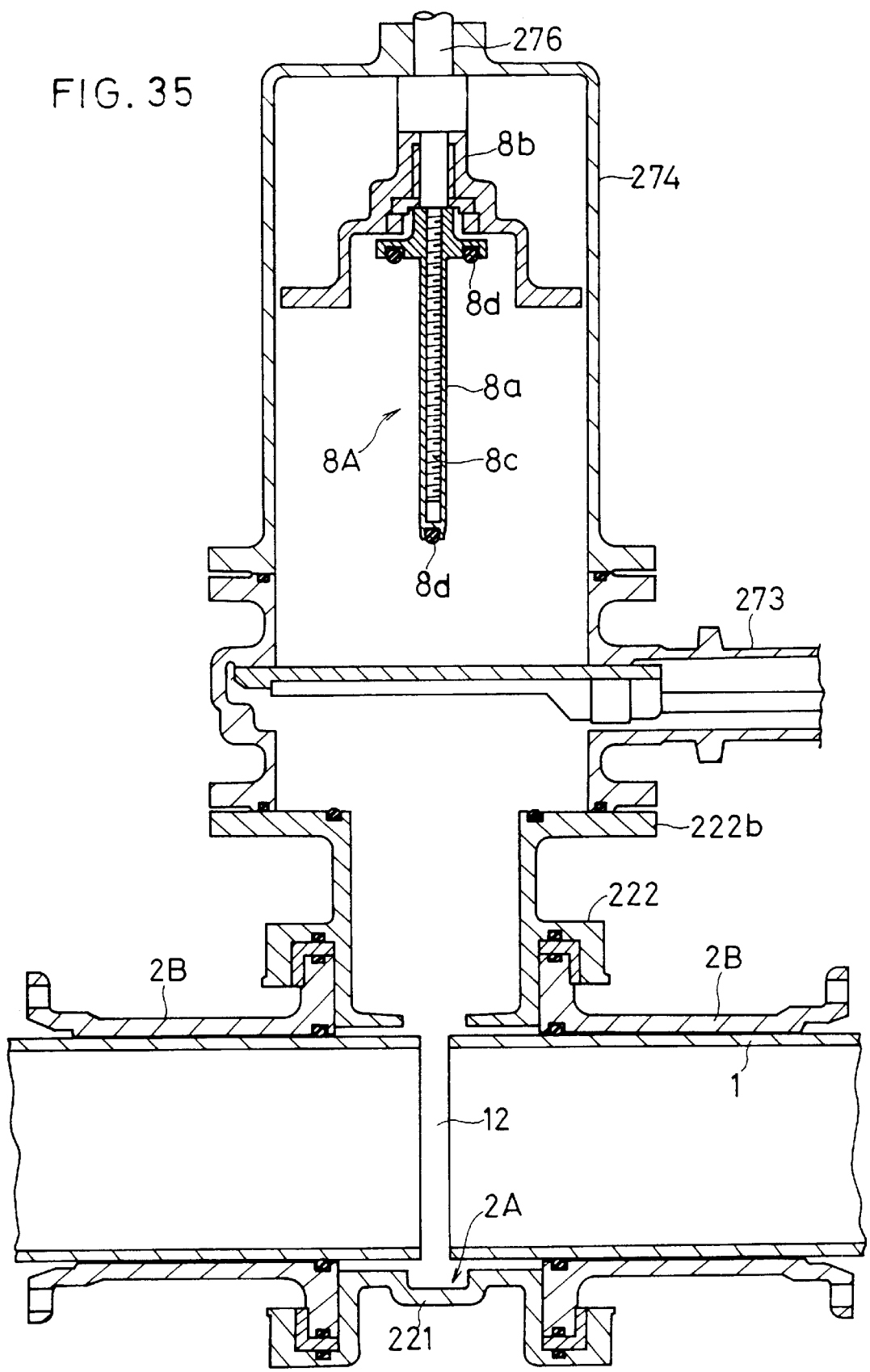
FIG. 35 is a sectional view showing a state where the valve body, valve cover, etc. of a sluice valve are housed in an operation upper chamber.

Next, the workmen accommodate the valve cover 8b in FIG. 35 and the sluice valve body 8a in the operation upper chamber 274 and connect the corresponding upper chamber 274 to the operation sluice valve 273. The sluice valve 8A is provided with a spindle 8c for opening and closing the sluice valve body 8a. The sluice valve 8A constitutes a valve so that rubber packing 8d secured at the sluice valve body 8a is pressure-fitted to the inner circumferential surface, etc. of the first seal-up housing 2A in FIG. 37 as the sluice valve body 8a invades the cut-open portion 12 by turning the spindle 8c. That is, the first seal-up housing 2A constitutes a valve housing of the sluice valve 8A.

Figure 36:
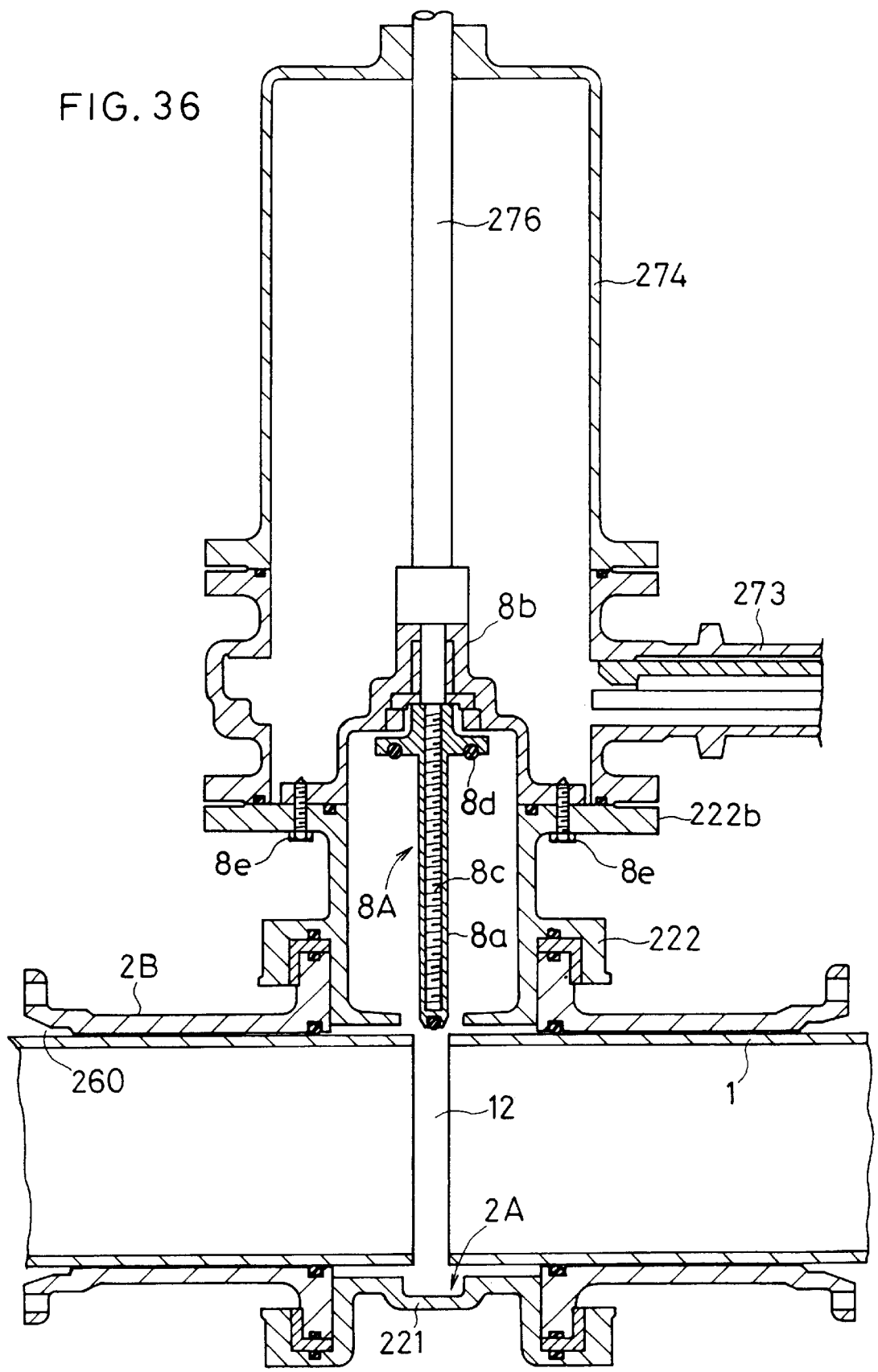
FIG. 36 is a sectional view showing a state where the valve is inserted.
Figure 37:
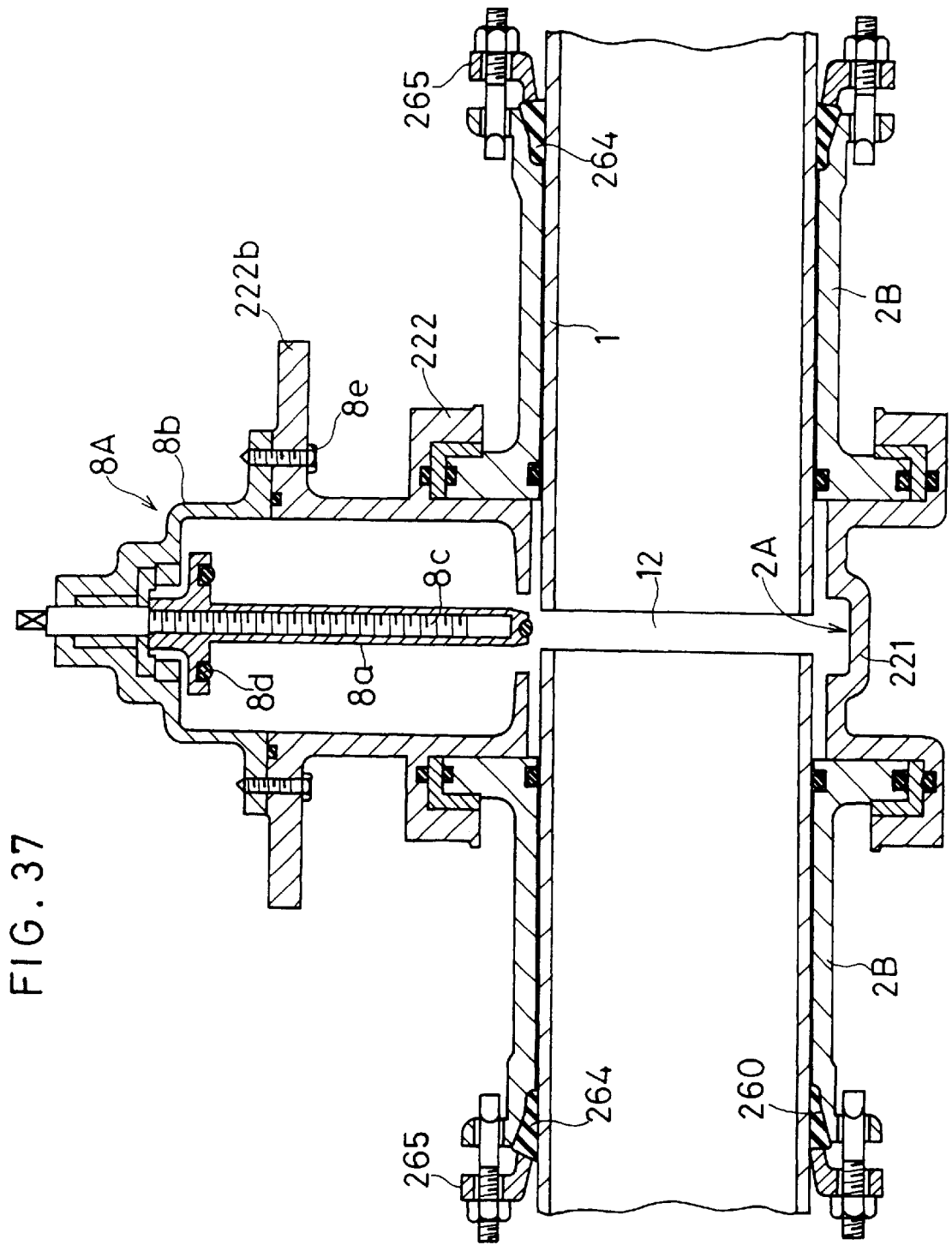
FIG. 37 is a sectional view showing the completed state.

After the operation upper chamber 274 in FIG. 35 is mounted, the workmen open the operation sluice valve 273 as shown in FIG. 36 and shift down the lifting shaft 276, wherein the valve cover 8b is brought into contact with the bifurcated portion 222b. After they are brought into contact with each other, the workmen connect the valve cover 8b to the bifurcated portion 222b by flange bolts 8e. After the connection is finished, the workmen withdraw the operation upper chamber 274 and operation sluice valve 273. Thereafter, the workmen press rubber rings 264 into the packing insertion portions 260 of the second seal-up housing 2B in FIG. 37 and attach the split press rings 265 to the second seal-up housings 2B. Thus, the sluice valve 8A is disposed at the position corresponding to the cut-open portion 12, and the sluice valve 8A is inserted in a line.

Fourth Preferred Embodiment

FIG. 38 through FIG. 49 show a fourth preferred embodiment.

Hereinafter, a description is given, in the order of processes, of an existing pipe slitting method and a method for inserting a valve in a line without stopping passage of water according to the fourth preferred embodiment. Cutting equipment and fixtures for operation, which are used in the fourth preferred embodiment, are almost the same as those in the third preferred embodiment. However, in order to make them doubly sure, their description is given below.

Cutting Equipment (Slitting Equipment)

Figure 38:
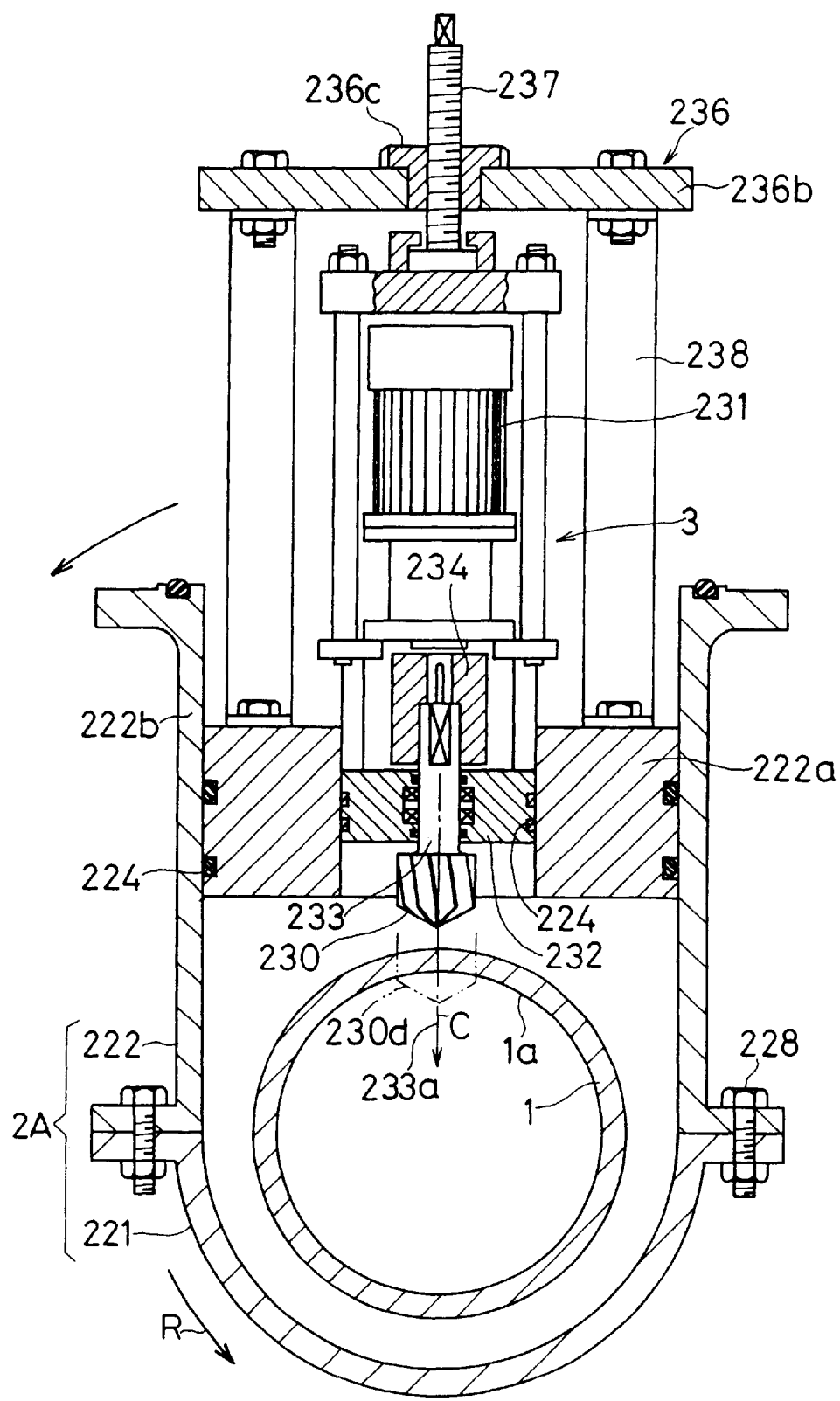
FIG. 38 is a cross-sectional view of a seal-up housing showing a fourth preferred embodiment of the invention.
Figure 39:
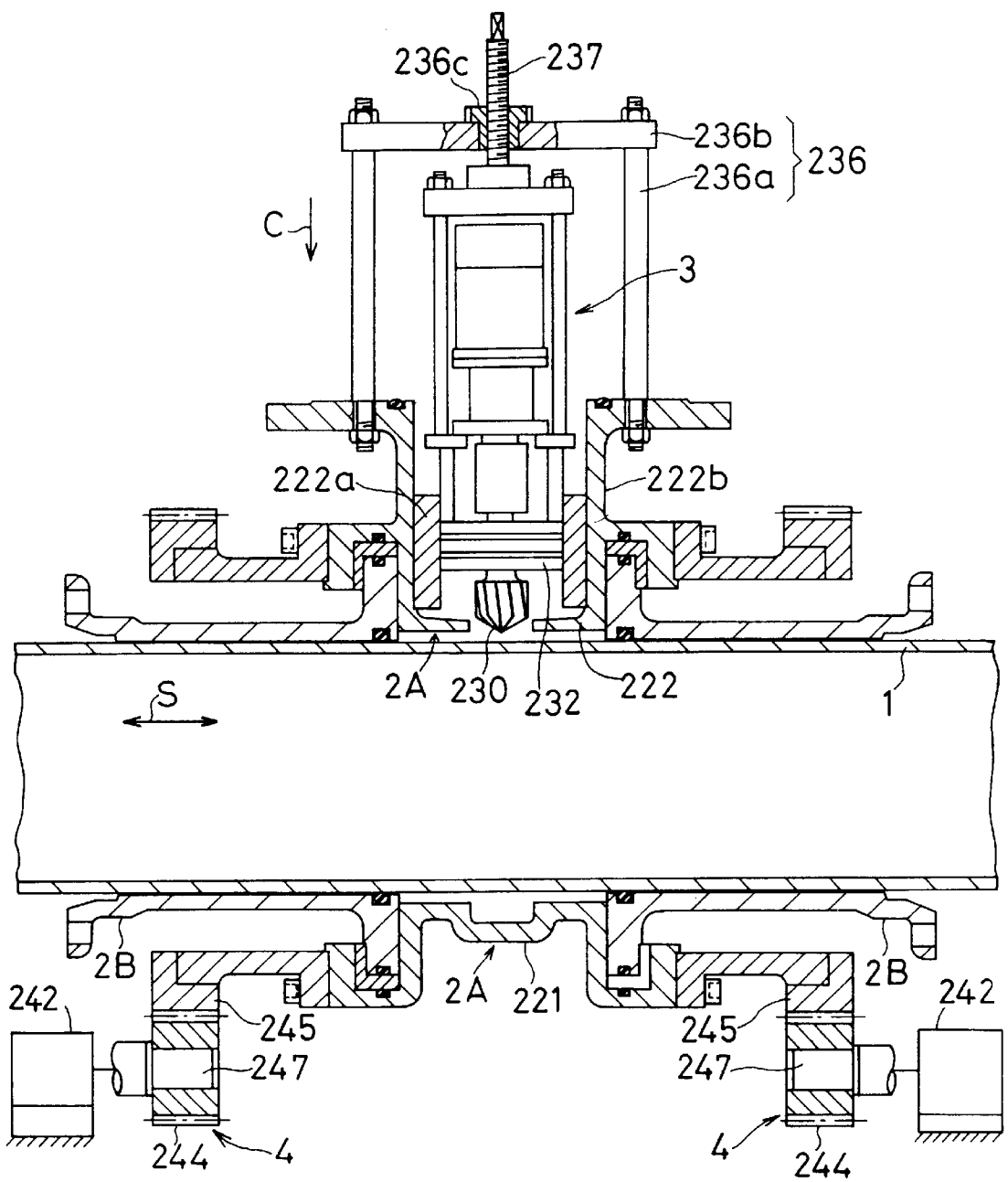
FIG. 39 is a longitudinally sectional view showing the entirety of a seal-up housing, cutting equipment, etc., FIG. 40($a$) is a longitudinally sectional view mainly showing cutting equipment before the cutting is started, and FIG. 40($b$) is a side elevational view of a roughly columnar cutting tool.

As shown in FIG. 39, in the preferred embodiment, a first central seal-up housing 2A and a pair of left and right second seal-up housings 2B are used. As shown in FIG. 38, the abovementioned first seal-up housing 2A is provided with a first and second split housings 221 and 222, which are obtained by being divided into two sections in the circumferential direction, and a guide bushing 222a. Furthermore, the second seal-up housings 2B (FIG. 39) are also divided into two sections in the circumferential direction. As shown in FIG. 40(a), rubber rings 224 are used to seal up between the respective housings 221 (FIG. 39), 222, 2A and 2B and between the second seal-up housings 2B and the existing pipe 1.

The abovementioned second split housing 222 has a bifurcated portion 222b protruding in the diametrical direction C of the existing pipe 1, and the main bearing 232 is attached to the abovementioned bifurcated portion 222b so as to freely advance and retreat in the diametrical direction C of the existing pipe 1 via the guide bushing 222a. Rubber rings 224 are used to seal up between the guide bushing 222a, bifurcated portion 222b and the main bearing 232. An opening 222c into which a columnar cutting tool 230 is inserted is formed at the abovementioned bifurcated portion 222b at the second split housing 222.

Cutting equipment 3 is attached to the guide bushing 222a fixed at the abovementioned first seal-up housing 2A via the main bearing 232. That is, a first motor 231 (an example of a prime mover) for rotating a cutting tool is fixed upward of the main bearing 232. On the other hand, the cutting tool 230 is disposed inside of the abovementioned main bearing 232 (cutter attaching housing). A cutting tool 230 is formed to be integral with the main shaft (cutter shaft) 233 rotatably supported at the main bearing 232. The first motor 231 causes the cutting tool 230 to rotate via a coupling 234 fixed at the output shaft 231a of the first motor 231 and the main shaft 233.

As shown in FIG. 40(b), the abovementioned cutting tool 230 has a plurality of blades 230f on the roughly columnar tip end surface 230d and outer circumferential surface 230e. Furthermore, the main shaft 233 is formed on the cutting tool 230 to be integral therewith. As shown in FIG. 38, the axial line 233a of the cutting tool 230 and main shaft 233 is established in the diametrical direction C of the existing pipe 1. The cutting tool 230 carries out a cutting motion by rotating around the axial line 233a set in the diametrical direction C of the existing pipe 1. Furthermore, in the preferred embodiment, a cutting tool 230 having a greater diameter than that of the cutting tool 230 in the third preferred embodiment is used. Moreover, the tip end of the cutting tool 230 is pointed to be conical.

A cutting feed frame 236 is fixed at the abovementioned bifurcated portion 222b in FIG. 40(a). The cutting feed frame 236 is provided with long bolts 236a fixed at the bifurcated portion 222b and a top plate 236b fixed at the upper ends of the long bolts 236a. A male lead screw 237 for cutting feed is screwed in a bushing 236c secured at the abovementioned top plate. 236b of the cutting feed frame 236.

By turning and screwing the male lead screw 237 for cutting feed in the cutting feed direction C, the main bearing 232 advances in the cutting feed direction C. Therefore, by feeding the cutting tool 230 together with the main bearing 232 in the cutting feed direction C and causing the cutting tool to be advanced into the opening 222c, it is possible to slit the existing pipe 1 by the cutting tool 230 as shown in FIG. 41. Furthermore, since the guide bushing 222a is fixed at the cutting feed frame 236 via a connection metal fitting 238 in FIG. 38, the guide bushing 222a can be withdrawn together with the cutting feed frame 236 after the slitting is completed.

In the preferred embodiment, a housing turning device 4 in FIG. 39 is provided, which turns the first seal-up housing 2A around the existing pipe 1. The housing turning device 4 has a pair of second motors 242 for turning the seal-up housing. The corresponding second motor 242 rotates the drive gear 244 for turning the seal-up housing via the output shaft 247. The corresponding drive gear 244 rotates the driven gears 245 for turning the seal-up housing, which are fixed at the first seal-up housing 2A. Therefore, by turning the first seal-up housing 2A by approximately 180 degrees around the existing pipe 1 while rotating the cutting tool 230 in a cutting feed state in FIG. 41, it is possible to slit the existing pipe 1 and to form a slit groove 12C in FIG. 45.

As shown in FIG. 40, the second seal-up housing 2B constitutes a slip preventing member 5A. The corresponding second seal-up housing 2B is divided into two sections in the circumferential direction (R) (FIG. 38) of the existing pipe 1. A number of set screws 251 are provided in the circumferential direction R (FIG. 38) at two points spaced from each other in the axial direction S of pipe 1. A rotation guiding portion 250 which slides via a liner 252 is secured at the connection portion between the abovementioned first seal-up housing 2A and the second seal-up housing 2B. The abovementioned pair of second seal-up housings 2B are fixed at the existing pipe 1 by the abovementioned set screws 251. The abovementioned second seal-up housings 2B guide the first seal-up housing 2A via the abovementioned rotation guiding portion 250 and prevent the first seal-up housing 2A from slipping or shaking in the axial direction S of the existing pipe 1. Therefore, the first seal-up housing 2A is able to be smoothly turned when turning around the existing pipe 1. Furthermore, a ball bearing may be used instead of a liner 252.

Slitting Process

Next, a description is given of a sequence of slitting.

First, in a state where fluid (water) is flowing in the existing pipe 1 in FIG. 39, the workmen attach the first and second seal-up housings 2A and 2B to the existing pipe 1 and both split housings 221 and 222 by assembling bolts in FIG. 38. Thus, as shown in FIG. 39, the first and second seal-up housings 2A and 2B enclose and seal up the existing pipe 1 in an airtight state. Furthermore, the cutting equipment 3 is attached, in advance, to the guide bushing 222a of the first seal-up housing 2A.

Figure 42A:
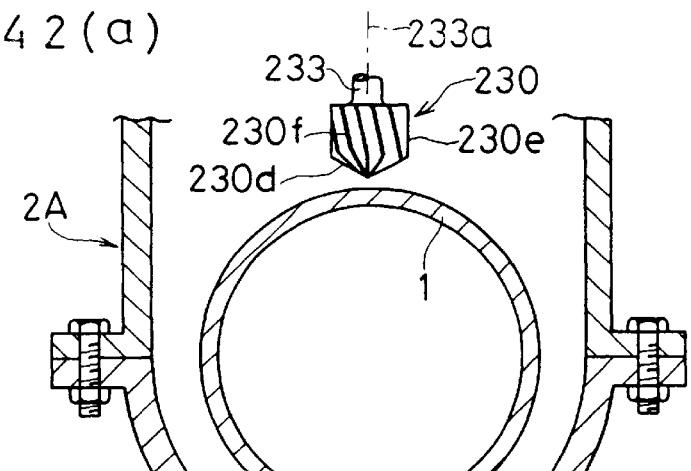
Figure 42B:
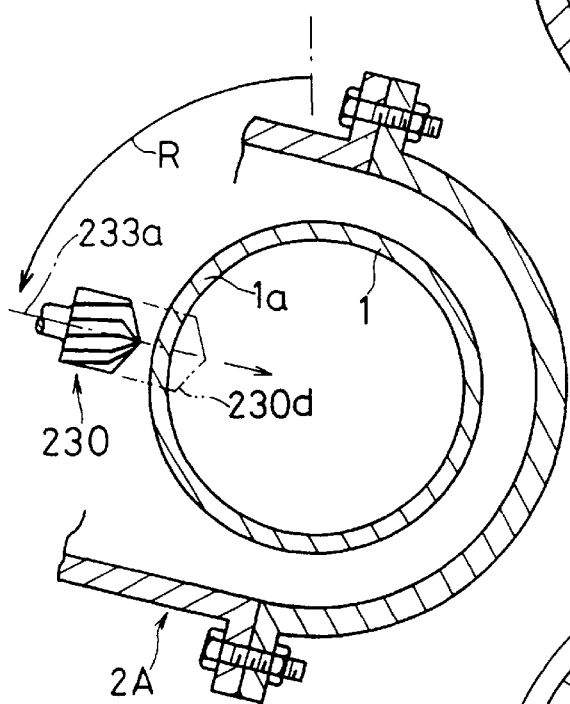

Next, as shown in FIG. 42(a) and FIG. 42(b), a position to be slit by a cutting tool 230 is determined. That is, the housing turning device 4 in FIG. 39 is driven, wherein the first seal-up housing 2A and cutting equipment 3 are turned until the position wherein the axial line 233a (FIG. 42) of the cutting tool 230 is made roughly horizontal.

Next, as the workmen drive the first motor 231 in FIG. 38, the corresponding first motor 231 rotates the cutting tool 230 around the axial line 233a of the main shaft 233, wherein the cutting tool 230 is caused to perform a slitting motion by which the existing pipe 1 is slit by rotations of the cutting tool 230. In a state where the cutting tool 230 is performing a slitting motion, the workmen screw the male lead screw 237 for cutting feed in the cutting feed direction C, concurrently, as shown by an alternate long and two dashes line in FIG. 42(b), the cutting tool 230 advances to the position where the tip end surface 230d thereof passes through a part of the wall 1a of the existing pipe 1. Thus, the cutting feed of the cutting tool 230 in the direction C is completed.

Figure 42C:
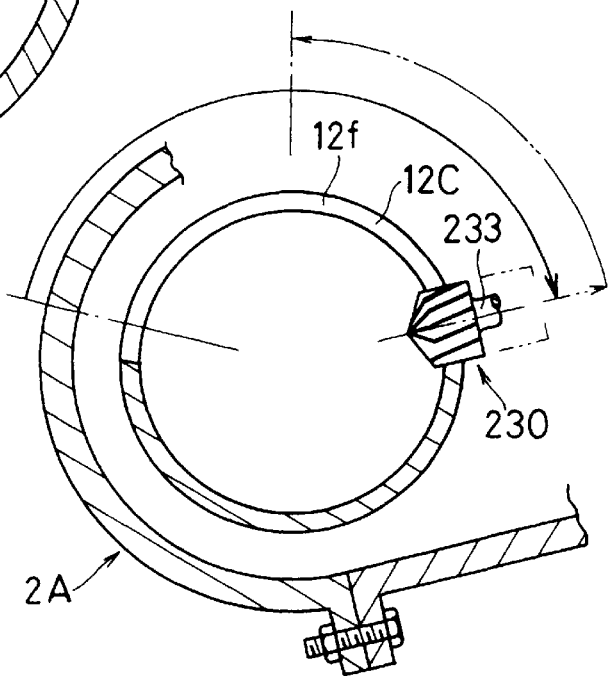

After that, as the workmen drive the second motor 242 for turning the housing in FIG. 39, the first seal-up housing 2A is turned, via a pair of drive gears 244 and driven gears 245, around the existing pipe 1 in a state where it is guided by the second seal-up housings 2B. Thereby, as shown in FIG. 42(c), the cutting tool 230 rotates on the main shaft 233 while turning along the outer circumference of the existing pipe 1 by approximately 180 degrees (for example, 160 degrees) together with the first seal-up housing 2A, wherein the existing pipe is semi-annularly slit to form a slit groove 12C thereat. The corresponding slit groove 12C is cut open in a range of approximately 180 degrees in the circumferential direction R of the existing pipe 1.

That is, the abovementioned second motor 242 (FIG. 38) turns the cutting tool 230 in the circumferential direction R by causing the first seal-up housing 2A to be turned in the circumferential direction R (FIG. 38) of the existing pipe 1, as shown in FIG. 42(b) and FIG. 42(c), a cutting feed motion is given to the cutting tool 230. Thereby, the cutting tool 230 semi-annularly slits the abovementioned existing pipe 1 in order to form a slit groove 12C at the existing pipe 1. After the corresponding slitting is completed, the cutting tool 230 is returned to its original position as shown by the arrow of an alternate long and two dashes line. Thereafter, the workmen remove the housing turning device 4 in FIG. 39.

Furthermore, by attaching a water discharge valve at the main bearing 232, cutting chips may be discharged through the water discharge valve when slitting.

Cutting Equipment Removing Equipment

Figure 43:
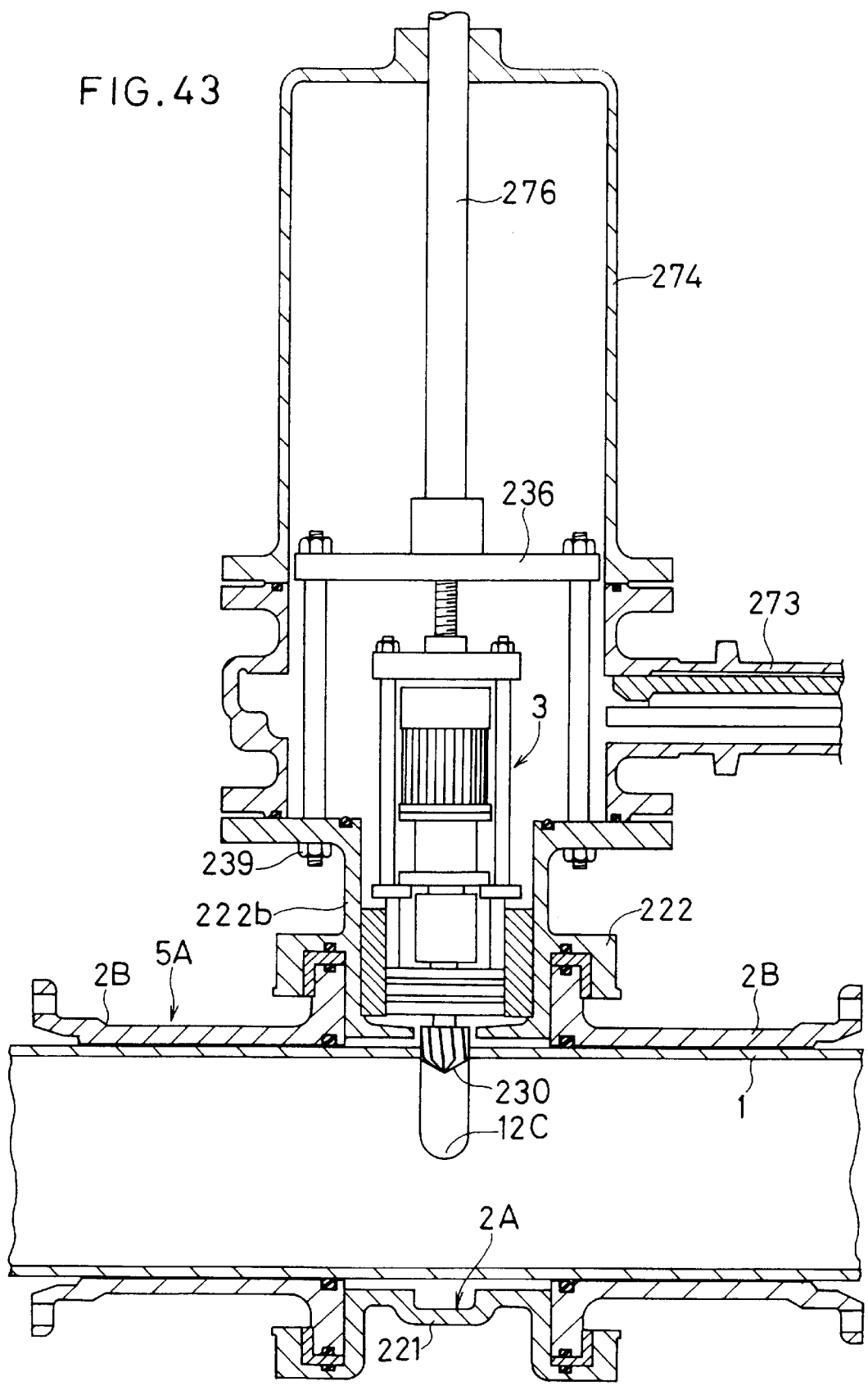
FIG. 43 is a longitudinally sectional view showing a state where the operation upper chamber is assembled after the cutting is finished.
Figure 44:
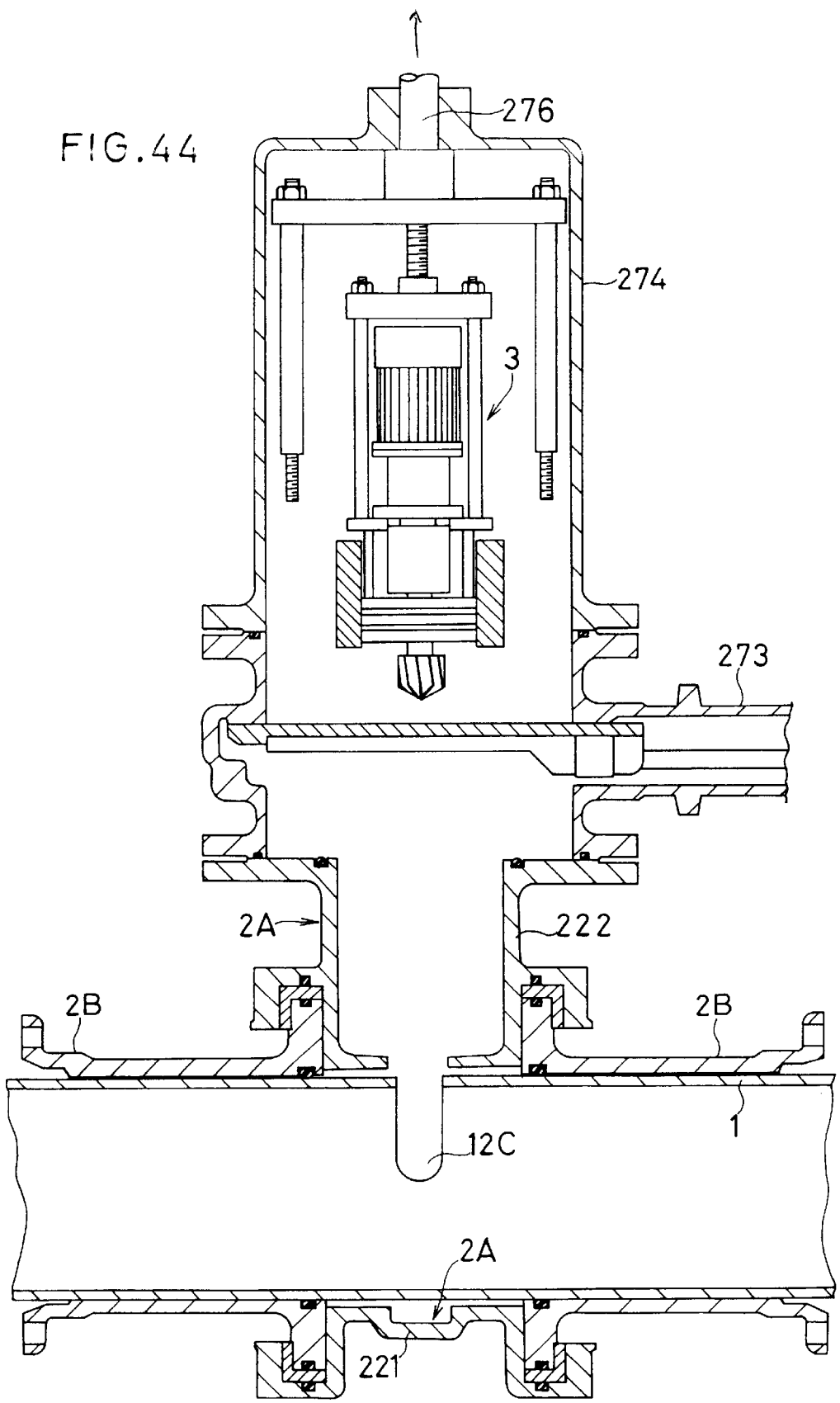
FIG. 44 is a sectional view showing a state where the cutting equipment is removed.

Next, the workmen remove the cutting equipment 3 by the method described below. That is, as shown in FIG. 43, the workmen connects an operation sluice valve 273 to the bifurcated portion 222b, and furthermore an operation upper chamber 274 is connected to the operation sluice valve 273 so as to overlap thereon. When carrying out the connection, the workmen connect a frame 236 for cutting feed to the tip end of a lifting shaft 276 passing through the operation upper chamber 274. After the connection is finished, the workmen remove nuts 239. After the nuts 239 are removed, the workmen raise the lifting shaft 276 in FIG. 44 and remove the cutting equipment 3 from the first seal-up housing 2A into the operation upper chamber 274. After the cutting equipment is removed, the workmen close the operation sluice valve 273. After the valve is closed, the workmen separate the operation upper chamber 274 from the operation sluice valve 273.

Next, a description is given of a structure of sluice valve body of a valve to be inserted in a line.

Figure 45:
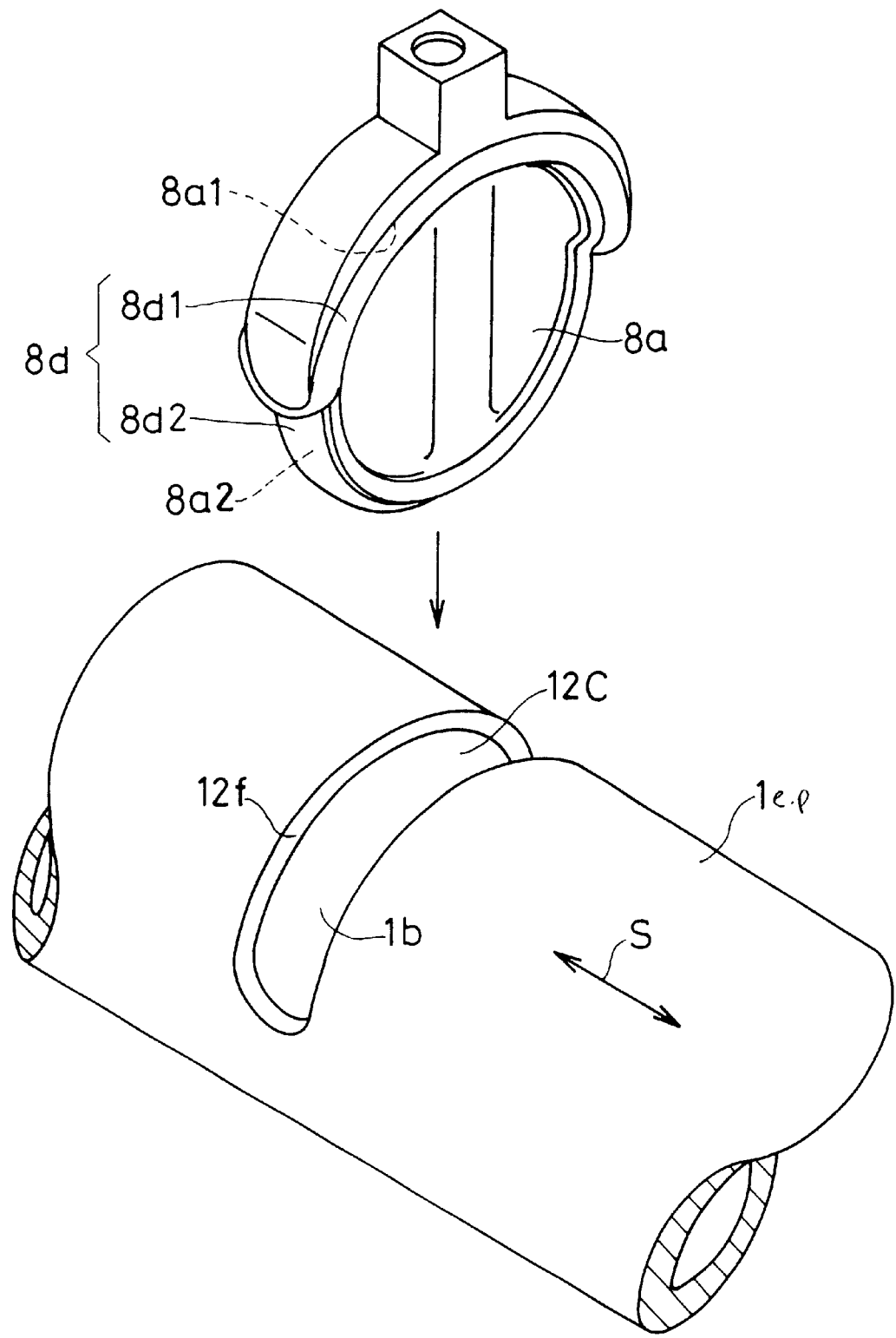
FIG. 45 is a perspective view showing a valve body and a slit groove, FIG. 46($a$) is a side elevational view of rubber packing, FIG. 46($b$) is a front elevational view of the rubber packing, FIG. 46($c$) is a longitudinally sectional view showing a closed state of an existing pipe, and FIG. 46($d$) is a cross-sectional view showing a closed state of the existing pipe.
Figure 46A:
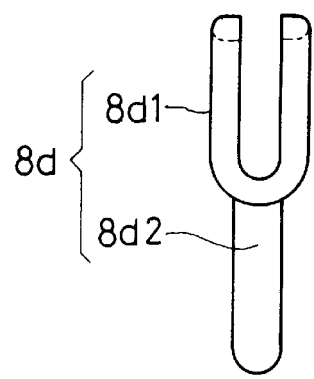
Figure 46B:
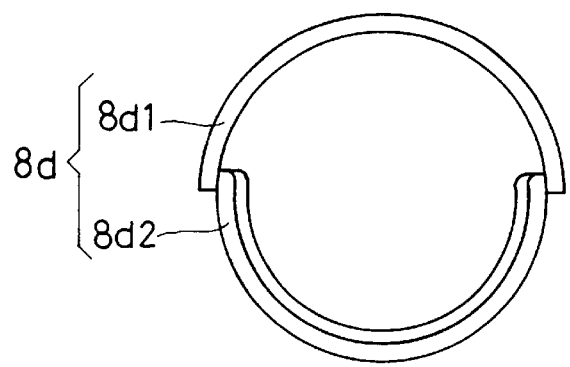
Figure 46C:
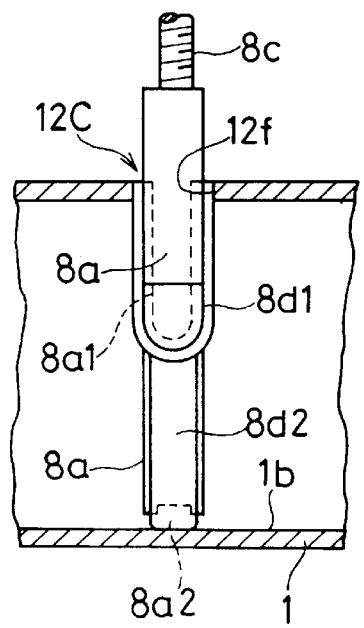
Figure 46D:
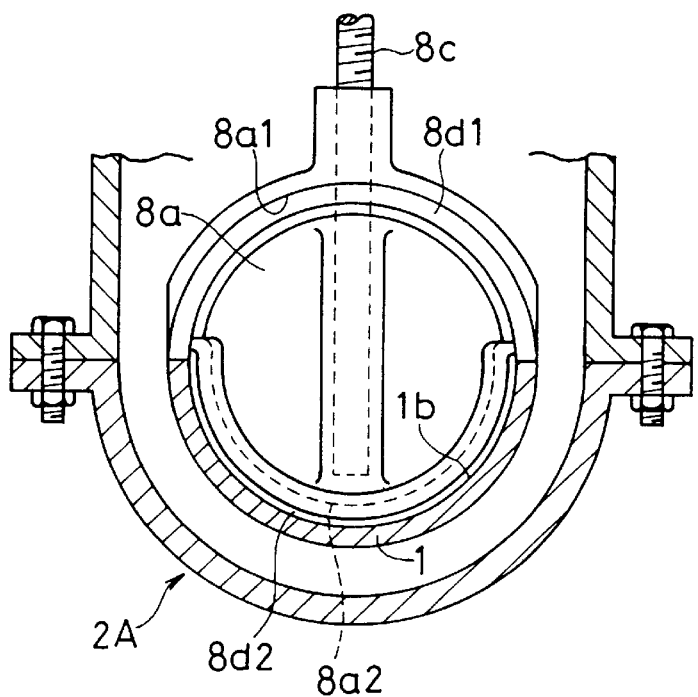

A valve is provided with a sluice valve body 8a shown in FIG. 45. The corresponding sluice valve body 8a is provided with rubber packing 8d. The corresponding rubber packing 8d closes the slit groove 12C as the sluice valve body 8a invades inside of the existing packing 1 through the slit groove 12C, and is pressure-fitted to the inner surface 1b of the existing pipe 1. That is, the rubber packing 8d consists of a first rubber packing portion 8d1 pressure-fitted to the slit surface 12f of the slit groove 12C and a second rubber packing portion 8d2 pressure fitted to the inner circumferential surface 1b of the existing pipe 1 in a series as shown in FIG. 46(c) and FIG. 46(d). Furthermore, a first attaching groove 8a1 and a second attaching groove 8a2 are formed at the abovementioned sluice valve body 8a in order to attach the first and second rubber packing portions 8d1 and 8d2 which are shown in FIG. 46(a) and FIG. 46(b).

Valve Inserting Process

Figure 47:
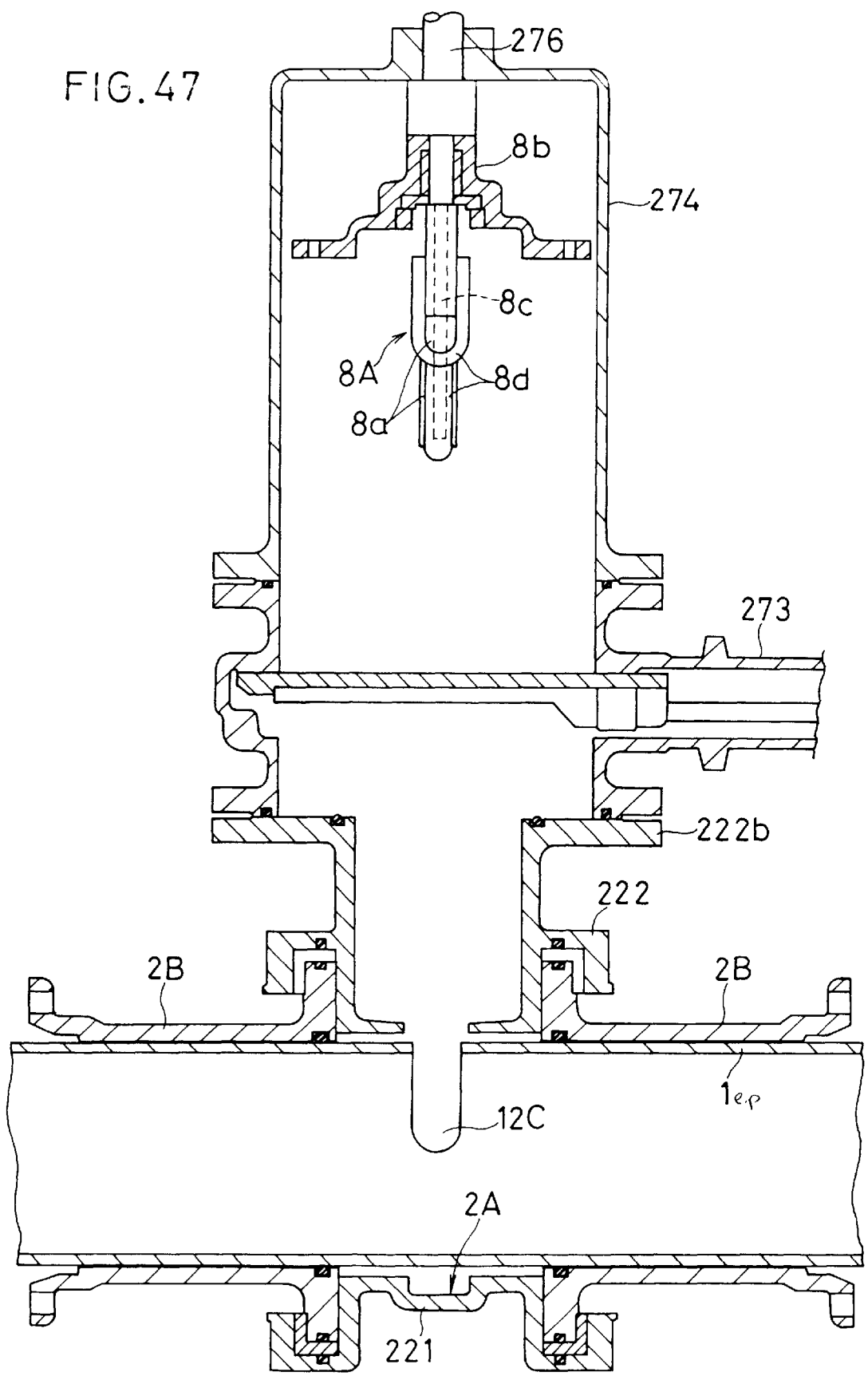
FIG. 47 is a longitudinally sectional view showing a state where the valve body and valve cover of a sluice valve are housed in the operation upper chamber.

Next, the workmen accommodate the valve cover 8b in FIG. 47 and the abovementioned sluice valve body 8a in the operation upper chamber 274 and connect the corresponding operation upper chamber 274 to the operation sluice valve 273. The sluice valve 8A is provided with a spindle 8c for opening and closing the sluice valve body 8a. The corresponding sluice valve 8A constitutes a valve so that the sluice valve body 8a in FIG. 45 invades the existing pipe 1 through the slit groove 12C and the rubber packing 8d secured at the sluice valve body 8a is pressure-fitted to the cutting surface 12f of the existing pipe 1 and the inner circumferential surface 1b of the existing pipe 1. That is, the existing pipe 1 constitutes a part of the valve housing of the sluice valve 8A.

Figure 48:
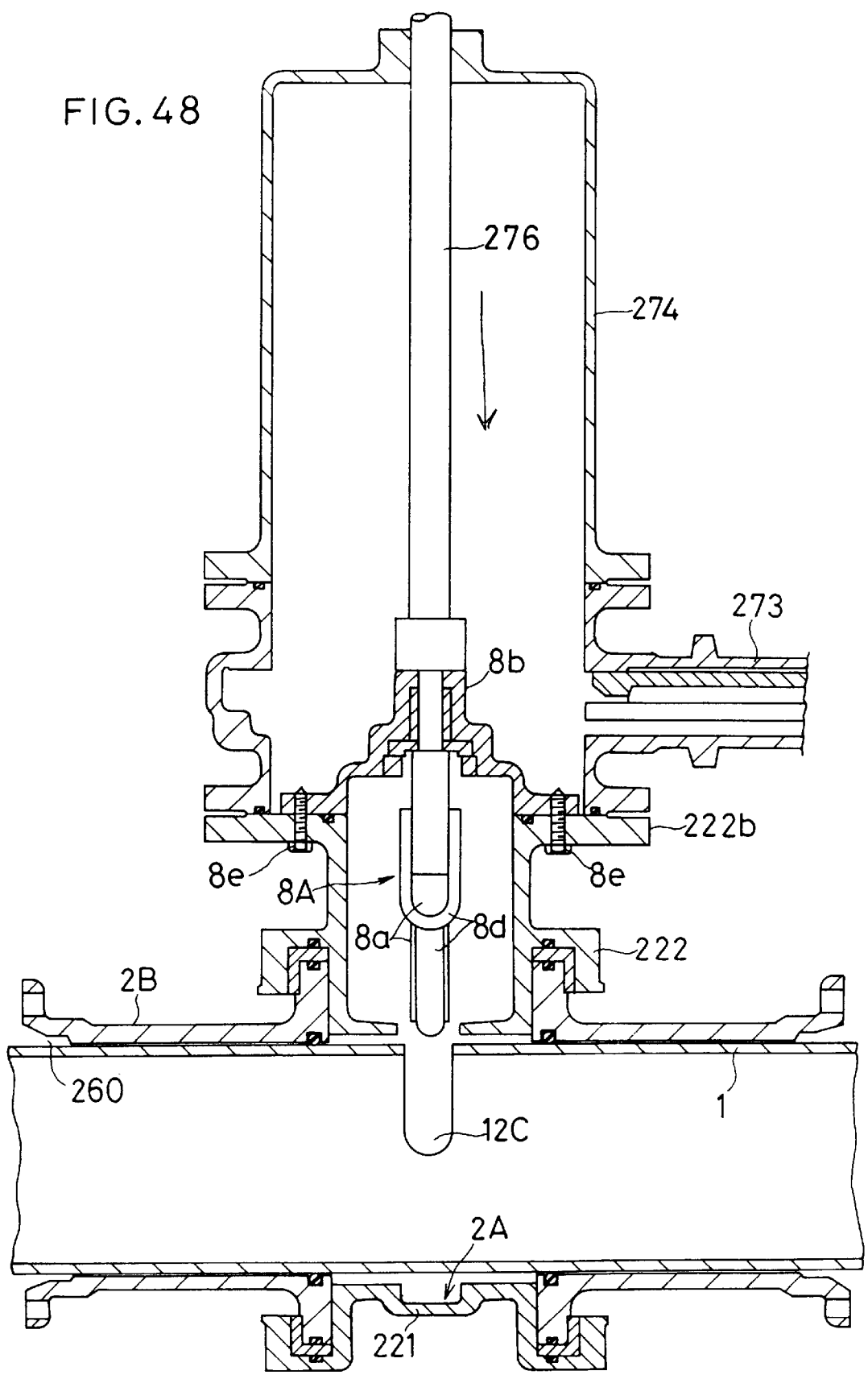
FIG. 48 is a sectional view showing a state of inserting a valve.
Figure 49:
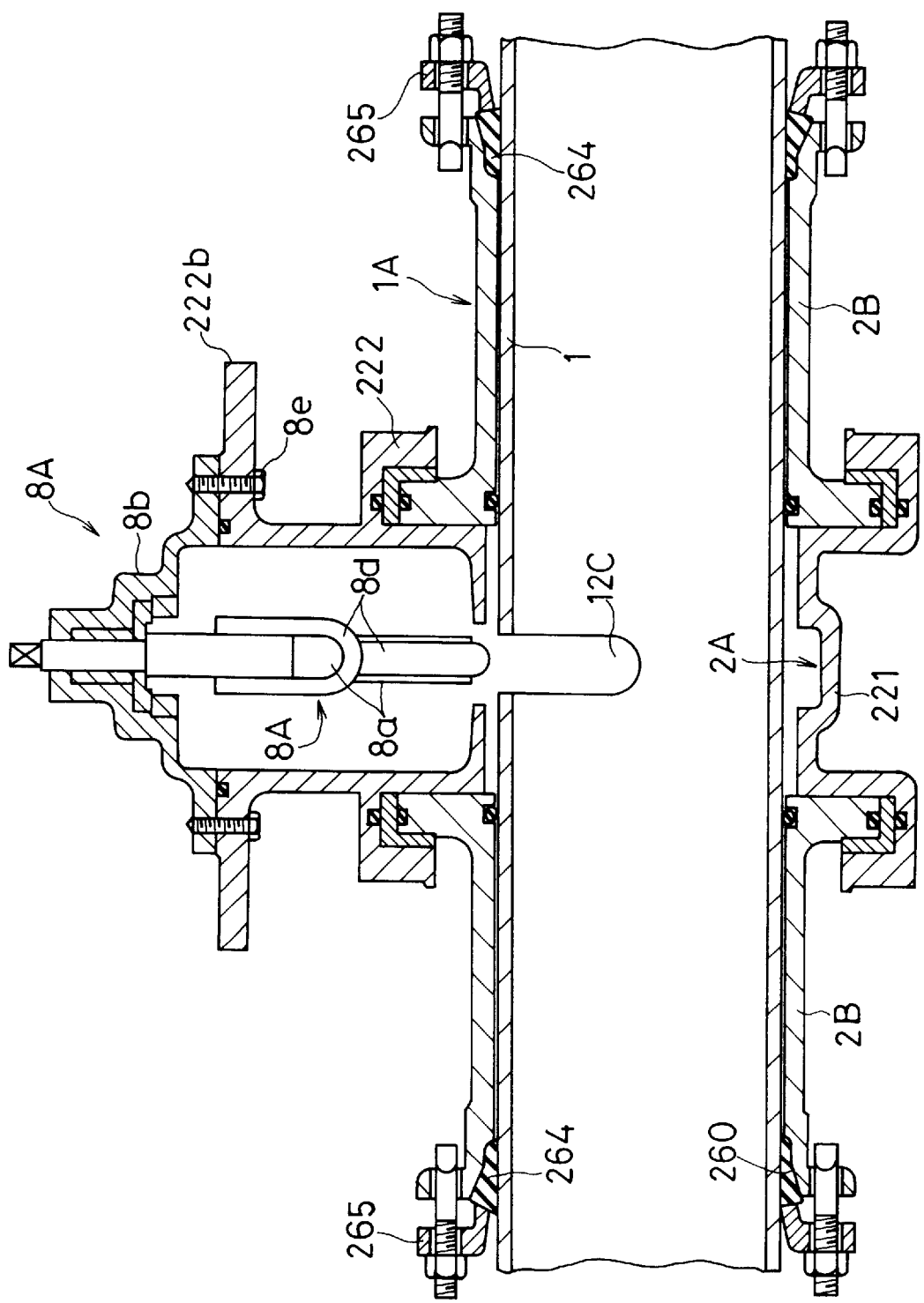
FIG. 49 is a sectional view showing the completed state, FIG. 50($a$) is a partially sectioned side elevational view showing a seal-up housing according to a modified version of the fourth preferred embodiment, FIG. 50($b$) is a bottom view showing the second split housing, FIG. 51($a$) is a cross-sectional view showing a state where the seal-up housing is attached to an existing pipe, FIG. 51($b$) is a plan view of the second split housing.

After the operation upper chamber 274 in FIG. 47 is attached in place, the workmen opens the operation sluice valve 273 as shown in FIG. 48 and shifts down the lifting shaft 276, wherein the valve cover 8b is brought into contact with the bifurcated portion 222b. After the valve cover 8b is brought into contact therewith, the workmen connect the valve cover 8b to the bifurcated portion 222b by flange bolts 8e. After the connection, the workmen withdraw the operation upper chamber 274 and operation sluice valve 273. Thereafter, the workmen press rubber rings 264 into the packing insertion portions 260 of the second seal-up housing 2B in FIG. 49 and attach split press rings 265 to the second seal-up housing 2B. Thus, the sluice valve 8A is disposed at the point corresponding to the slit groove 12C, wherein the sluice valve 8A is inserted in a line 1A.

Herein, in the fourth preferred embodiment, since rubber packing 8d is pressure-fitted to the slitting surface 12f and the inner circumferential surface 1b of the existing pipe 1 in FIG. 45, that is, the existing pipe 1 is used as a valve housing, a great external force is applied to the existing pipe 1. However, in this preferred embodiment, the width of a slit groove 12C formed at the existing pipe 1 is made small, in particular no thin portion is produced at the existing pipe 1, and there is no fear that the existing pipe 1 is damaged when the line 1A is closed with a sluice valve body 8a.

Furthermore, since, when the sluice valve body 8a is closed, the sluice valve body 8a is supported in the axial direction S of pipe 1 on the slitting surface 12f via the first rubber packing portion 8a1, the valve body 8a is scarcely deformed even though it is given pressure when stopping water. Therefore, it is possible to make the spindle 8c slender. Furthermore, since the width of the slitting. groove 12C is small, the force, with which the valve body 8a is pressed upward by hydraulic pressure, is also small. Therefore, the spindle 8c can be made slender.

Furthermore, in the abovementioned second preferred embodiment through the fourth embodiment, although a seal-up housing is divided into the first seal-up housing 2A and second seal-up housing 2B and a part of the seal-up housing, that is, the first seal-up housing 2A is turned, in the present invention, the first seal-up housing 2A and second seal-up housing 2B may be formed to be integral with each other. In this housing, a slip preventing member is separately provided aside of the seal-up housing, wherein the entire seal-up housing is turned. This example is shown by the following modified version of the embodiments.

Modified Version

FIG. 50 through FIG. 61 show a modified version of the fourth preferred embodiment.

Hereinafter, after a description is given of the seal-up housing of the present modified version, a description is given of a piping structure thereof.

Seal-up Housing

Figure 50A:
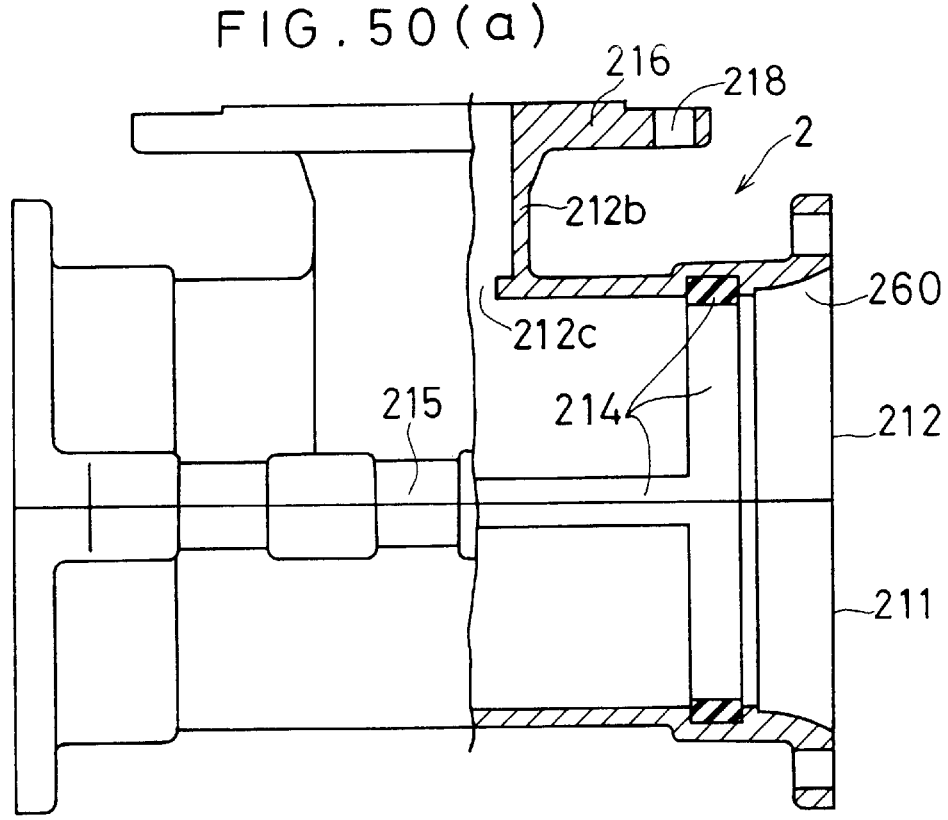
Figure 50B:
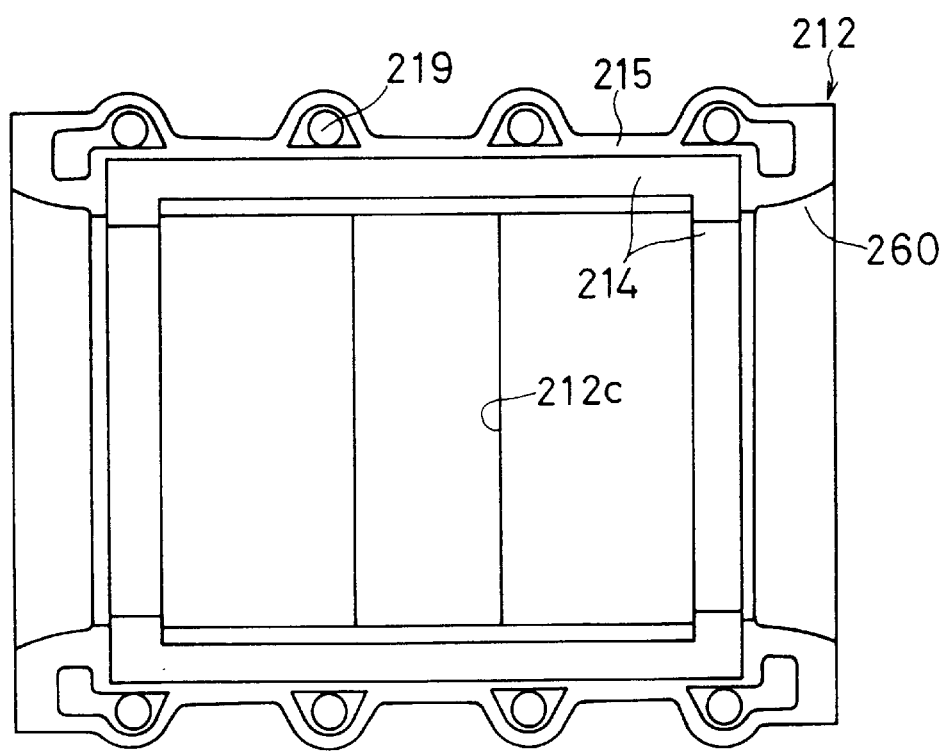
Figure 52:
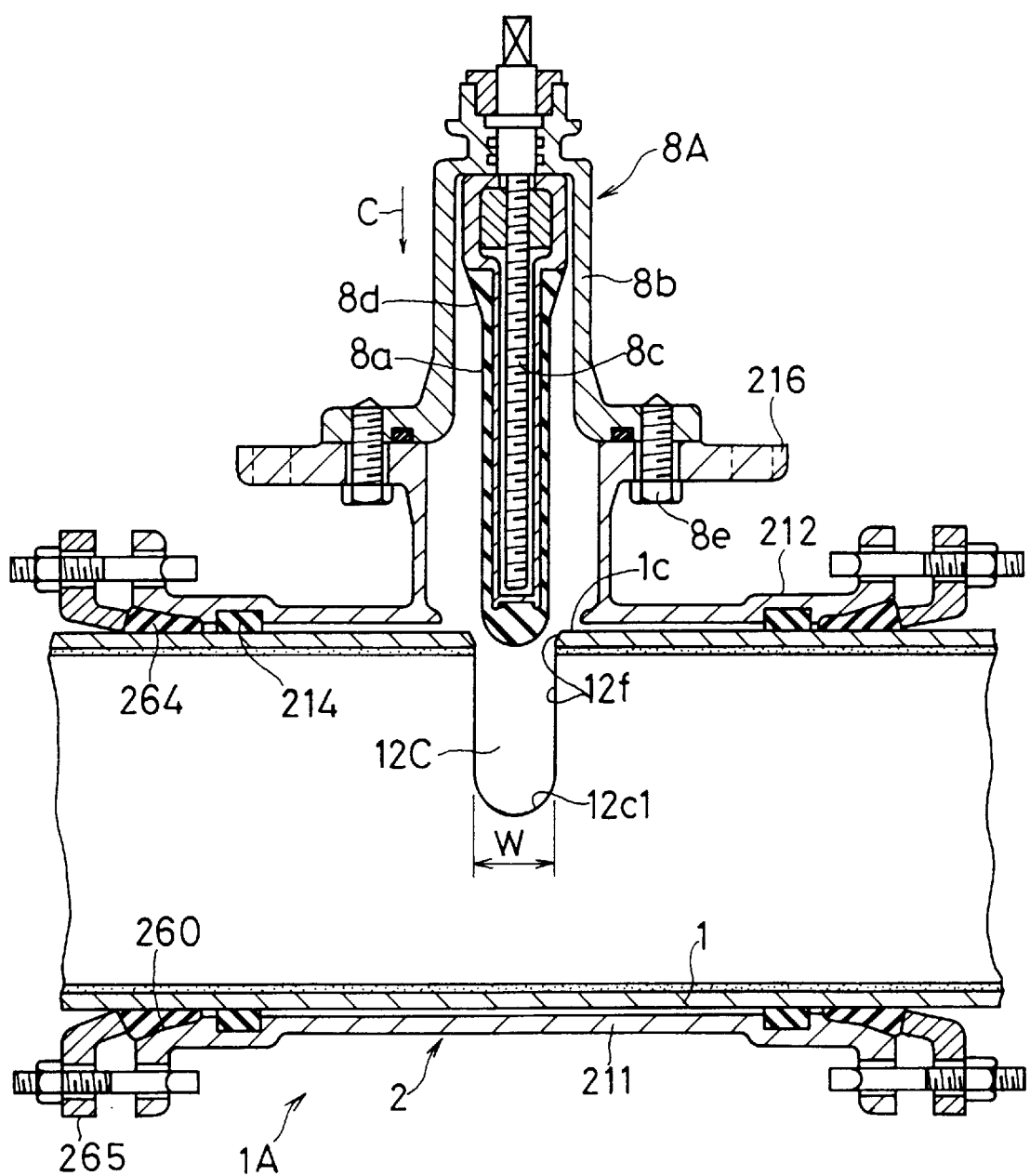
FIG. 52 is a longitudinally sectional view showing the completed state when the valve is open.

As shown in FIG. 50(a), the seal-up housing 2 is divided into the first and second split housings 211 and 212, wherein the split surface 215 is sealed up by rubber packing 214 shown in FIG. 50(b). Furthermore, the split surface 215 of the two split housings 211 and 212 is constructed so that they are brought into contact with each other in a metal-to-metal touching state. Furthermore, a packing insertion portion 260 into which rubber packing 264 in FIG. 52 is inserted is provided at both ends of the seal-up housing 2.

Figure 51A:
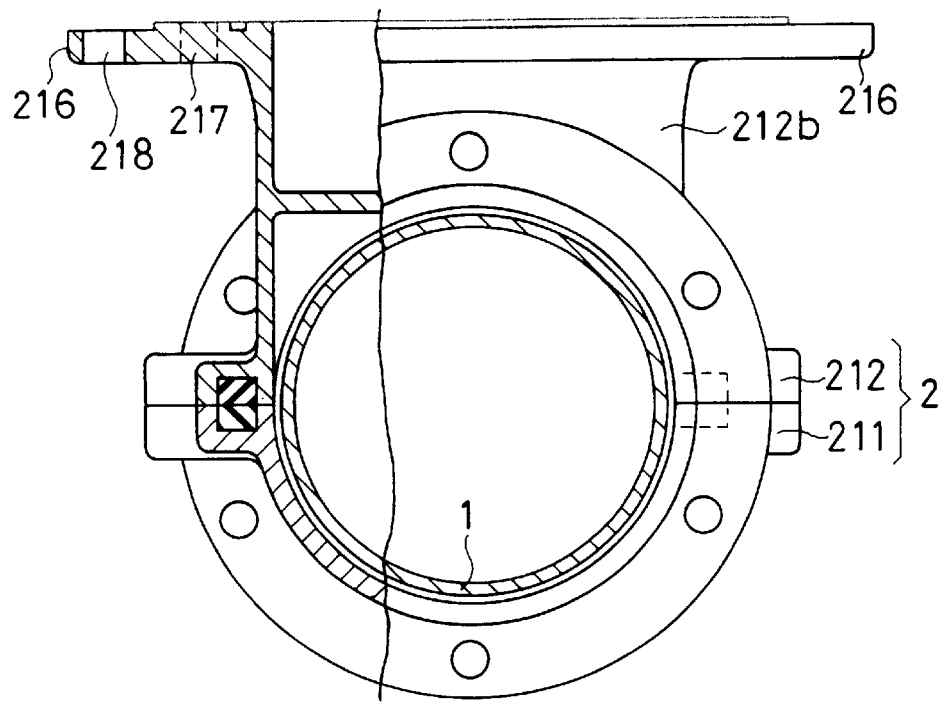
Figure 51B:
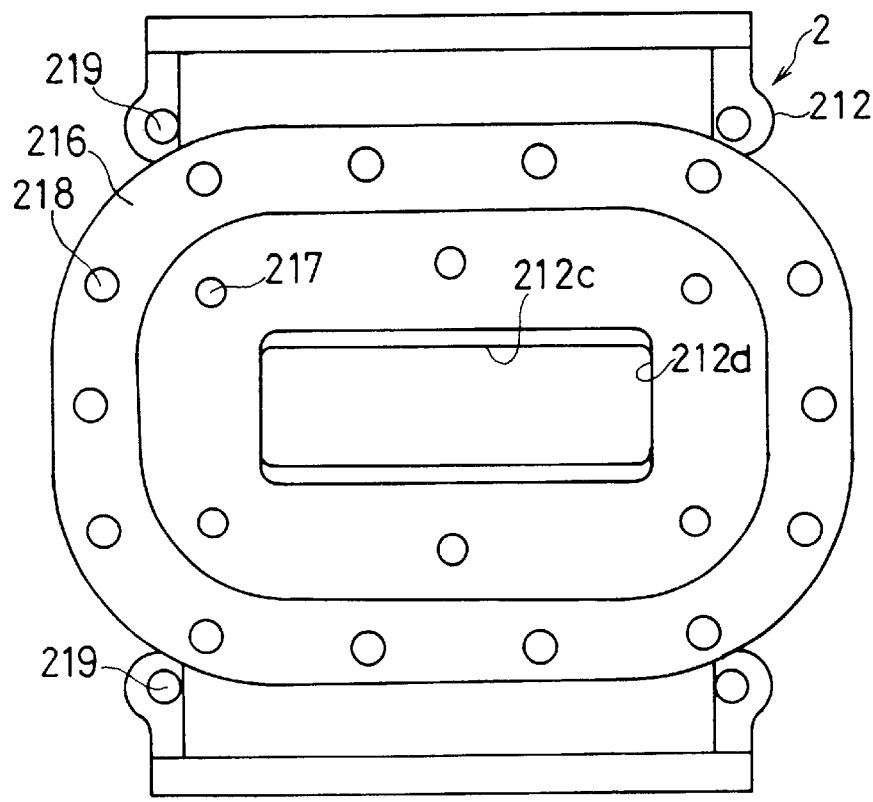

As shown in FIG. 51(b), a bolt insertion opening 217 for fixing a valve cover and a bolt insertion opening 218 for fixing an operation sluice valve are formed at a flange 216 of the second split housing 212 in FIG. 51(a). A hole 219 is to insert an assembling bolt thereinto.

Piping Structure

FIG. 52 through FIG. 55 show a piping structure.

Figure 53:
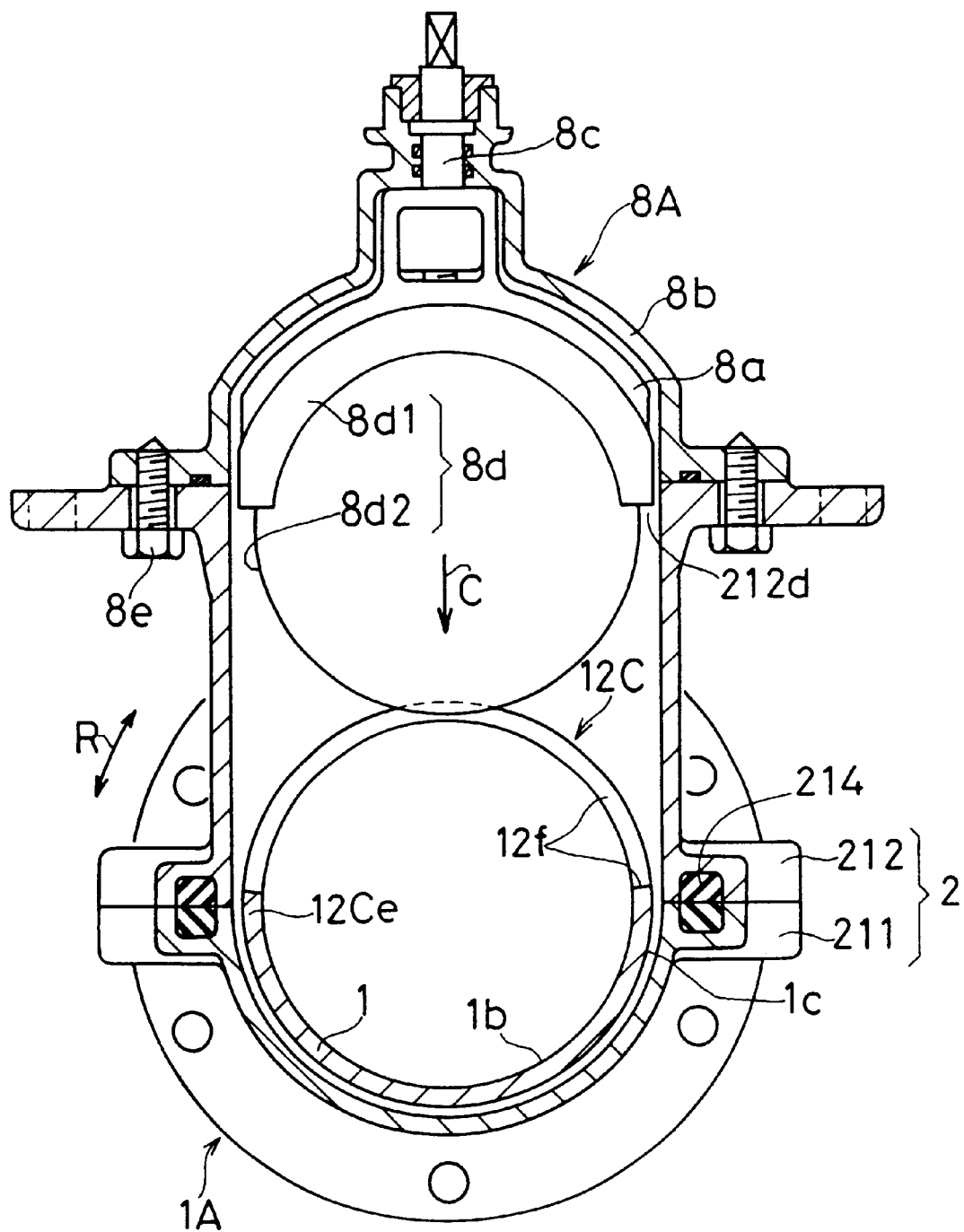
FIG. 53 is a cross-sectional view showing the completed state when the valve is open.

In FIG. 52, a slit groove 12C is formed at the existing pipe 1. As shown in FIG. 53, the corresponding slit groove 12C is notched and cut open in a range of approximately 180 degrees in the circumferential direction of the existing pipe 1. The corresponding slit groove 12C is formed by slitting the existing pipe 1 by a cutting tool described later. As shown in FIG. 52, the corresponding groove 12C is formed so that both ends 12c1 thereof in the circumferential direction is made roughly U-shaped. Thus, since both ends 12c1 of the slit groove 12C draws a smooth curve, the sealing at the corresponding both ends 12c1 is facilitated.

Furthermore, the portion excluding the abovementioned both ends 12c1 at the abovementioned slit groove 12C is formed to a fixed groove width W.

Figure 54:
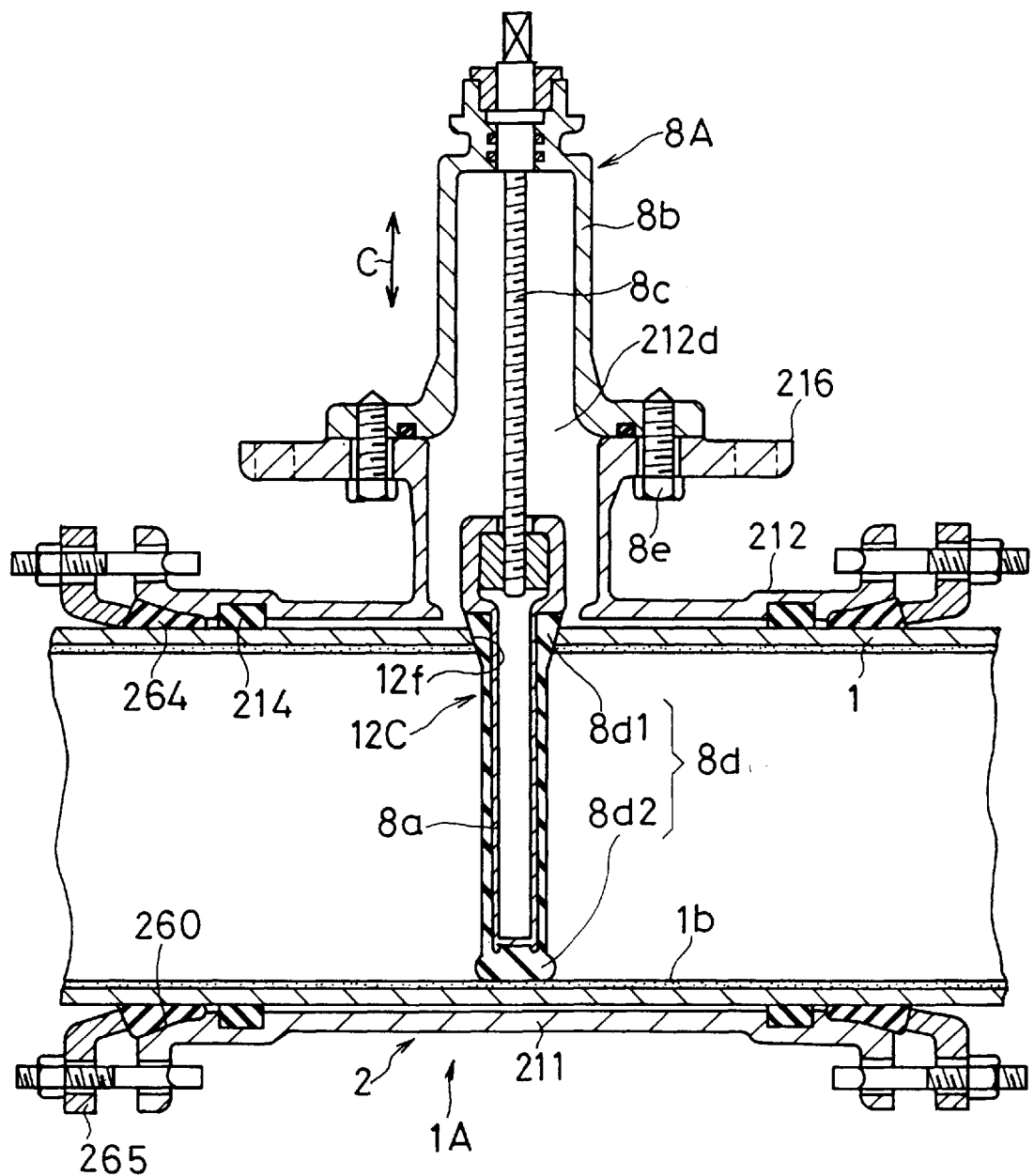
FIG. 54 is a longitudinally sectional view showing the completed state when the valve is closed.
Figure 55:
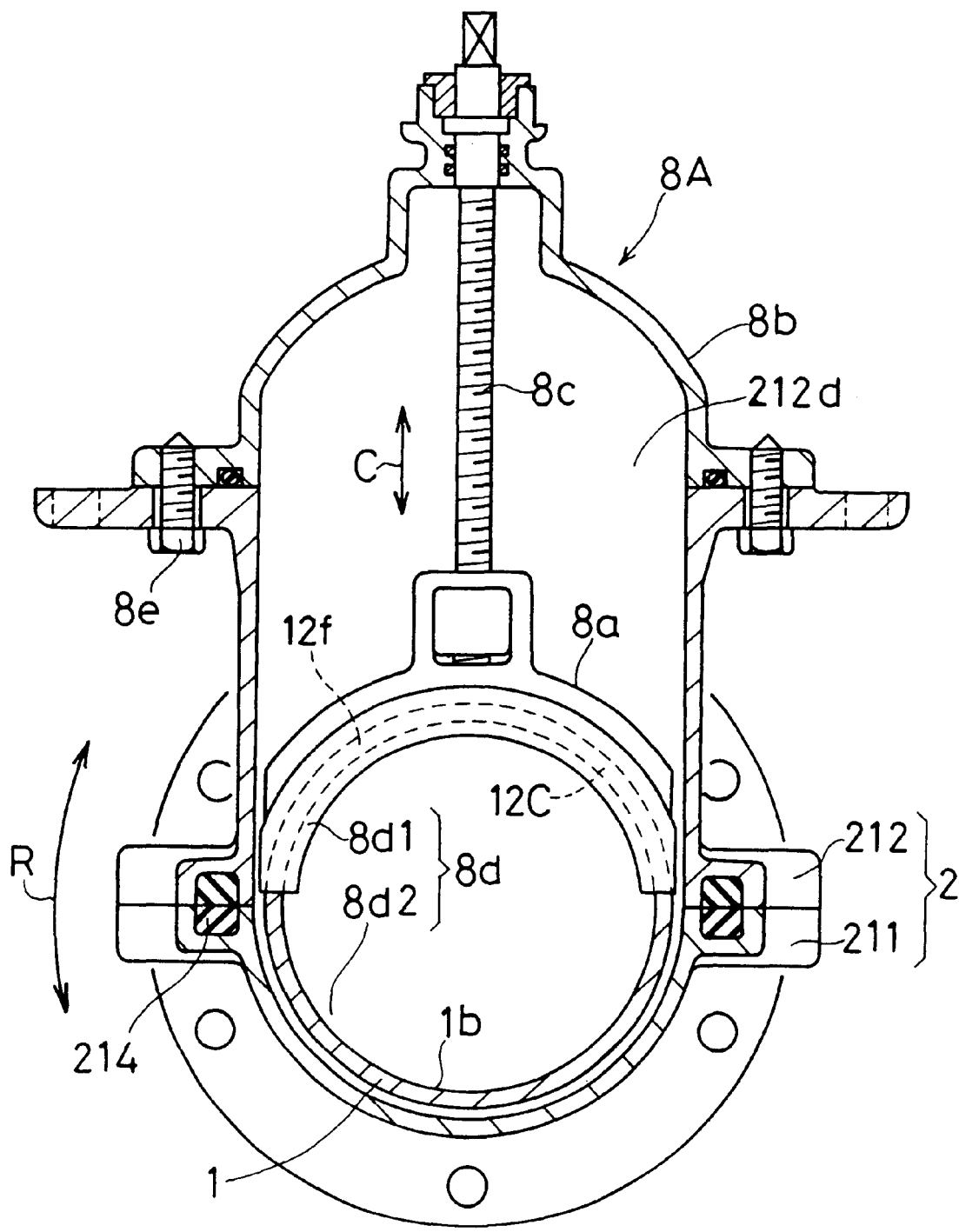
FIG. 55 is a cross-sectional view showing the completed state when the valve is closed.

Furthermore, the slit surface 12f forming the abovementioned slit groove 12C is set in a range from 45 through 90 degrees with respect to the surface 1c of the existing pipe 1 at the corresponding portion. That is, as shown in FIG. 53, the existing pipe 1 does not have any thin portion at the peripheral edge portion 12Ce of the slit groove 12C. Therefore, as shown in FIG. 54 and FIG. 55, even though rubber packing 8d of the valve body 8a is pressure-fitted to the slit surface 12f, there is no fear that the existing pipe 1 is damaged. For this reason, it is possible to repeatedly open and close the sluice valve 8A.

The abovementioned seal-up housing 2 is divided into two sections in the circumferential direction R of the existing pipe 1 and is sealed up by rubber packing 214, wherein the existing pipe 1 is enclosed and sealed up in an airtight state. The first split housing 211 is formed along the outer circumferential surface of the existing pipe 1. On the other hand, the second split housing 212 has a hole 212d which permits the sluice valve body 8a to move in the diametrical direction C of the existing pipe 1. The valve cover 8b is fixed at the abovementioned second split housing 212. The corresponding valve cover 8b clogs the hole 212d for moving the abovementioned second split housing 212. The abovementioned valve body 8b and the second split housing 212 form a space in which the sluice valve body 8a is accommodated when the valve is opened in FIG. 53.

As shown in FIG. 54, the abovementioned sluice valve body 8a has rubber packing 8d. The corresponding rubber packing 8d is formed so that the first rubber packing 8d1 which is brought into contact with the slit surface 12f (shown with a broken line in FIG. 55) forming the slit groove 12C and the second rubber packing 8d2 which is brought into contact with the inner circumferential surface 1b of the existing pipe 1 are made integral with each other. The corresponding rubber packing 8d is baked to the sluice valve body 8a to be integral therewith.

As shown in FIG. 52 and FIG. 54, the abovementioned sluice valve body 8a is moved in the diametrical direction C of the existing pipe 1 in the seal-up housing 2 if the spindle (valve rod) 8c is turned. The abovementioned sluice valve body 8a invades the inside of the existing pipe 1 through the abovementioned slit groove 12C, wherein the rubber packing 8d is brought into contact with the slit surface 12f and the inner circumferential surface 1b of the existing pipe 1, and fluid flowing in the existing pipe 1 is stopped. Furthermore, the inner circumferential surface 1b of the existing pipe 1 in the present preferred embodiment is finished with mortar lining.

Cutting Equipment (Slitting Equipment)

Figure 56:
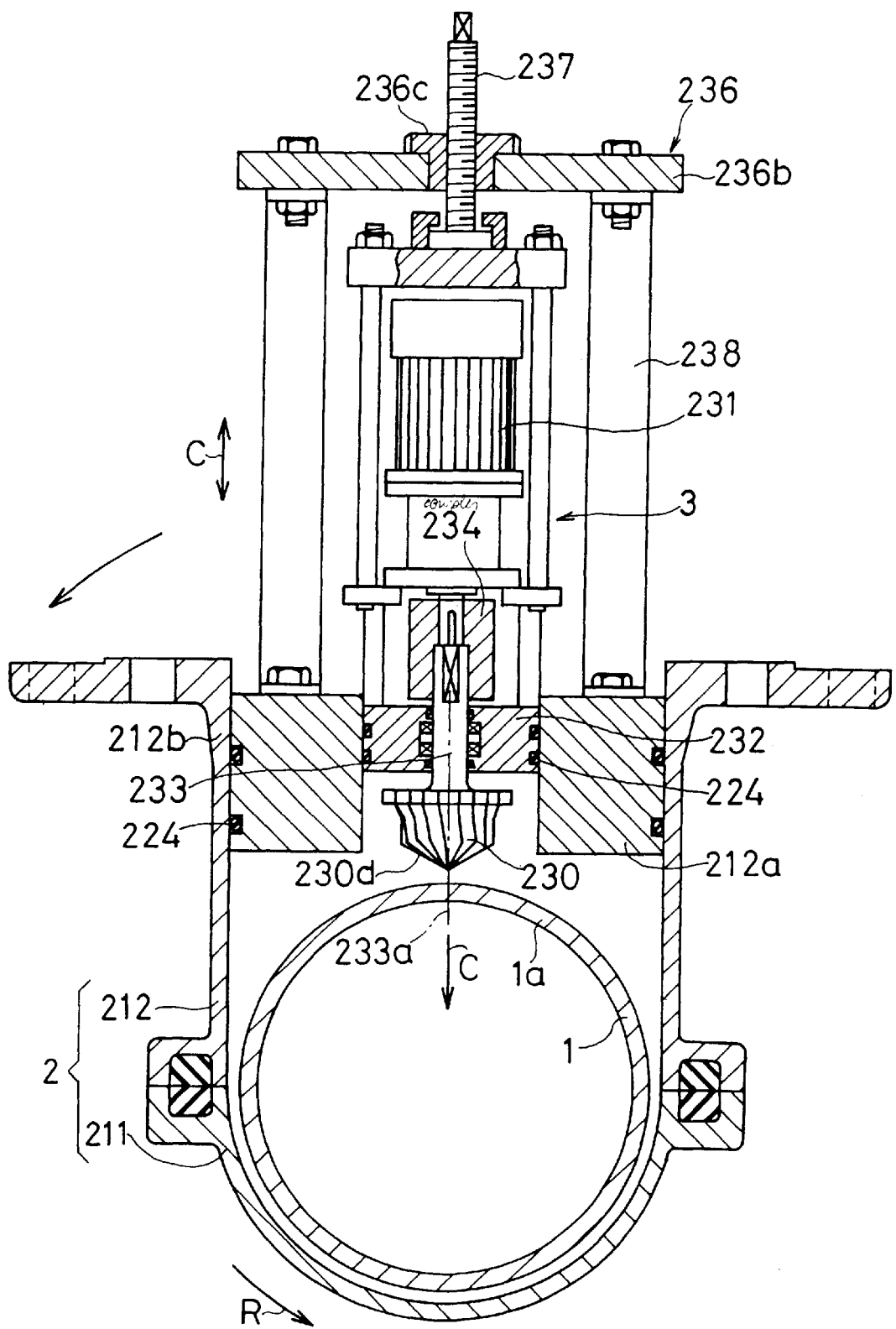
FIG. 56 is a cross-sectional view of the seal-up housing.

In the slitting process, as shown in FIG. 56, the abovementioned seal-up housing 2 is provided with the first and second split housings 211 and 212 split into two sections in the circumferential direction and a guide bushing 212a.

The abovementioned second split housing 212 has a bifurcated portion 212b protruding in the diametrical direction C of the existing pipe 1, wherein a main bearing 232 to support the main shaft 233 is attached to the corresponding bifurcated portion 212b slidably in the diametrical direction C of the existing pipe 1 via the abovementioned guide bushing 212a. As shown in FIG. 58(a), rubber rings 224 are used to seal up between the abovementioned guide bushing 212a, bifurcated portion 212b and main bearing 232. An opening 212c in which a columnar cutting tool 230 is inserted is formed at the abovementioned bifurcated portion 212b in the second split housing 212.

Cutting equipment 3 is attached to the guide bushing 212a fixed at the abovementioned seal-up housing 2 via the main bearing (tool attaching housing) 232. That is, A motor (one example of a prime mover) 231 for rotating the tool is fixed upward of the main bearing 232. On the other hand, the abovementioned cutting tool 230 is disposed inside the abovementioned main bearing 232. The cutting tool 230 is formed to be integral with and at the main shaft (cutter shaft) 233 which is rotatably supported at the main bearing 232. The abovementioned motor 231 causes the cutting tool 230 to rotate via the output shaft 231a of the corresponding motor 231 and a coupling 234 fixed at the main shaft 233.

As shown in FIG. 58(b), the abovementioned cutting tool 230 has a plurality of blades 230f on the roughly columnar tip end surface 230d and outer circumferential surface 230e. Furthermore, the abovementioned main shaft 233 is formed integral with the cutting tool 230.

Furthermore, in the preferred embodiment, in order that the slitting surface 12f is tapered as shown in FIG. 52, a tapered portion 230t is provided at the cutting tool 230 in FIG. 58(b). Furthermore, in order to prevent the abovementioned tapered portion 230t from entering toward the center of the existing pipe 1 excessively, the cutting tool 230 is provided with a cutting feed stopper 230s fixed thereon.

The cutting feed stopper 230s is made of hard resin, and it is favorable that the cutting feed stopper 230s is provided with grooves through which cutting chips are permitted to escape. In the preferred embodiment, the cutting feed stopper may be secured at the guide bushing 212a instead of being secured at the cutting tool 230.

As shown in FIG. 56, the axial line 233a of the abovementioned cutting tool 230 and main shaft 233 is set in the diametrical direction C of the existing pipe 1. The abovementioned cutting tool 230 carries out a slitting motion by being rotated around the abovementioned axial line 233a established in the diametrical direction C of the abovementioned existing pipe 1.

A cutting feed frame 236 is fixed at the abovementioned bifurcated portion 212b in FIG. 58(a). The corresponding cutting feed frame 236 is provided with long bolts 236a fixed at the abovementioned bifurcated portion 212b and a top plate 236b fixed on the upper ends of the corresponding long bolts 236a. A male lead screw 237 for cutting feed is screwed in a bushing 236c secured at the abovementioned top plate 236b of the abovementioned cutting feed frame 236.

Figure 59:
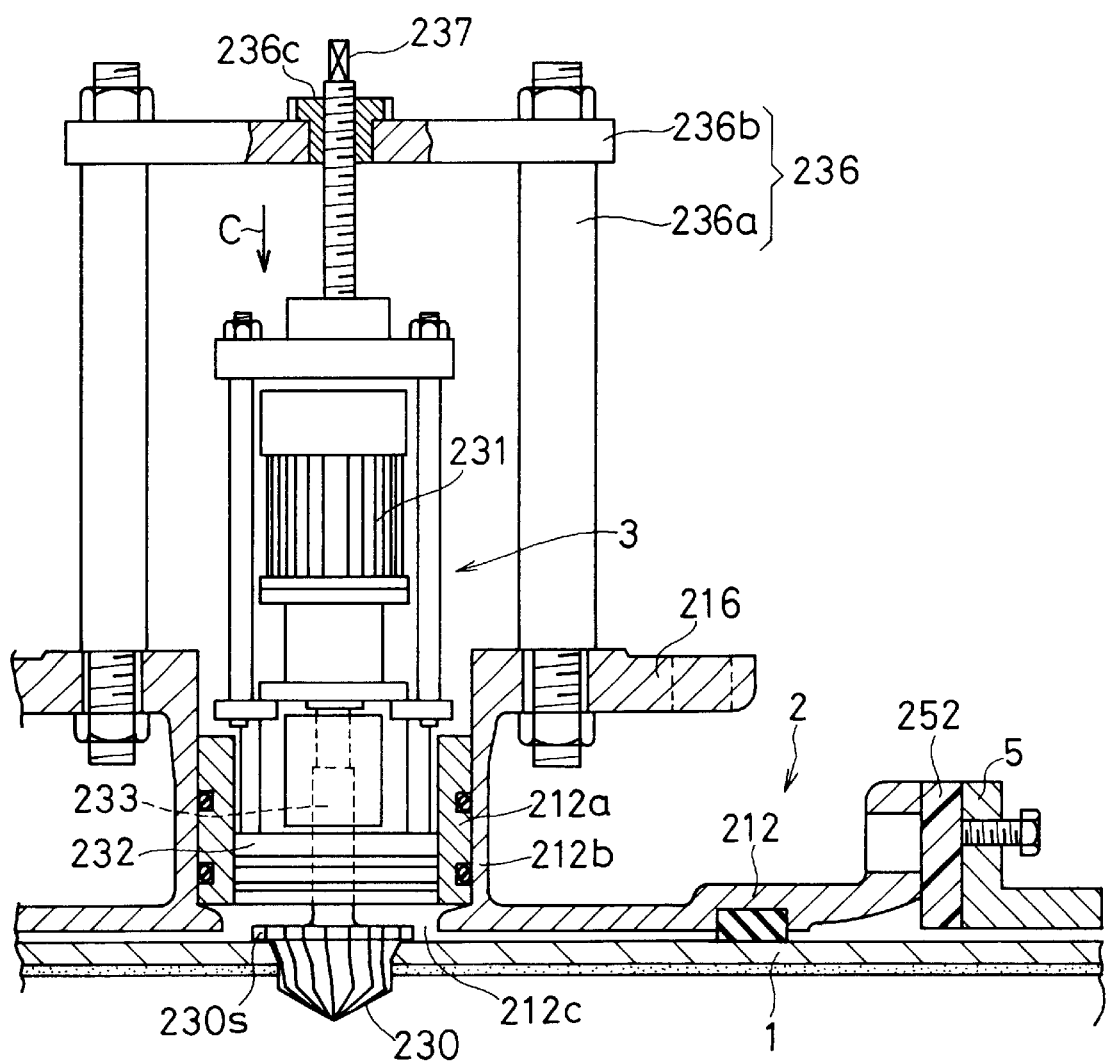
FIG. 59 is a longitudinally sectional view showing the cutting equipment after the cutting is finished, FIG. 60($a$), FIG. 60($b$), and FIG. 60($c$) are, respectively, a process view showing the sequence of slitting.

By turning and screwing the male lead screw 237 for cutting feed in the cutting feed direction C, the main bearing 232 advances in the cutting feed direction C. Therefore, by causing the cutting tool 230 to advance in the opening 212c by feeding the cutting tool 230 together with the main bearing 232 while rotating the cutting tool 230, it is possible to slit the existing pipe 1 by the cutting tool 230 as shown in FIG. 59. Furthermore, the abovementioned guide bushing 212a is fixed at the cutting feed frame 236 via a connection metal fitting 238 in FIG. 56, and it is withdrawn together with the cutting feed frame 236 after the slitting is completed.

Figure 57:
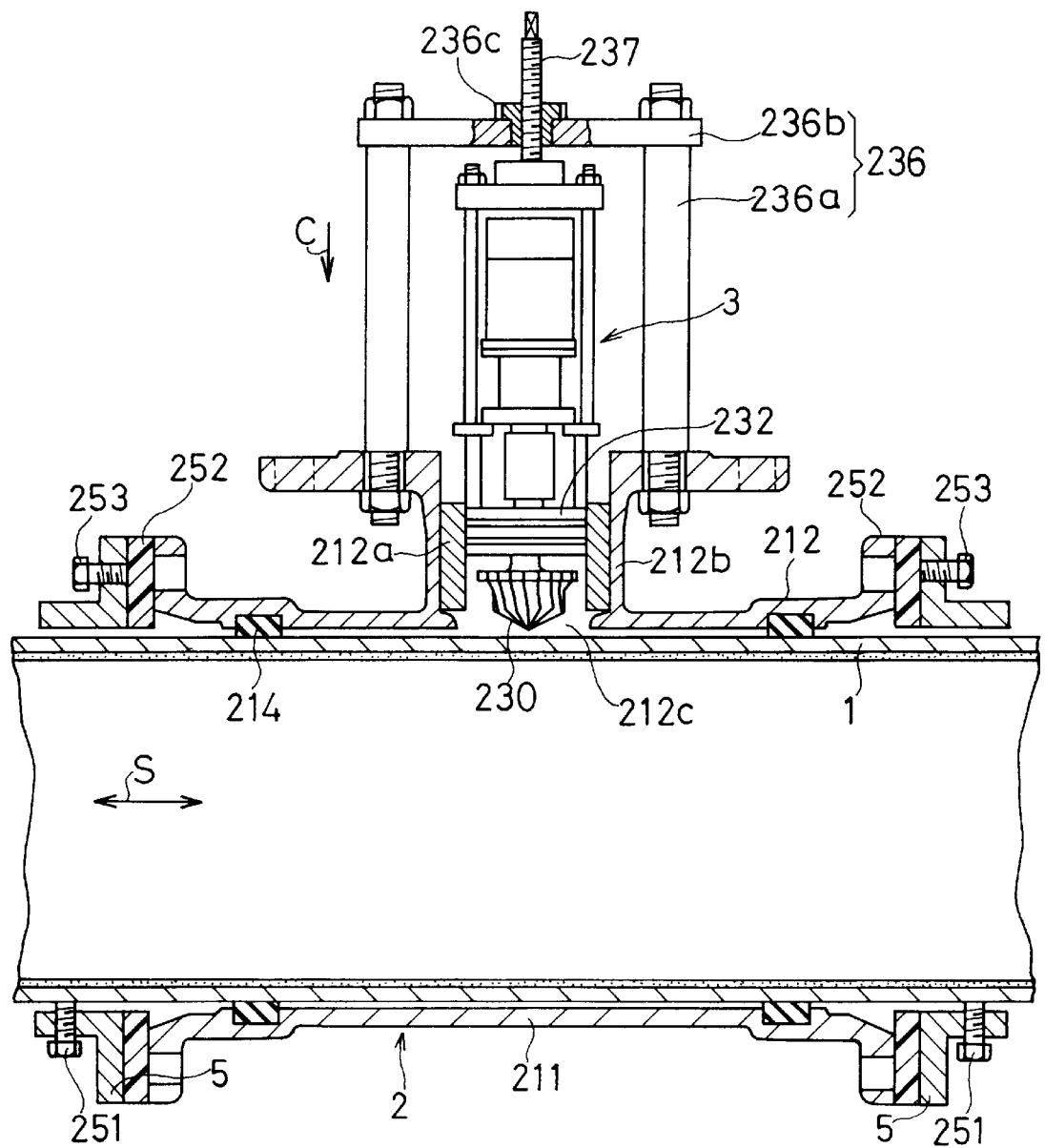
FIG. 57 is a longitudinally sectional view showing the entirety of the seal-up housing, cutting equipment, etc.
Figure 58:
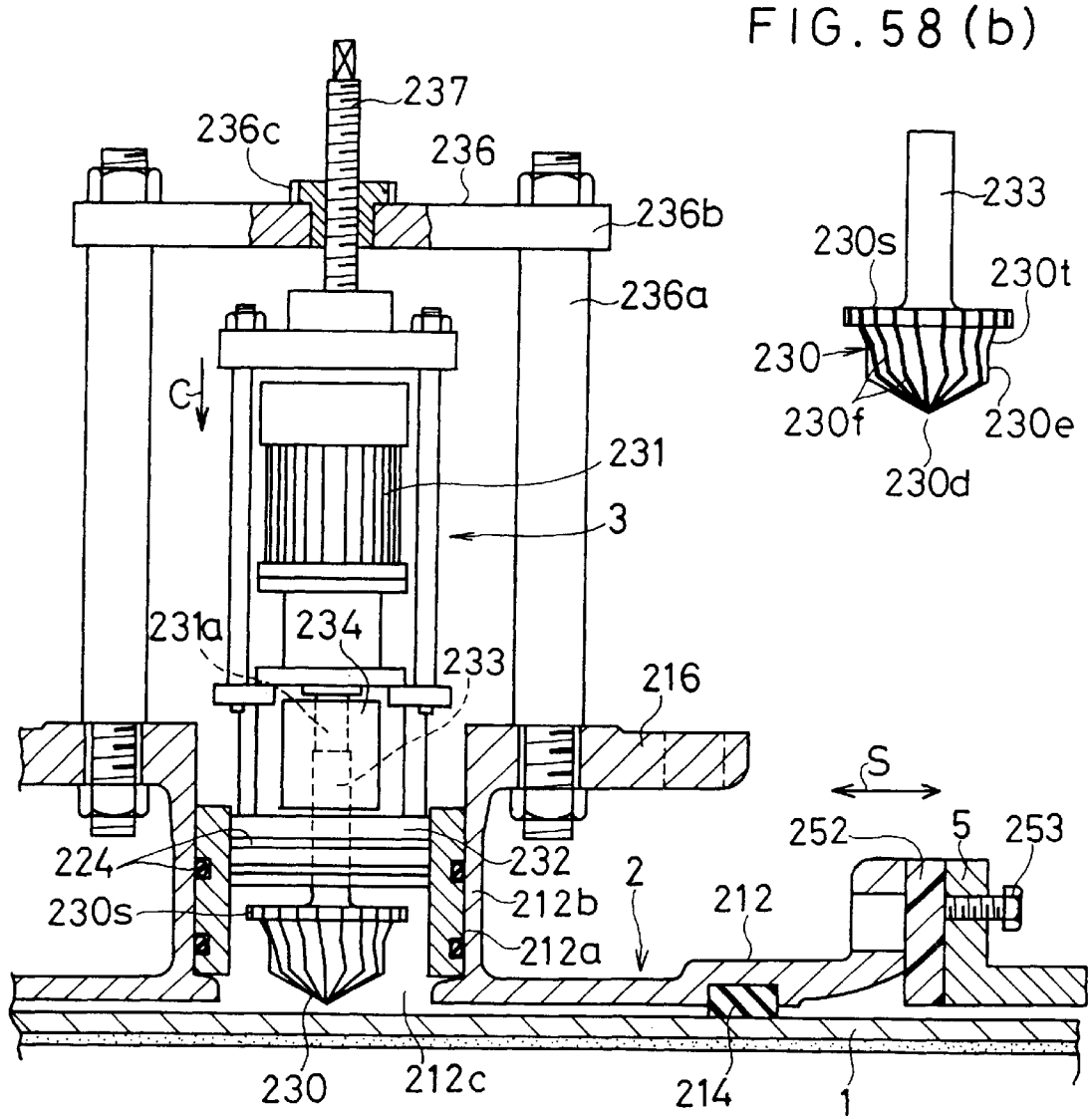
FIG. 58($a$) is a longitudinally sectional view mainly showing the cutting equipment before the cutting is started, FIG. 58($b$) is a sectional view of a columnar cutting tool.

As shown in FIG. 57, a slip preventing member 5 is provided at both sides of the abovementioned seal-up housing 2. The corresponding slip preventing member 5 is fixed at the existing pipe 1 by a number of set screws 251 and is brought into contact with both sides of the seal-up housing 2 via a liner 252. Thereby, the slip preventing member 5 guides the seal-up housing 2 and prevents the seal-up housing 2 from slipping or shaking in the axial direction S of the existing pipe 1. Therefore, the seal-up housing 2 is smoothly turned when turning around the existing pipe 1. Furthermore, a pressing screw 253 presses the liner 252 to the seal-up housing 2.

Slitting Process

Next, a description is given of a sequence of slitting.

First, in a state where fluid (water) is flowing in the existing pipe 1 in FIG. 57, the workmen attach the seal-up housing 2 to the existing pipe 1 and assemble both split housings 211 and 212 by assembling bolts (not illustrated). Thus, as shown in FIG. 57, the seal-up housing 2 encloses and seals up the existing pipe 1 in an airtight state. Furthermore, the cutting equipment 3 is attached, in advance, to the guide bushing 212a.

Figure 60A:
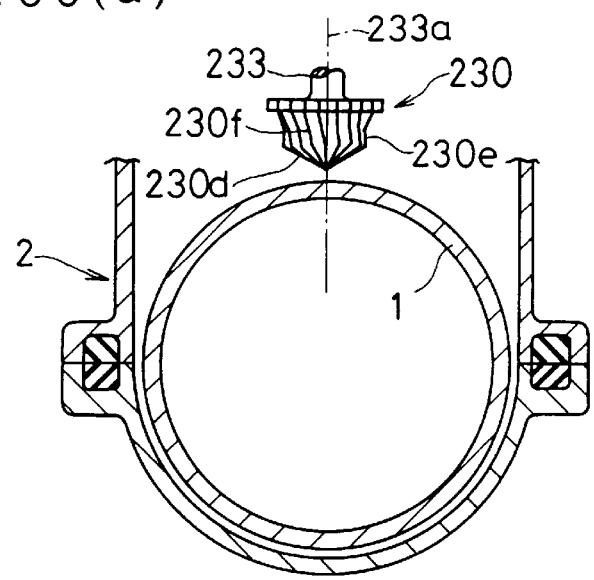
Figure 60B:
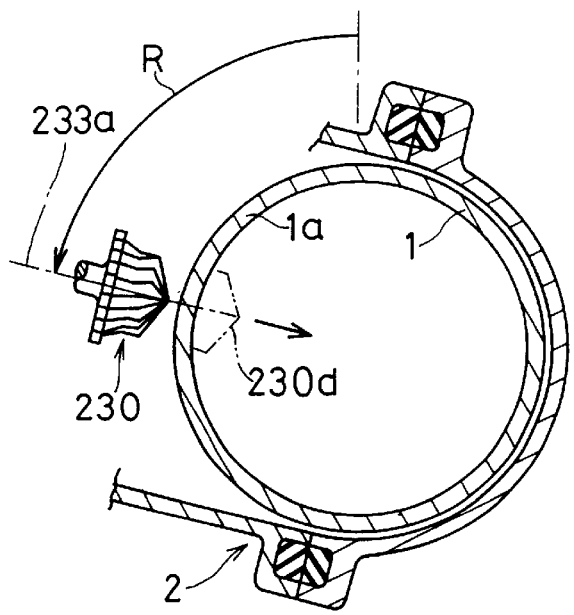

Next, as shown in FIG. 60(a) and FIG. 60(b), a slitting position to be slit by the cutting tool 230 is determined. That is, the workmen, manually or by using a winch, turn the seal-up housing 2 and cutting equipment 3 to the position where the axial line 233a of the cutting tool 230 is roughly horizontal. Furthermore, in the present embodiment, an operation handle and a speed reduction mechanism, which are used to turn the seal-up housing 2, may be provided.

Next, as the workmen drive the motor 231 in FIG. 56, the corresponding motor 231 turns the cutting tool 230 around the axial line 233a of the main shaft 233 and causes the cutting tool 230 to perform a slitting motion, by which the existing pipe 1 is slit by the corresponding cutting tool 230. In a state where the cutting tool 230 is performing the corresponding slitting motion, the workmen screw the male lead screw 237 for cutting feed in the cutting feed direction C, concurrently, as shown with an alternate long and two dashes line in FIG. 60(b), the tip end surface 230d of the cutting tool 230 advances to the position where the tip end surface passes through a part of the wall 1a of the existing pipe 1. At this time, the cutting feed stopper 230 in FIG. 59 is brought into contact with the outer circumferential surface of the existing pipe 1. Thus, the cutting feed by the cutting tool 230 is completed.

Figure 60C:
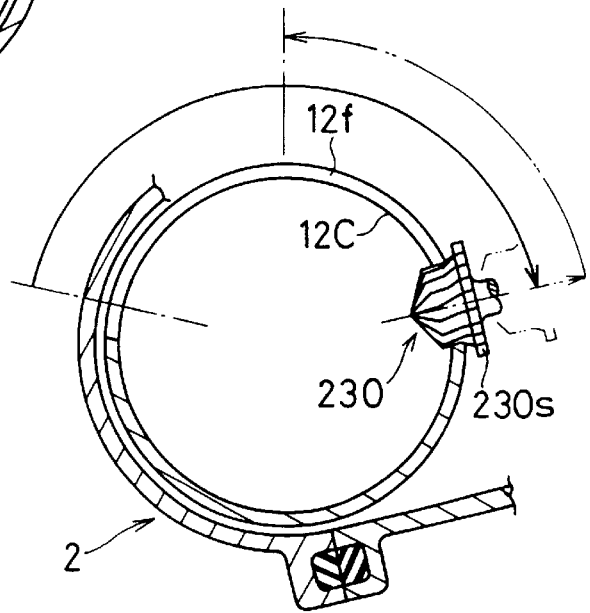

After the cutting feed is completed, the workmen turn the seal-up housing 2 around the existing pipe 1 as shown in FIG. 60(b) and FIG. 60(c), thereby, the cutting tool 230 is turned around the axial line 233a while turning by approximately 180 degrees (for example, 160 degrees) along the outer circumference of the existing pipe 1 together with the seal-up housing 2, wherein the existing pipe 1 is semi-annularly slit, and a slit groove 12C is formed at the existing pipe 1.

After the slitting is completed, the cutting tool 230 in FIG. 60(c) is returned to the original position as shown with the arrow of an alternate long and two dashes line. Furthermore, in order that the water stopping made by the sluice valve 8A (FIG. 53) inserted in a line later is made sufficient, it is necessary that the cutting tool 230 is returned to the central position of the cutting groove 12C.

Cutting Equipment Removing Process

Figure 61:
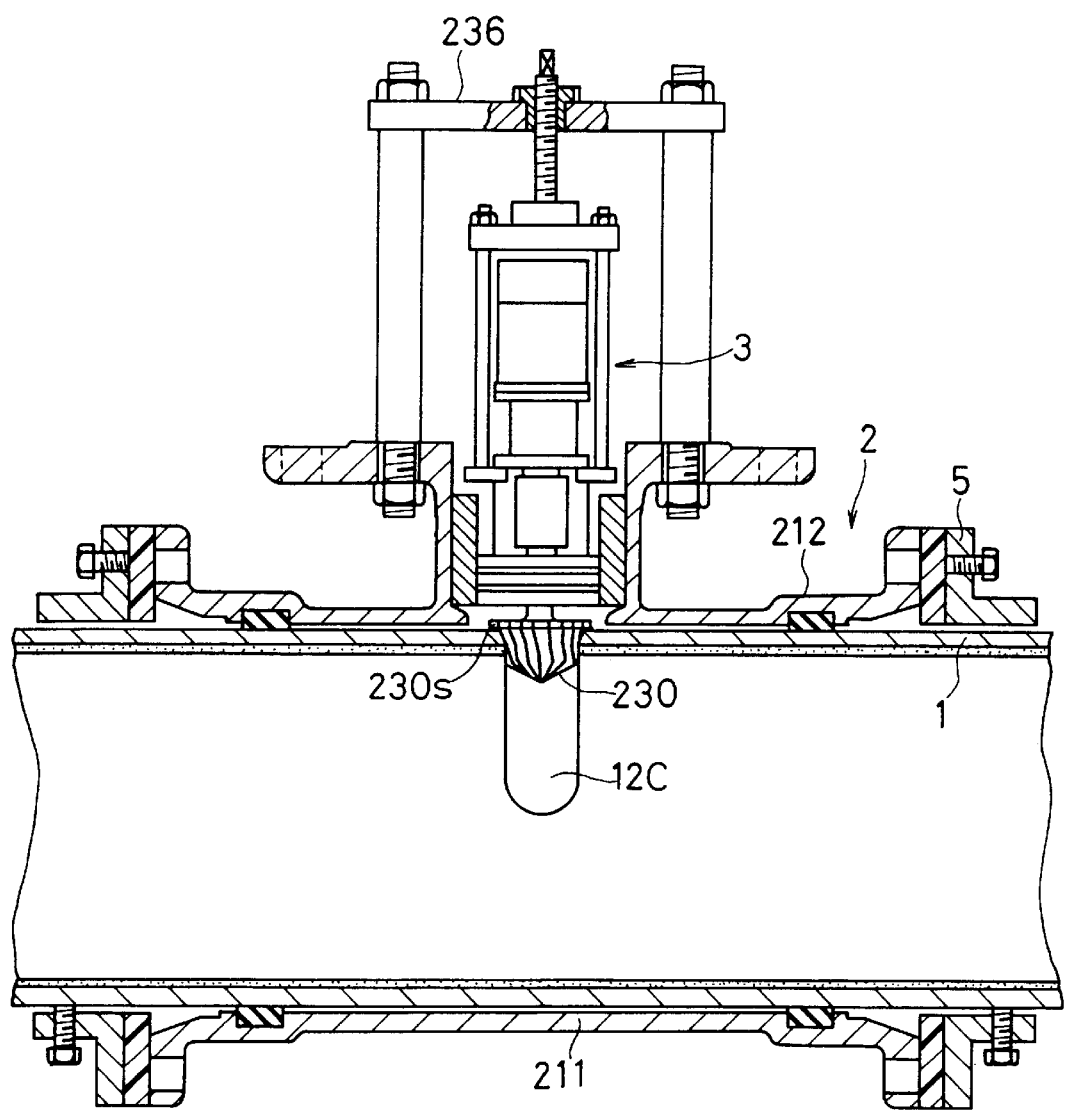
FIG. 61 is a longitudinally sectional view showing a state after the cutting is finished, FIG. 62($a$), FIG. 62($b$), and FIG. 62($c$) are, respectively, front elevational views showing modified versions of the cutting tool, FIG. 62($d$) is a sectional view showing another method for forming a slit groove for the piping structure, FIG. 62($e$) is a perspective view showing still another method for forming a slit groove for the piping structure, FIG. 63($a$) is a cross-sectional view of a seal-up housing showing a fifth preferred embodiment of the invention, FIG. 63($b$) is a longitudinally sectional view of the same seal-up housing, FIG. 63($c$) is a cross-sectional view showing a brief construction of cutting equipment, FIG. 63($d$) is a longitudinally sectional view showing a brief construction of the cutting equipment.

Next, the workmen removes the cutting equipment 3 in FIG. 61 by a method similar to that in the abovementioned embodiment, and further, as shown in FIG. 52 and FIG. 53, the sluice valve 8A is inserted into a place corresponding to the slit groove 12C in a line 1A.

Thus, in the present piping structure, since the width of the slit groove 12C in FIG. 52 is small, it is possible to decrease the size of the seal-up housing 2.

Figures 62A, 62B, 62C:
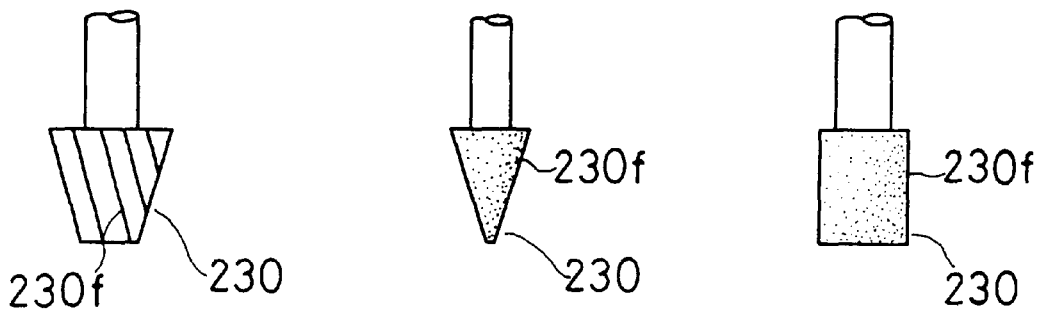

A cutting tool for slitting the slit groove 12C according to the invention may be a conical trapezoidal type as shown in FIG. 62(a), a conical type as shown in FIG. 62(b), or a columnar type as shown in FIG. 62(c). Furthermore, as blades 230f, a number of diamond grains may be employed, as shown in FIG. 62(b) and FIG. 62(c), in addition to ultra hard chips.

Figure 62D:
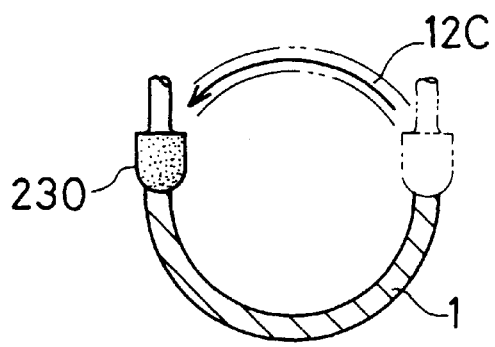
Figure 62E:
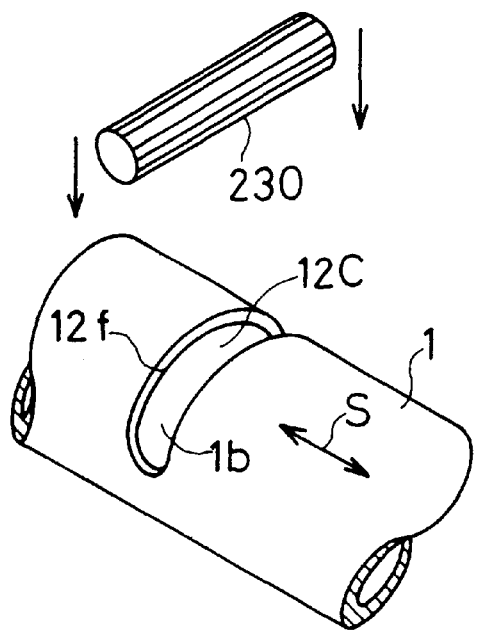

Furthermore, in the present piping structure, as a method for slitting the existing pipe 1, it is not necessary to turn the seal-up housing 2, but as shown in FIG. 62(d), a roughly columnar cutting tool 230 is parallelly moved in the circumferential direction R in order to form a slit groove 12C. Furthermore, as another method, as shown in FIG. 62(e), the slit groove 12C may be also formed by machining the existing pipe 1 so as to press the side of a cutting tool 230 consisting of a column-shaped miller to the existing pipe 1.

Fifth Preferred Embodiment

FIG. 63 through FIG. 68 show the fifth preferred embodiment. Hereinafter, a description is given of an existing pipe cut-off method and a method for inserting a valve in a line without stopping passage of water according to the fifth preferred embodiment.

First, the workmen attach the seal-up housing 2 to the existing. pipe 1 as shown in FIG. 63(a) through FIG. 63(d) and enclose and seal up a part of the outer circumference of the existing pipe 1 by the seal-up housing 2 in an airtight state.

Since the abovementioned seal-up housing 2 constitutes a part of a valve housing of a sluice valve which is inserted by the present method, it is divided into the first split housing 321, the second split housing 322 and lower cover 323. The abovementioned first split housing 321 and the second split housing 322 are fixed by a slip preventing member 5B having set screws 351 shown in FIG. 64 via a liner 352 so that they do not slip in the axial direction S of pipe 1. The abovementioned lower cover 323 is such that a cover body 345 to clog an opening of the bifurcated portion 326 of the second split housing 322, cylindrical portion 346 and flange portion 347 are made integral with each other. The tip end of the stopper bolt 327 secured at the flange 349 of the bifurcated portion 326 is brought into contact with the abovementioned cover body 345.

Furthermore, rubber packing 324 is used to seal up the slitting portion.

Cutting equipment 3 is attached to the lower cover 323 of the abovementioned seal-up housing 2. The corresponding cutting equipment 3 has a cutting tool 330. As the cutting tool 330, for example, it is favorable to use an end mill as in the second preferred embodiment. The cutting tool 330 is housed in the seal-up housing 2. The cutting tool 330 is fixed at the tip end of the main shaft (cutter shaft) 331 and is rotatably supported at the main bearing 332 via the main shaft 331.

The main bearing 332 is slidable in the cylindrical portion 346 of the abovementioned lower cover 323, wherein, by turning the main shaft feed screw 333, the main bearing 332 moves vertically in the axial direction in the lower cover 323. That is, the cutting tool 330 protrudes toward the wall 1a of the existing tube 1 in the seal-up housing 2, and is advanced and retreated in the diametrical direction C of the existing pipe 1. A coupling portion 334 is provided at the upper portion of the abovementioned main bearing 332. The corresponding coupling portion 334 connects the output shaft 336 of a prime mover 335 such as a motor to the main shaft 331.

Figure 63A:
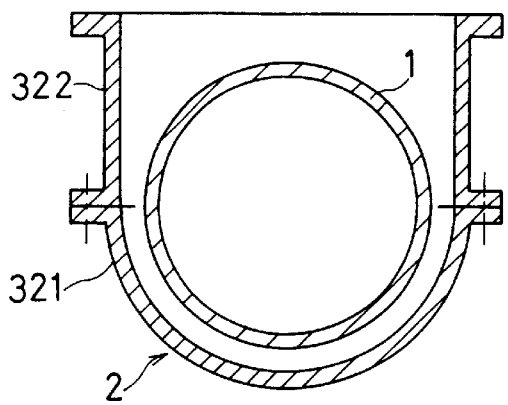
Figure 63B:
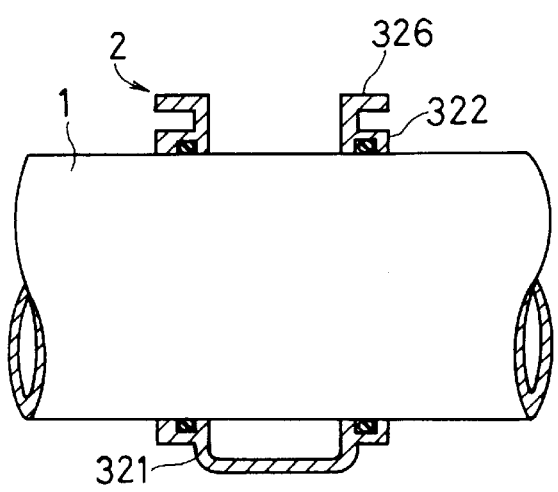
Figure 63C:
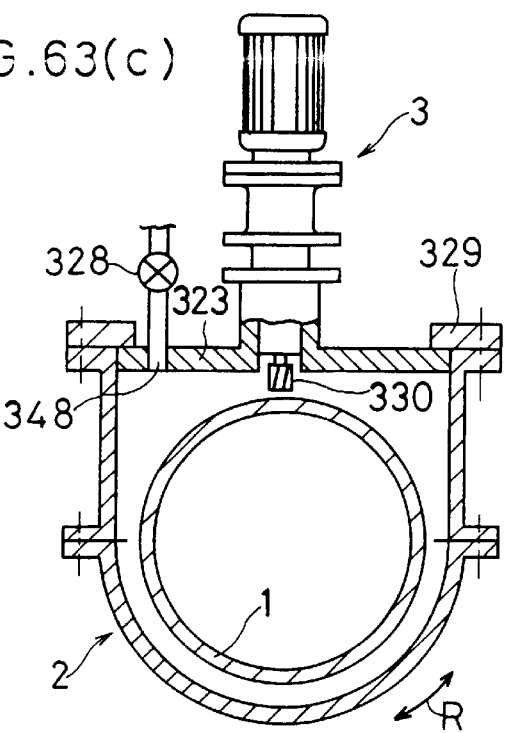
Figure 63D:
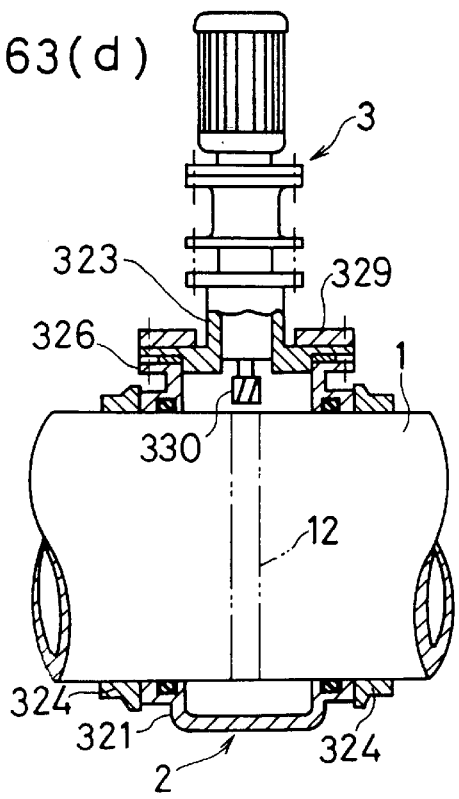

After the abovementioned seal-up housing 2 is attached in place, the workmen connect a water discharge valve 328 to the water discharge port 348 secured at the lower cover 323 in FIG. 63(c). Furthermore, the workmen fix a pressing cover 329, by which the cover body portion 345 of the lower cover 323 in FIG. 64 is pressed from upwards, at the flange 349 of the bifurcated portion 326 with bolts 350.

Figure 64:
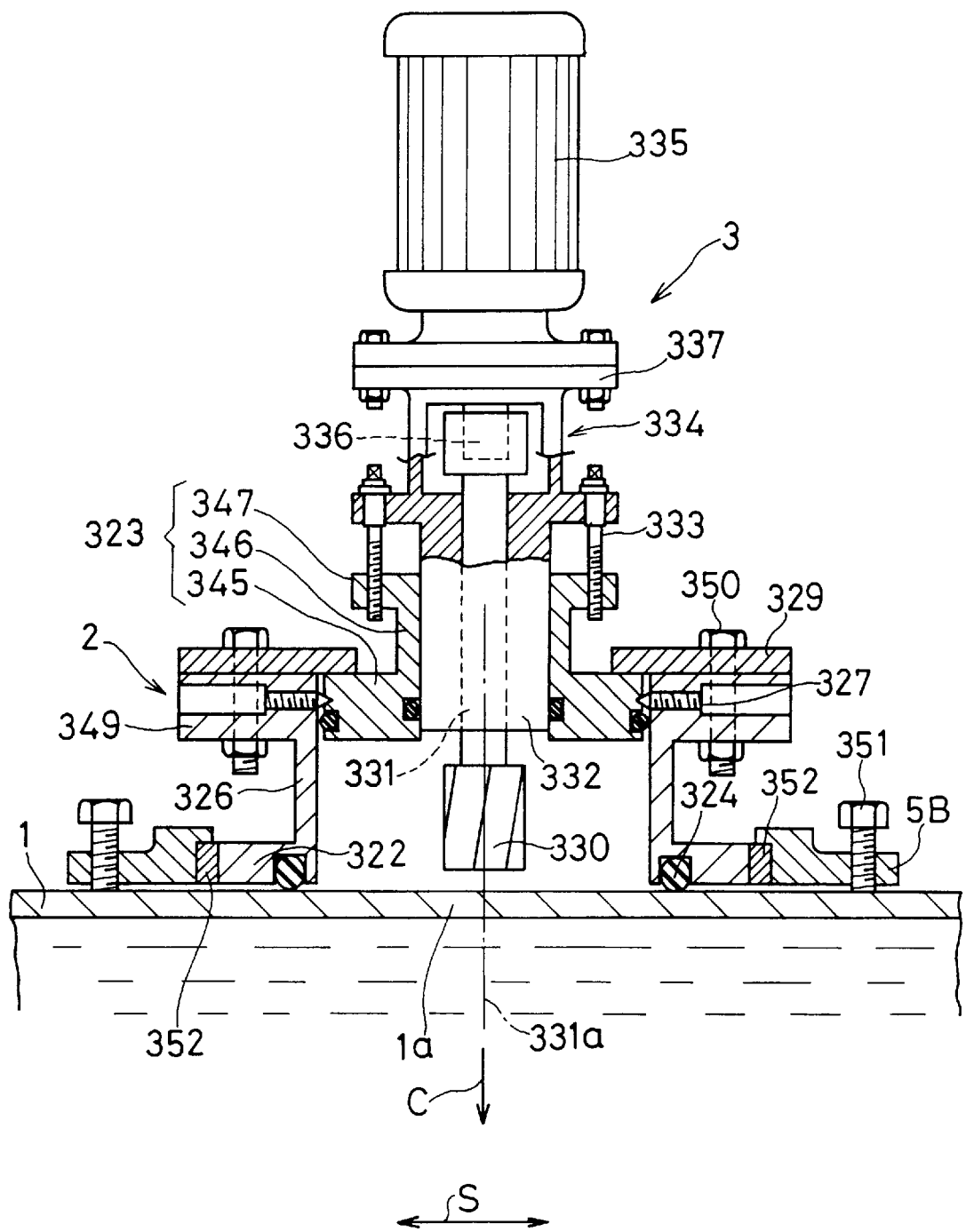
FIG. 64 is a sectional view showing the cutting equipment.

Next, the workmen drive the prime mover 335 in FIG. 64, the cutting tool 330 rotates around the axial line 331a of the main shaft 331. In this state, if, by turning the main shaft feed screw 333, the workmen feed the cutting tool 330 to the position where the cutting tool 330 passes through the wall 1a of the existing pipe 1 in the diametrical direction C thereof, a circular hole is drilled at the existing pipe 1. After the drilling is completed, the workmen turn the seal-up housing 2 in FIG. 63(c) in the circumferential direction R of the existing pipe 1 at a low speed to turn (feed) the cutting tool 330 in the same circumferential direction R, wherein a part (illustrated by an alternate long and two dashes line in FIG. 63(d)) of the existing pipe 1 is slit by the cutting tool 330. Herein, since, in the present cut-off method, the cutting is performed by using an end mill, no annular cut-off section is produced. The annularly slit and cut-open portion 12 becomes a space in which a sluice valve body 8a in FIG. 66 described later perpendicularly moves.

As the method for turning the abovementioned seal-up housing 2, a winch or other large-sized construction machines may be employed. If the existing pipe is made of vinyl chloride, the seal-up housing 2 may be manually turned. Cutting chips produced by the abovementioned cutting or slitting are discharged through a water discharge valve 328 (FIG. 63(c)) opened during the slitting.

Figure 65:
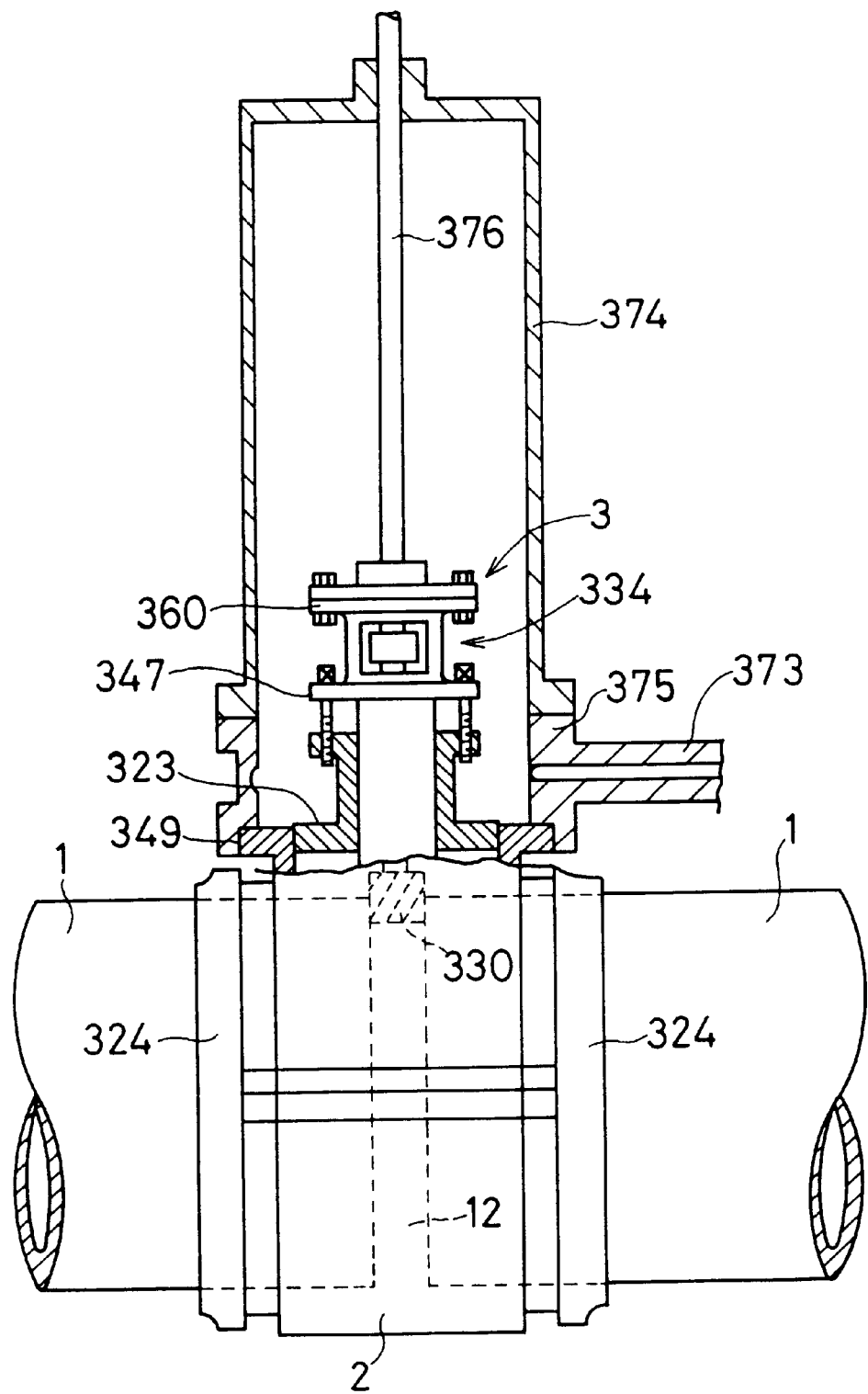
FIG. 65 is a sectional view showing a withdrawing method of the same cutting equipment, FIG. 66($a$) is a cross-sectional view showing a method for inserting a sluice valve body, and FIG. 66($b$) is a longitudinally sectional view showing the same method.

Next, the workmen remove the prime mover 335 in FIG. 64 and press cover 329, and remove the cutting equipment 3 by an already known method described later. That is, as shown in FIG. 65, the workmen connect an operation sluice valve 373 to the flange 349 of the bifurcated portion 326, and furthermore connect an operation upper chamber 374 to the operation sluice valve 373 so as to overlap each other. When connecting them, the flange 360 is connected to the lower end portion of the lifting shaft 376 passing through the operation upper chamber 374. After the connection is completed, the workmen remove stopper bolts 327 in FIG. 64. Thereafter, they raise the lifting shaft 376 in FIG. 65 and remove the cutting equipment 3 and the lower cover 323 from the seal-up housing 2 into the operation upper chamber 374. Thereafter, the sluice valve 373 is closed. After the sluice valve is closed, the workmen separate the operation upper chamber 374 from the operation sluice valve 373.

Next, the workmen connect the abovementioned operation upper chamber 374, in which the valve cover 8b and sluice valve body 8a in FIG. 66(a) and FIG. 66(b) are housed, to the flange 375 of the operation sluice valve 373. The sluice valve 8A inserted in a line 1A is provided with a spindle 8c for opening and closing the sluice valve body 8a. The corresponding sluice valve 8A constitutes such a valve that by turning the spindle 8c, the sluice valve body 8a invades the slit and cut-open portion 12 and rubber packing 8d for sealing, which is secured at the sluice valve body 8a, and is pressure-fitted to the inner circumferential surface 321a of the seal-up housing 2 in FIG. 68.

Figure 67:
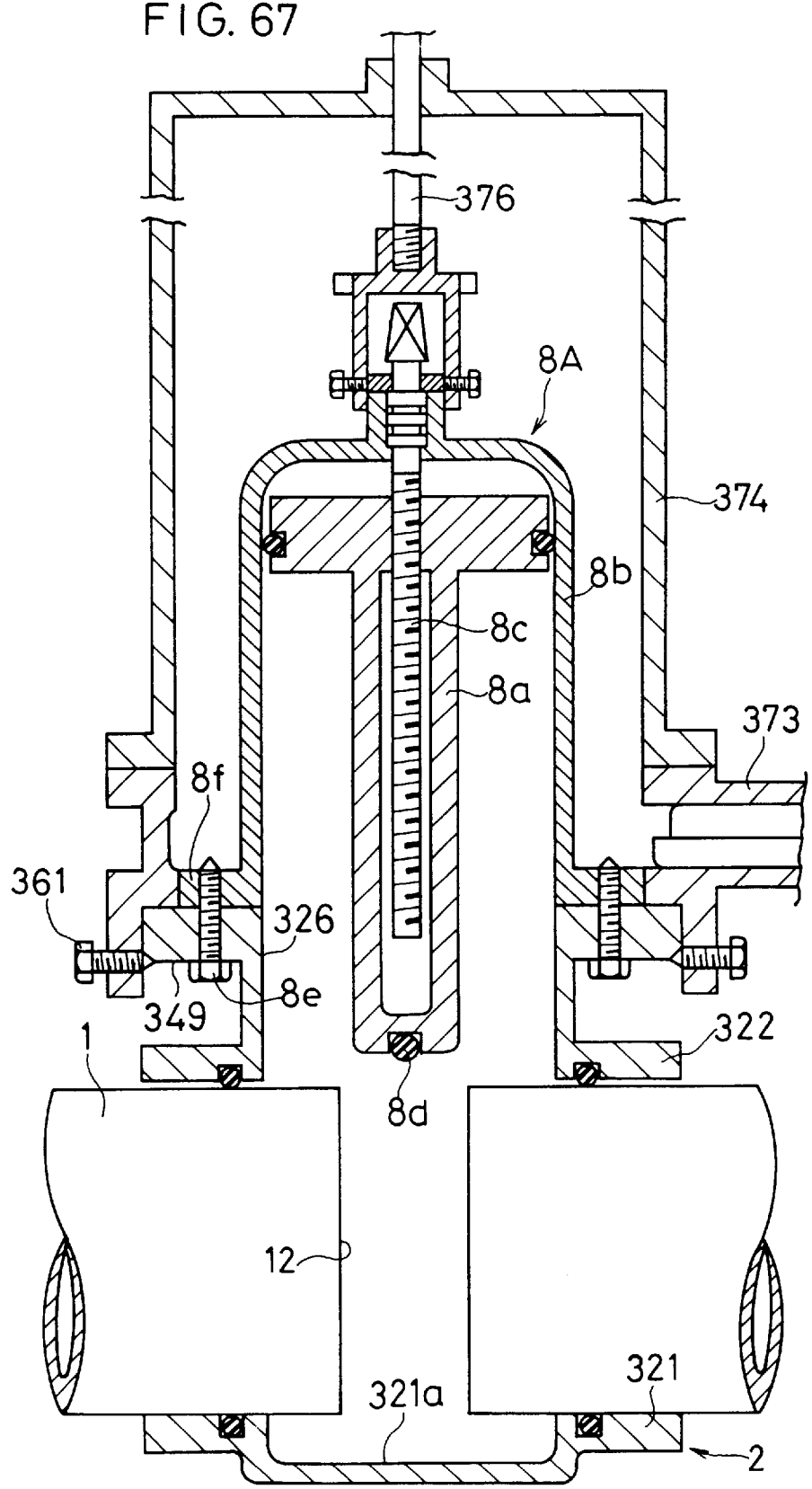
FIG. 67 is a sectional view showing a method for inserting a sluice valve body.
Figure 68:
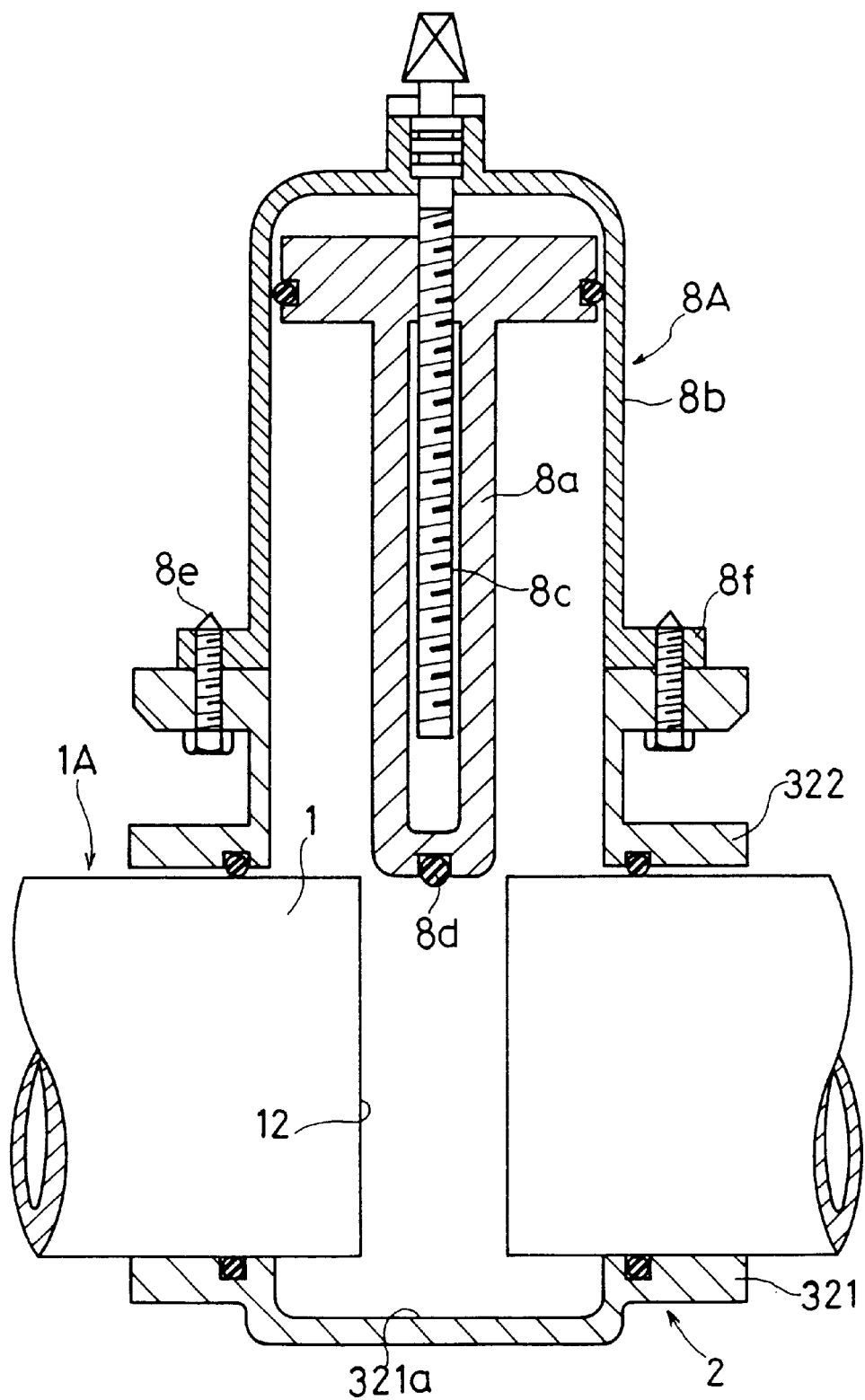
FIG. 68 is a sectional view showing the completed state.

After attaching the abovementioned operation upper chamber 374 in FIG. 66(a), the workmen open the operation sluice valve 373 as shown in FIG. 66(b), slightly shift down the lifting shaft 376, and as shown in FIG. 67, coincide the flange 8f of the valve cover 8b with the flange 349 of the bifurcated portion 326. Thereafter, the workmen insert a flange bolt 8e through the flange 349 to fix the valve cover 8b at the second split housing 322. After that, the workmen remove the fixing bolts 361, by which the operation sluice valve 373 is fixed, after withdrawing the operation upper chamber 374, and withdraws the operation sluice valve 373. Thus, as shown in FIG. 68, the sluice valve 8A is installed at a place corresponding to the slit and cut-open portion 12, wherein the sluice valve 8A is inserted in a line 1A.

In the abovementioned method, since a cutting tool 330 in FIG. 63(c) is attached to the seal-up housing 2, it is possible to draw the inner circumference of the seal-up housing 2 to the outer circumference of the existing pipe 1. Therefore, the seal-up housing 2 can be made small-sized.

Modified Version

Figure 69:
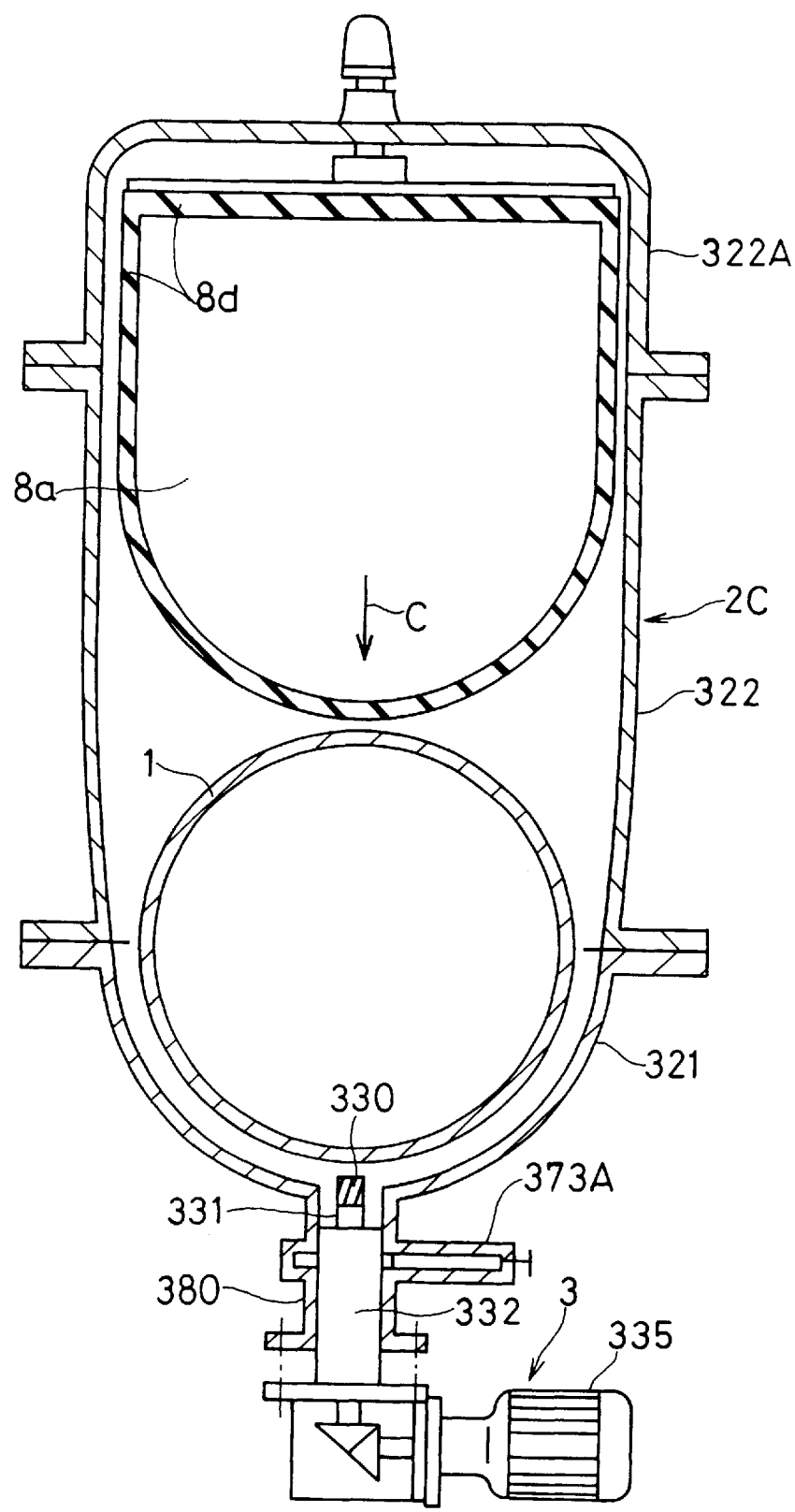
FIG. 69 is a sectional view showing a valve inserting method according to a modified version of the fifth preferred embodiment.
Figure 70:
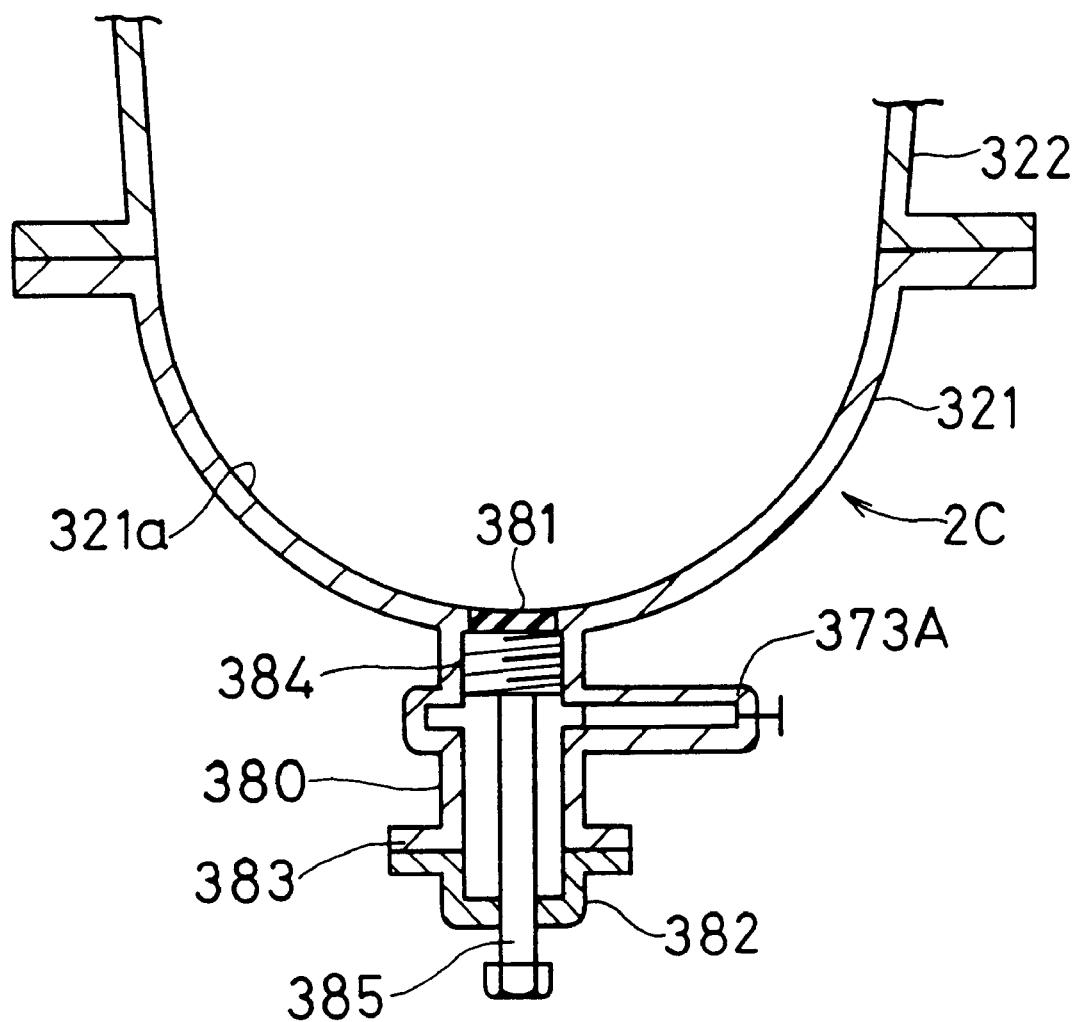
FIG. 70 is a sectional view showing a clogging method of the cylindrical portion of the same modified version.

FIG. 69 and FIG. 70 show a modified version of the fifth preferred embodiment.

In FIG. 69, in the present modified version, the entire seal-up housing 2C constitutes the valve housings 321, 322 and the valve cover 322A. In the corresponding seal-up housing 2C, a sluice valve body 8a which moves in the diametrical direction C of the existing pipe 1 is housed. On the other hand, the corresponding seal-up housing 2C is provided with a cylindrical portion 380 for take-out, which has an operation sluice valve 373A, at the opposite side of the sluice valve body 8a. In the modified version, after the end mill 330 is cut in from the state shown in FIG. 69, the existing pipe 1 is cut off as in the abovementioned fourth preferred embodiment if the workmen turn the cutting equipment 3 together with the seal-up housing 2C. After the cutting is completed, the workmen close the operation sluice valve 373A while removing the cutting equipment 3, and remove the cutting tool 330, etc.

Thereafter, the workmen close the opening of the cylindrical portion 380 for take-out with a clogging member 381 which clogs the cylindrical portion 380 in FIG. 70. That is, after the workmen connect a clogging cap 382 to the flange portion 383 of the cylindrical portion 380 for take-out, they open the operation sluice valve 373A and screw the male screw member 384, wherein the opening of the cylindrical portion 380 is shaped so as to match the inner circumferential surface of the seal-up housing 2C and is closed by the clogging member 381. Furthermore, the abovementioned clogging member 381 is made of a rubber cap having curvature along the inner circumferential surface 321a of the abovementioned seal-up housing 2. The corresponding clogging member 381 is fixed at and attached to the tip end of an operation rod 385 slidable at the clogging member 382 via a male screw member 384.

Furthermore, the other construction and method of the modified version are the same as those of the abovementioned fifth preferred embodiment, and they are given the same reference numbers as those of the fifth embodiment, wherein the description thereof is omitted.

Figure 71:
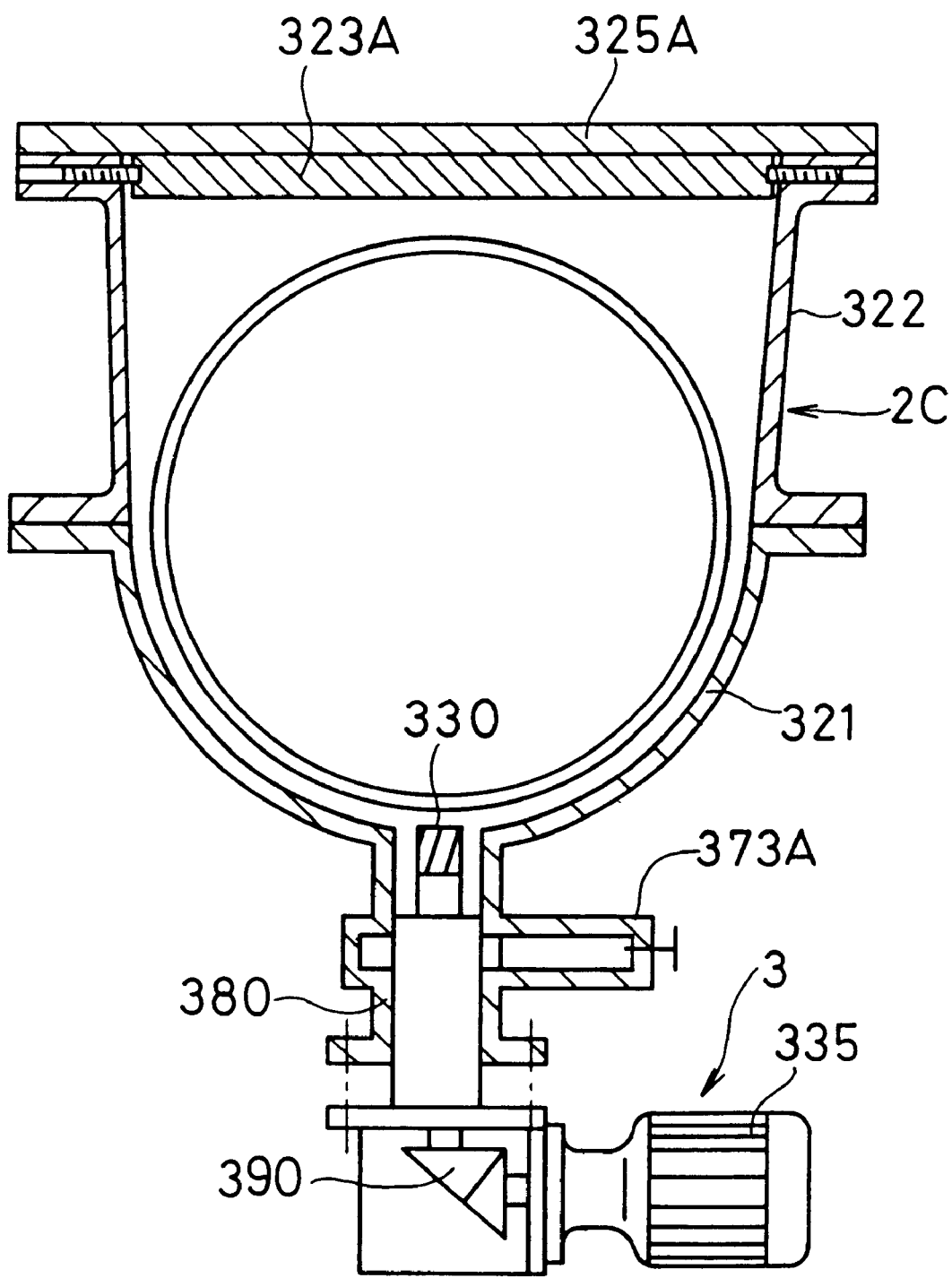
FIG. 71 is a sectional view showing a seal-up housing according to another modified version.
Figure 72:
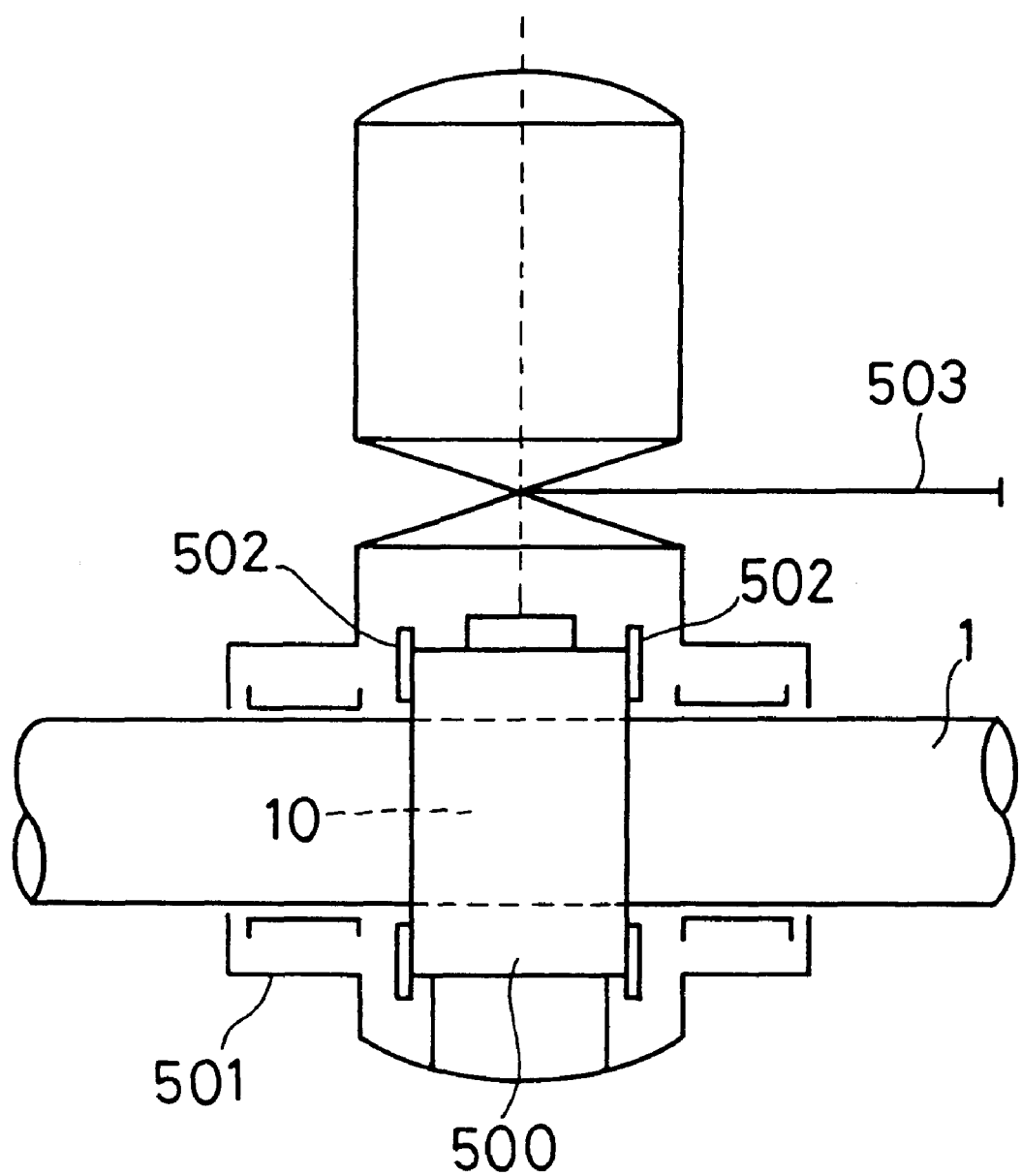
FIG. 72 is a brief sectional view showing a conventional existing pipe cut-off method.
Figure 73:
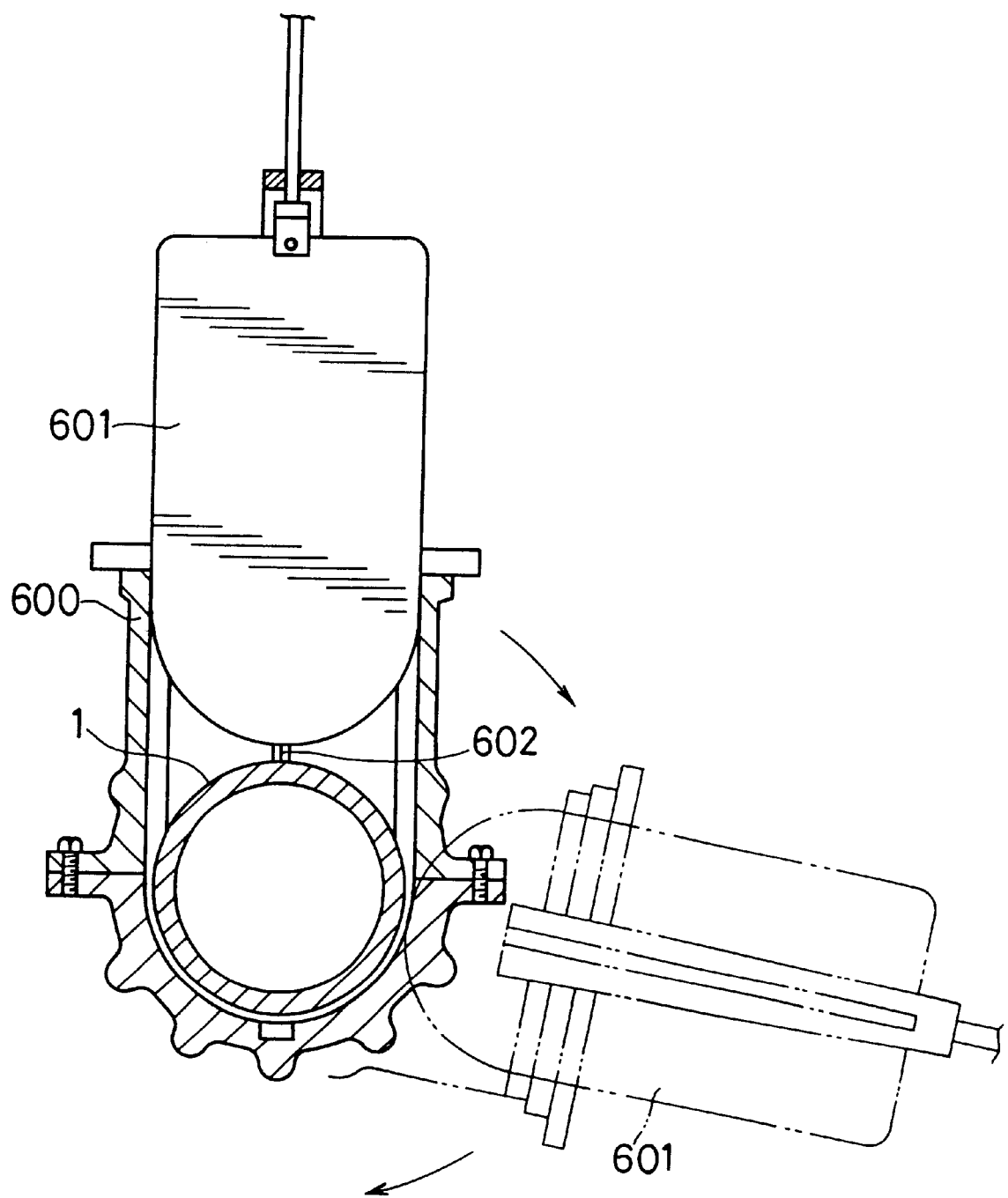
FIG. 73 is a sectional view showing another conventional method.
Figure 74:
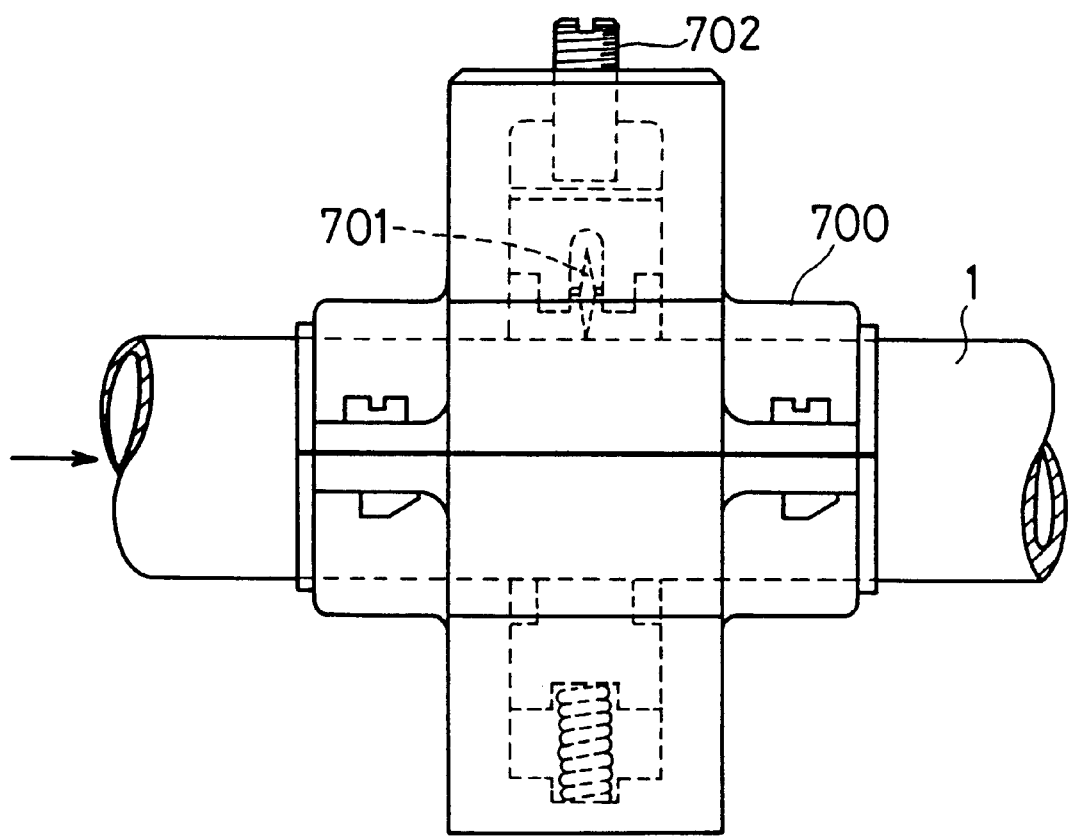
FIG. 74 is a sectional view showing still another conventional method.
Figure 75A:
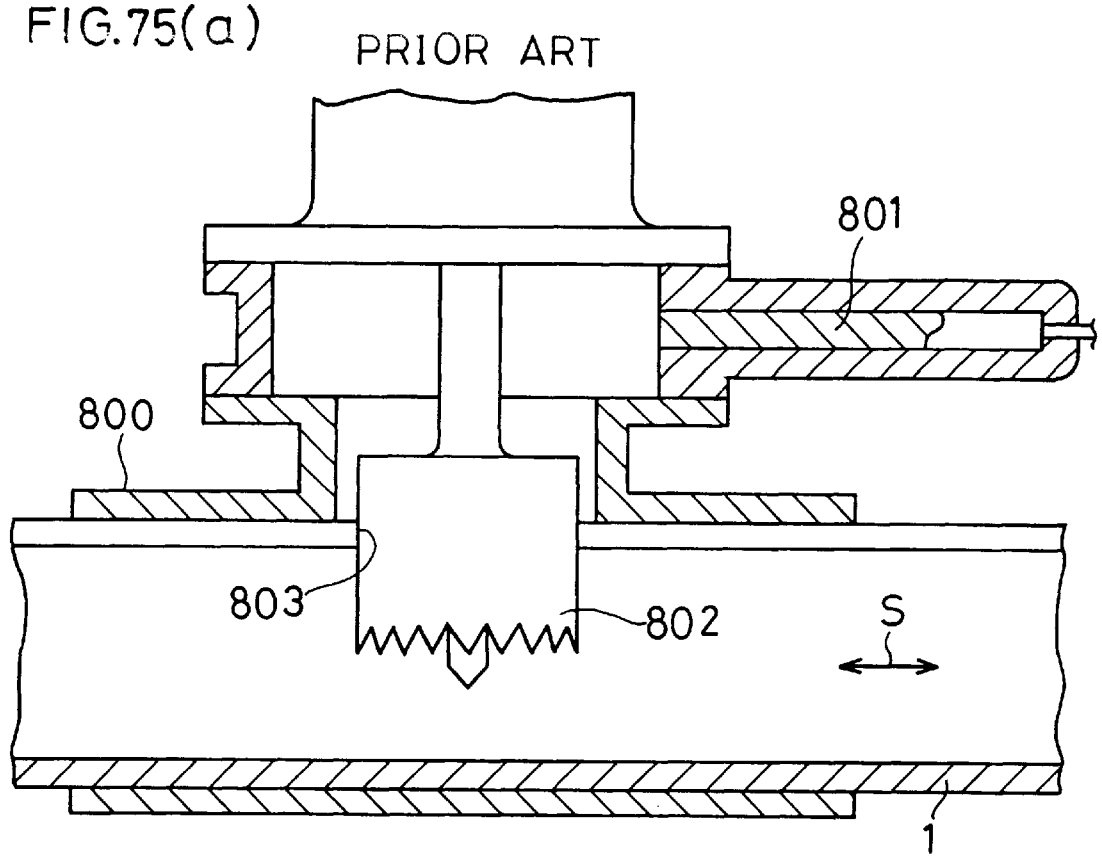
FIG. 75(a) is a sectional view showing a conventional drilling method without stopping passage of water.
Figure 75B:
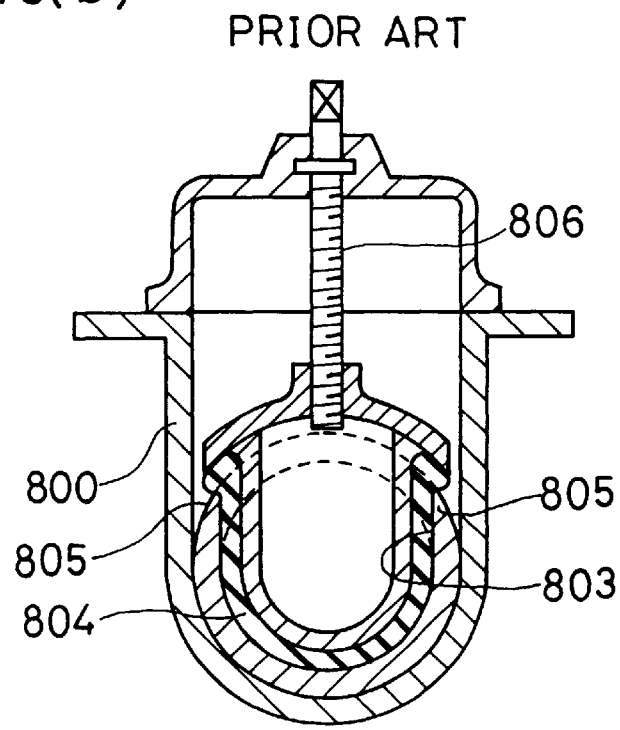
FIG. 75(b) is a sectional view showing a conventional method for inserting a valve in a line without stopping passage of water.
Figure 76A:
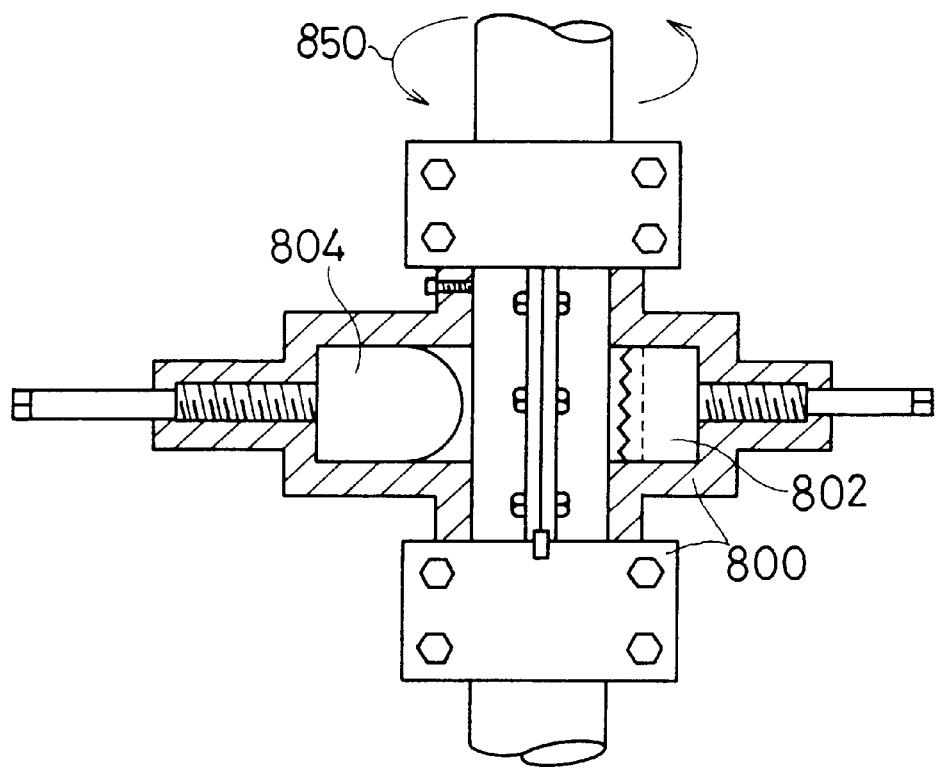
FIG. 76(a) is a sectional view showing a state before cutting by a conventional valve insertion method for inserting a valve in a line without stopping passage of water.
Figure 76B:
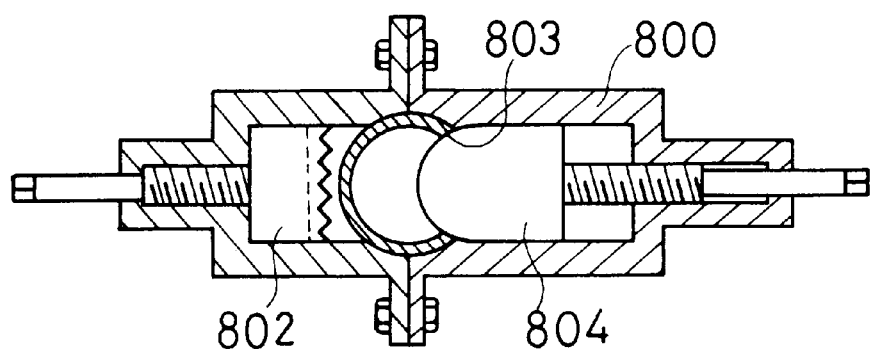
FIG. 76(b) is a sectional view after a cutting is completed by the conventional valve insertion method for inserting a valve in a line without stopping passage of water.
Figure 77:
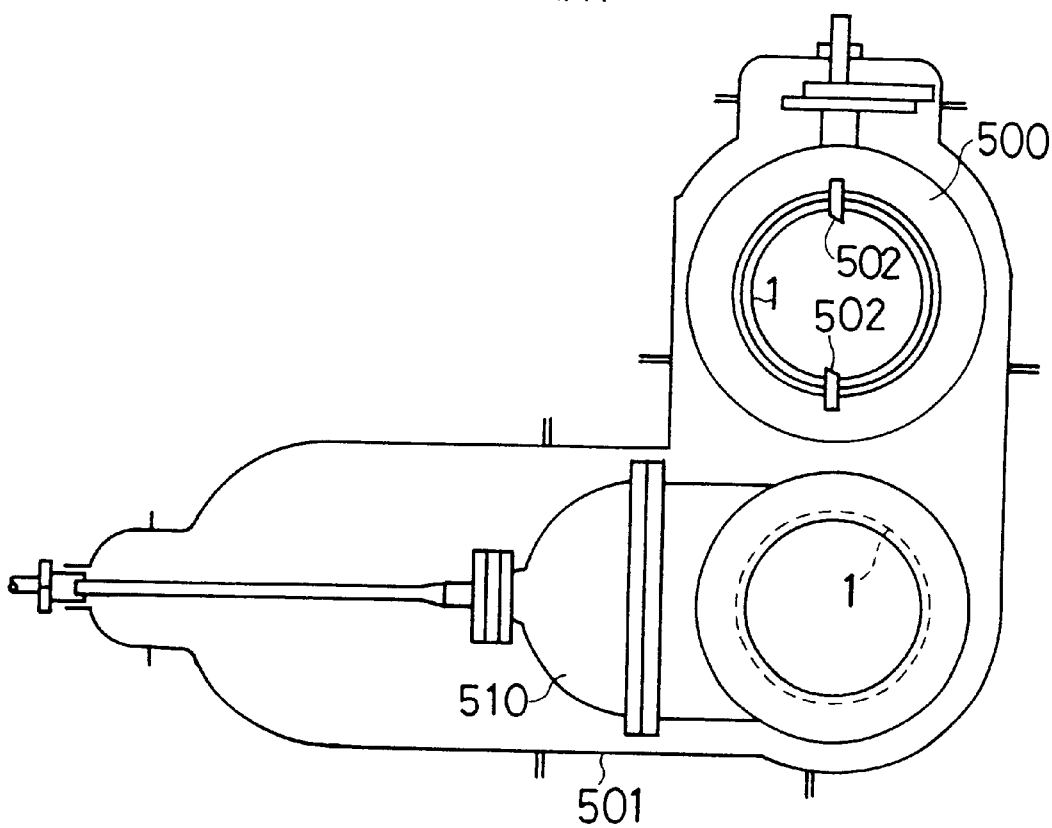
FIG. 77 is a sectional view showing a state after a valve is inserted by another conventional valve insertion method for inserting a valve in a line without stopping passage of water.

FIG. 71 shows another modified version of the fifth preferred embodiment.

In the apparatus according to the modified version in FIG. 69, the modified version in FIG. 71 may be used in a housing where a large space can not be secured around the surrounding of the existing pipe 1. In this modified version, the seal-up housing 2C consists of the first split housing 321, second split 322, first lower cover 323A, and second lower cover 325A. The cutting equipment 3 is attached to the cylindrical portion 380 for take-out, but is not attached to the first lower cover 323A. The sluice valve body (not illustrated) is attached by the same method as in the abovementioned fourth preferred embodiment. Furthermore, as in this preferred embodiment, if power is transmitted by a bevel gear 390, the downsizing of equipment can be secured.

Sixth Preferred Embodiment

FIG. 78 through FIG. 85 show a sixth preferred embodiment.

The sixth preferred embodiment is preferably employed for a pipe of small diameter, for example, 3 inches through 12 inches. The seal-up housing and the piping structure after an appointed valve is inserted are approximate to the modified versions illustrated in FIG. 50 through FIG. 61. Herein, parts which are different from the modified versions are mainly described below.

Seal-up Housing

Figure 78:
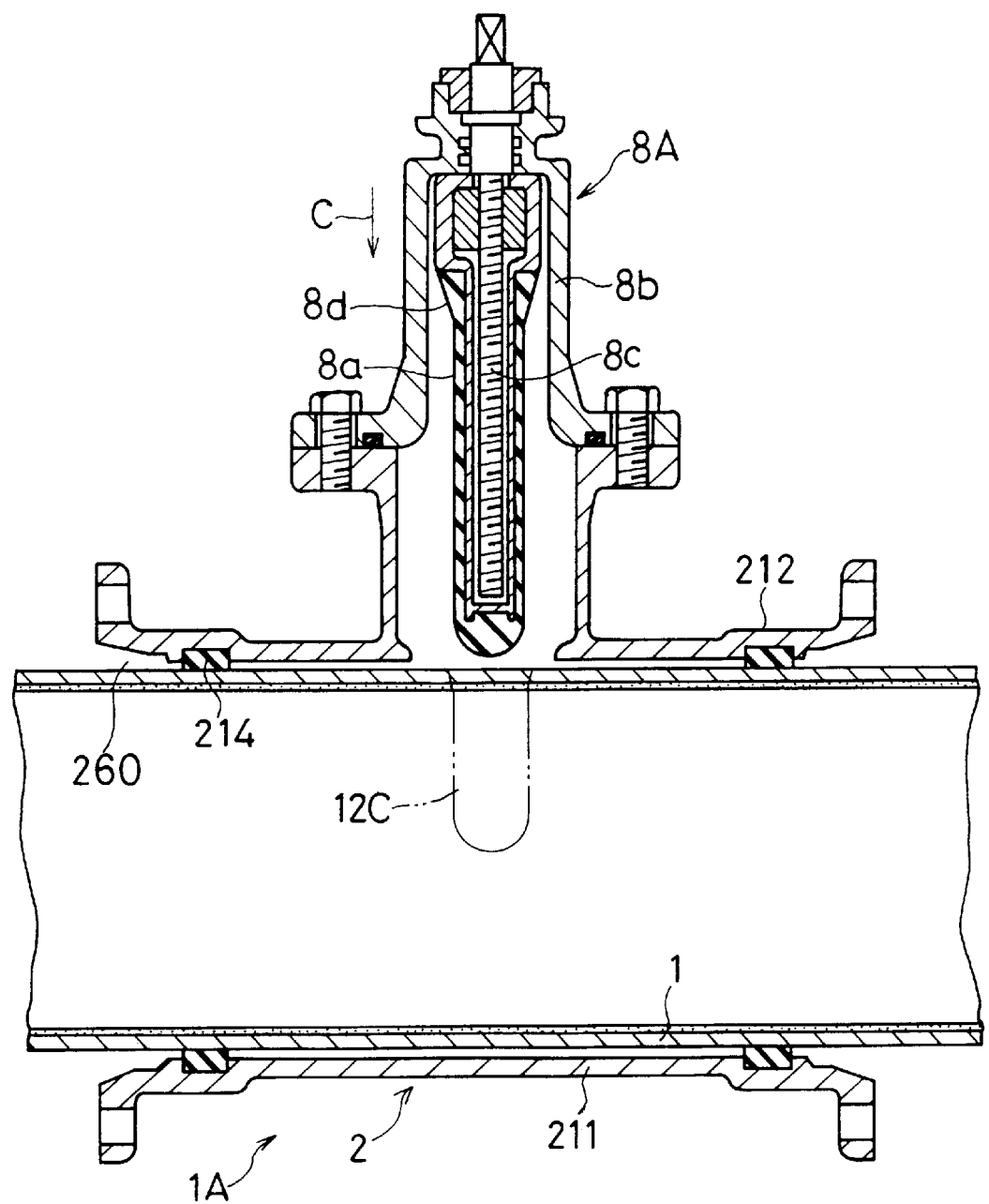
FIG. 78 is a longitudinally sectional view showing a state where a seal-up housing is attached.
Figure 79:
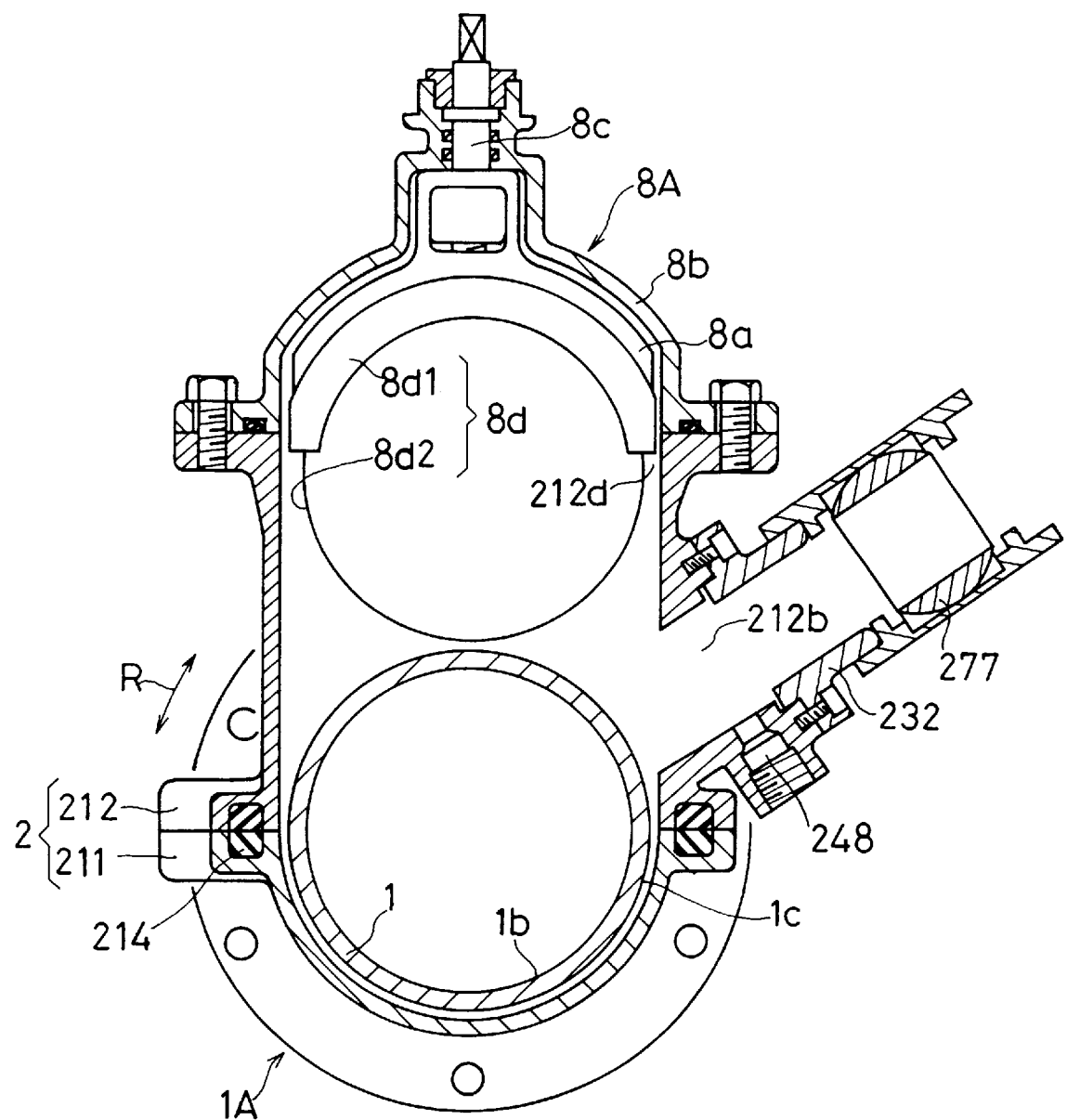
FIG. 79 is a cross-sectional view showing a state where a seal-up housing is attached.

In this preferred embodiment, as shown in FIG. 78 and FIG. 79, a sluice valve body 8a and a spindle 8c are accommodated in advance in the seal-up housing 2. A valve cover 8b also constitutes the seal-up housing 2 together with the first split housing 211 and the second split housing 212.

As shown in FIG. 79, a bifurcated portion 212b, through which a cutting tool 230 (FIG. 80) passes, protrudes and is provided in the second split housing 212. The main bearing 232 is fixed at the abovementioned bifurcated portion 212b in FIG. 80. The main bearing 232 supports the main shaft 233 of the cutting tool 230 when performing a cutting operation. On the other hand, a discharge opening 248 which discharges cutting chips produced during a cutting operation together with water is provided at the abovementioned bifurcated portion 212b. Furthermore, a discharge valve may be connected to the discharge opening 248 as necessary.

Cutting Equipment

A ball valve (operation valve) 277 is connected to the abovementioned main bearing 232 and cutting equipment 3 is attached to the corresponding ball valve 277. The cutting equipment 3 is used to form a semi-annular slit groove 12C (FIG. 78) as in the abovementioned fourth preferred embodiment, wherein the cutting tool 230 is rotated by a rotating force of a prime mover such as a motor and an engine along with feeding the cutting tool 230 in the diametrical direction C, and a cutting motion is performed. The structure of the cutting equipment 3 is similar to that of a hole saw type drilling machine used without stopping passage of water, which has been already known. Therefore, detailed illustration and description thereof are omitted herein.

As shown with an imaginary line in FIG. 78, a sluice valve body 8a is disposed in advance at a place corresponding to the slit groove 12C slit by the abovementioned cutting tool 230.

Slitting Process

Next, a description is given of the sequence of slitting.

Figure 80:
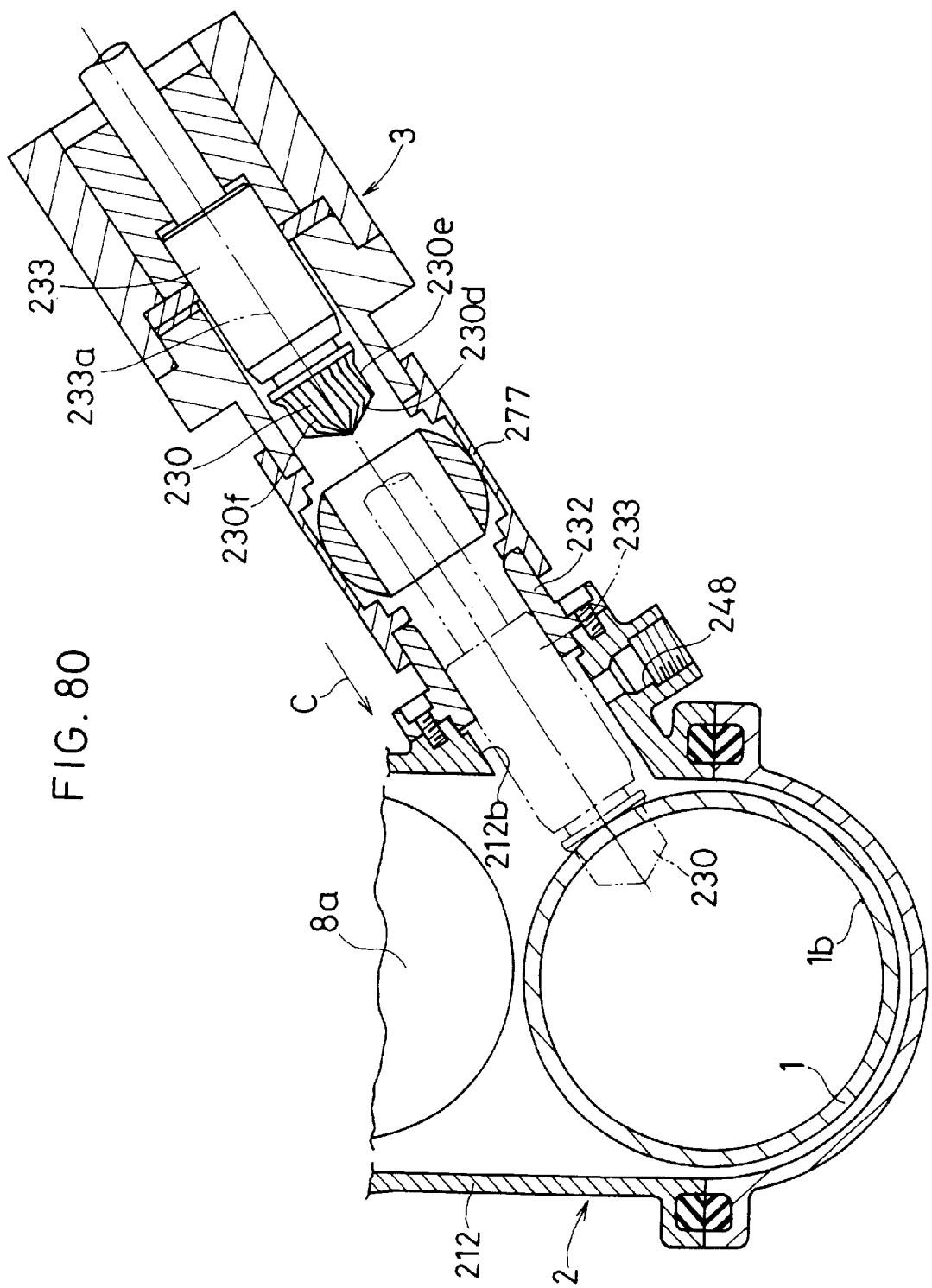
FIG. 80 is a sectional view showing a state where the cutting tool is attached.

First, the workmen attach a seal-up housing 2 to an existing pipe 1 in a state where water flows in the existing pipe 1 in FIG. 79, and concurrently, assemble both split housings 211 and 212 by assembling bolts (not illustrated). After that, the cutting equipment 3 in FIG. 80 is attached in advance to the second split housing 212 of the seal-up housing 2 via a ball valve 277. Thus, as shown in FIG. 78, the seal-up housing 2 encloses and seals up the existing pipe 1 in an airtight state.

Figure 81:
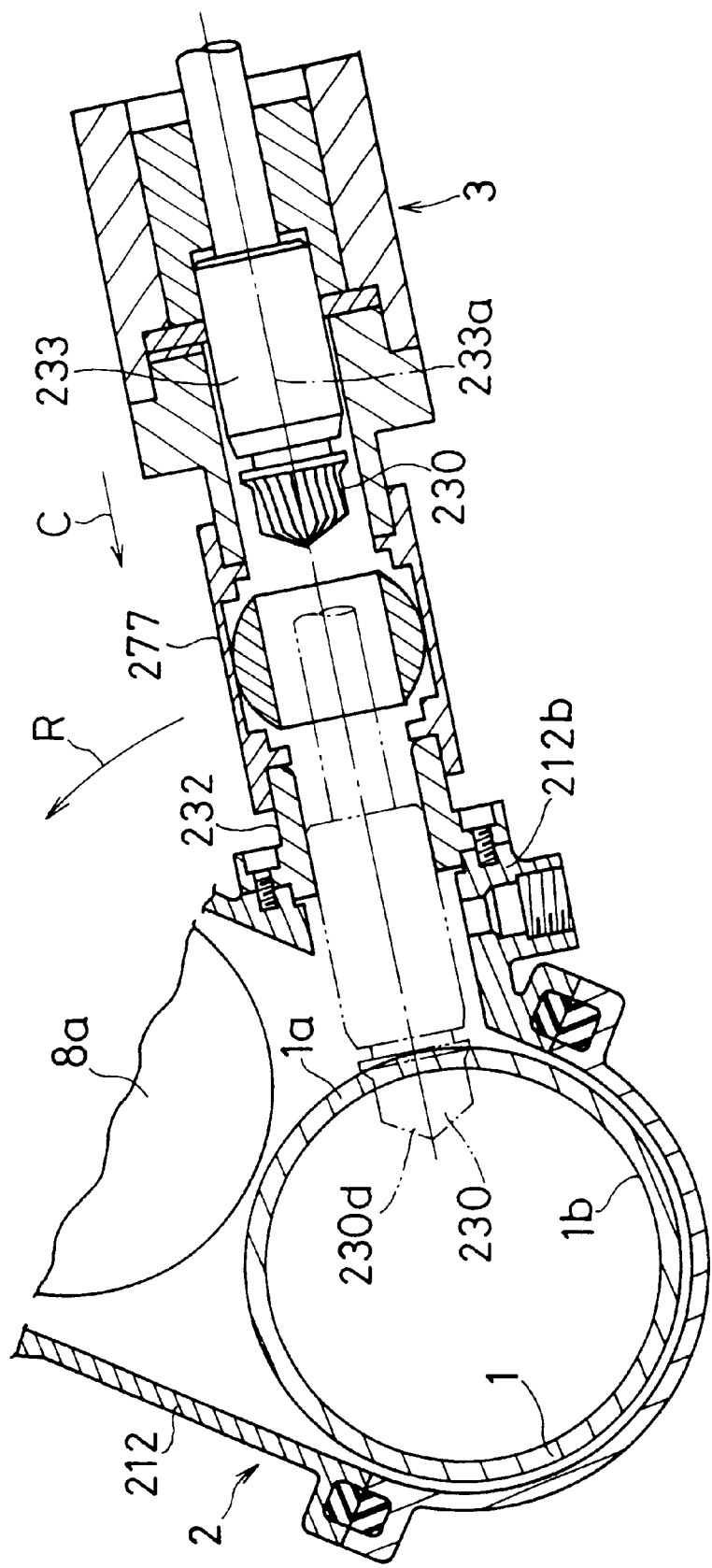
FIG. 81 is a sectional view showing a state after the cutting is commenced.
Figure 82:
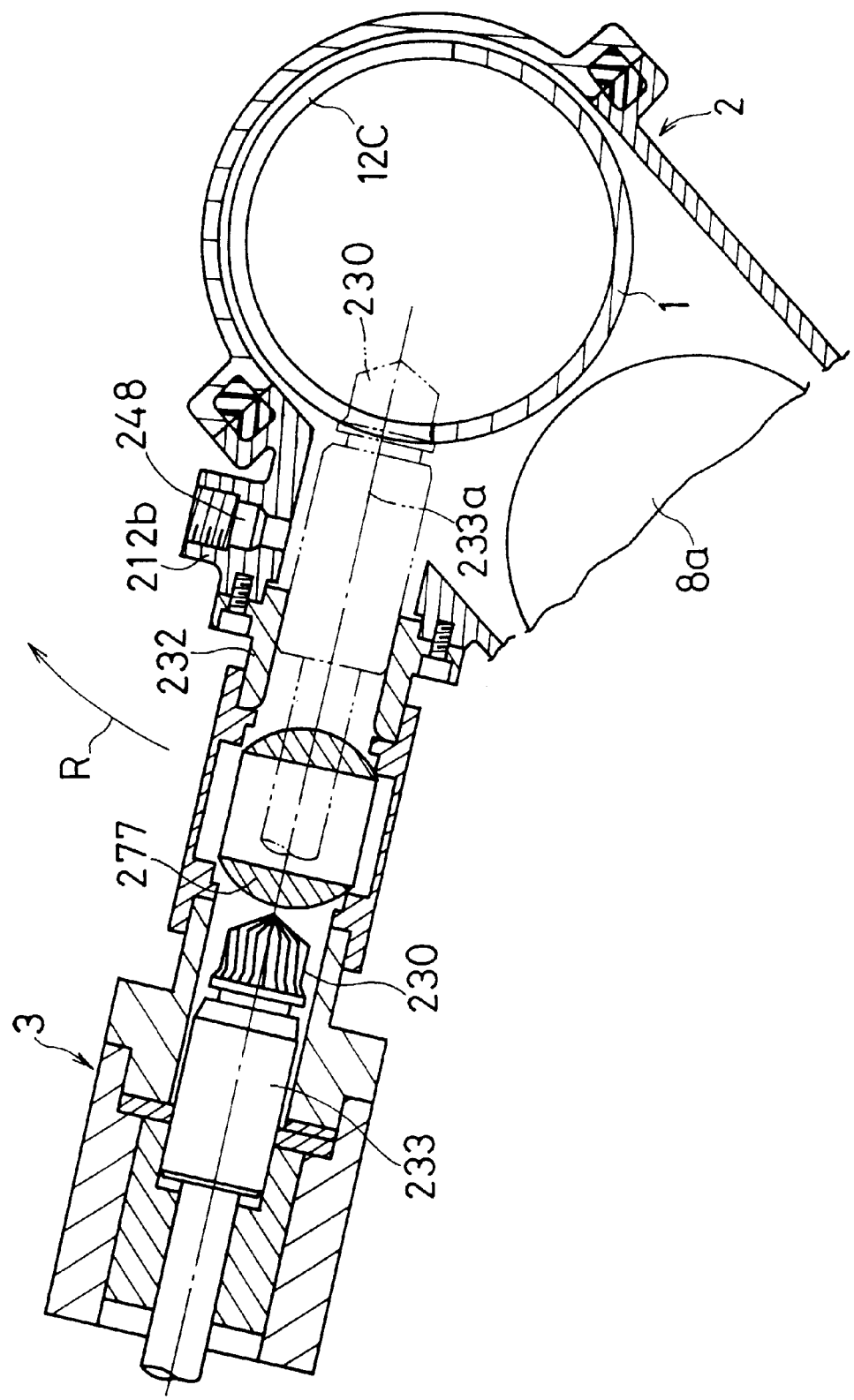
FIG. 82 is a sectional view showing a state after the cutting is completed.

Next, the seal-up housing 2 is turned, and as shown in FIG. 81, a slitting position carried out by the cutting tool 230 is established. That is, manually or by using a winch, the workmen turn the seal-up housing 2 and cutting equipment 3 to the position where the axial line 233a of the cutting tool 230 is made roughly horizontal.

Furthermore, as the workmen drive the prime mover of the cutting equipment 3, the corresponding prime mover causes the cutting tool 230 to rotate around the axial line 233a of the main shaft 233 and causes a slitting motion to be carried out, by which the existing pipe 1 is slit by rotations of the corresponding cutting tool 230. If the cutting tool 230 is fed in the cutting feed direction C in a state where the cutting tool 230 is performing the corresponding slitting motion, as shown with alternate short and long two-dashed lines, the cutting tool 230 shortly advances to the position where the tip end surface 230d thereof, and penetrates a part of the pipe wall 1a of the existing pipe 1. Thus, the cutting feed of the cutting tool 230 in the direction C is completed.

After that feed is completed, the workmen turns the seal-up housing 2 around the existing pipe 1 in the circumferential direction R of the existing pipe 1 in FIG. 81. Thereby, the cutting tool 230 is turned around the axial line 233a while turning approximately 150 to 160 degrees along the outer circumference of the existing pipe 1 together with the seal up housing 2, wherein the cutting tool 230 semi-annularly slits the existing pipe 1 as in FIG. 82, wherein a slit groove 12C is formed in the existing pipe 1.

Cutting Equipment Removing Process

Figure 83:
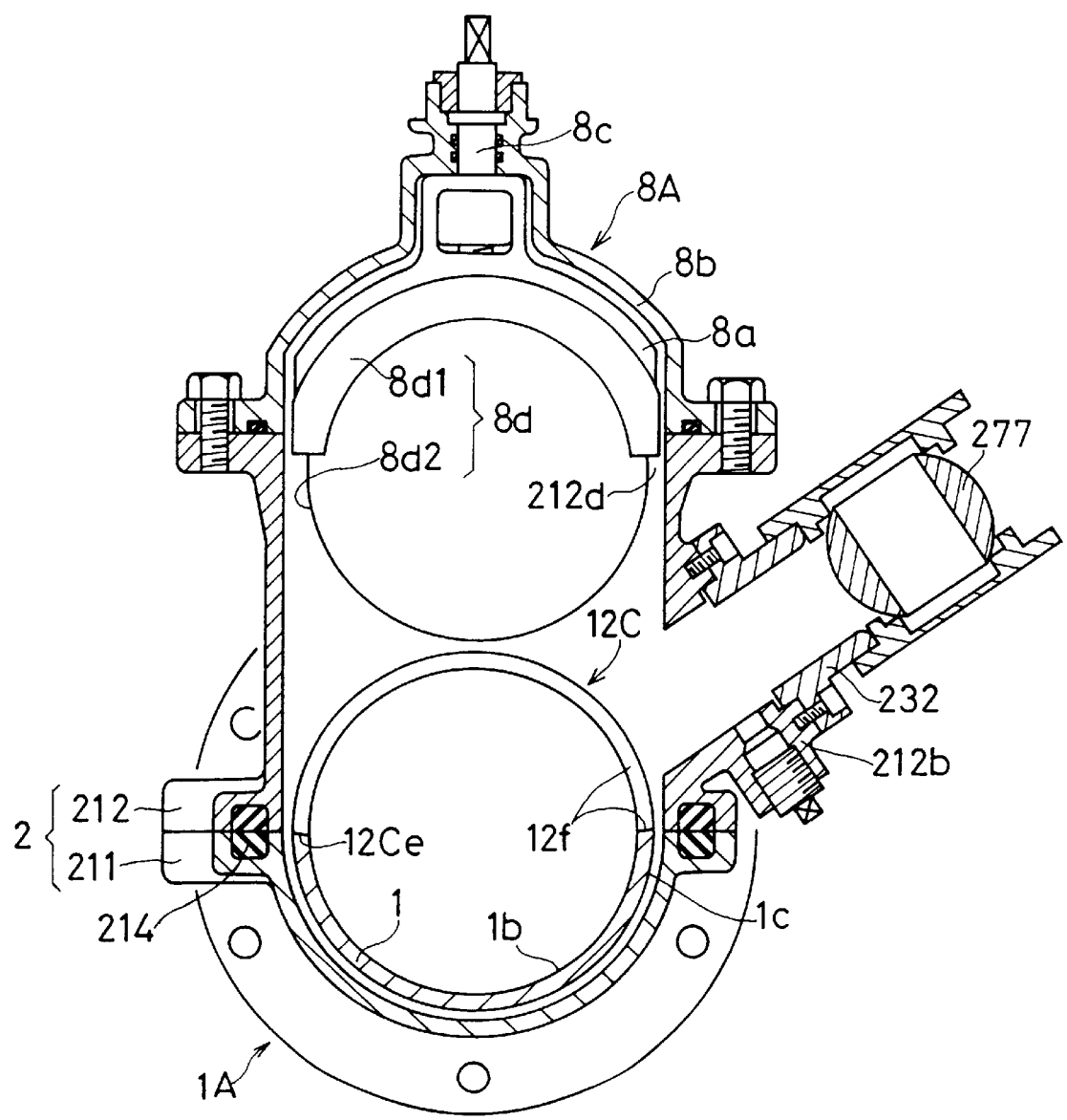
FIG. 83 is a longitudinally sectional view showing a piping structure after a valve is inserted.
Figure 84:
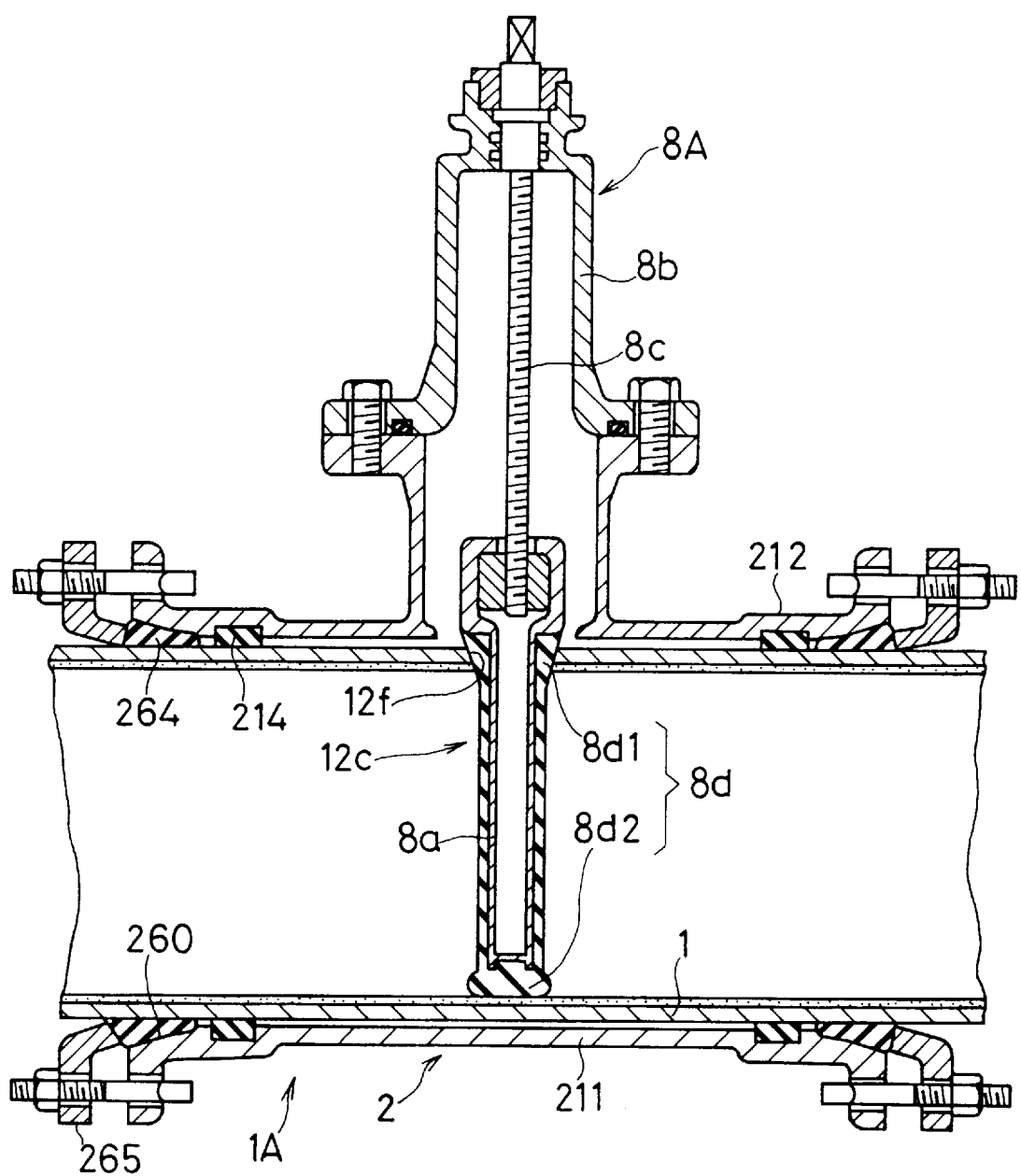
FIG. 84 is a longitudinally sectional view showing a state where the valve is closed.

After the abovementioned slit groove 12C is formed, the discharge opening 248 is clogged by a plug (not illustrated). After that, the cutting tool 230 is retreated, and the ball valve 277 is closed. After the ball valve is closed, the cutting equipment 3 is removed from the seal-up housing 2. After it is removed, the seal-up housing 2 is turned back from the position shown in FIG. 82 to its original position as shown in FIG. 83. Thereafter, a rubber ring 264 and a split press ring 265, which are shown in FIG. 84, are attached. Here, insertion (installation) of the valve in a line is completed.

Figure 85:
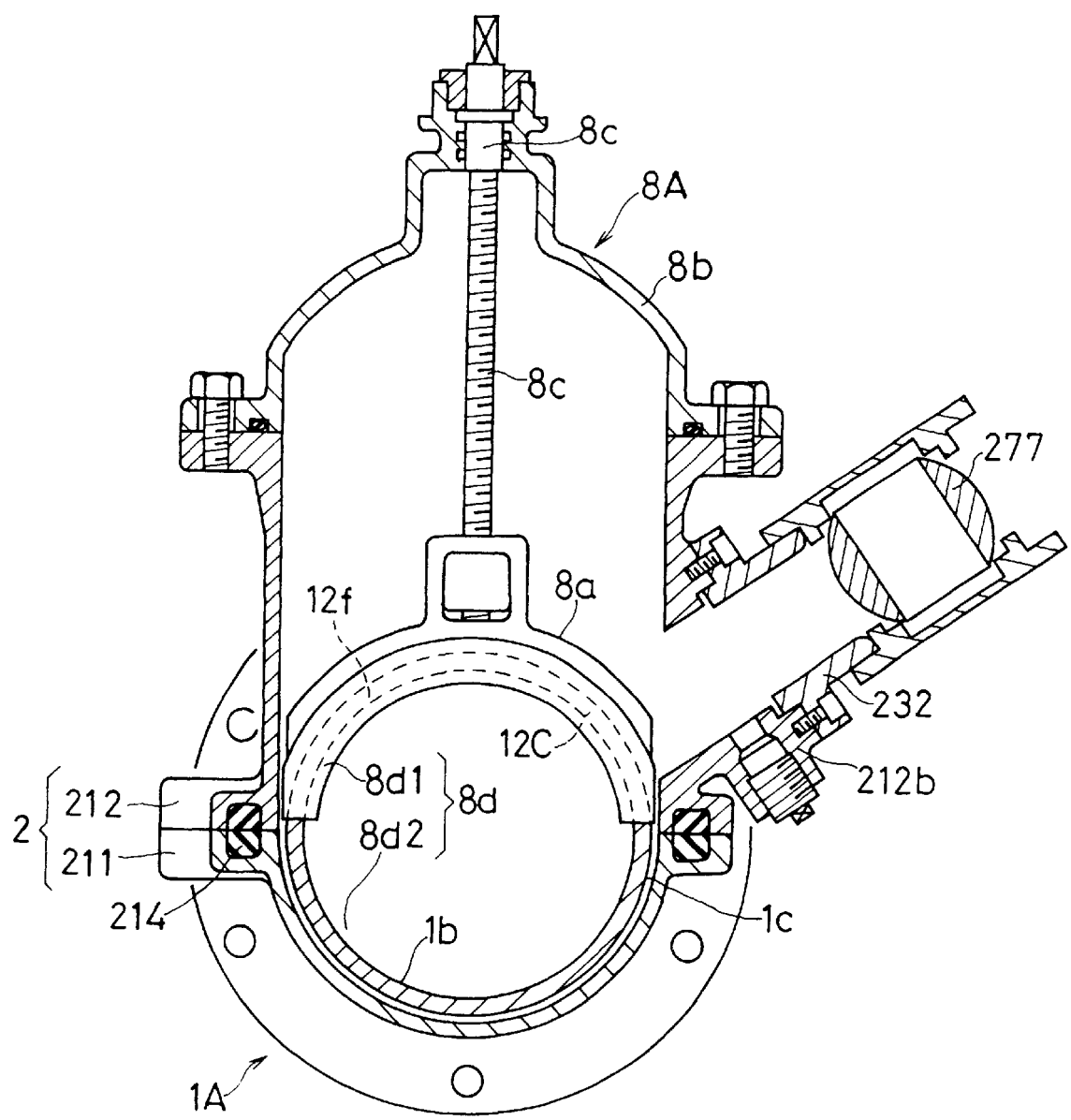
FIG. 85 is a cross-sectional view showing a state where the valve is closed.

The sluice valve body 8a is closed as shown in FIG. 84 and FIG. 85 where optional. Thus, in this preferred embodiment, no operation upper chamber is required, and the operation valve 277 can be made remarkably small. Furthermore, since it is not necessary that, after the slitting is completed, the operation valve 277 is opened and the sluice valve body 8a is accommodated in the seal-up housing 2, the time required for the operation can be remarkably shortened.

As described above, although some preferred embodiments of the invention are explained with reference to the accompanying drawings, they does not intend to limit the scope of the invention, that is, one skilled in the art is able to easily make various types of variations and modifications in a clear range with reference to the specification hereof.

For example, an engine may be employed in addition to a motor as a prime mover which gives a slitting motion to a cutting tool. Furthermore, a prime mover is installed on the ground, and power of the corresponding prime mover is transmitted to a cutting tool via its cutter shaft by a flexible shaft. Furthermore, after an existing pipe is enclosed and sealed up by a seal-up housing, a cutting tool may be attached to the corresponding seal-up housing. Still furthermore, after the existing pipe 1 is cut off or slit, a branch pipe may be connected to the seal-up housing via a sluice valve.

Furthermore, when cutting or slitting the existing pipe 1 by a cutting tool, although it is generally favorable that the cutting tool is fed toward roughly the center in the diametrical direction of the existing pipe as in the respective preferred embodiments, in the present invention, it is not necessary that the cutting tool is moved toward the center thereof. It is satisfactory that the cutting tool is fed in the diametrical direction.

Furthermore, the seal-up housing may be divided into three or four sections in the circumferential direction. Still furthermore, a valve body may be inserted from any direction such as upward, sideway or downward.

In addition, the present invention is applicable to not only a water pipe but also a gas pipe. That is, fluid flowing in an existing pipe may be gas or oil in addition to water. These are included in the invention.

Therefore, it is easily understood that such variations and modifications are included in the scope of the invention, which are defined by the claims thereof.

What is claimed is:

1. An existing pipe cut-off method, comprising the steps of:
    rotatably mounting a seal-up housing on an existing pipe, such that the seal-up housing encloses a part of the existing pipe in an air tight state via a set of seal members that contact the existing pipe about at least two outer circumferences of the existing pipe that are spaced apart in the longitudinal direction of the existing pipe, the seal-up housing having at least two split portions that receive the seal members, each split portion having a unitary construction that extends completely across the at least two outer, spaced apart circumferences of the existing pipe, thereby allowing the at least two split portions to move as a single unit around the existing pipe during a cutting operation;
    accommodating a cutting tool, which is supported for rotation about a cutter shaft and is provided with a plurality of blades, in the seal-up housing; and
    while rotating the cutting tool about the cutter shaft,
    (1) feeding the cutting tool in a radially inward direction of the existing pipe to slit the existing pipe, and
    (2) rotating the entire seal-up housing including the at least two split portions together with the cutting tool in a circumferential direction of the existing pipe so that the cutting tool cuts through an entire circumference of the existing pipe.

2. An existing pipe cut-off method as set forth in claim 1, further comprising the steps of:
    rotatably mounting a second seal-up housing on the existing pipe, the two seal-up housings being spaced from each other in the longitudinal direction of the existing pipe;
    accommodating a cutting tool in the second seal-up housing; and
    slitting the existing pipe at two points to form a cut-off section to be removed.

3. An existing pipe cut-off method as set forth in claim 2, further comprising the step of:

providing a spacer between of the two seal-up housings to determine the relative positions of the two seal-up housings.

4. An existing pipe cut-off method as set forth in claim 2, further comprising the steps of:
mounting an operation chamber on the existing pipe to enclose the two seal-up housings and a portion of the existing pipe in an air tight state;
sliding the two seal-up housings toward each other so that both seal-up housings are positioned on the cut-off section; and
removing the cut-off section together with the two seal-up housings from the existing pipe.

5. A valve insertion method for inserting a valve in a line without stopping passage of water, wherein after the cut-off section in claim 4 is removed from the existing pipe, a valve to seal a line is inserted into the line.

6. An existing pipe cut-off method as set forth in claim 1, wherein the cutting tool is a disk-shaped cutting tool having the plurality of blades provided on an outer circumferential portion of a disk-shaped base.

7. An existing pipe cut-off method as set forth in claim 6, wherein the cutter shaft is parallel to the longitudinal direction of the existing pipe.

8. An existing pipe cut-off method as set forth in claim 7, wherein the disk-shaped cutting tool has non-directivity, which is able to slit said existing pipe while rotating in any one of the two rotating directions on the cutter shaft.

9. An existing pipe cut-off method as set forth in claim 7, wherein the blades are made of diamond grains, and the cutting tool is a diamond wheel.

10. An existing pipe cut-off method as set forth in claim 9, wherein the cutter shaft is provided with two diamond wheels that are spaced from each other in the longitudinal direction of the existing pipe.

11. A valve insertion method for inserting a valve in a line without stopping passage of water, wherein after a cut-off section cut off by the two diamond wheels in claim 10 is removed from the seal-up housing together with the two diamond wheels, a valve to stop the passage of water is inserted into the line at a position from which the cut-off section was removed.

12. An existing pipe cut-off method as set forth in claim 1, wherein after the cutting tool is fed in the radially inward direction of the existing pipe so that the cutting tool passes through a wall of the existing pipe, the seal-up housing and the cutting tool are rotated together so that the cutting tool slits through the pipe wall.

13. An existing pipe cut-off method as set forth in claim 1, wherein one of the split portions of the housing is provided with a bifurcated portion projecting roughly in the radial direction of the existing pipe; and
wherein a tool attaching housing, which rotatably supports the cutter shaft, is attached to the bifurcated portion so that the cutting tool is moveable in the radial direction of said existing pipe with respect to said bifurcated portion.

14. An existing pipe cut-off method as set forth in claim 1, wherein the cutting tool has a columnar portion with the plurality of blades provided on a tip end face and an outer circumferential surface of the columnar portion.

15. An existing pipe cut-off method as set forth in claim 14, wherein the cutter shaft is substantially parallel to the radial direction of the existing pipe.

16. A valve insertion method for inserting a valve in a line without stopping passage of water, wherein after the existing pipe is cut through by the cutting tool in claim 15 so that no cut-off section remains, a valve is inserted into a cut-open portion in a line.

17. A valve insertion method for inserting a valve in a line without stopping passage of water as set forth in claim 16, wherein the seal-up housing constitutes at least a part of a housing of the valve to be inserted thereinto.

18. A piping structure comprising:
an existing pipe;
a seal-up housing provided on said existing pipe for rotation relative to said existing pipe in a circumferential direction of said existing pipe to cut a groove in said existing pipe that extends approximately 180 degrees in the circumferential direction of said exiting pipe, said groove having a fixed groove width and roughly U-shaped end portions, said seal-up housing enclosing a part of said existing pipe in an airtight state via a set of seal members that contact said existing pipe about at least two outer circumferences of said existing pipe that are spaced apart in the longitudinal direction of said existing pipe, said seal-up housing having at least two split portions that receive said seal members, each split portion having a unitary construction that extends completely across said at least two outer, spaced apart circumferences of said existing pipe, thereby allowing said at least two split portions to move as a single unit around said existing pipe during a cutting operation;
a sluice valve body provided in said seal-up housing and radially moveable through said groove of said existing pipe between an open position and a closed position, said sluice valve body having a rubber packing that contacts (1) an inner circumferential surface of said existing pipe and (2) a surface forming said groove in the closed position to stop a passage of fluid in said existing pipe; and
a valve rod connected to said valve body to move said valve body in the radial direction.

19. The piping structure as set forth in claim 18, wherein said groove is slit by a cutting tool.

20. The piping structure as set forth in claim 19, wherein said surface forming said groove forms an angle with an outer surface of said existing pipe in a range from 45 degrees to 90 degrees.

21. The piping structure as set forth in claim 18, wherein one of said at least two split portions is a first divided housing formed along an outer circumference of said existing pipe;
wherein another of said at least two split portions is a second divided housing having a hole in which said sluice valve body moves, and accommodating at least a part of said sluice valve body in the open position; and
wherein said seal-up housing further comprises a valve cover for closing said hole of said second divided housing.

22. The piping structure as set forth in claim 18, wherein said seal-up housing comprises:
a first bifurcated portion for accommodating the sluice valve body; and
a second bifurcated portion for accommodating a cutting tool for slitting said groove.

23. A piping structure as set forth in claim 22, wherein said first and said second bifurcated portions are provided in one of said at least two split portions of said seal-up housing.

24. The method as set forth in claim 23, wherein the seal-up housing is provided with a first bifurcated portion for accommodating the sluice valve body and a second bifurcated portion for attaching the operation valve.

25. The method as set forth in claim 24, wherein the first and the second bifurcated portions are provided in one of the at least two split portions of the seal-up housing.

26. An existing pipe slitting method, comprising the steps of:
rotatably mounting a seal-up housing on an existing pipe, such that the seal-up housing encloses a part of the existing pipe in an air tight state via a set of seal members that contact the existing pipe about at least two outer circumferences of the existing pipe that are spaced apart in the longitudinal direction of the existing pipe, the seal-up housing having at least two split portions that receive the seal members, each split portion having a unitary construction that extends completely across the at least two outer, spaced apart circumferences of the existing pipe, thereby allowing the at least two split portions to move as a single unit around the existing pipe during a cutting operation;

accommodating a cutting tool, which is supported for rotation about an axis that extends in a radial direction of the existing pipe and is provided with a plurality of blades, in the seal-up housing; and while rotating the cutting tool about the axis, (1) feeding the cutting tool in a radially inward direction of the existing pipe to slit the existing pipe, and (2) rotating the seal-up housing including the at least two split portions together with the cutting tool in a circumferential direction of the existing pipe to slit the existing pipe in a range of approximately 180 degrees in the circumferential direction.

27. The method as set forth in claim 26, wherein after the cutting tool is fed in the radially inward direction of the existing pipe so that the cutting tool passes through a wall of the existing pipe, is the seal-up housing and the cutting tool are rotated together so that the cutting tool slits through pipe wall.

28. The method as set forth in claim 26, further comprising the steps of:

providing a tool attaching housing, which rotatably supports the cutting tool, on a bifurcated portion of the seal-up housing,, the tool attaching housing adapted to advance and retreat the cutting tool in the radial direction of the existing pipe relative to the bifurcated portion.

29. A valve insertion method for inserting a valve in a line without stopping passage of a fluid, after the existing pipe is slit in a range of approximately 180 degrees by the cutting tool, as set forth in claim 26, the valve insertion method comprising the step of:

inserting a valve having a valve body into the line, the valve body invades through the slit and into the existing pipe, such that the valve body is pressure-fitted to an inner circumferential surface of the existing pipe.

30. A valve insertion method for inserting a valve in a line without stopping passage of water, after the existing pipe is slit in a range of approximately 180 degrees by the cutting tool, as set forth in claim 26, the valve insertion method comprising the step of:

inserting a valve having a valve body into the line, the valve body invades through the slit and into the existing pipe, such that the valve body is pressure-fitted to an inner circumferential surface of the existing pipe.

31. The method as set forth in claim 26, further comprising the steps of:

accommodating a sluice valve body in the seal-up housing in addition to the cutting tool before slitting the existing pipe, wherein the sluice valve body is operative to invade the existing pipe through the slit and close the existing pipe by (1) clogging the slit and (2) being pressure-fitted to an inner circumferential surface of the existing pipe; and providing an operation valve on the seal-up housing, which maintains the seal-up housing in an air tight state upon removal of the cutting tool;

wherein after the cutting tool slits the existing pipe, the cutting tool is removed from the seal-up housing.

32. A piping structure comprising:

an existing pipe through which a fluid is flowing;

a seal-up housing mounted on said existing pipe and sealing up said existing pipe in an airtight state via a set of seal members that contact said existing pipe about at least two outer circumferences of said existing pipe that are spaced apart in the longitudinal direction of said existing pipe, said seal-up housing having at least two split portions that receive said seal members, each split portion having a unitary construction that extends completely across said at least two outer, spaced apart circumferences of said existing pipe, thereby allowing said at least two split portions to move as a single unit around said existing pipe during a cutting operation, said seal-up housing rotatable relative to said existing pipe in a circumferential direction of said existing pipe;

a cutting tool mounted in said seal-up housing (1) for rotation about an axis that extends in a radial direction of said existing pipe and (2) for translation in the radial direction relative to said seal-up housing to cut said existing pipe;

wherein said seal-up housing including said at least two split portions and said cutting tool are rotatable together in the circumferential direction of said existing pipe so that when (1) said cutting tool is rotated about said axis and (2) positioned radially inward to cut said existing pipe, said cutting tool slits a top portion of said existing pipe to provide a groove extending approximately 180 degrees in the circumferential direction of said existing pipe.

33. An existing pipe slitting method, comprising the steps of:

rotatably mounting a seal-up housing on an existing pipe, such that the seal-up housing encloses a part of the existing pipe in an air tight state via a set of seal members that contact the existing pipe about at least two outer circumferences of the existing pipe that are spaced apart in the longitudinal direction of the existing pipe, the seal-up housing having at least two split portions that receive the seal members, each split portion having a unitary construction that extends completely across the at least two outer, spaced apart circumferences of the existing pipe, thereby allowing the at least two split portions to move as a single unit around the existing pipe during a cutting operation;

providing a cutting tool in the seal-up housing, the cutting tool being supported for rotation about an axis that extends in a radial direction of the existing pipe; and while rotating the cutting tool about the axis, (1) feeding the cutting tool in a radially inward direction of the existing pipe to slit the existing pipe, and (2) rotating the seal-up housing including the at least two split portions together with the cutting tool in a circumferential direction of the existing pipe to slit a top portion of the existing pipe in a range of approximately 180 degrees in the circumferential direction.

34. The method as set forth in claim 33, further comprising the steps of:

accommodating a sluice valve body in the seal-up housing in addition to the cutting tool before slitting the existing pipe; and providing an operation valve on the seal-up housing, which maintains the seal-up housing in an air tight state upon removal of the cutting tool;

wherein after the cutting tool slits the existing pipe, the cutting tool is removed from the seal-up housing.

* * * * *

UNITED STATES PATENT AND TRADEMARK OFFICE
CERTIFICATE OF CORRECTION

PATENT NO. : 6,470,907 B1
DATED : October 29, 2002
INVENTOR(S) : Toshiyuki Sato et al.

It is certified that error appears in the above-identified patent and that said Letters Patent is hereby corrected as shown below:

<u>Title page,</u>
Item [73], Assignee, please change "SuIken Co., Ltd." to -- Suiken Co., Ltd. --

<u>Column 36,</u>
Line 60, change "23" to -- 31 --.

Signed and Sealed this

Eleventh Day of March, 2003

JAMES E. ROGAN
*Director of the United States Patent and Trademark Office*